(12) United States Patent
Sibley et al.

(10) Patent No.: US 11,517,008 B1
(45) Date of Patent: Dec. 6, 2022

(54) TARGETING OBJECTS OF INTEREST IN AN AGRICULTURAL ENVIRONMENT

(71) Applicant: Verdant Robotics, Inc., Hayward, CA (US)

(72) Inventors: Gabriel Thurston Sibley, Alameda, CA (US); Lorenzo Ibarria, Dublin, CA (US); Curtis Dale Garner, Sand City, CA (US); Patrick Christopher Leger, Belmont, CA (US)

(73) Assignee: VERDANT ROBOTICS, INC., Hayward, CA (US)

( * ) Notice: Subject to any disclaimer, the term of this patent is extended or adjusted under 35 U.S.C. 154(b) by 0 days.

(21) Appl. No.: 17/840,534

(22) Filed: Jun. 14, 2022

Related U.S. Application Data

(63) Continuation of application No. 17/506,618, filed on Oct. 20, 2021, now Pat. No. 11,399,531.

(51) Int. Cl.
  *G06F 7/00* (2006.01)
  *A01M 7/00* (2006.01)
  *G05B 15/02* (2006.01)

(52) U.S. Cl.
  CPC .......... *A01M 7/0089* (2013.01); *G05B 15/02* (2013.01)

(58) Field of Classification Search
  CPC .............................. A01M 7/0089; G05B 15/02
  USPC .............................. 47/1.7; 700/213, 245, 266
  See application file for complete search history.

(56) References Cited

U.S. PATENT DOCUMENTS

| 10,823,591 | B2 | 11/2020 | Yang |
| 2001/0016788 | A1 | 8/2001 | Hauwiller et al. |
| 2003/0152186 | A1 | 8/2003 | Jurczyk et al. |
| 2003/0205460 | A1 | 11/2003 | Buda |
| 2005/0167588 | A1 | 8/2005 | Donnangelo |
| 2007/0100547 | A1 | 5/2007 | Chang |
| 2008/0141072 | A1 | 6/2008 | Kalgren et al. |
| 2008/0157990 | A1 | 7/2008 | Bowen et al. |
| 2010/0169030 | A1 | 7/2010 | Parlos |
| 2013/0129142 | A1 | 5/2013 | Miranda-steiner |
| 2015/0015697 | A1 | 1/2015 | Redden et al. |

(Continued)

FOREIGN PATENT DOCUMENTS

| CN | 112036265 A | 12/2020 |

OTHER PUBLICATIONS

International Search Report and Written Opinion for International Patent Application No. PCT/US2020/052071, dated Dec. 17, 2020.

(Continued)

*Primary Examiner* — Yolanda R Cumbess
(74) *Attorney, Agent, or Firm* — Perkins Coie LLP

(57) ABSTRACT

A method includes receiving, by the treatment system, during operation in an agricultural environment, one or more images comprising one or more agricultural objects in the agricultural environment, identifying, in real-time, one or more objects of interest from the one or more agricultural objects by analyzing the one or more images, wherein the analyzing results in a first object being identified as belonging to one or more target objects and a second object being identified as not belonging to the one or more target objects, logging one or more results of the identification of each of the one or more objects of interest and a corresponding treatment decision; and activating the treatment mechanism to treat the one or more target objects.

20 Claims, 67 Drawing Sheets

(56) References Cited

U.S. PATENT DOCUMENTS

| | | |
|---|---|---|
| 2016/0223506 A1 | 8/2016 | Shriver et al. |
| 2017/0016870 A1 | 1/2017 | Mcpeek |
| 2017/0030877 A1 | 2/2017 | Miresmailli et al. |
| 2017/0071188 A1 | 3/2017 | Rees |
| 2017/0278159 A1 | 9/2017 | Chung |
| 2017/0328716 A1 | 11/2017 | Ma |
| 2017/0334560 A1 | 11/2017 | O'connor et al. |
| 2017/0359943 A1 | 12/2017 | Calleija et al. |
| 2018/0160672 A1 | 6/2018 | Crinklaw et al. |
| 2018/0330435 A1 | 11/2018 | Garg |
| 2018/0373932 A1 | 12/2018 | Albrecht et al. |
| 2019/0035071 A1 | 1/2019 | Klein |
| 2019/0150357 A1 | 5/2019 | Wu et al. |
| 2019/0303668 A1 | 10/2019 | King |
| 2019/0362146 A1 | 11/2019 | Polzounov et al. |
| 2020/0005063 A1 | 1/2020 | Ralls et al. |
| 2020/0029490 A1 | 1/2020 | Bertucci et al. |
| 2020/0107537 A1 | 4/2020 | Brown et al. |
| 2020/0120886 A1 | 4/2020 | Geltner |
| 2020/0187406 A1 | 6/2020 | Redden |
| 2020/0187433 A1 | 6/2020 | Redden et al. |
| 2020/0342225 A1 | 10/2020 | Schumann et al. |
| 2020/0359550 A1* | 11/2020 | Tran ............... G05D 1/0094 |
| 2020/0359582 A1 | 11/2020 | Tran et al. |
| 2020/0364456 A1 | 11/2020 | Tran et al. |
| 2020/0364843 A1 | 11/2020 | Stueve et al. |
| 2021/0158041 A1* | 5/2021 | Chowdhary ......... G05D 1/027 |
| 2021/0192754 A1 | 6/2021 | Sibley et al. |
| 2021/0345567 A1 | 11/2021 | Klemm et al. |
| 2021/0357664 A1 | 11/2021 | Kocer et al. |
| 2022/0053122 A1 | 2/2022 | Scheiner et al. |
| 2022/0104435 A1* | 4/2022 | Stewart ............. G01N 33/0098 |
| 2022/0125032 A1* | 4/2022 | Ascherl ............. A01M 7/0089 |
| 2022/0142142 A1* | 5/2022 | Van Alphen ........ A01M 7/0089 |
| 2022/0183208 A1 | 6/2022 | Sibley et al. |

OTHER PUBLICATIONS

Non-Final Office Action dated Aug. 19, 2022 for U.S. Appl. No. 17/073,244 (22 pages).

* cited by examiner

1400

ML Algorithms 20200

ML Target Inclusion 23000

ML Target Exclusion 23200

ML Training 23400

ML Execution 23600

Ejector(s) 25000

Cameras 25200

Wireless 25400

*FIG. 32E*

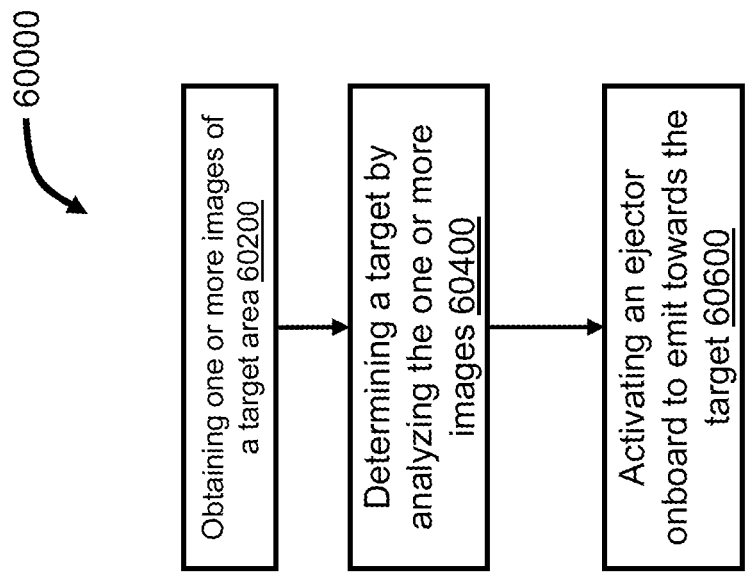

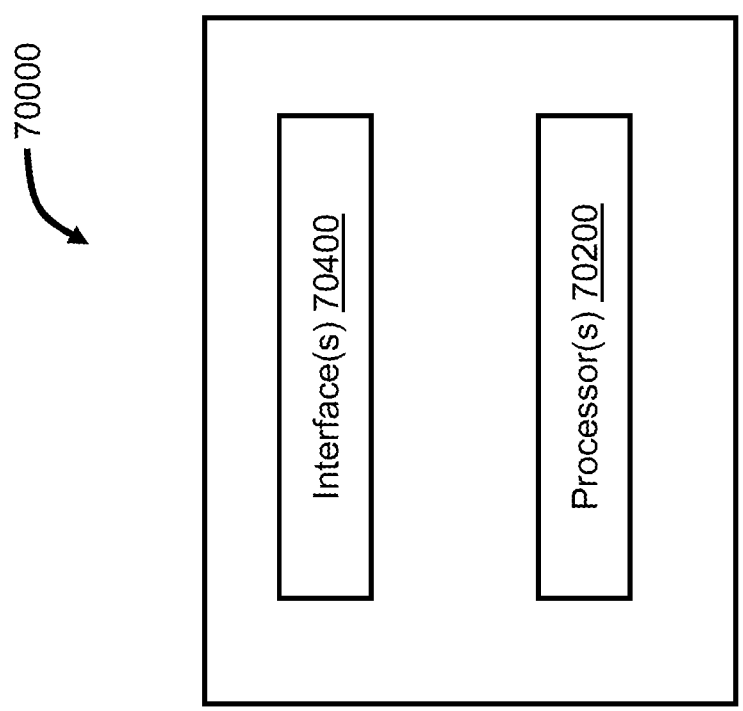

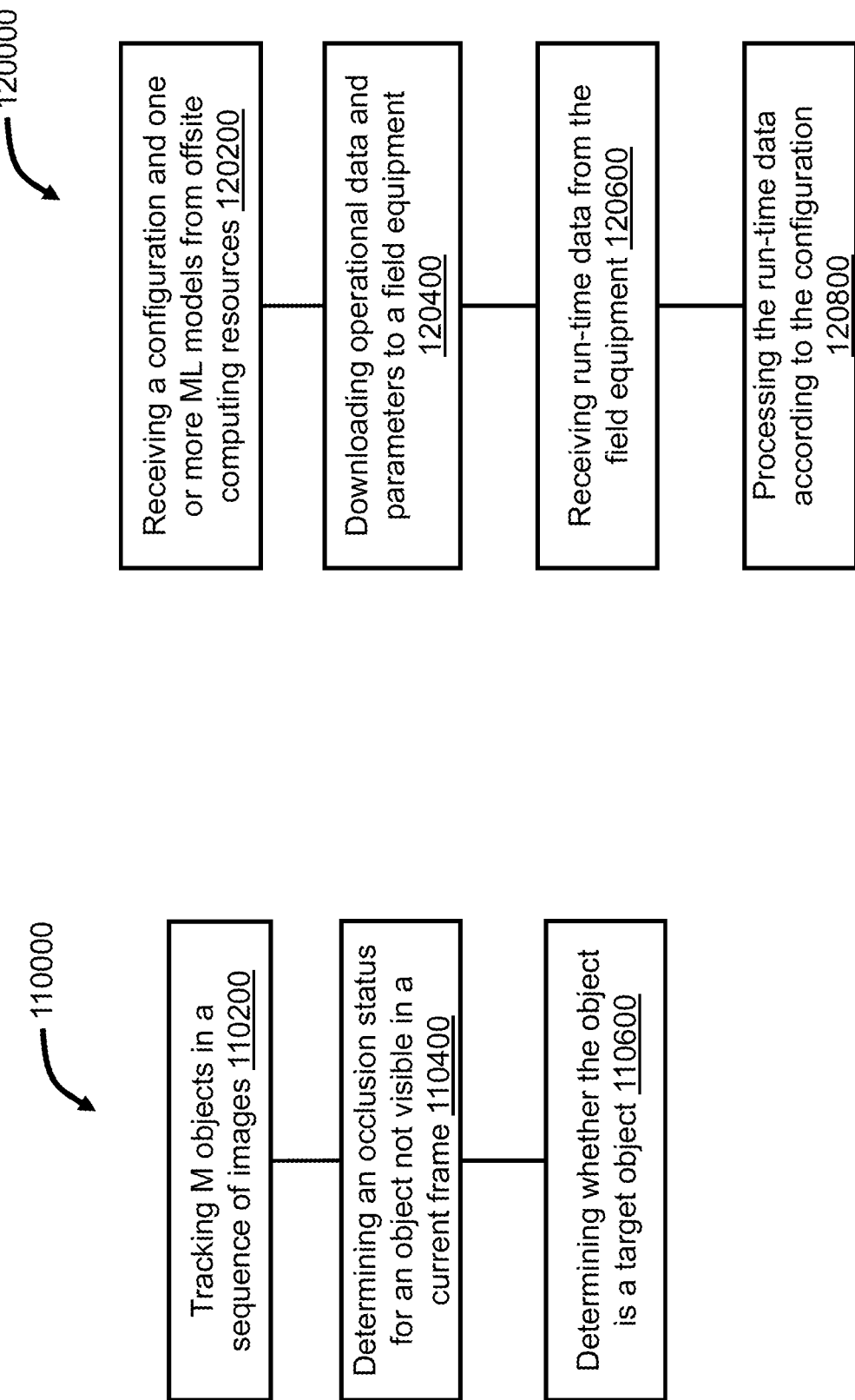

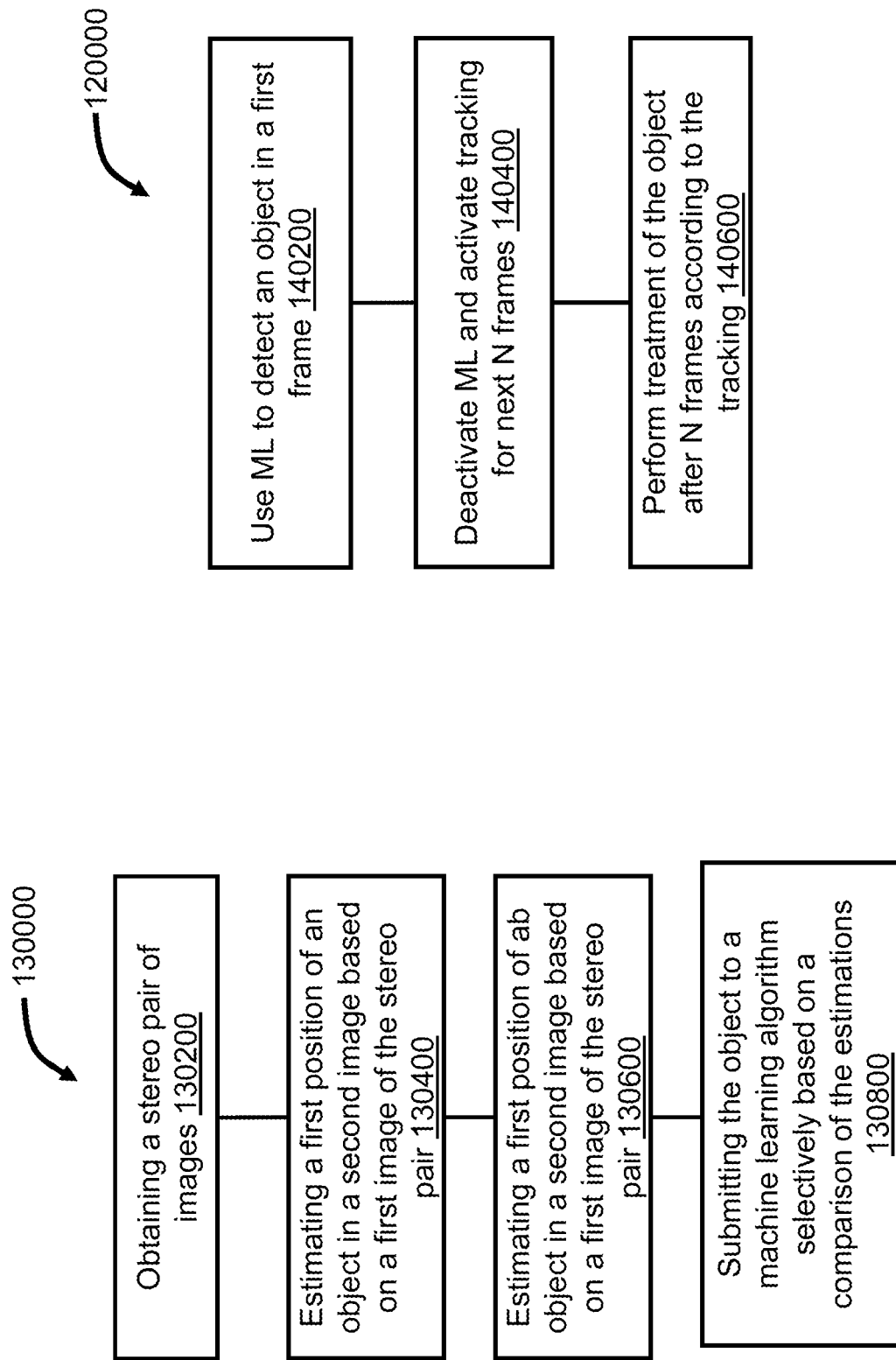

TARGETING OBJECTS OF INTEREST IN AN AGRICULTURAL ENVIRONMENT

CROSS REFERENCE TO RELATED APPLICATIONS

This patent document is a continuation of and claims the benefit of priority to U.S. patent application Ser. No. 17/506,618, filed on Oct. 20, 2021. The entire contents of the before-mentioned patent application is incorporated by reference as part of the disclosure of this application.

TECHNICAL FIELD

The present patent document relates to machine learning and robotic implementation of agricultural activities.

BACKGROUND

Global human population growth is expanding at a rate projected to reach 10 billion or more persons within the next 40 years, which, in turn, will concomitantly increase demands on producers of food. To support such population growth, food production, for example on farms and orchards, need to generate collectively an amount of food that is equivalent to an amount that the entire human race, from the beginning of time, has consumed up to that point in time. Many obstacles and impediments, however, likely need to be overcome or resolved to feed future generations in a sustainable manner.

To support such an increase in demand, agricultural technology has been implemented to more effectively and efficiently grow crops, raise livestock, and cultivate land. Such technology in the past has helped to more effectively and efficiently use labor, use tools and machinery, and reduce the amount of chemicals used on plants and cultivated land.

However, many techniques used currently for producing and harvesting crops are only incremental steps from a previous technique. The amount of land, chemicals, time, labor, and other costs to the industry still pose a challenge. A new and improved system and method of performing agricultural services is needed.

SUMMARY

Techniques for detection of and controlling growth of undesirable vegetation in a field are described.

In one example aspect, a method includes obtaining, by the treatment system mountable on an agricultural vehicle and configured to implement a machine learning (ML) algorithm, one or more images of a region of an agricultural environment near the treatment system, wherein the one or more images are captured from the region of a real-world where agricultural target objects are expected to be present, determining, by the treatment system, one or more parameters for use with the ML algorithm, wherein at least one of the one or more parameters is based on one or more ML models related to identification of an agricultural object, determining, by the treatment system, a real-world target in the one or more images using the ML algorithm, wherein the ML algorithm is at least partly implemented using the one or more processors of the treatment system, and applying a treatment to the target by selectively activating the treatment mechanism based on a result of the determining the target.

In another example aspect, a method performed by a treatment system having one or more processors, a storage, and a treatment mechanism is disclosed. The method includes receiving, by the treatment system, sensor inputs including one or more images comprising one or more agricultural objects; continuously performing a pose estimation of the treatment system based on sensor inputs that are time synchronized and fused; identifying the one or more agricultural objects as real-world target objects by analyzing the one or more images; tracking the one or more agricultural objects identified by the analyzing; controlling an orientation of the treatment mechanism according to the pose estimation for targeting the one or more agricultural objects; and activating the treatment mechanism to treat the one or more agricultural objects according to the orientation.

In another example aspect, an apparatus is disclosed. The apparatus may be used as an agricultural vehicle and comprises a processor and one or more sensors that are configured to obtain sensor readings of an agricultural environment, analyze the one or sensor readings to determine a target and activating a treatment mechanism to interact with the target.

These, and other, aspects are described throughout the present document.

BRIEF DESCRIPTION OF THE DRAWINGS

The present disclosure will become better understood from the detailed description and the drawings, wherein:

FIG. 32C depicts an example of a Machine Learning (ML) system implementation.

FIG. 32E shows examples of inputs/outputs available on an onsite platform.

FIG. 36 shows an example of an example method of detection and elimination of undesirable vegetation.

FIG. 37 shows an example of a hardware platform on which the techniques described in the present document may be implemented.

FIG. 41 is a flowchart of an example method of detection and control of undesirable vegetation.

FIG. 42 is a flowchart of an example method of operation of an edge server.

FIG. 43 is a flowchart of an example of a calibration method.

FIG. 44 is a flowchart of an example method of image processing.

DETAILED DESCRIPTION

Figure 1:
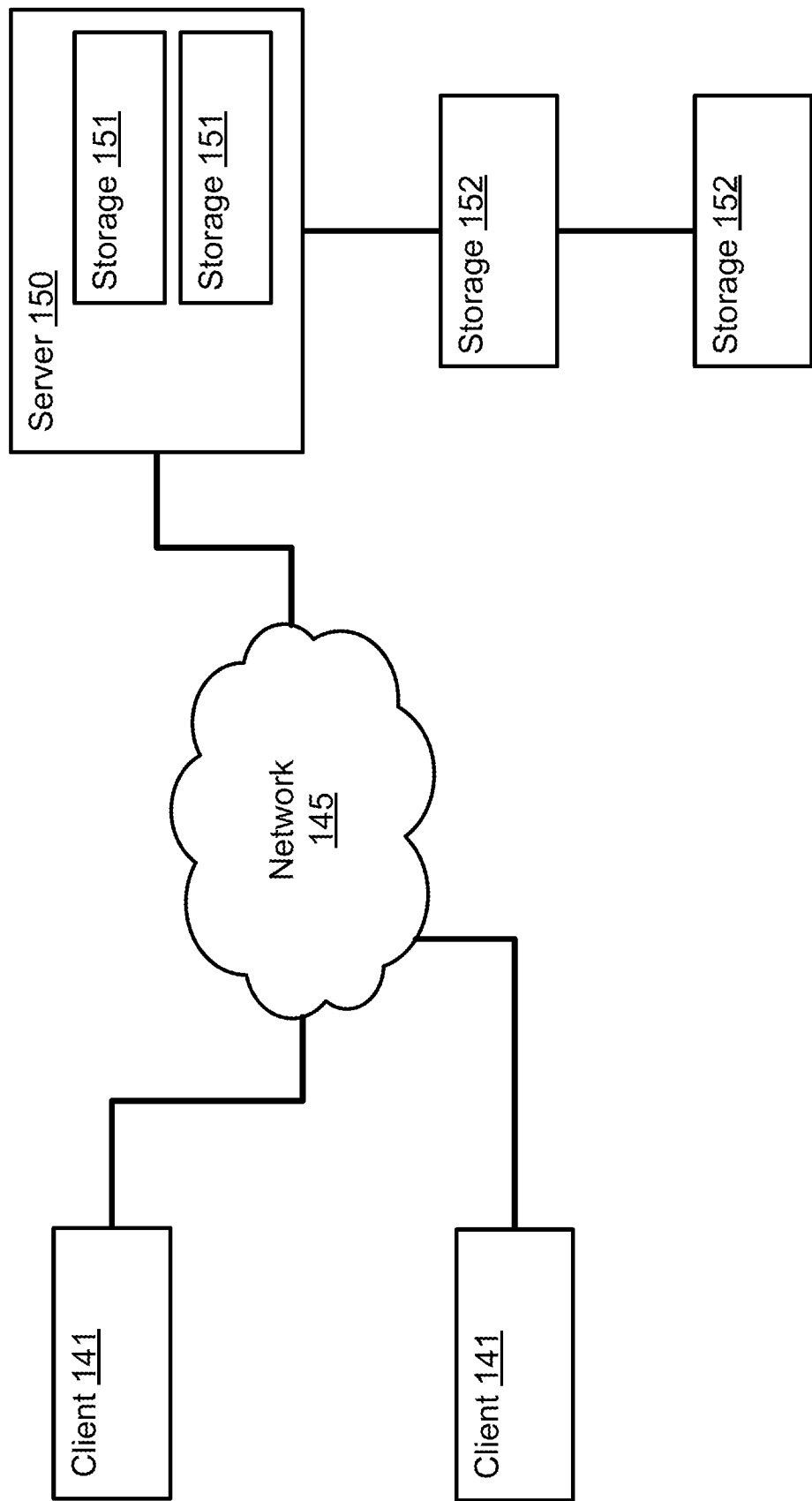
FIG. 1 is a diagram illustrating an exemplary environment, according to some examples.

In this specification, reference is made in detail to specific embodiments of the disclosure. Some of the embodiments or their aspects are illustrated in the drawings.

For clarity in explanation, the present document has been described with reference to specific embodiments, however it should be understood that the disclosure is not limited to the described embodiments. On the contrary, the disclosure covers alternatives, modifications, and equivalents as may be included within its scope as defined by any patent claims. The following embodiments of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein. Various examples and embodiments described below relate generally to robotics, autonomous driving systems, and autonomous agricultural application systems, such as an autonomous agricultural observation and treatment system, utilizing computer software and systems, computer vision and automation to autonomously identify an agricultural object including any and all unique growth stages of agricultural objects identified, including crops or other plants or portions of a plant, characteristics and objects of a scene or geographic boundary, environment characteristics, or a combination thereof.

Additionally, the systems, robots, computer software and systems, applications using computer vision and automation, or a combination thereof, can be configured observe a geographic boundary having one or more plants growing agricultural objects identified as potential crops, detect specific agricultural objects to each individual plant and portions of the plant, determine that one or more specific individual agricultural object in the real world geographic boundary requires a treatment based on its growth stage and treatment history from previous observations and treatment, and to deliver a specific treatment to each of the desired agricultural objects, among other objects. Generally, the computer system provides computer vision functionality using stereoscopic digital cameras and performs object detection and classification and apply a chemical treatment to target objects that are potential crops via an integrated onboard observation and treatment system. The system utilizes one or more image sensors, including stereoscopic cameras to obtain digital imagery, including 3D imagery of an agricultural scene such as a tree in an orchard or a row of plants on a farm while the system moves along a path near the crops. Onboard lights sources, such as LEDs, may be used by the system to provide a consistent level of illumination of the crops while imagery of the crops is being obtained by the image sensors. The system can then identify and recognize different types of objects in the imagery. Based on detected types of objects in the digital imagery, or the same object from one moment in time to another moment in time experiencing a different growth stage which can be recognized, observed, and identified by the on system, as well as the system associating the growth stage or the different label with a unique individual agricultural object previously identified and located at previous growth stage, the system can apply a treatment, for example spray the real-world object with chemicals pumped from one or more liquid tanks, onto a surface of the agricultural object. The system may optionally use one or more additional image sensors to record the treatment, as a projectile, as it is applied from the system to the agricultural object in proximity to the system.

Referring now to FIG. 1, a diagram of an exemplary network environment in which example systems and devices may operate is shown. In the exemplary environment, clients 141 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles, or other ground mobility units configured to support a server 150, and between a base station and one or more control centers as described herein may be executed similarly as the client 141 requests.

The exemplary environment is illustrated with only two clients and one server for simplicity, though in practice there may be more or fewer clients and servers. The computers have been termed clients and servers, though clients can also play the role of servers and servers can also play the role of clients. In some examples, the client 141 may communicate with each other as well as the servers. Also, the server 150 may communicate with other servers.

The network 145 may be, for example, local area network (LAN), wide area network (WAN), networks utilizing 5G wireless standards technology, telephone networks, wireless networks, intranets, the Internet, or combinations of networks. The server 150 may be connected to storage 152 over a connection medium, which may be a bus, crossbar, network, wireless communication interface, or other interconnect. Storage 152 may be implemented as a network of multiple storage devices, though it is illustrated as a single entity. Storage 152 may be a file system, disk, database, or other storage.

In one example, the client 141 may perform one or more methods herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle, or a system or apparatus supported by a vehicle, that sends vehicle sensor data. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client (e.g., in a peer-to-peer system). In one example, the vehicle can be an electric, gasoline, hydrogen, or hybrid powered vehicle including an all-terrain vehicle, a truck, a tractor, a small rover with bogey rocker system, an aerial vehicle such as a drone or small unmanned aerial system capable of supporting a treatment system including vision components, chemical deposition components, and compute components.

In accordance with the above discussion, embodiments can be used to store a file on local storage such as a disk or solid-state drive, or on a removable medium like a flash drive. Furthermore, embodiments may be used to store a file on an external storage device connected to a computer over a connection medium such as a bus, crossbar, network, wireless communication interface, or other interconnect. In addition, embodiments can be used to store a file on a remote server or on a storage device accessible to the remote server.

Furthermore, cloud computing and edge computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user. Edge computing utilizes processing, storage, transfer, and receiving data at a remote server more local to where most, or a desired portion of the data may be processed, stored, and transferred to and from another server, including a central hub or at each geographic boundary where data is captured, processed, stored, transmitted, and received.

Figure 2:
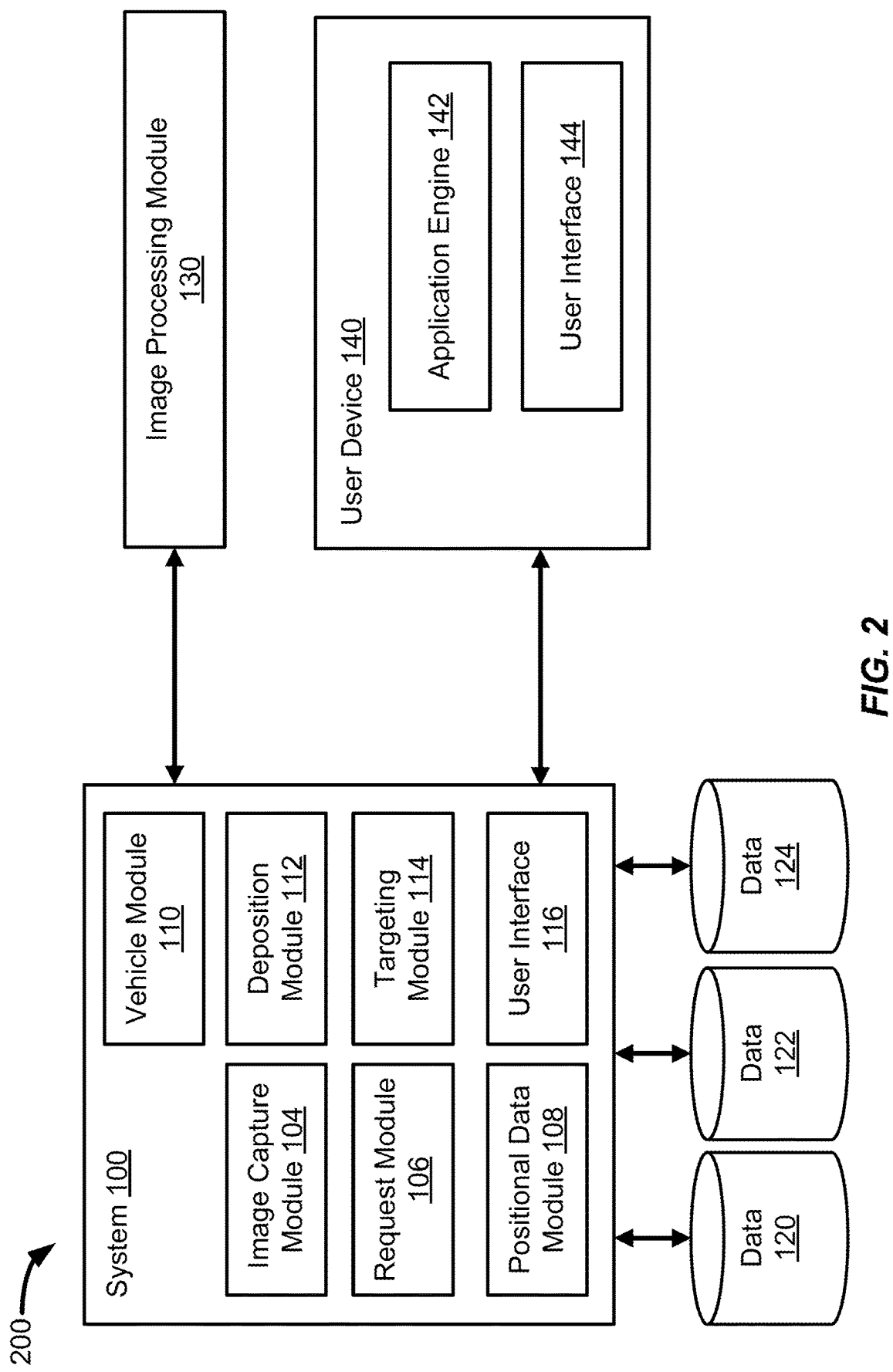
FIG. 2 is a diagram illustrating an exemplary environment, according to some examples.

FIG. 2 illustrates a diagram 200 of an example system 100 configured to observe a geographic boundary in the real-world, for example a farm or orchard, perform object detection, classification, identification, of any and all objects in the geographic boundary including agricultural objects, determine any individual agricultural object that may require an agricultural treatment based on the agricultural object's growth stage, previous treatments applied, and other characteristics observed, particularly at the point in time of the observation by system 100, and apply a specific treatment to the agricultural object. The system 100 can include and object observation and treatment engine that includes an image capture module 104, a request module 106, a positional data module 108 for capturing, fusing, and transmitting sensor data related to position, localization, pose, velocity, and other position related signals to the rest of the system 100, a vehicle module 110, a deposition module 112 for applying a liquid or light treatment on each individual object detected and determined to require a treatment, a targeting module 114 for targeting and tracking an identified object in the real-world based on sensor data and object detection in an image captured of the real-world while a vehicle is moving, and a user interface (U.I.) module 116. The system 100 may communicate with a user device 140 to display output, via a user interface 144 generated by an application engine 142. In one example, the deposition module 112 can also be a treatment module configured to perform non fluid type deposition treatment including having a mechanical mechanism or end effector, including mechanical arms, blades, injectors, drills, tilling mechanism, etc., that physically interacts with surfaces or roots of plant objects or soil.

The system 100 can also include an image processing module 130, either on board a vehicle supporting the system 100, part of the system 100, embedded in the system 100, or supported by one or more servers or computing devices remote from the vehicle supporting the system 100. The image processing module 130 can be configured to process any and all images or other sensor data captured by the system 100 including feature extraction, object identification, detection, and classification, image matching, comparing, and corresponding with other images received simultaneously or previously of the same location, labelling unique features in each of the images, as well as point clouds from various other sensors such as that of lidars, or a combination thereof.

While the databases 120, 122 and 124 are displayed separately, the databases and information maintained in a database may be combined together or further separated in a manner that promotes retrieval and storage efficiency and/or data security.

Figure 3A:
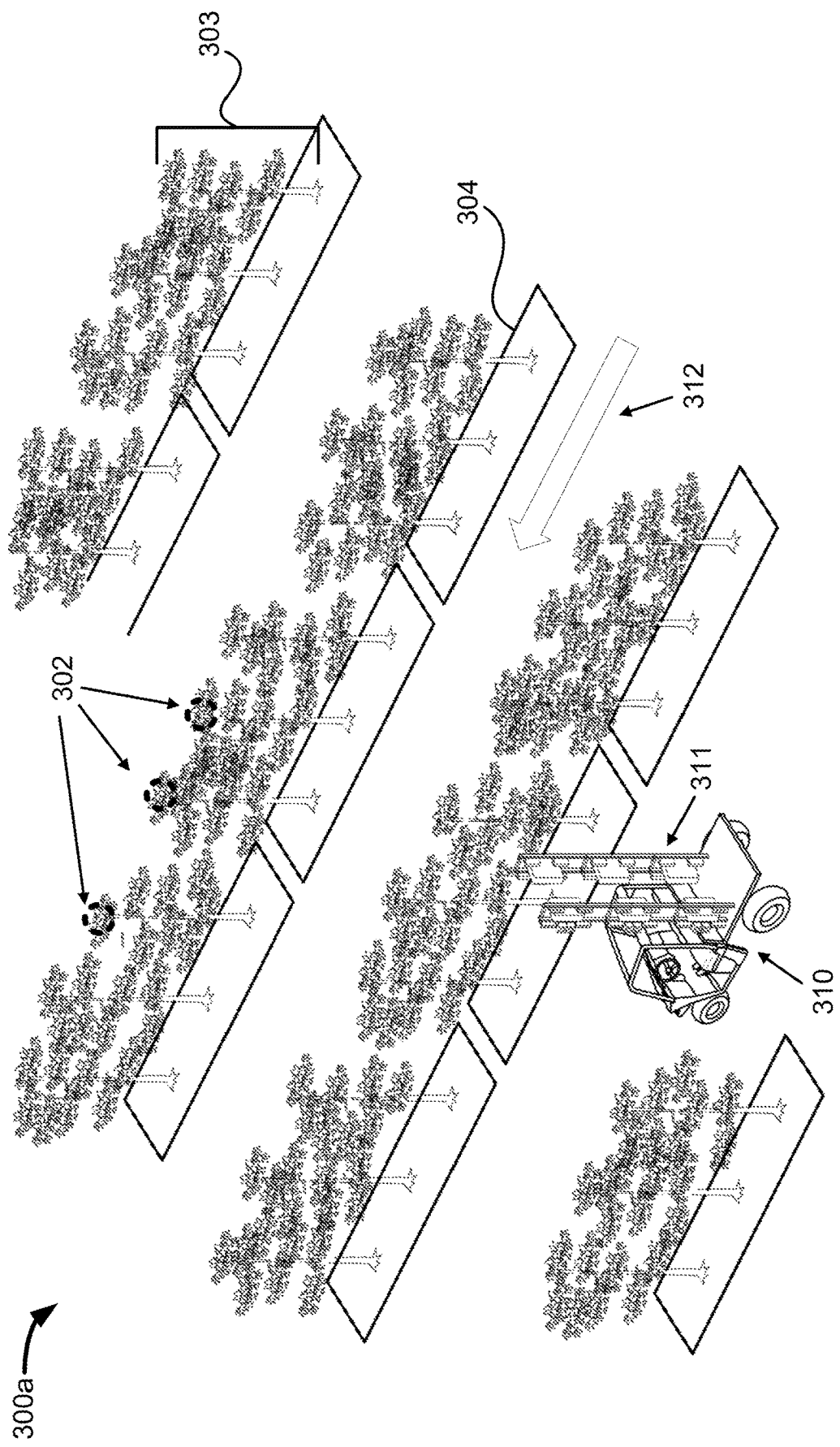
FIG. 3A is a diagram illustrating an agricultural scene within a geographic boundary, according to some examples.

FIG. 3A illustrates a diagram 300a depicting an agricultural scene. The agricultural scene can be any physical environment in the real-world used for agriculture such as, but not limited to, a farm or orchard. The agricultural scene can be contained in a regional geographic boundary or a region without any defined boundaries. The agricultural scene can include agricultural objects including a plurality of one or more different types of plants objects having different plant phenology depending on the season or year on the same agricultural scene. The agricultural objects can be further observed and categorized based on each plant anatomy. For example, diagram 300a can illustrate an orchard having permanent plants, such one or more trees 303. These trees 303 can be permanent trees that can produce crop such as fruit trees or nut trees in seasonal or yearly cycles for multiple years. The plants can also be row crops for harvesting where the plants themselves are for harvest. The agricultural objects observed and potentially treated can be further categorized and identified by the anatomy of the specific type of tree 303. For example, a plant such as a tree 303 can include a trunk, root, branch, stems, leaves, pedals, flowers, plant pistils and stigma, buds, fruitlets, fruits, and many other portions of a plant that make up the plant's anatomy, all of which can be agricultural objects of interest for observation and treatment. For example, the tree 303 in diagram 300a can include one or more agricultural objects 302. These objects can include fruiting flowers or fruitlets that an agricultural treatment system can detect and identify in real-time, and perform an action to treat the flower or fruitlet.

The agricultural scene can also include an agricultural observation and treatment system 311, supported by an example vehicle 310, performing observations and actions in the agricultural scene. In one example, the vehicle 310 can travel inside an orchard along a path 312 such that the agricultural observation and treatment system 311 can sense, identify, perform actions on specific agricultural objects 302 in real time, and index and store the sensed objects 302 and action history, such that the observation and treatment system 311 can use the previously stored information about the specific object 302 that was observed and treated for its next treatment upon detection at a later time or a later phenological stage of the specific object 302. The agricultural observation and treatment system 311 itself can be a component or subsystem of a larger system that can perform computations, store and display information, make decisions, and transmit and receive data from a plurality of agricultural observation and treatment systems performing observations and actions on a plurality of geographic scenes. The larger system can manage a mesh network of individual agricultural observation and treatment systems, each performing online, and onboard a vehicle, in one or more geographic regions, and a mesh network of servers and other compute devices in the cloud or edge to perform real time functions, quasi real-time functions or support functions for each online agricultural observation and treatment system, or offline at one or more servers to analyze data such as sensor data, performance activity, perform training one or more machine learning models, updating machine learning models stored on one or more of the agricultural observation and treatment systems located at various geographic regions, as well as a plurality of other tasks and storage capabilities that can generally be performed or maintained offline from the online and real time performing treatment systems. Various examples of agricultural observation and treatment systems, or components of modular agricultural observation and treatment systems are described in further detail below in this disclosure.

In one example, the agricultural scene can be that of an orchard having a plurality of fruiting trees planted in rows as illustrated in diagram 300a. The rows can be further partitioned and categorized by zones 304. In this example, the treatment system 311 can perform a different variety of chemical treatments with varying treatment parameters, such as chemicals used, chemical composition, treatment frequency, and perform A/B type testing (A/B testing) on the agricultural scene by different zones of the same plant type, different chemical trials in the same or different zones or by different individual plant object for harvest, or a combination thereof. The A/B testing for best treatment or best trial discovery can performed at a microarray level such that varying chemical types can be used in real time and varying chemical compositions and concentrations can be used in real time. These combinations can go up to over a million different combinations of different compositions, concentrations, volume, frequency of chemical treatment on varying plant varieties at different stages of growth. In one example, the agricultural observation and treatment system 311 can apply and log each of these different possibilities of varying treatment parameters and perform A/B testing on each zone, each tree, or each crop level specificity to determine the optimal treatment process for each plant or crop type that has not been previously identified in the industry. For example, as the agricultural observation and treatment system 311 applies different treatment parameters to different objects in the same geographic region throughout the growing cycle, upon harvest, some fruiting objects will have more desirable traits and characteristics as that of others, of the same type of crop. The agricultural observation and treatment system 311 can determine which exact object treated and logged from the beginning of the grow cycle for that particular object of the crop, determine the objects specific treatment history, including treatments used, concentration, volume, frequency, etc. and determine that the particular treatment process based on the treatment history of that particular object, that fruited into the most desired version of the crop, is the optimal process based on the A/B testing.

Additionally, based on the zone 304 of plants that produces the best crops, or the best crop at the individual object or fruit level of each zone 304, the best crops being based on size, health, color, amount, taste, etc. crop, the agricultural observation and treatment system 311 can determine the best method of performing treatment actions, based on a variety of parameters that can be adjusted and customized, and apply the same method of treatment actions on the particular zone 304 that yielded the best crop, for other crops in a new or subsequent crop cycle. In one example, treating each agricultural objects with a different treatment parameter to determine the best method of treating a crop does not have to be partitioned by zones 304. The agricultural observation and treatment system 311 can identify, tag, observe, log each unique agricultural object 302 and treat each agricultural object 302 of interest at the individual agricultural object level. For example, instead of treating a first zone 304 with a certain amount or type of chemical of each agricultural object and treating a second zone 304 with a different amount or type of chemical, the treatment system 311 can treat a first agricultural object 302, such as plant bud, and a second agricultural object 302, a different plant bud at the same stage of growth as that of the first plant bud, to observe and discover which bud yields the better fruit.

In one example, the agricultural scene is an orchard having a plurality of rows and trees planted in each row. The vehicle 310 can autonomously travel through each row such that the treatment system 311 can scan one or more trees 303 along a path of the vehicle to detect various agricultural objects including agricultural objects 302 for treatment. Once the treatment system 311's sensing system senses a potential agricultural object, the system 311 can determine whether the agricultural object 302 detected is a new object identified for the first time, a previously identified, tagged, and stored object detected again, a previously identified, tagged, and stored object detected again, that has changed its state or stage of growth in its phenological cycle, a previously identified object that has moved or changed in anatomy, or other objects with varying characteristics detected such as stage of growth, size, color, health, density, etc. Once the object is detected in real time, whether it is of an object previously identified and mapped onto a virtual agricultural scene representing the real agricultural scene, the treatment system 311 can determine, based on a combination of determining the agricultural object's identity, phenotype, stage of growth, and treatment history, if any, whether to perform a unique action onto the agricultural object 302 identified. The action can be an interaction between a treat unit of the treatment system 311 that can interact with a target, including preparing a chemical fluid projectile emitted from a device or treatment unit as part of the treatment 311 directly onto a portion of a surface of the agricultural object 302. The fluid can be a single liquid projectile similar to that of a shape of a water droplet emitted from a water sprayer, a mist or aerosol, a volumetric spray across a period of time, or many other types of fluid that can be emitted from a device discussed later in this disclosure.

The actions performed by the observation and treatment system 311 can be performed for the purposes similar to that of many actions typically performed in agriculture. These actions can include soil and fertilizer deposition, emitting seeds from the treatment system 311 into soil or dirt, treating individual plant objects including thinning, weeding, pollinating, pruning, extracting, harvesting, among many other actions that can be performed by a treatment system 311 having a device configured to sense an individual object and its stage of growth, access its treatment history, and perform a physical action including emitting a fluid, small object, or shine a light source such as a laser onto the individual object, physically manipulate the object including removing or moving the object for better sense and treatment of another object, destroying the object, pruning or harvesting the object, or a combination thereof.

In one example, the agricultural scene and geographic region can be a farm where the ground or terrain is partitioned into a plurality of rows with row crops for planting, growing, and harvesting and the plants themselves are harvested, unlike that of orchards where agricultural objects are harvested from permanent plants. The observation and treatment can be observed and performed on the crops themselves, or of other plants of interest. For example, weeds can grow in the same agricultural scene as that of a crop of interest such that the observation and treatment performed by treatment system 311 can be that of both the crop and the one or more different types of weeds, or just the weeds. In another example, the agricultural scene can be that of a farm, orchard, or any kind of ground terrain that does not yet have any trees or crops, but only of dirt and soil.

Figure 3B:
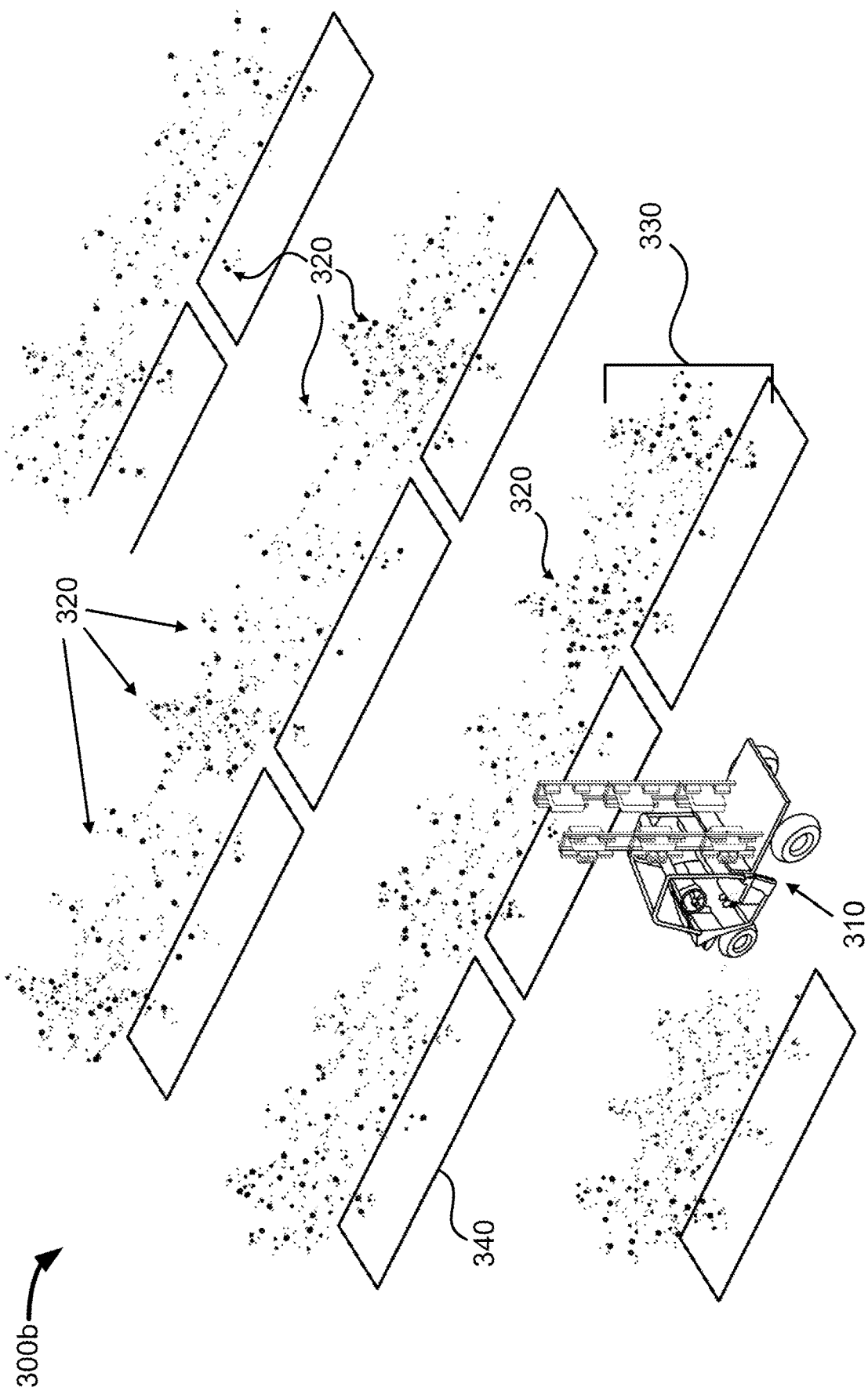
FIG. 3B is a diagram illustrating image acquisition and digitization of a geographic boundary, according to some examples.
Figure 3C:
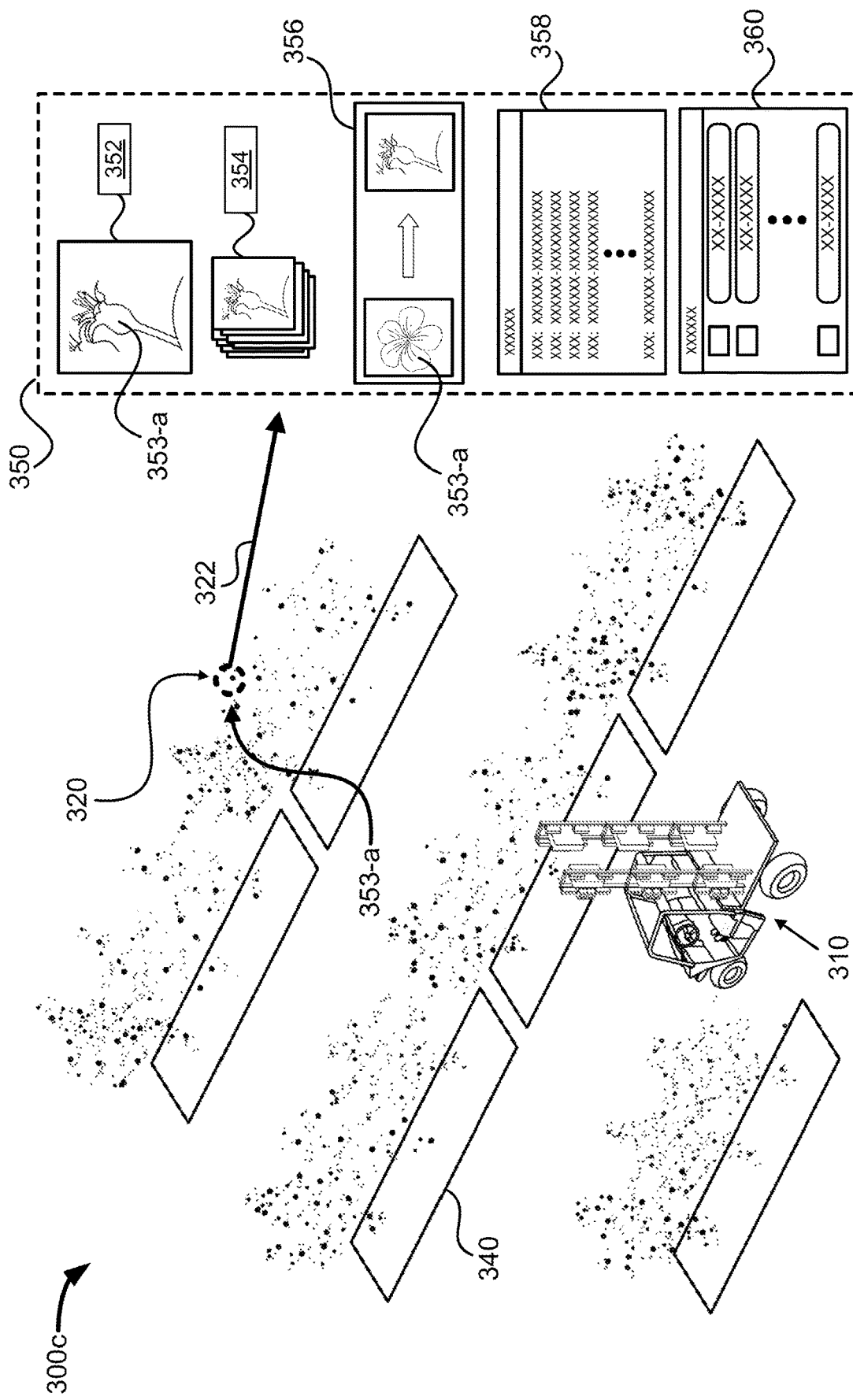
FIG. 3C is a diagram illustrating image acquisition and digitization of objects a geographic boundary measured across time, according to some examples.

FIG. 3B and FIG. 3C illustrate diagrams 300b and 300c each depicting a portion of a virtual and digitized agricultural scene or area similar to that of agricultural scene in diagram 300a. Diagram 300b can depict a virtual scene generated by an agricultural observation and treatment system similar to that of agricultural observation and treatment system 311 or at servers, cloud, or edge computing devices connected to an agricultural observation and treatment system operating and acquiring images and other perception data of the agricultural scene. The virtual scene can be that of a high definition 2D map, 3D map, or both, of an agricultural scene surveyed, observed, treated, logged, or a combination thereof, by a treatment system, such as treatment system 311. The treatment system 311, having perception and navigation related sensors and a plurality of modular treatment modules each having its own sensors, including vision and navigation sensors, compute units, treatment devices or units, illumination devices, can be supported by a vehicle 310 that can drive along a path, and can be configured to scan and observe a geographic scene and build a virtual map of the scene.

In general, the vehicle 310 moves along a path in the real world while the agricultural observation and agricultural treatment system 311 obtains imagery and other sensed readings, including images captured by image capture devices or point clouds captured by LiDAR's, or a plurality of different sensor readings captured by a plurality of different sensors, of the external environment. The observation and treatment system can generate points along the path representing external agricultural objects (e.g., plants, crops, trees, debris, patterns, landmarks, keypoints or salient points, patterns, cluster of features or patterns that are fixed in space, etc.).

For example, as the vehicle 310 passes by a particular agricultural object in the real world, the object determination and object treatment engine can capture images and reconstruct a digital or virtual geographic scene representing the geographic scene as illustrated by diagram 300b. The diagram 300b can include a plurality of mapped data points representing agricultural objects or clusters of objects, including objects that have been treated, objects for observation, objects indexed for marking location of nearby objects in the overall geographic scene or the object itself in the global scene, or a combination thereof, as well as landmarks, patterns, regions of interest, or a combination thereof. The mapped points depicted by objects 320, which can include agricultural objects for treatment, with different identifiers based on the phenology or stage of growth of each individual objects. The points depicted by objects 320 can be generated and/or represented by images taken in the real world of the scene, patches of images, lidar point clouds or portions of points clouds, 3D images modelled by various imaging techniques such as visual constructions of objects in computer vision, including structure from motion or 3d model reconstruction from a single, stereo, multi camera configuration, the cameras being color sensors, black and white sensors, multispectral sensors, or a combination thereof. Multiple images of the same scene or same object can be combined and analyzed as the agricultural observation and treatment system 311 scans and observes the environment multiple times throughout a grow season or year. Each object, cluster of objects, or landmarks detected can have a plurality of layers of images or other sensor readings, such as radar and lidar point cloud readings, to form high resolution 2D or 3D reconstructed models of the real-world objects detected. In one example, a stereo vision system in an image capture module can capture images of objects in space and superimpose views of the objects captured in the frames captured in time in stereo into a 3D model of the object. In one example, the generated 3D model of the objects detected, including agricultural objects, with different models at each of its different detected and labelled growth stages, can be positioned in the virtual geographic boundary or geographic scene for a user to scan through a see via the user interface described below. In one example, a geographic scene can be a fruit orchard having multiple trees 303 and agricultural objects 302. The agricultural observation and treatment system 311 can observe the geographic scene, both in real time via compute units disposed on board the vehicle 310 or edge or cloud compute devices or offline. The system can generate a digital or virtual map of the scene having a plurality of objects 320, clusters of objects 320 that can represent a portion of an entire plant 330, for example a tree. Each object 320 can include agricultural objects such as fruits, buds, flowers, fruitlets, or other object types of objects that can be treated by a treatment system, depending on its stage of growth or phenology.

The objects 320 can be digitally indexed objects having a type, identity, stage of growth, and location associated with the objects, which can be represented by individual images, stereo pair images, or portions of images of the real-world equivalent object captured by an image capture device. The object 320 may have an associated geo-graphic data associated to the object, including position data, orientation and pose estimation relative to the geographic boundary view or relative to physical components of the agricultural treatment system 400, including image sensors, or treatment engines, or relative to other agricultural objects. In one example, each of the objects 320 can include images that are full frame images captured by one or more cameras in the agricultural treatment system. The full frames can be 2D or 3D image showing the images captured directly by one or more cameras and/or rendered by the agricultural treatment system 311. The images can include images captured a few meters away from the physical surface and position of agricultural objects in the geographic boundary, which can include images of a plurality of individual agricultural objects, that are potential crops, as well as landmarks including objects or scenery, or other objects of interest including calibration targets and markers or other farming equipment, devices, structures, or machinery typically found on a farm that can be detected for localization of the treatment system and tracking objects in real time and for constructing a map of a scene either in real time or offline. The objects 320 can also include specific patches within captured full frame images. For example, a stereo pair of cameras can each, simultaneously, capture a high-resolution image having hundreds of agricultural objects including target objects for treatment, potential objects for observation for treating at a future time, landmarks, other patterns, etc. The patches can be identified by the agricultural system by detecting, classifying, identifying and extracting features, and labelling specific portions of a full image frame, including labelling agricultural objects and specific stages of growth of agricultural objects. The portion of the full frame image can be extracted as a patch such that each individual patch, which itself is a portion of the full frame image, is a visual representation of each individual and unique agricultural object on the geographic boundary, and can be identified and indexed, associated with its position data, any and all treatment history if any of the objects detected are objects detected from a previous trial on the specific marked and identified agricultural object, as well as timestamps associated with the image captured and data acquisition, position captured, treatment applied, or a combination thereof. In one example, each object 320 in the virtual construction of a scene depicted by diagram 300b can be a point of varying size depending on the actual size of the object in the real world, or the size of the patch associated with the object. In another example, each object 320 in the virtually constructed scene can be represented by the real-world object virtual 3d model associated with each of the objects 320. For example, each of the thousands or millions of objects, landmarks, or patterns can be visually represented as 2d or 3d models of each of the specific objects in the real world. Thus, a map, either a 2d or a 3d map can be generated and accessed, visually, illustrating each object, landmark, pattern or region of interest, in the real world such that each object's and/or landmark's visualization, structure, location, treatment and prediction details can be represented and displayed in the map.

A user interface can be accessed to interface with the digitally mapped agricultural scene such that a user can view images, models, model of the specific object, spray history, other data related to agricultural objects including predictions related to yield, size, health, disease, etc., of each object observed and or treated associated with its location in the real world based on its location in the digital map. For example, a cluster of objects 320, including fruits and fruitlets of a fruiting tree, located in a specific area in an orchard, for example in a specific zone 304 in the real world, can be mapped to a specific zone 340 in the map, such that the cluster of objects 320, accessed by a user, in the map also represents the location of the specific real-world objects associated with objects 320 of the virtual map. The user interface is further described in detail below.

In one example, as illustrated in diagram 300c, a user interface 350 may be accessed. The user interface 350 can show the points representing each of the objects 320 of the virtual map. The user interface may provide for the user selection of the any of the points depicted in the virtual scene or map. For example, a unique object 353-a, which in this example can be an individual and unique fruitlet in an orchard, can be detected in the orchard by the agricultural observation and treatment system 311. The object 353-a can be detected in one or more images from a system supported by a moving vehicle. A patch of the image can be identified and extracted depicting just the object 353-a. And additionally, a 3D constructed model of the specific fruitlet, that is object 353-a at the time of capture by the observation and treatment system, can be generated by using one or more computer vision techniques from associated multiple different views of the same object 353-a and associating each view with location data of object 353-a and motion of the image capture device, or by implementing other computer vision techniques.

Upon selection of a specific point in the user interface, for example a point of the map representing object 353-a, the user interface 350 can display multiple visualizations and information associated with the selected object 353-a. For example, the user interface 350 can display an image 352 associated with the point selected, as for this case selecting the point associated with object 353-a. The image 352 can be a pixelated 2-dimensional or 3-dimensional image with localization information. The image 352 can also include the specific image patch extracted from the images captured by the treatment system, instead of a constructed image depicting the shape, size, color, or other unique attributes of the object 353-a at the time the observation and treatment system last observed the object 353-a. In one example, the image 352 can be a pixelated 2d or 3d image that represents a model of the specific object 353-a in the real world at a stage of growth, or state, detected by the treatment system. The 2d or 3d model can be generated by using various computer vision techniques by associating multiple views of the object along with depth and/or motion data of the image capture device. Some objects may be occluded such that an image sensor travelling along a path guided by a vehicle may not capture the entire view of the object detected. For example, the object could be hidden further inside of a tree instead of growing closer to the outer surface of a tree. The object could have other objects blocking portions of the object from view such as leaves or other agricultural objects or landmarks of interest. In this example, one or more machine learning algorithms can be applied to process the existing images sensed on the object, whether through a single pass of the image sensor in a single run, capturing a plurality of image frames forming a single video, or in stereo, or by analyzing image frames from multiple passes, each image frame whether captured in a single sequence or multiple sequences from multiple trials, each image frame having at least a portion of a view of the object. The machine learning algorithm can be used to compensate for the occluded portions of the object and construct a high resolution 2D image or 3D model of the object. In cases where the phenological stage of the object changes in time, the agricultural observation and treatment system 311 can generate multiple constructed images or models depicting different stages of growth of the same object with timestamps associating which stage of growth was detected and constructed and the relationship between the different constructed images and models of the same object, for example showing the phenological changes from one constructed image of the object to the next constructed image of the same object. In one example, the computer vision techniques can be performed using machine learning models and algorithms, either embedded on board the agricultural observation and treatment system 311, or offline via edge or cloud computing device. The user interface 350 can also display multiple views of the same patch associated with a specific object selected by the user in the virtual map. For example, the agricultural observation and treatment system 311 can capture more than one view of object 353-a and store all of the different frames that include object 353-a. The system can generate, index and store each of the individual patches of images depicting different views of the object and display it in the user interface 350 as a group of images 354 for the user when the specific object, for example object 353-a, in the virtual map is selected.

Additionally, the user interface 350 can display a time series lapse of the history of images captured on the same object, the images partitioned based on state changes, stage of growth or phenological changes, including bud, leaf, shoot, flower/blossom, fruiting developments, and maturing developments of the same object detected. For example, object 353-a can be fruitlet of an apple fruit, detected as an individual object in the real world with location, position, and/or orientation data, relative to some arbitrary point in the orchard, the exact point in the real world, a relative position to the agricultural observation and treatment system 311 such that the treatment system itself has a location and orientation data in the real-world. And the object detected at the time can be identified as a fruitlet of a fruiting tree. However, the object 353-a will have been a flower earlier in its life cycle at a prior time, and a bud in its life cycle at an even prior time to flowering, while still being at the same, or close to the same location and position in the orchard, and location and position relative to a defined position of the tree supporting the object 353-a. For example, a portion of the tree, such as a base of the trunk or an arbitrary center point of the tree can be defined with $(x_0, y_0, z_0)$ position data. The object detected can be some $(\Delta x_0, \Delta y_0, \Delta z_0)$ position relative to the base or arbitrarily chosen position $(x_0, y_0, z_0)$ in the geographic scene, zone of the geographic scene, or a particular tree/plant, for example a position $(x_1, y_1, z_1)$. The coordinate system chosen is just an example wherein a plurality of different coordinate systems and origin points can be used to locate relative positions and orientations of objects relative to other objects.

In this example, the agricultural observation and treatment system 311 may have logged information related to object 353-a before it was labelled as a fruitlet in its most recent timed log. The system may have detected the same object 353-a, at the same or near location, when it was detected with an identifier of a bud associated with the object. And then at a later trial detecting the same object 353-a again, but before it was detected and labelled with the identifier of fruitlet but after it was detected and labelled as a bud, another detection with the identifier, for example, of a flower/blossom. Each of these detections can have location position of, or near location position of $(x_1, y_1, z_1)$. In this case, the system can associate the different identifications of the same object, based on the objects state changes, or stage of growth or phenological changes, and display, via a series of views across time, the state change in sequence in the user interface 350. Identifying, storing and indexing, and associating portions of images and patches and other sensor readings of objects of the same type with near or the same locations of the same objects identified throughout time from different trials and identifying with different states of the same object in the geographic scene can be performed using various techniques including machine learning feature extraction, detection, and or classification to detect and identify objects in a given image frame as well as generating keyframes based on the objects and landmarks detected. The keyframes can be determined to more efficiently identify and index objects in a frame while reducing redundancy, for example, by identifying common and/or the same landmarks across multiple frames. The machine learning and other various computer vision algorithms can be configured to draw bounding boxes to label portions of images with objects of interest and background, masking functions to separate background and regions of interest or objects of interest, perform semantic segmentation to all pixels or a region of pixels of an given image frame to classify each pixel as part of one or more different target objects, other objects of interest, or background and associate its specific location in space relative to the a component of the treatment system and the vehicle supporting the treatment system.

Additionally, the agricultural observation and treatment system 311 can perform functions to associate portions of image, for example image patches of objects, image frames, key frames, or a combination thereof from different trials where the agricultural observation and treatment system 311 observed, identified, labelled, and stored information about the same object across multiple states and phenological stages. Additionally, the association of the frames or portion of the frames can be packaged into a series of image frames that can be displayed in sequence as a video displaying the growth, or backwards growth depending on the direction of displaying the images, of the specific object. For example, the series of indexed images or patches of images associated with each other throughout time can be displayed in the user interface 350 in the video or visual time lapse history 356. In one example, the functions can be performed by various computer vision and machine learning techniques including image to image correspondence including template matching and outlier rejection, performed by various techniques including RANSAC, k-means clustering, or other feature-based object detection techniques for analyzing a series of images frames, or a combination thereof. In one example, the above techniques can also be used to generate key frames of a subsequent trial by comparing frames from the subsequent trial with keyframes of one or more prior trials, depending on how many prior trials there are. Additionally, the comparison and the candidate frames or keyframes from a previous trial that may be accessed by the agricultural observation and treatment system 311, or at a server offline, to be used to perform comparisons to identify state and phenological stage change of a same object, such as object 353-a, can be narrowed down for selection based on location data logged at the time of capture, pose data logged at the time of capture, or a combination thereof associated with each of the keyframes, or objects detected in each keyframe. These accessed and selected frames or key frames in the prior trials, having been selected based on its location data associated with the frames or objects detected in the frames, can be used to compare with currently captured frames, or subsequently captured frames from the prior frames, having similar location data associated with the selected frames for key frames to match objects that may have different labels, since different states or phenological stages will have different labels due to the states having different shape, color, size, density, etc. If there is a match, or if there is a threshold reached based on the comparison of the accessed frame or keyframe against one or more frames in a subsequently captured series of frames, the agricultural observation and treatment system 311 can determine that the two, or more, objects of different types and identifiers associated with each of the objects, are the same object and that one, with a first phenological stage, changed into the other having a second label or identifier of a second phenological stage.

In one example, the agricultural observation and treatment system 311 can run a machine learning detector on portions of images, to detect objects of interest in each of the portions of images by performing feature extraction and generating bounding boxes around an object of interest, performing semantic segmentation or performing semantic classification of each pixel of a region of an image to detect objects of interest, or a combination thereof. One or more key frames from a prior trial or in a prior frame of captured frames from a subsequent trial, any trial subsequent to the prior trial, can be propagated into candidate frames captured in the subsequent trial, for example the subsequent trial being the most recent trial, or current trial, with images captured that have not yet been processed and indexed. The frames with the propagated detections or labels can be used to detect whether a machine learning detection was accurate, whether location data associated with the frame is accurate, or detecting other outliers, as a threshold to mitigate false positives and false negatives of features detected but doesn't actually exist or missing but should have been detected, since these frames will have similar location data associated to each of the other frames and detecting and corresponding, above a certain threshold, the same features of more than one frame in a same trial or across frames having the same location from previous trials may give more confidence that the features detected are real and accurate.

The series of images can be each of the patches displayed in order, similar to that of a video display of images, where a user can view the changes in state of the object from when it was bud, through various growth stages, including small incremental stages from day-to-day in a growing season, until fruiting. In one example, a visual time lapse history 356 of object 353-a as it was detected as a bud, to a flower, to a fruitlet, and to a fruit, incrementally, can be displayed in the user interface 350. Additionally, the series of images displayed in the visual time lapse history 356 of an object, for example object 353-a, can be reconstructed or generated images from combining multiple images depicting the same object or landmark. These images would be machine learning rendered images generated by associating portions of captured images as well as portions of generated pixels of an image generated by a machine learning model to display a better representation of the selected object to the user. This can include generating higher resolutions from upscaling portions of the captured images when analyzing portions of the captured images to generate an image displayed to the user or generating views of an object detected that were otherwise occluded in the captured images. In this example, upon selection of an object in the user interface, the user interface 350 can display any captured images 352, where the image itself can contain smaller patches within the image 352 containing views of objects, or display one or more rendered images generated from a plurality of captured images associated with the object selected.

In one example, the visual time lapse history 356 can be used to visualize the state changes or visualize its real-world growth from sprouting into crop, or from bud into fruit, depending on the type of crop. This would give the effect, in some instances, of displaying a growth sequence of an agricultural object from a dormant phase, to a fully grown crop of the same or substantially the same location. The location would not be the exact since the object will grow and drop lower due to its weight or can be externally moved by wind. Alternatively, the visual time lapse history 356 can function as a "time machine" visualization of the object. The visual time lapse history 356 can be viewed in reverse time to view what a currently detected, or otherwise the object's current state in the real world, assuming the agricultural observation and treatment system has captured and detected the object in its current or proximately current state, looked like in the past by visually linking captured sensor readings, including image frames having views of the object, and displaying them in sequence, such as a video.

The agricultural observation and treatment system can associate similarities from an image frame, or a portion of one or more patches within the frame corresponding with an object of interest captured at a first time, with another frame captured at a second time that is close in proximity to the first time, for example a day, such that the state change will be minor and the system can combine location data of the objects detected in frames from frame to frame across time having a same location associated with the object, so the system can have more confidence that, for example, an object from a first frame associated with a first timestamp is a same object from a second frame associated with a second timestamp, because the real world location of both objects from different frames and different timestamps are in proximity with each other above a certain threshold for the system to determine that the two objects are the same. Additionally, the system can determine any relationship between the images of the same object, such that one object turned from one state detected in the first frame to the other state detected in the second frame. The incremental changes can allow the image correspondence to reach a certain threshold of confidence such that matching an object of a first phenological stage with an object of a second phenological stage as the same object does not have to rely on its detected spatial proximity in the real-world location associated with the object when the object was identified with their respective captured frames and timestamps.

In one example, the user interface 350 can store and display a variety of information, data, logs, predictions, histories, or other information related to each object. The information can be displayed to a user upon selection of information, or upon selection of the object in an interactive virtual map. In one example, the user interface 350 can display a visualization 358 of various data including data related to an object's treatment history, observation history, or both. This can include information about each of the times the particular objected selected, for example object 353-a, was detected in the real world and indexed. In one example, the detection of an object across multiple frames or sensor readings in a single trial can be categorized and indexed as a single detection. If a treatment was applied, for example a spraying of a substance, a mechanical interaction with the object with a physical end effector contacting object 353-a, or any kind of action other than a treatment that physically affects the object, can be logged in time and location. As the agricultural observation and treatment system 311 performs multiple trials across period of time, the system 311 can associate each observation and/or treatment of a same object with each other, and display the information related to observations and treatments in order. The information can include the type of spray or treatment used, the length of time of the spray or treatment, the time associated with the treatment, timestamp, the phenological stage of the object detected. This can allow the agricultural observation and treatment system 311 to determine the treatment parameters per object. For example, the system can determine, due to its indexing and understanding of each object in a geographic scene, that in an immediate upcoming trial, a first object, if detected, should receive a treatment of a first substance, but a similar second object, proximate to the first object, if detected, does not need to receive a treatment of the first substance, at least during the immediate upcoming trial. Further examples will be provided below in this disclosure. Additionally, the user interface 250 can display a visualization 360 of data related to features, attributes, and characteristics of each object, or the specific object selected. The information can include information of the object relating to its size, color, shape, density, health, or other information related to prediction information relating to yield estimate, future size, shape, and health, and optimal harvest parameters of the specific object. Additionally, since the actions for treating each object, themselves can be sensed, indexed, and stored, a user can access each individual treatment action including its parameters such as type, volume, concentration, dwell time or surface contact diameter for fluid projectile treatments on each individual agricultural object or crop throughout the life cycle of that specific individual crop or object detected. This would allow a user to determine grow, health, and harvest parameters and data per crop or per object.

Figure 3D:
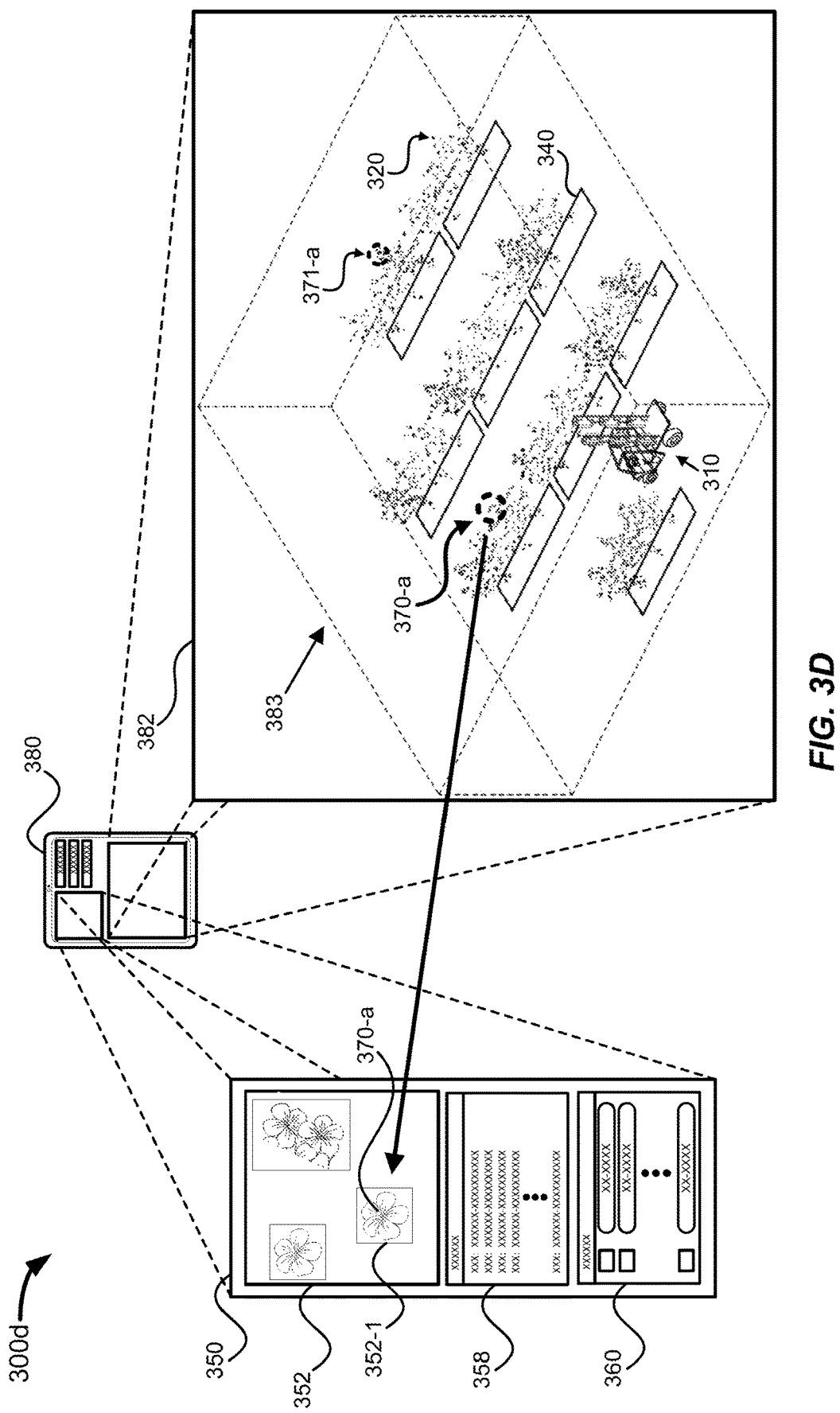
FIG. 3D is a diagram illustrating an interface for interacting with a digitized agricultural scene, according to some examples.

In one example, as illustrated in diagram 300d of FIG. 3D, a user can access the user interface 350 and one or more interactive maps through a variety of devices. In one example, the electronic device can be a tablet 380 having a user interface including user interface 350 and interactive virtual map 382. The interactive virtual map 382 can be that of the virtual maps discussed above. For example. The interactive virtual map 382 can be that of a virtual map associated with a map of a real-world geographic scene having a plurality of agricultural objects and landmarks. Because the geographic scene changes over a period of time, multiple virtual maps can be generated to index each state of the geographic scene, at a global scene level, such as the broader geographic level including terrain, topography, trees, large objects, etc., and at a local level, such as that of each agricultural object, including target crop objects. Both the local scene comprising a plurality of agricultural objects and the global scene can be combined to generate each virtual map. In one example, each virtual map of the same real world geographic coordinates, or predetermined geofenced location, can be associated with each other such that an interactive changing map can be displayed where one map changing or updating to another map represents the changing state of the geographical scene changing across a grow season. This can include plants sprouting, trees growing in size, or growing fruits. Each trial performed by the agricultural observation and treatment system 311 can include a plurality of sensor readings, including images captured from image capture devices that include 3d structure, location, depth, relative size to objects in the real world, heatmap, etc., such that a virtual map of the area sensed in the trial can be generated.

As more trials are performed, more of the geographic scene can be mapped, and thus used to generate a virtual map, or an index of information associated with objects and landmarks of the geographic scene. For example, a first map can be generated to depict a first geographic scene captured at a first time with a first set of characteristics, the characteristics including global characteristics, such as number of sprouts, number of trees, amount and color of visible dirt, topography, etc., and including local characteristics, such as per crop object of interest and each of its phenological stages, depending on the type of geographic scene such as terrain, row crop farm land, orchard, etc., and a second map can be generated to depict the same first geographic scene captured at a second time having different global and local characteristics.

The system can associate the first and second map maps such that there is a logical link between the first and second map, indexed information related to each of the first and second maps, the indexed and generated maps, or the generated interactive virtual maps, such that the geographic scene having characteristics captured in the first map have turned into the geographic scene, with the same or similar real-world geographic boundary, having characteristics captured in the second map. In one example, the system can generate a single map such that as the system performs more trials and senses and captures more of both the global and local portions of the geographic scene, and thus mapping more details and characteristic changes of the geographic scene from trial to trial, the system can update the same map into one more updated maps having updated global and local attributes and characteristics of the geographic scene across time, instead of or in addition to generating multiple maps.

While the description above discussed virtual maps, the discussion can be applied more generally to indexed information of geographic scenes, including geographic scenes of changing characteristics throughout time, stored in multiple forms and does not necessarily have to be a generated virtual map that can be visualized and displayed in a user interface. The real-world geographic scene can be sensed, and indexed in a database having information relating to agricultural objects and landmarks of the geographic scene with various sensor readings associated with each agricultural object and landmark, including visual information, location information, etc., such that the information stored in the database can be used to generate a map. The information of each agricultural object and landmark can also be used to generate a visualized virtual map that can be interfaced with a user on an electronic device.

In one example, the tablet 380 can display an interactive virtual map 382 depicting, for example, the most updated map, or the most recently generated map, of a mapped geographic boundary 383. The mapped geographic boundary 383 can be the most recently captured and sensed state of a real-world geographic region depicted in diagram 300a of FIG. 3A, having a plurality of agricultural objects and landmarks sensed, the agricultural objects being in their current state, and indexed, stored, and mapped as mapped geographic boundary 383. A prior mapping, from a previous trial, on the same real-world geographic region can also be indexed, stored, and mapped and associated with mapped geographic boundary 383. For example, agricultural object 370-a can be an individual blossom of an object detected by the agricultural observation and treatment system 311 captured in a recent trial. A user, via tablet 380, or any other electronic device, can interact with interactive virtual map 382 to select a selectable object 370-a in the tablet to view information about object 370-a including any and all views captured of object 370-a previously, time lapse video and time machine video of object 370-a's history as it blossomed from a bud, for example, treatment history, metadata, and crop characteristics of object 370-a including prediction type information. The interactive virtual map 382 displaying a mapped geographic boundary 383 can have a plurality of selectable objects 320's to choose from. For example, object 371-a can be a different object in the same geographic scene having a different treatment history as that of object 370-a. The image 352 can be a portion of a larger image captured by one or more image capture devices such as a 4K or 8K image frame, where image 352 is a cropped portion of the 4K or 8K image frame. Additionally, the image 352 can include more than one even smaller patches of the image 352 of a specific object, such as image patch 352-1 of image 352 to display a view of virtual or digitized object 370-a of some real-world object 302 in the real world, for example.

In one example, the selectable object in the virtual map 382 itself can be an image. Because the virtual map 382 is interactive, the user can zoom in to the specific object in the virtual map 382 to view the specific object inside interactive virtual map 382. The object zoomed into can be an animated object depicting the specific object sensed and indexed from the real world, or can be an image patch, cropped from an image capture device, having a view of the object in the image patch. The objects and landmarks indexed in the virtual map 382, are associated with a location in the real world. Each animated agricultural object, or representation of the agricultural object can include data representing at least one image captured by an image sensor of the agricultural object in the real world, a localization data representing the position of the agricultural object relative to the geographic boundary itself, the position of the agricultural object relative to the agricultural observation and treatment system that captured an image of the individual agricultural object, or its position relative to other agricultural objects also with position data associated with the agricultural objects, as well as a timestamp of when the image and location data was acquired.

In one example, one or more agricultural object detected in the real-world will change characteristics, for example phenological stages or changes in size, such that the system 100 can detect a new feature of the agricultural object and assign a label or identifier to the agricultural object that had a different label or identifier previously assigned to the same agricultural object having the same or similar position detected in the geographic boundary. This is due to a portion of a potential crop growing on a plant, for example a lateral, changing characteristics due to the growth stage of the plant. As a simplified example, a fruiting tree can have buds on the tree's laterals which can turn into flowers, and then eventually a fruitlet, and then a fruit, for example. Additionally, each of these features can be associated with each other, particularly for labeled features of agricultural objects that have the same position detected in the real world, or similar image features from a previous trial of when the system 100 captured images of the specific agricultural object, or a combination thereof.

Figure 3E:
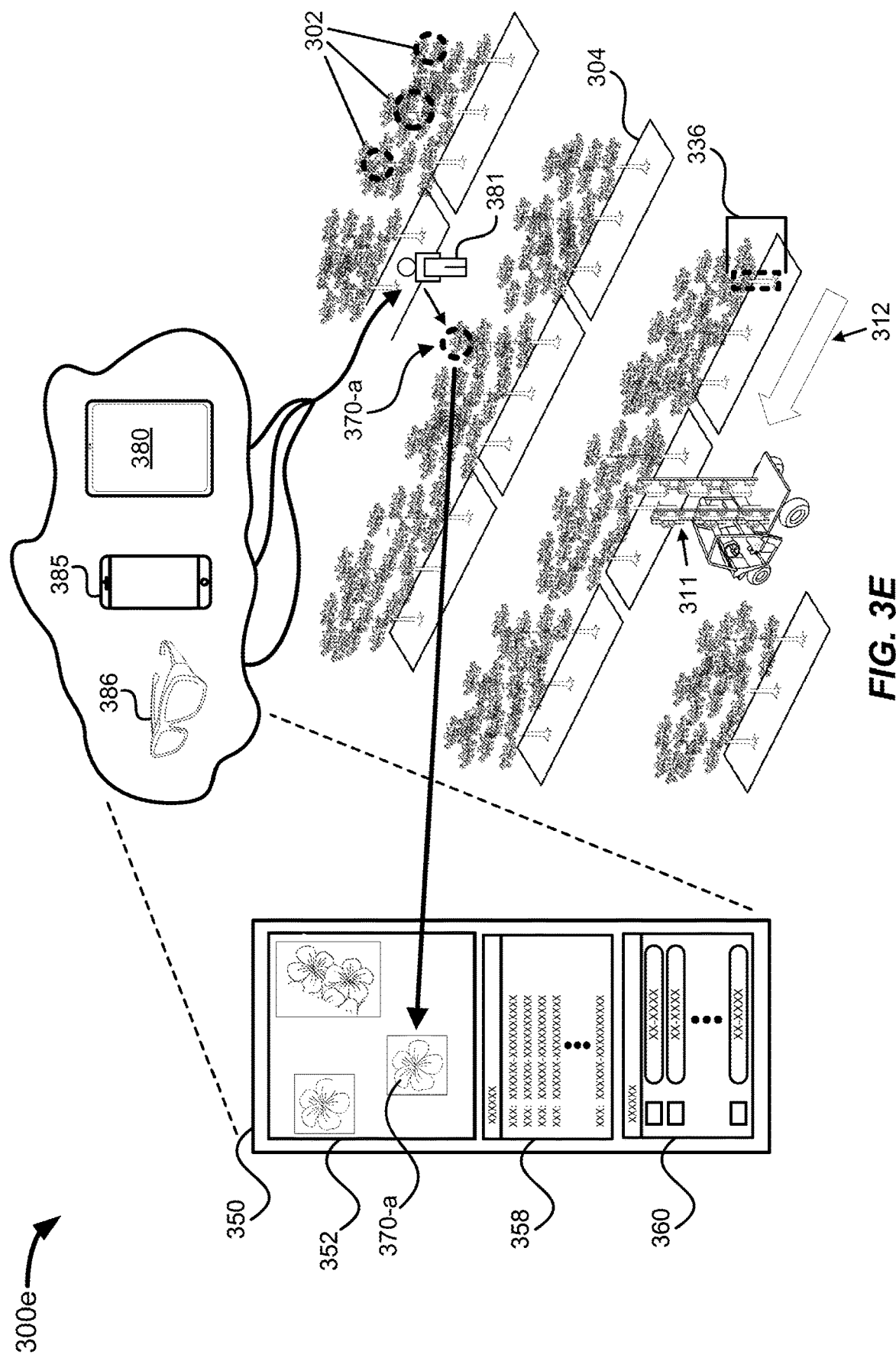
FIG. 3E is a diagram illustrating an interface for interacting with an agricultural scene, according to some examples.

FIG. 3E illustrates a diagram 300e depicting a user, or human 381, interacting in a real-world environment with an electronic device having a user interface and interactive virtual map similar to that of the user interfaces and interactive virtual maps discussed above. A user can have an electronic device with location and image sensing capabilities to detect a location of the device in the real world, the location of the device relative to an identified object, the identified object having location data stored in the device or a location accessible wireless by the device, or a combination thereof. As the user physically navigates in the geographic boundary, such as an orchard, the user may come across one more indexed objects in the real world, that may be in plain view or viewable in real time by the electronic device, such as the tablet 380, a phone or smart device 385, or smart glasses 386, or mixed reality smart glasses, or any other wearable or holdable device. In one example, the electronic device can be a drone controlled by the user in real time such as any drone free can be relayed and displayed in real time to the user via a device the user is holding with an interactive interface including a screen.

For example, if the user is near agricultural object 370-a in the real world, the user can access information stored about object 370-a in the electronic device, including most recently views of the object, treatment history, or other information and metadata about the object, particularly those discussed above.

Additionally, an augmented reality or mixed reality environment can be accessed via an electronic device such as a wearable with a display and image sensors, a phone or table with image sensors, or a combination thereof. As the user physically navigates the real-world geographic scene, the electronic device's image sensors can capture and detect objects in its field of view. Each object previously detected, indexed, and stored can be displayed to the user in real time via augmented reality or mixed reality, as the same objects in the real-world are detected by the electronic devices in real time. The user can then interact with the electronic device in a similar way described above. In one example, an entire virtual map can be augmented on the real-world geographic scene so that the user can see information about every object in the user, or electronic devices, field of view. In one example, a virtual reality environment can be generated such that a user, having a virtual reality device can navigate inside the virtual reality environment and interact with each agricultural object and landmark displayed and created in the virtual reality environment. The user can view portions of the entire virtual reality environment changing across time, either forward or backward. For example, a first virtual reality environment and scene depicting the geographic scene at a given time can change, gradually or instantly, to a second virtual reality environment depicting the geographic scene at a different time. Each of the objects and landmarks can also be selectable so the user can view specific views captured of the objects at various times from different trials.

Figure 4:
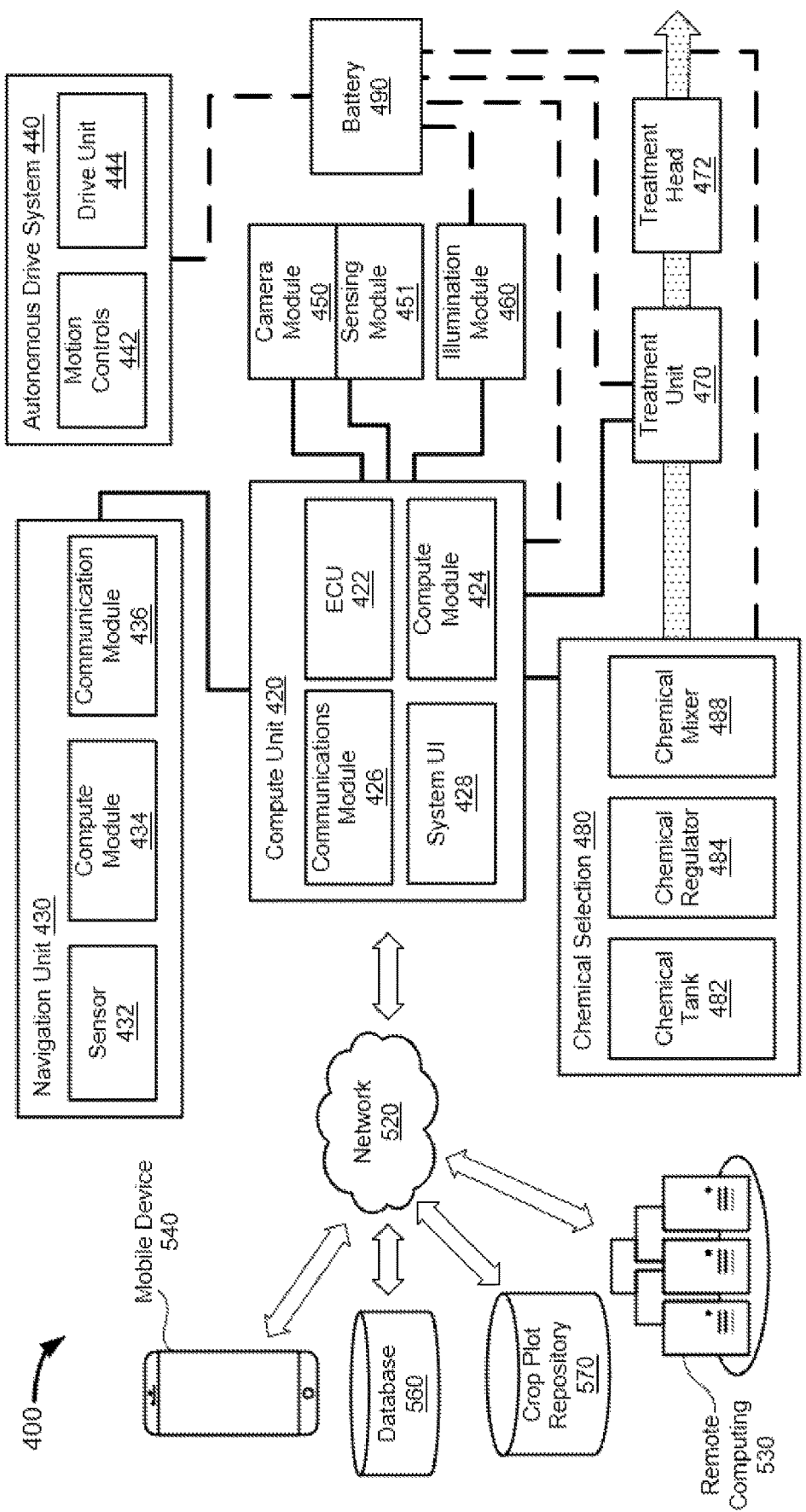
FIG. 4 is a diagram illustrating an example agricultural observation and treatment system, according to some examples.

FIG. 4 illustrates a system architecture of an agricultural observation and treatment system, or agricultural treatment system 400, or treatment system. The agricultural treatment system 400 can include a robot having a plurality of computing, control, sensing, navigation, process, power, and network modules, configured to observe a plant, soil, agricultural environment, treat a plant, soil, agricultural environment, or a combination thereof, such as treating a plant for growth, fertilizing, pollenating, protecting and treating its health, thinning, harvesting, or treating a plant for the removal of unwanted plants or organisms, or stopping growth on certain identified plants or portions of a plant, or a combination thereof. In one example, an agricultural observation and treatment system, described in this disclosure, can be referred to as a portion of a system for observing and treating objects that is onboard a moving vehicle. Performances by the portion of the system onboard the moving vehicle, including computations, and physical actions, can be considered online performance or live performance. A portion of the system comprising one or more compute or storage components, that are connected as a distributed system, can be considered the offline portion of the system configured to perform remote computing, serve as a user interface, or storage. In one example, the agricultural observation and treatment system is a distributed system, distributed via cloud computing, fog computing, edge computing, or a combination thereof, or more than one subsystem is performing computations and actions live in addition to the portion of the system onboard a moving vehicle.

The systems, robots, computer software and systems, applications using computer vision and automation, or a combination thereof, can be implemented using data science and data analysis, including machine learning, deep learning including convolutional neural nets ("CNNs"), deep neural nets ("DNNs"), and other disciplines of computer-based artificial intelligence, as well as computer-vision techniques used to compare and correspond features or portions of one or more images, including 2D and 3D images, to facilitate detection, identification, classification, and treatment of individual agricultural objects, perform and implement visualization, mapping, pose of an agricultural object or of the robotic system, and/or navigation applications using simultaneous localization and mapping (SLAM) systems and algorithms, visual odometry systems and algorithms, including stereo visual odometry, or a combination thereof, receive and fuse sensor data with sensing technologies to provide perception, navigation, mapping, visualization, mobility, tracking, targeting, with sensing devices including cameras, depth sensing cameras or other depth sensors, black and white cameras, color cameras including RGB cameras, RGB-D cameras, infrared cameras, multispectral sensors, line scan cameras, area scan cameras, rolling shutter and global shutter cameras, optoelectric sensors, photooptic sensors, light detection and ranging sensors (LiDAR) including spinning Lidar, flash LiDAR, static Lidar, etc., lasers, radar sensors, sonar sensors, radio sensors, ultrasonic sensors and rangefinders, other range sensors, photoelectric sensors, global positioning systems (GPS), inertial measurement units (IMU) including gyroscopes, accelerometers, and magnetometers, or a combination thereof, speedometers, wheel odometry sensors and encoders, wind sensor, stereo vision systems and multi-camera systems, omni-directional vision systems, wired and wireless communications systems and network communications systems including 5G wireless communications, computing systems including on-board computing, mobile computing, edge computing, cloud and cloudlet computing, fog computing, and other centralized and decentralized computing systems and methods, as well as vehicle and autonomous vehicle technologies including associated mechanical, electrical and electronic hardware. The systems, robots, computer software and systems, applications using computer vision and automation, or a combination thereof, described above, can be applied, for example, among objects in a geographic boundary to observe, identify, index with timestamps and history, and/or apply any number of treatments to objects, and, more specifically, of an agricultural delivery system configured to observe, identify, index, and/or apply, for example, an agricultural treatment to an identified agricultural object based on its location in the real-world geographic boundary, growth stage, and any and all treatment history.

In this example, the agricultural treatment system 400 agricultural treatment system 400 can include an on-board computing unit 420, such compute unit 420 computing unit embedded with a system on chip. The on-board computing unit can include a compute module 424 configured to process images, send and receive instructions from and to various components on-board a vehicle supporting the agricultural treatment system 400 agricultural treatment system 400. The computing unit can also include an engine control unit 422, a system user interface, system UI 428, and a communications module 426.

The ECU 422 can be configured to control, manage, and regulate various electrical components related to sensing and environment that the agricultural treatment system 400 will maneuver in, electrical components related to orienting the physical components of the agricultural treatment system 400, moving the agricultural treatment system 400, and other signals related to managing power and the activation of electrical components in the treatment system. The ECU 422 can also be configured to synchronize the activation and deactivation of certain components of the agricultural treatment system 400 such as activating and deactivating the illumination module 460, and synchronize the illumination module 460 with one or more cameras of the camera module 450 or one or more other sensors of the sensing module 451 for sensing an agricultural scene for observation and treatment of agricultural objects.

The compute module 424 can include computing devices and components configured to receive and process image data from image sensors or other components. In this example, the compute module 424 can process images, compare images, identify, locate, and classify features in the images including classification of objects such as agricultural objects, landmarks, or scenes, as well as identify location, pose estimation, or both, of an object in the real world based on the calculations and determinations generated by compute module 424 on the images and other sensor data fused with the image data. The communications module 426, as well as any telemetry modules on the computing unit, can be configured to receive and transmit data, including sensing signals, rendered images, indexed images, classifications of objects within images, data related to navigation and location, videos, agricultural data including crop yield estimation, crop health, cluster count, amount of pollination required, crop status, size, color, density, etc., and processed either on a computer or computing device on-board the vehicle, such as one or more computing devices or components for the compute module 424, or remotely from a remote device close to the device on-board the vehicle or at a distance farther away from the agricultural scene or environment that the agricultural treatment system 400 maneuvers on.

For example, the communications module 426 can communicate signals, through a network 520 such as a wired network, wireless network, Bluetooth network, wireless network under 5G wireless standards technology, radio, cellular, etc. to edge and cloud computing devices including a mobile device 540, a device for remote computing of data including remote computing 530, databases storing image and other sensor data of crops such as crop plot repository 570, or other databases storing information related to agricultural objects, scenes, environments, images and videos related to agricultural objects and terrain, training data for machine learning algorithms, raw data captured by image capture devices or other sensing devices, processed data such as a repository of indexed images of agricultural objects. In this example, the mobile device 540 can control the agricultural treatment system 400 through the communications module 426 as well as receive sensing signals from the telemetry module 366. The mobile device 540 can also process images and store the processed images in the databases 560 or crop plot repository 570, or back onto the on-board computing system of agricultural treatment system 400. In one example, remote computing 530 component can be one or more computing devices dedicated to process images and sensing signals and storing them, transferring the processed information to the database 560, or back to the on-board computing device of agricultural treatment system 400 through the network 520.

In one example, the agricultural treatment system 400 includes a navigation unit 430 with sensors 432. The navigation unit 430 can be configured to identify a pose and location of the agricultural treatment system 400, including determining the planned direction and speed of motion of the agricultural treatment system 400 in real time. The navigation unit 430 can receive sensing signals from the sensors 432. In this example, the sensing signals can include images received from cameras or Lidar's. The images received can be used to generate a grid map in 2D or 3D based on simultaneous visualization and mapping (SLAM) including geometric SLAM and Spatial SLAM techniques, visual odometry, or both, of the terrain, ground scene, agricultural environment such as a farm, etc. The sensing signals from the sensors 432 can also include depth signals from depth sensing cameras including RGB-D cameras or infrared cameras, or calculated with stereo vision mounted sensors such as stereo vision cameras, as well as other signals from radar, radio, sonar signals, photoelectric and photooptic signals, as well as location sensing signals, from having a global positioning system (GPS) unit, encoders for wheel odometry, IMU's, speedometers, etc. A compute module 434, having computing components such as a system on chip or other computing device, of the navigation unit 430, or compute module 424 of the compute unit 420, or both, can fuse the sensing signals received by the sensors 432, and determine a plan of motion, such as to speed up, slow down, move laterally, turn, change the rocker orientation and suspension, move, stop, or a combination thereof, or other location, pose, and orientation-based calculations and applications to align a treatment unit 470 with the ground, particularly with an object of interest such as a target plant on the ground. In one example, the navigation unit 430 can also receive the sensing signals and navigate agricultural treatment system 400 autonomously. For example, an autonomous drive system 440 can include motion components including a drive unit 444 having motors, steering components, and other components for driving a vehicle, as well as motion controls 442 for receiving instructions from the compute module 424 or compute module 424, or both, to control the drive unit and move the vehicle, autonomously, from one location and orientation to a desired location and orientation.

In one example, the navigation unit 430 can include a communications module 436 to send and receive signals from other components of the agricultural treatment system 400 such as with the compute unit 420 or to send and receive signals from other computing devices and databases off the vehicle including remote computing devices over the network 520.

In another example, the navigation unit 430 can receive sensing signals from a plurality of sensors including one or more cameras, Lidar, GPS, IMUs, VO cameras, SLAM sensing devices such as cameras and LiDAR, lasers, rangefinders, sonar, etc., and other sensors for detecting and identifying a scene, localizing the agricultural treatment system 400 and treatment unit 470 onto the scene, and calculating and determining a distance between the treatment unit 470 and a real world agricultural object based on the signals received, fused, and processed by the navigation unit 430, or sent by the navigation unit 430 to be processed by the compute module 424, and/or another on-board computing device of the treatment system 900. The images received can be used to generate a map in 2D or 3D based on SLAM, visual odometry including geometry based or learning based visual odometry, or both, of the terrain, ground scene, agricultural environment such as a farm, etc. The sensing signals can also include depth signals, from having depth sensing cameras including RGB-D cameras or infrared cameras, a radar, radio, sonar signals, photoelectric and photooptic signals, as well as location sensing signals from GPS, encoders for wheel odometry, IMUs, speedometers, and other sensors for determining localization, mapping, and position of the agricultural treatment system 400 to objects of interest in the local environment as well as to the regional agricultural environment such as a farm or other cultivated land that has a designated boundary, world environment, or a combination thereof. The navigation unit 430 can fuse the sensing signals received by the sensors, and determine a plan of motion, such as to speed up, slow down, move laterally, turn, move, stop, change roll, pitch, and/or yaw orientation, or a combination thereof, or other location, localization, pose, and orientation-based calculations and applications.

In one example, the navigation unit 430 can include a topography module configured to utilize sensors, computer components, and circuitry configured to detect uneven surfaces on a plane or scene of the terrain which allows the topography module to communicate with the rest of the components of the treatment system to anticipate, adjust, avoid, compensate for, and other means of allowing the agricultural treatment system 400 to be aware of uneven surfaces detected on the terrain as well as identify and map unique uneven surfaces on the terrain to localize the vehicle supporting the navigation unit 430.

In one example, the agricultural treatment system 400 includes a camera module 450 having one or more cameras, sensing module 451 having other sensing devices, or both, for receiving image data or other sensing data of a ground, terrain, orchard, crops, trees, plants, or a combination thereof, for identifying agricultural objects, such as flowers, fruits, fruitlets, buds, branches, plant petals and leaves, plant pistils and stigma, plant roots, or other subcomponent of a plant, and the location, position, and pose of the agricultural objects relative to a treatment unit 470, camera module 450, or both, and its position on the ground or terrain. The cameras can be oriented to have a stereo vision such as a pair of color or black and white cameras oriented to point to the ground. Other sensors of sensing module 451 can be pointed to the ground or trees of an orchard for identifying, analyzing, and localizing agricultural objects on the terrain or farm in parallel with the cameras of the camera module 450 and can include depth sensing cameras, LiDAR's, radar, electrooptical sensors, lasers, etc.

In one example, the agricultural treatment system 400 can include a treatment unit 470 with a treatment head 472. In this example, the treatment unit 470 can be configured to receive instructions to point and shine a laser, through the treatment head 472, to treat a target position and location on the ground terrain relative to the treatment unit 470.

The agricultural treatment system 400 can also include motion controls 442, including one or more computing devices, components, circuitry, and controllers configured to control mechatronics and electronic components of a vehicle supporting the agricultural treatment system 400 configured to move and maneuver the agricultural treatment system 400 through a terrain or orchard having crops and other plants of interest such that, as the agricultural treatment system 400 maneuvers through the terrain, the cameras 350 are scanning through the terrain and capturing images and the treatment unit is treating unwanted plants identified in the images captured from the camera module 450 and other sensors from sensing module 451. In one example, an unwanted plant can be a weed that is undesirable for growing next or near a desirable plant such as a target crop or crop of interest. In one example, an unwanted plant can be a crop that is intentionally targeted for removal or blocking growth so that each crop growing on a specific plant or tree can be controlled and nutrients pulled from the plant can be distributed to the remaining crops in a controlled manner.

The agricultural treatment system 400 can also include one or more batteries 490 and one or configured to power the electronic components of the agricultural treatment system 400, including DC-to-DC converters to apply desired power from the battery 490 to each electronic component powered directly by the battery.

In one example, the illumination module 460 can include one or more light arrays of lights, such as LED lights. The one or more light arrays can be positioned near the one or more cameras or sensors of camera module 450 and sensor module 451 to provide artificial illumination for capturing bright images. The light arrays can be positioned to point radially, from a side of the vehicle, pointed parallel to the ground, and illuminate trees or other plants that grow upwards. The light arrays can also be positioned to be pointed down at the ground to illuminate plants on the ground such as row crops, or other plants or soil itself. The light arrays can be controlled by the ECU 422, as well as by a synchronization module, embedded in the ECU 422 or a separate electronic component or module, such that the lights only flashes to peak power and luminosity for the length of 1 frame of the camera of camera module 450, with a matched shutter speed. In one example, the lights can be configured by the ECU 422 to flash to peak power for the time length of a multiple of the shutter speed of the camera. In one example, the lights of the light array can be synchronized to the cameras with a time offset such that the instructions to activate the LED's of the light array and the instructions to turn on the camera and capture images are offset by a set time, predetermined time, or automatically calculated time based on errors and offsets detected by the compute unit 420, so that when the LED's actually activate to peak power or desired luminosity, which will be a moment in time after the moment in time the ECU sends a signal to activate the light array, the camera will also activate at the same time and capture its first image, and then both the lights and cameras will be synchronized and run at the same frequency. In one example, the length of time of the peak power of the activated light is matched and synchronized with the exposure time of each frame captured of the camera, or a multiple of the exposure time. In one example, the cameras can include cameras having different resolution and/or frame capture rates.

For example, the lights of the light array can flash with turning on, reach peak power, and turn off at a rate of 30 to 1000 Hertz (Hz). In one example, the lights can flash at 240 Hz to match one or more cameras that has a rolling shutter speed, global shutter speed, or both, of 240 Hz. In one example, the lights can flash at 240 Hz to match one or more cameras that has a rolling shutter speed, global shutter speed, or both, of 30 or 60 Hz. In one example, the lights can reach a peak power of 2.0M Lumen with a sustained peak power ON for 250 microseconds with a duty cycle of less than 10%. In one example, the color temperature of the light 170 can include the full spectrum of white light including cool, warm, neutral, cloudy, etc. In one example, the color temperature of the light can be around 5000K nm to reflect and artificially imitate the color temperature of the Sun.

In one example, the agricultural treatment system 400 can include a treatment unit 470 with a treatment head 472. In this example, the treatment unit 470 can include a turret and circuitry, electronic components and computing devices, such as one or more microcontrollers, electronic control units, FPGA, ASIC, system on chip, or other computing devices, configured to receive instructions to point and a treatment head 472, to treat a surface of a real-world object in proximity of the treatment unit 470. For example, the treatment unit 470 can emit a fluid projectile of a treatment chemical onto an agricultural object in the real world based on detecting the agricultural object in an image captured and determining its location in the real world relative to the treatment unit 470.

The treatment unit 470 can include a gimbal assembly, such that the treatment head 472 can be embedded in, or supported by the gimbal assembly, effectively allowing the treatment head 472 to rotate itself and orient itself about one or more rotational axes. For example, the gimbal assembly can have a first gimbal axis, and a second gimbal axis, the first gimbal axis allowing the gimbal to rotate about a yaw axis, and the second gimbal axis allowing the gimbal to rotate about a pitch axis. In this example, a control module of the treatment unit can control the gimbal assembly which changes the rotation of the gimbal assembly about its first gimbal axis, second gimbal axis, or both. The compute module 424 can determine a location on the ground scene, terrain, or tree in an orchard, or other agricultural environment, and instruct the control module of the treatment unit 470 to rotate and orient the gimbal assembly of the treatment unit 470. In one example, the compute module 424 can determine a position and orientation for the gimbal assembly to position and orient the treatment head 472 in real time and make adjustments in the position and orientation of the treatment head 472 as the agricultural treatment system 400 is moving relative to any target plants or agricultural objects of interest on the ground either in a fixed position on the ground, or is also moving. The agricultural treatment system 400 can lock the treatment unit 470, at the treatment head 472, onto the target plant, or other agricultural object of interest through instructions received and controls performed by the control module of the treatment unit 470, to adjust the gimbal assembly to move, or keep and adjust, in real time, the line of sight of the treatment head 472 onto the target plant.

In one example, a chemical selection module, or chemical selection 480, of agricultural treatment system 400 agricultural treatment system 400 can be coupled to the compute module 424 and the treatment unit 470. The chemical selection module can be configured to receive instructions to send a chemical fluid or gas to the treatment unit 470 for treating a target plant or other object. In this example, the chemical selection module can include one or more chemical tanks 482, one or more chemical regulators 484 operable connected to the one or more chemical tanks 484 such that there is one chemical regulator for tank, a pump for each tank, and a chemical mixer 488 which can mix, in real time, chemical mixtures received from each chemical tank selected by the chemical mixer 488. In one example, a vehicle supporting the agricultural treatment system 400 agricultural treatment system 400, including the chemical selection module 480, can support one chemical tank 482, a chemical pump, a chemical regulator 486, a chemical and a chemical accumulator, in series, linking connecting a pathway for a desired chemical or liquid to travel from a stored state in a tank to the treatment unit 470 for deposition on a surface of an object. The chemical regulator 484 can be used to regulate flow and pressure of the fluid as it travels from the pump to the treatment unit. The regulator 484 can be manually set by a user and physically configure the regulator on the vehicle, or controlled by the compute unit 420 at the compute module 424 or ECU 422. The chemical regulator 484 can also automatically adjust flow and pressure of the fluid from the pump to the treatment unit 470 depending on the treatment parameters set, calculated, desired, or a combination thereof. In one example, the pump can be set to move fluid from the storage tank to the next module, component, in the series of components from the chemical tank 482 to the treatment unit 470. The pump can be set at a constant pressure that is always pressurized when the vehicle and agricultural treatment system 400 agricultural treatment system 400 is currently running a trial for plant or soil treatment. The pressure can then be regulated to controlled from the constant pressure at the regulator, and also an accumulator 487, so that a computer does not need to change the pump pressure in real time. Utilizing a regulator and accumulator can cause the pressure needed for the spray or emission of a fluid projectile to be precisely controlled, rather than controlling voltage or power of the pump. In one example, the agricultural treatment system 400 agricultural treatment system 400 will identify a target plant to spray in the real world based on image analysis of the target plant identified in an image captured in real time. The compute unit 420 can calculate a direction, orientation, and pressurization of the treatment unit 470 such that when the treatment unit 470 activates and opens a valve for the pressurized liquid to pass from the chemical selection module 480 to the treatment unit 470, a fluid projectile of a desired direction, orientation, and magnitude, from the pressure, will be emitted from the treatment unit 470 at the treatment head 472. The pump will keep the liquid stream from the chemical tank 482 to the treatment unit 470 at a constant pressure, whether or not there is flow. The chemical regulator 484 in the series of components will adjust and step down the pressure to a desired pressure controlled manually before a trial, controlled by the compute unit 420 before the trial, or controlled and changed in real time during a trial by the compute unit 420 either from remote commands from a user or automatically calculated by the compute module 424. The accumulator 487 will keep the liquid stream in series pressurized to the desired pressure adjusted and controlled by the chemical regulator 484, even after the treatment unit 470 releases and emits pressurized fluid so that the stream of fluid from the pump to the treatment unit 470 is always kept at a desired pressure without pressure drops from the release of pressurized fluid.

In one example, the chemical can be a solution of different chemical mixtures for treating a plant or soil. The chemicals can be mixed, or premixed, configured, and used as pesticides, herbicides, fungicides, insecticides, fungicides, adjuvants, growth enhancers, agents, artificial pollination, pheromones, etc., or a combination thereof. In one example, water or vapor can be substituted for any of the fluid or chemical selections described above. In one example, the agricultural treatment system 400 agricultural treatment system 400 can apply powder sprays or projectiles as well as foams, gels, coatings, or other physical substances that can be emitted from a chemical spray device.

In one example, the treatment unit 470 can emit a projectile, liquid, gas, aerosol, spray, mist, fog, or other type of fluid droplet induced spray to treat a plurality of different plants in real time. An agricultural scene can include a row crop farm or orchard planted with different crops. In this example, each row of plants can include a different type of plant to by cultivated and treated such that the treatment unit 470 can treat one row with one type of treatment, such as a chemical mixture-1, mixed and sent to the treatment unit 470 by the chemical mixer 488, and another row with another type of treatment to a different crop or plant, such as a chemical mixture-2. This can be done in one trial run by a vehicle supporting the chemicals, and treatment system with treatment unit 470. In another example, each row itself, in a row crop farm or orchard, can have a plurality of different type of crops. For example, a first row can include a first plant and a second plant, such that the first plant and second plant are planted in an alternating pattern of a first plant, a second plant, a first plant, a second plant, and so forth for the entire row of a first row. In this example, the chemical selector 488 and treatment unit 470 can deposit a first chemical mixture projectile, for precision treatment, to the first plant, and deposit a second chemical mixture projectile, for precision treatment, to the second plant, in real time, and back to the depositing the first chemical projectile to the third plant in the row of crops, the third plant being of the same plant type as the first plant, and so forth. In one example, a plurality of more than two types or species of plants can be planted in tilled soil, and be grown and treated in a row crop with the agricultural treatment system 400

In one example, the treatment unit of agricultural treatment system 400 can blast water or air, or a water vapor to one or more agricultural objects to wash off any undesired objects detected on the surface or other portion of the agricultural objects. The undesired objects can be unwanted bugs or debris on the agricultural object as well as previously applied chemicals that are no longer desired to leave on the agricultural object. In one example, the treatment unit can then recoat an agricultural object that was previously cleaned with water or air with a new chemical treatment. In one example, one of the chemical tanks can also include water for the purposes of purging the stream of liquid from tanks to the treatment units of any excess chemical or substance buildup which could affect chemical composition, pressure, spray health, and other controlled factors that could affect desired performance. In one example, one of the tanks can include water for chemigation as water is mixed with substance from a different tank.

Figure 5:
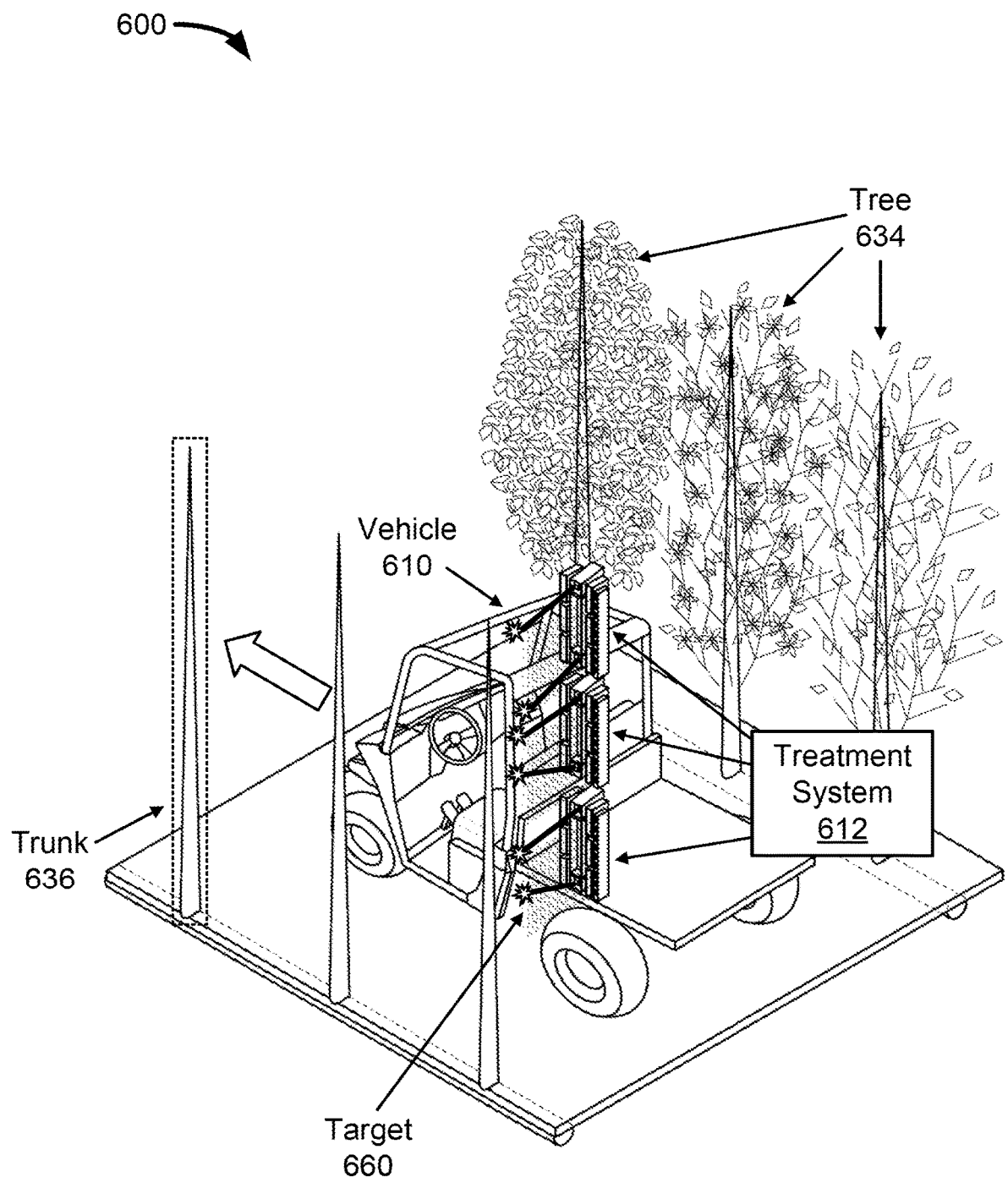
FIG. 5 is a diagram illustrating an example vehicle supporting an observation and treatment system performing in a geographic boundary, according to some examples.

FIG. 5 is a diagram 600 illustrating an example vehicle 610 supporting an example observation and treatment system, or treatment system 612, performing in a geographic boundary, according to some examples. In this example, the vehicle 610 can support one or more modular treatment systems 612. The treatment systems 612 can be similar to that of agricultural observation and treatment systems described above. For example, a system can include onboard and offline components performing tasks both in real time while a vehicle supporting the onboard portions of components are performing observations and actions and at edge compute device or remotely both in real time or offline.

For example, the treatment system 612 can be one of a plurality of modular component treatment systems, each component treatment system can include one or more sensors including image capture sensors, illumination devices, one or more treatment units, for example a pair of treatment units each with a treatment head capable of aiming at a target 660 with at least 2 degrees of rotational freedom, a compute unit configured to send and receive instructions of sensors, encoders, and actuators and connected and associated with the component treatment system and the compute unit to time sync all of the components, and other electronics to sync and communicate with other compute units of other component treatment systems. Each of these treatment systems 612 can receive treatment fluids from a common pressurized source of fluid, or each treatment unit is connected to different sources of fluid. The component treatment systems are configured to sense targets 660 in real time while supported by the moving vehicle 612, determine what kind of treatment, or other action, to perform on to a surface of the target 660, target and track the target 660, predict performance metrics of the instructed parameters of the action including projectile location, perform the action, including emitting a fluid projectile or light source, and evaluating the efficacy and accuracy of the action.

Additionally, each of these treatment systems 612, or component treatment systems, can communicate and receive information from a component navigation system or navigation unit which is configured to sense a global scene such that each of the compute units of each of the component treatment systems can sense its local environment from sensors operably connected to the compute unit of the component treatment system, or embedded in the component treatment system, as well as receive information about the global environment in a geographic scene from sensors and analysis performed by sensors and the one or more compute units of the navigation unit connect to each of the local component treatment systems.

The vehicle 610 can be operating in a geographic region such as a farm or orchard. A portion of the geographic boundary, illustrated in FIG. 5, with one or more trees 634 is shown. In this example the vehicle 610 can be operating in an orchard with multiple rows of trees, each having a trunk 636, or other plants for the treatment systems 612 to observe and treat. In one example, the vehicle can be travelling in a straight line along a row of trees and crops on both sides of the vehicle.

One or more treatment systems 612 can be mounted on top, embedded in, suspended underneath, towed, or oriented in many ways securely onto the vehicle such that the treatment system 612 can be configured and oriented to scan a row of crops or plants or other agricultural scenes in a line while the vehicle 610 is moving.

The vehicle 610 may include functionalities and/or structures of any motorized vehicle, including those powered by electric motors or internal combustion engines. For example, vehicle 610 may include functionalities and/or structures of a truck, such as a pick-up truck (or any other truck), an all-terrain vehicle ("ATV"), a utility task vehicle ("UTV"), or any multipurpose off-highway vehicle, including any agricultural vehicle, including tractors or the like. The treatment systems 612 that may be powered or pulled separately by a vehicle, which may navigate paths autonomously in the geographic boundary.

In one example, a geographic boundary can be configured to have two rows of plants on each side of a single lane for a vehicle to navigate through. On each side of the vehicle will be vertically growing plants such as trees. The treatment system 612 can be mounted on the vehicle in a way that image sensors of the treatment system 612 are pointing directly at the trees on each two left and right side of the vehicle. As the vehicle operates along a lane or path in the orchard, the treatment system 612 can capture a series of images from one side to another of the row of plants as well as treat each agricultural object with a precision treatment.

Figure 6:
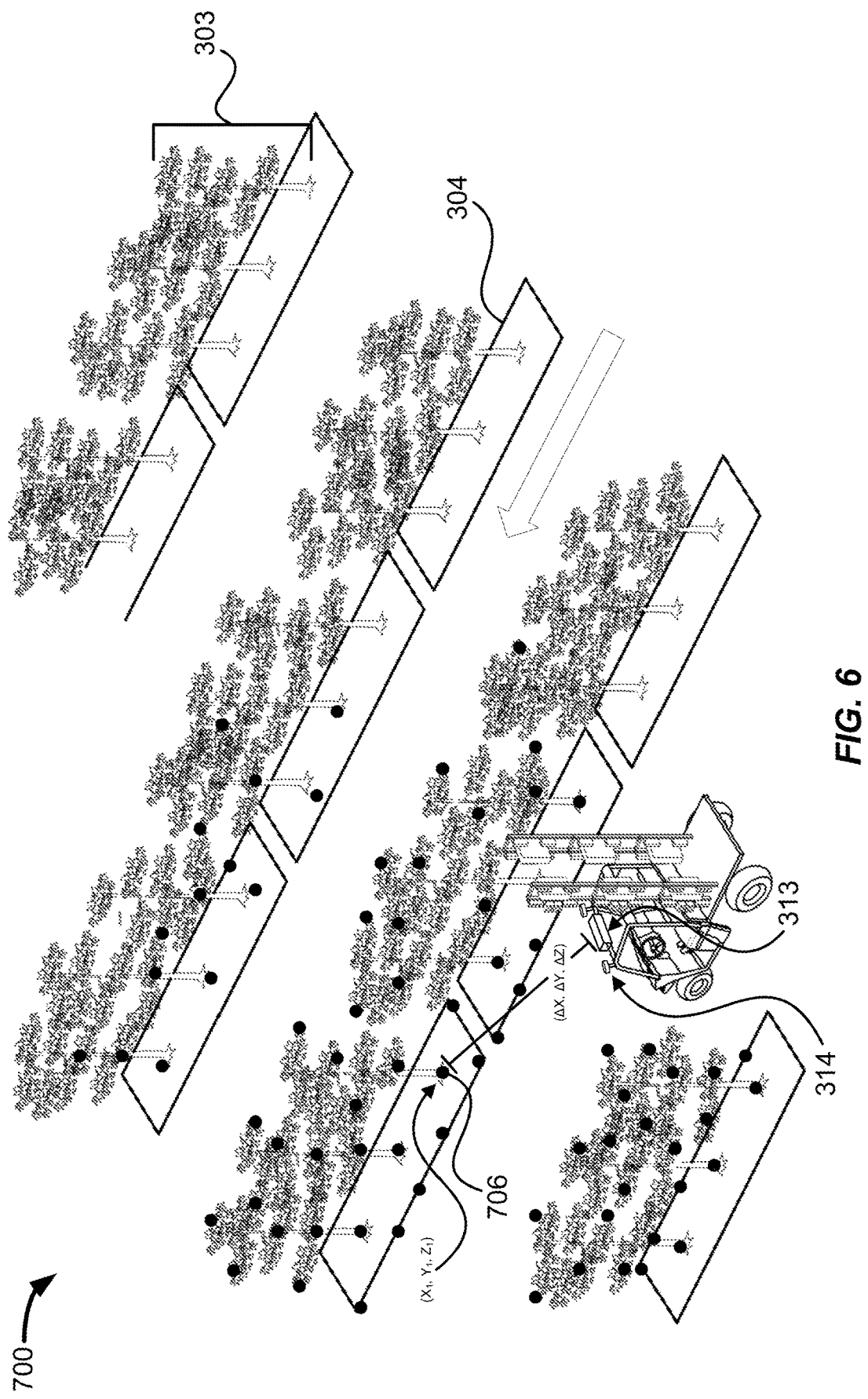
FIG. 6 is a diagram of a vehicle navigating in an agricultural environment, according to some examples.

FIG. 6 illustrates a diagram 700 depicting an agricultural observation and treatment system supported by a vehicle navigating in an agricultural environment. The agricultural environment can be a farm or orchard typically having one or more plants such as trees 303. While the illustration depicts a system in an environment similar to that of an orchard, different, the description below can apply to a system, the same system, performing in multiple different types of environments such as row crop farms where portions of the system include sensors pointing at the ground to detect row crop objects of interest.

The agricultural observation and treatment system can be a modular system similar to that of agricultural observation and treatment system 311 supported by vehicle 310. The system 311 can also include various sensors such as imaged based sensor 313, lidar based sensors 314, or a plurality of non-vision-based sensors as described previously. Similar to that of navigation unis and navigation modules described in this disclosure, the treatment system depicted in diagram 700 can use sensors, such sensor 313 and 314 to perform global registry of the agricultural environment as well as perform localization and pose estimation of the vehicle or portions of the vehicle in a global scene or from a global point of reference. This can include receiving sensor data and generating and building high definition 2-dimensional and 3-dimensional maps, or global maps as opposed to views of individual crops with sensors close up to the individual crops which can be referred to a local scene or local registry of a geographic boundary or scene, of the agricultural environment in real time.

In one example, the agricultural observation and treatment system 311, described in previous discussions, can be configured to perform scene understanding, mapping, and navigation related analysis including localization of the vehicle and/or components of the treatment system and pose estimation of the vehicle and/or components of the treatment system, for example pose estimation of individual image capture devices embedded in each component spray system, each component spray system illustrated in diagrams 900, 902, 2406, and 2408, or each modular subsystem of the agricultural observation and treatment. The sensing can be performed with a various suite of image-based sensors, motion-based sensors, navigation-based sensors, encoder sensors, other sensors, or a combination thereof, fused and synchronized together such that at least components of the agricultural observation and treatment system 311 can determine navigational properties of an environment the system is in, including pose and pose estimation of the components in real time as the vehicle, treatment system, and components of the system moves and navigates in such environment.

In one example, the agricultural observation and treatment system 311 can perform mapping of a scene and localizing the treatment system in the scene. This can include mapping a scene with a global frame of reference or point of origin in a given coordinate system, and determining its location relative to a point in the mapped scene, particularly a point of origin in the scene. For example, when a vehicle is navigating in an agricultural environment in FIG. 6, the system can arbitrarily determine a point of origin in the agricultural environment, for example the portion of the agricultural environment the system has sensed thus far, or preloaded into the system before sensing the environment in real time. For example, a first corner or first edge of a portion or region of a farm or orchard. As the vehicle navigates in the environment, the system can determine where the vehicle and each of the components of the system, due to the components being fixed relative to the vehicle, has moved across time. The treatment system's navigation type sensors, including GPS, IMU, encoders, image capture devices configured to capture a high resolution or low resolution of a global scene and perform techniques and functions in computer vision and machine learning such as visual SLAM and visual odometry (the global scene referring to the farm or orchard, or any kind of agricultural environment itself, and not necessarily those sensors pointing directly at individual plants or crops of plants for high-definition images of individual plants), Lidars to sense a global scene similar to that of the image capture devices, optoelectrical sensors, ultrasonic sensors, radar, sonar, and other image capture devices such as NIR cameras, RGB-D cameras, multispectral cameras, etc., configured to obtain global registry of an environment including mapping the environment at a global level, and can be used to generate and continuously generate a global pose estimation of the vehicle as it moves along a path, and each of its component, relative to a point of origin in the geographic environment, the system can also determine the same global pose of components of the system as well, due to the components being rigidly connected or supported by the vehicle. For example, while a camera sensor that is 15 feet from the ground or 15 feet vertically above a bed of the vehicle may wobble and move more than that of a camera sensor that is 1 foot from the ground or 1 feet vertically above the bed of the vehicle, each poses of the cameras may be different to each other at a local level, relative to a vehicle, and therefore, relative to a point of origin in the geographic scene, the global pose estimation can be estimated to that of the global pose estimation generated for the vehicle by a navigation module and sensors associated with navigation. This is because each of these cameras can be rigidly connected to the sensors configured to perform global registry of the environment, such that physical translation and movement of the vehicle, and particularly movement of the navigation-based sensors (for example, GPS, and navigation-based camera sensors), the local sensors embedded or supported by each component spray module or component treatment module will substantially move the same amount. Additionally, each sensor supported by each component treatment module can track local objects, shapes, patterns, or any salient points or patterns local to each of the component treatment modules such that a more accurate pose estimation for each of the component treatment modules, more specifically, pose estimation of sensors of each component treatment modules, can be generated and continuously generated as the component treatment modules are scanning a local scene to observe objects and perform objects on target objects.

In one example, the system, both the navigation system and its components, sensors, and compute units, as well as each component subsystem or component treatment module having its own components, sensors, treatment units, and compute units, can use techniques associate with simultaneous localization and mapping (SLAM) and odometry, particularly visual SLAM, VSLAM, and visual odometry, or VIO, in conjunction with other non-visual based navigation and localization analysis, fused together in real time with sensor fusion and synchronization, to perform pose estimation of the vehicle. Additionally, each modular sub systems of the treatment system including each modular spray subsystem, for example each modular spray subsystem or component treatment module including a structural mechanism, a compute unit, one or more sensors, one or more treatment units, and one or more illumination devices, can perform VSLAM and receive other non-visual based sensor readings, and continuously generate its own localized pose estimation, the pose being relative to specific objects detected by each of the component treatment modules, which can include agricultural objects including target objects or nearby objects or patterns, shapes, points, or a combination thereof that are of a similar size to that of the target objects. The pose estimation of components of each of the component treatment modules will be relative to the location of the objects and patterns detected to be tracked across time and across sensors in stereo for stereo matching points for depth perception. Additionally, the system can perform projection and reprojection, and determine reprojection error, for more accurately determining location of objects and eliminating outliers. Thus, detecting objects and patterns that are known to be fixed in space, for example a ground terrain with unique rocks or dirt patterns, or individual plants, and calculating and identifying the objects' or patterns' 3D location and/or orientation relative to the sensors' 3D location and/or orientation sensing the objects and patterns allows the system to understand navigation, localization, and more specifically local pose estimation of each of those sensors relative to the objects detected. Additionally, since the orientation of the treatment units, and its treatment heads, are in close proximity to the individual component treatment module, and rigidly attached and connected to a structure of the component treatment module (illustrated in at least FIGS. 9A, 9B, and 21), and also in close proximity and rigidly connected to the sensors associated with that particular component treatment module and compute unit, the location and orientation of the treatment head of the treatment units (the treatment heads having encoders to determine line of sight relative to the body of the treatment unit) can also be continuously generated and determined relative to the target objects or objects near the target objects themselves for better accuracy of treatment.

In this disclosure, while the determined pose estimation can be referred to the pose estimation generated for the vehicle or a component modular spray subsystem, a pose estimation can be determined, using VSLAM, VIO, and/or other sensor analysis, to generate a pose, including a location and/or orientation for any component of the vehicle or component of the agricultural observation and treatment system. In one example, a pose estimation can be referred to and generated with coordinates, for example $(x_1, y_1, z_1, \Phi_1, \theta_1, \Psi_1)$ with x, y, z, being the translational location relative to an origin $(x_0, y_0, z_0)$ and starting orientation $(\Phi_0, \theta_0, \Psi_0)$ of the component relative to an origin point and/or orientation, of any component or portion of a component.

In one example, as illustrated in FIG. 6, a vehicle's navigation module can include sensors such as imaged based sensor 313, lidar based sensors 314, or a plurality of non-vision-based sensors as described previously, fused together to obtain global registry of the scene for mapping the scene as well as in real time navigating in the scene. For example, a pair or more than one pair of image sensors 313, in stereo, can be mounted on the vehicle such that the sensors are pointed out to the real world to observe a global scene, as opposed to down on the ground to observe individual plants or right in front of (a few meters or fewer away) a tree to observe individual plants, crops, or other agricultural objects. Additionally, Lidars, radar, sonar, and other sensors can be mounted in a similar location as that of the cameras to register a global scene.

The agricultural observation and treatment system, at the navigation unit, or a component of the navigation unit, can perform real time VSLAM and VIO to simultaneously map the agricultural environment that it is in, as well as understand the location, localizing, of the agricultural observation and treatment system itself as it is navigating in the environment, whether it is autonomously navigating or navigating with a human driver on the vehicle or remotely. In one example, as illustrated in diagram 700 of FIG. 6, VSLAM can be performed using keypoint detection and matching across stereo and across time, or surface matching of salient points or regions of surfaces detected. Keypoints, for example keypoint 706 can be generated in real time from image frames captured by image sensors. In one example, stereo image sensors can capture frames at the same time. Keypoints can be generated and identified by a compute unit embedded in the image sensor, or a compute unit of the navigation unit operably connected to each of the stereo image sensors configured to receive images or imagery data from the sensors. Common keypoints are matched such that the system can understand depth of the keypoint from the stereo sensors, and thus the depth of the keypoint from the navigation unit and therefore the vehicle. Thousands of keypoints can be detected, generated, and tracked over time per frame. They keypoints themselves can be cluster of pixel points representing a corner, blob, line, other salient patterns. These points do not necessarily have to be real world identifiable known objects. For example, a keypoint can be generated as a where two objects meet, or where one object and a background meet, for example an edge of a leaf from the background sky. The different in color between a leaf and a sky will create a line or edge between the two colors captured by an image sensor. Other examples can be corners of objects, dots, or lines. For example, three small rocks next to each other can form salient pattern to track, even if the system doesn't understand that it is a 3-rock cluster, meaning the system cannot extract enough features to perform object detection and determine that one or more rocks were identified. But the actual 3 rocks form a rigid and complex pattern that the system can still identify and track.

The system may not be able to detect an identity of an object, but it can detect its contours and edges and track those points. In this example any type of points or pixels, clusters of points or pixels, lines, corners, that the system may determine as salient points or patters, can be generated as a keypoint. The keypoint may or may not be generated in a different frame captured by a different image sensor, for example a second sensor in stereo with a first sensor. Common keypoints between different frames can be matched using various computer vision techniques such as image correspondence, keypoint matching, template matching where the templates are patches of image including keypoints, dense SLAM techniques, techniques with classifiers, RANSAC and outlier rejection to more accurately detect common keypoints, other statistical modelling techniques, or other corner, line, blob, edge detection techniques including FAST, SIFT, Harris corner detection, Lucas-Kanade tracking, SURF, NERF, ORB, or a combination thereof. Additionally, lines, corners, patterns, or other shapes, whether referred to as keypoints or not, that are generated in each frame can be matched to the similar lines, corners, patterns, and shapes using the same or similar techniques described above.

The keypoints that are matched between two cameras in stereo, or more cameras can be used to determine depth of the object or point or points in the real-world space associated with the keypoints detected. These techniques can be applied similarly with Lidar or used in conjunction with lidar sensed point clouds and fused together for more accurate representations of a scene. The images sense, and keypoints matched between cameras can be used to perform dense reconstructions of environments, as well as perform real time navigation, localization, and pose estimation of the sensors sensing the environment.

In one example, dense visual slam can be performed, whether by a single image sensor, such as a camera, infrared camera, rgb-d camera, multispectral sensors, or other sensor, or by stereo cameras, or two or more of different types of cameras that are synchronized with known fixed distance and orientation relative to each other, to compare image from frame to frame across time. The commonly matched and tracked points can allow the sensor to determine how much movement and amount of translation and orientation change of the sensor based on the shape and depth of the point or object detected and tracked from a previous frame. For example, an agricultural observation and treatment system can sense a point in space, which can be any type of pattern, but for example, can be a pattern of a base of a tree trunk. The system can determine that as a keypoint 706. As the vehicle supporting the agricultural observation and treatment system moves closer to the base of the tree trunk. The pattern of the keypoint 706 from a first frame will change in shape, location, size, etc., in a subsequent frame captured at a later point as the image sensor has moved closer to the point. The system would be able to calculate the amount of movement in space as it tracks the same point in space with keypoint matching or other techniques to perform VSLAM.

In one example, VSLAM can be performed by detecting objects themselves, rather than arbitrary points and patterns detected in an image frame. For example, a whether referred to as keypoints or not, the system can ingest a frame, perform feature extraction and object detection and detect specific known objects with a machine learning model. These objects, rather than salient points such as corners, lines, blobs, or other patterns that can be tracked across frames in stereo and across frames in time, can be objects such as agricultural objects and landmarks, such as leaves, weeds, rocks, terrain, trees, components of irrigation systems, wheels of a vehicle, or any other landmarks where the system can identify the landmark itself, rather than just salient points that may or may not be associated to a landmark. For example, referring to diagram 1300a of FIG. 12A, the agricultural observation and treatment system can detect a plurality of fruitlets, buds, and landmarks in a single frame using a machine learning detector embedded on board the system. From frame to frame, as the treatment system scans the orchard, the image sensors of each of the component treatment modules configured to detect individual objects and landmarks themselves, can detect objects, and match the object detections from frame to frame for the purposes of SLAM and pose estimation of the sensor sensing the object, in addition to determining whether to track an object to perform a treatment action. In another example, as illustrated in diagram 1600 of FIG. 14, the component treatment module sensing and analyzing the frame or image 1610 can detect every agricultural object in the frame including carrots (or agricultural object not to treat) and weeds (agricultural objects detected for treatment). The system can identify features of each object, and match the features from frame to frame for scene understanding and determining movement and orientation of the sensors capturing the frame (because the objects themselves are not moving in space) relative to those objects, even though the agricultural object and treatment system under certain configurations are tasked to only target, track, and treat the weeds. The objects can be detected using feature extraction and object detection with various machine learning techniques, computer vision techniques, or a combination thereof. Additionally, while the discussion above focuses on image-based sensors, similar techniques can be applied using one or more lidar sensors for point cloud to point cloud matching.

In one example, in additional to performing functions to allow a system to determine pose and therefore navigate in an environment, the system can use the same sensor readings used to determine pose estimation to perform dense reconstruction of a scene and map the agricultural environment. This can be done with VSLAM which takes multiple views across frames in time and in stereo to reconstruct a scene. Other techniques can include dense reconstruction of a scene from SLAM or structure from motion. Other techniques for improvements in scene geometry in a sequence of frames captured by an image sensor can include local bundle adjustment to improve visual SLAM.

In one example, the agricultural objects discussed in this disclosure can be any number of objects and features detected by various sensors including image sensors. The agricultural objects can include varieties of plants, different phenological stages of different varieties of plants, even though the specific object detected in a geographic scene, having different physical features due to its growth is the same physical object in the geographic scene, target plants to treat including treating plants to turn into a crop or treating plats for plant removal or stunting or stopping or controlling the growth rate of a plant. Agricultural objects can include soil or patches of soil for soil treatment. Other objects detected and observed by a treatment system can include landmarks in the scene. Landmarks can be trees and portions of trees including spurs, stems, shoots, laterals, specific portions of the terrain including dirt, soil, water, mud, etc., trellises, wires, and other farming materials used for agriculture. Additionally, landmarks can be any object that can be detected by the observation and treatment system and tracked as a vehicle supporting the treatment system is moving as well as tracked throughout time as the vehicle visits the location across a grow season in multiple trials or runs. For example, agricultural objects described throughout this disclosure can also be considered a landmark for tracking the landmark even though the observation and treatment system may not necessarily be targeting the object for treatment or tagging and indexing the object for observation. The landmarks can be tracked, using SLAM or other computer vision and machine learning based or assisted computer vision techniques, to better locate a nearby landmark or object that will be a target for treatment. For example, a plurality of landmarks and potential landmarks that are also target objects can be detected in a given image frame, or a pair of stereo frames, or sensed by a plurality of sensors synched in time. Once the agricultural observation and treatment system has identified In one example, landmarks that can be tracked are not specifically defined objects in the real world, but patterns or combinations of objects or features such as region in space separating one or more unknown objects from a background. While the system may not be able to perform feature extraction enough to detect an object's identity, it can still detect that an object, or a pattern created by one or more objects, exists in the captured sensor reading, and is that of one that is fixed in space and will not move. These detections can also be referred to as landmarks and used to track the landmarks for real time pose estimation. For example, landmarks detected as illustrated in diagrams 1300a and 1300b of FIGS. 12A and 12B can be used to generate keyframes for further offline analysis including matching frames taken at different times of the same or similar view to create a time lapse visualization of an object by comparing only keyframes instead of every frame ingested by a sensor, determining which candidate keyframe previously generated and stored by the system is used in real time to perform image correspondence for live/real time detections, targeting, and tracking, as well as used and tracked from frame to frame to perform VSLAM, and generate better pose estimation for the sensor sensing the frames.

An agricultural object of interest can be a target plant for growing into a harvestable crop. In one example, the agricultural object of interest can be a target plant to remove, such as that of a weed, or any plant that is not a crop. In one example, the agricultural object can be portions of a soil of interest to observe and cultivate, such that at least a portion of the cultivating process is treating the soil with one or more fluid chemical treatments or fertilizer.

In one specific example, the agricultural observation and treatment system can perform a variation of SLAM focusing on one or more specific features to extract to more accurately generate pose estimation for agricultural observation and treatment systems performing in agricultural environments. For example, a system can be embedded with a SLAM algorithm, whether assisted by machine learning, other computer vision techniques, or both, to detect tree trunks. In most orchards, tree trunks do not grow in size, change shape, or move in relatively short spans of time. Tree trunks are also spaced apart enough that each tree trunk detected can allow a system to determine a different set of agricultural objects detected in a tree are separated, which can be used to determine which sets of frames in a plurality of frames can be generated or used as a keyframe.

In another specific example, the agricultural observation and treatment system can perform a variation of SLAM focusing on one or more specific features to extract to more accurately generate pose estimation for agricultural observation and treatment systems performing in agricultural environments. For example, a system can be embedded with a SLAM algorithm, whether assisted by machine learning, other computer vision techniques, or both, to detect beds, troughs, furrows, and vehicle tracks of a row crop farm, the beds being where plants are planted and grow, and tracks being where vehicle wheels can travel. Instead of detecting arbitrary lines in a given frame, a machine learning assisted SLAM algorithm can be configured to detect just the beds and troughs, due to the beds and troughs looking substantially like lines that would take up an entire frame. This can help ease the performance load on performing VSLAM as the vehicle only needs to operate between two lines, detected as a trough, to better minimize drift.

In one example, each of the compute units of each component treatment modules can associate local and global pose. While the compute unit and sensors associated with the navigation unit performs slam and accounts for a vehicle pose (the vehicles components' own SLAM), for navigation purposes, it can also combine to individually map every single plant, because the plant will have a known location due to its relative location to the component treatment modules' sensors, for example stereo image sensors. The stereo image sensors will know where it is relative to a global scene to do the mapping of a local scene and the real time localization of the vehicle itself in the global scene. The combination will allow the system to generate a global map with every single unique and individual agricultural object sensed, and indexed with high precision in the global map itself.

In one example, a drone with one or more image sensors, lidars, GPS, IMU, can be configured to scan and map a scene of a geographic boundary of an agricultural scene and combine the sensor readings of the globally mapped scene from the drone with that of the globally mapped scene from the navigation unit's sensors and compute units of the agricultural observation and treatment system and the locally mapped individual agricultural objects and landmarks imposed onto the globally mapped scene generated by the agricultural observation and treatment system. This would allow any views or scenes not necessarily or accurately captured by the agricultural observation and treatment system on the ground but could be captured by the done to be accounted for to create an even more accurate global map with more views of the map or indexed database of a global map comprising a global scene from the drone with high definition readings of the geographic boundaries and views of the boundaries, a denser global scene of portions of the agricultural environment including trees, rows, beds, troughs, and it's location relative to each other and in the global frame, as well as a local scene of each individual agricultural object and landmark detected by each component treatment module.

In this example, individual crops, plants, agricultural objects, and landmarks can be sensed and registered with location and pose relative to image sensors sensing the individual crops, plants, agricultural objects, and landmarks. This will allow the agricultural observation and treatment system, at each of the component treatment systems having sensors and treatment units to identify more accurately where each object is relative to the local sensors of each component treatment module in real time. Additionally, the location of the individual crops, plants, agricultural objects, and landmarks, relative to the local sensors of each component treatment module can be indexed and stored. Because the local sensors of each component treatment module are rigidly connected to each other with a support structure, and the support structure is also rigidly connected to the vehicle supporting the navigation module and its sensors for obtaining global registry and global pose. The agricultural observation and treatment system can combine the local and global pose to determine where each individual crops, plants, agricultural objects, and landmarks sensed is located in a global scene. Thus, the agricultural observation and treatment system can be configured to create a global map of a scene with each individual object and/or landmark detected in the global map with sub-centimeter accuracy of where each individual object and/or landmark is located in the global map, or at least digitizing and indexing an agricultural scene without generating a visualizable map.

In one example, a vehicle or global pose estimation can be determined as well as an individual localized pose estimation for each component treatment module can be determined.

Figure 9A:
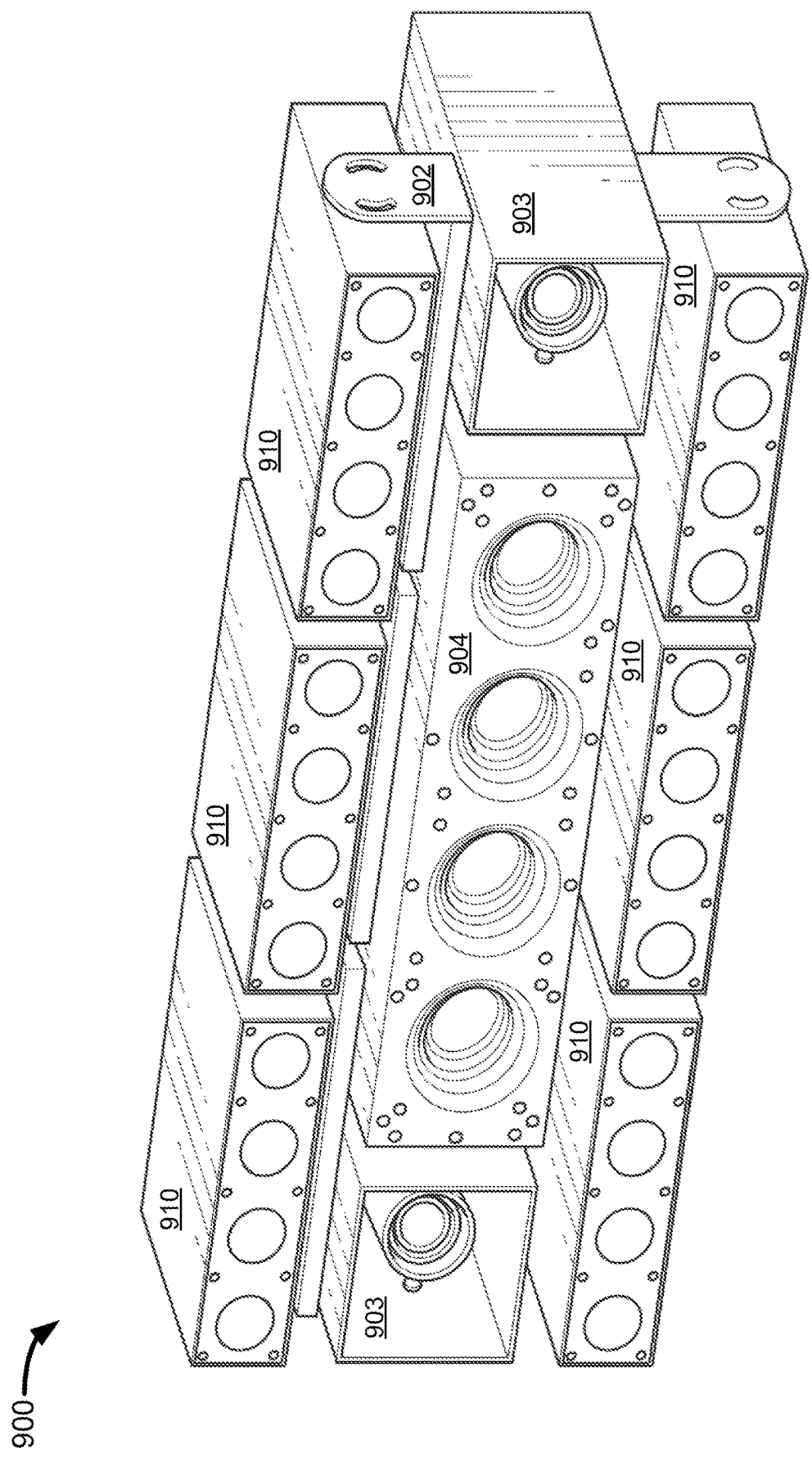
FIG. 9A is a diagram illustrating an example component of an agricultural observation and treatment system, according to some examples.
Figure 9B:
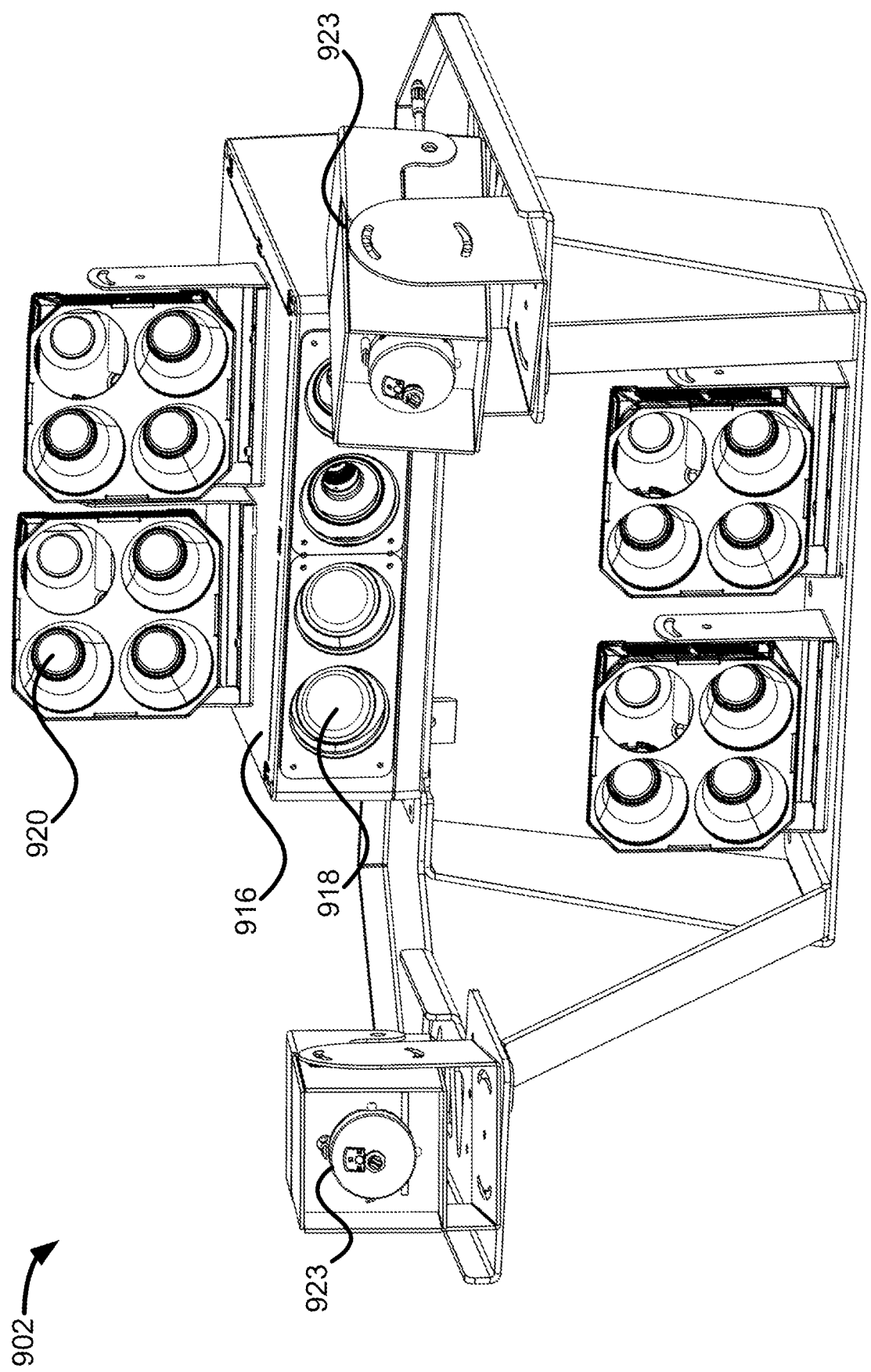
FIG. 9B is a diagram illustrating an example component of an agricultural observation and treatment system, according to some examples.

For example, each treatment module, having one or more image sensors, one or more illumination sources, and one or more treatment units (being a spray device or a light treatment device) and a compute unit all operable and rigidly attached to each other as a single modular treatment module, for example shown in diagram 900 of FIG. 9A and FIG. 9B, each of the individual treatment modules can compute its own pose estimation. This in effect allows for each treatment unit to have a more accurate pose estimation, for example, a local pose estimation of the treatment unit and the image sensors of the same treatment module supporting the treatment units of the treatment module locally to each other and to the ground row plants or orchard trees that each of the treatment module's sensors are sensing. Additionally, the sensors of the navigation unit or navigation module, for example the navigation unit including a GPS sensor, one or more IMU's, one or more encoders, one or more cameras, for example facing outward into the geographic area as a whole either facing forward or backwards of the direction of the vehicle path, or one or more laser or lidar sensors, can be configured to generate a global pose estimation for the vehicle itself. In this example, each treatment unit of each treatment module can rely on both the pose estimation determined by the treatment module's local sensors and compute units, for the local pose estimation of each treatment module, as well as the pose estimation determined by the navigation unit's sensors and compute unit, for the global pose estimation of the vehicle. The combined and fused pose estimation can be configured to give each treatment module a more accurate localization, orientation, and pose such that as each treatment module detects, targets, and tracks each object of interest detected, the treatment unit can target and treat the agricultural objects of interest more accurately.

Figure 7A:
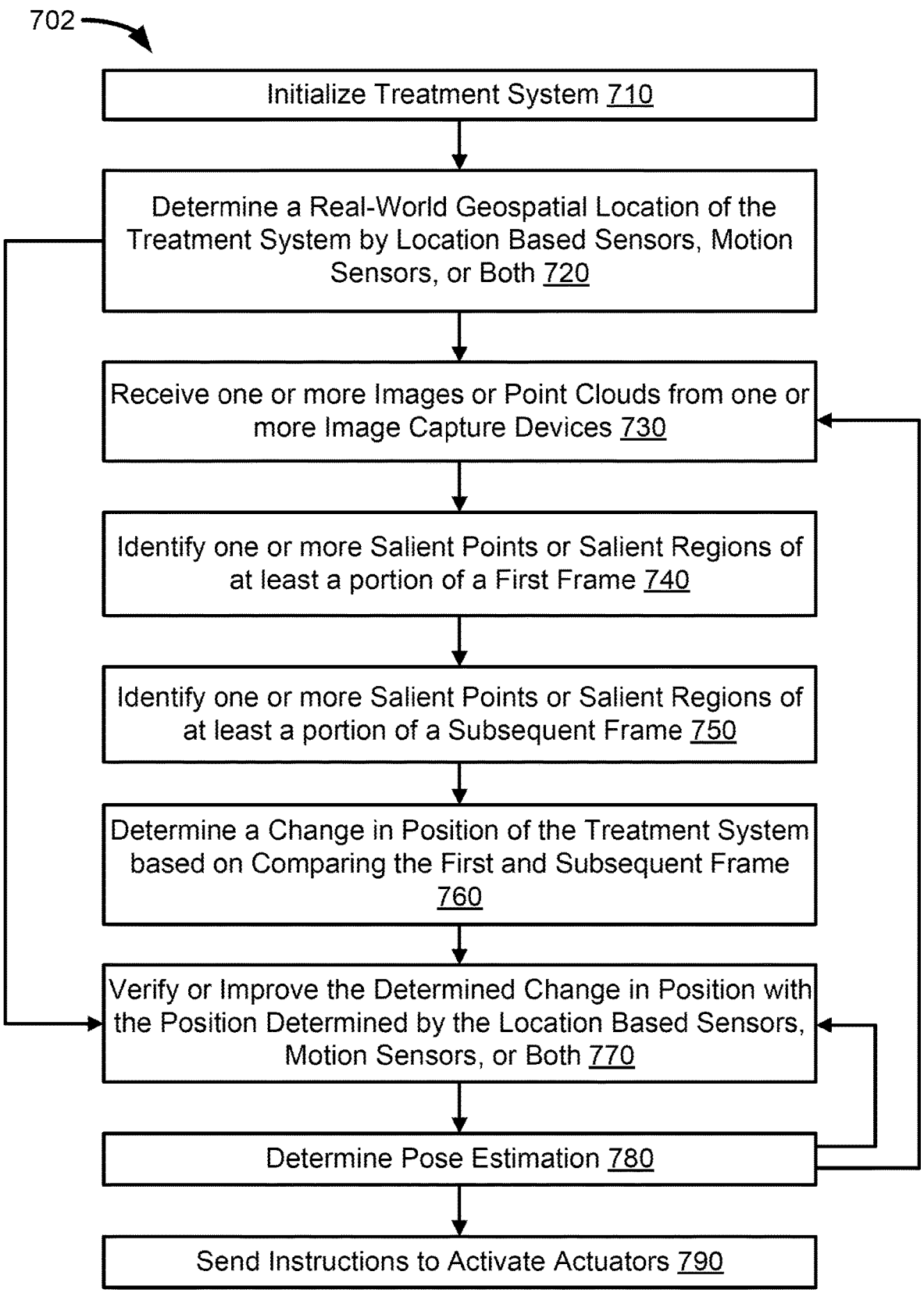
FIGS. 7A-7C are block diagrams illustrating an exemplary method that may be performed by a treatment system, according to some examples.

FIG. 7A illustrates an example method 702 that may be performed by some example systems, subsystems, or components of systems, described in this disclosure either online, that is onboard a vehicle supporting one or more modular agricultural observation and treatment systems, subsystems, or components of systems, or offline, that is at one or more servers or edge compute devices.

For example, at step 710, an agricultural observation and treatment system can initialize. At step 720, the agricultural observation and treatment system can determine a real-world geospatial location of the treatment system. The determining of location can be performed by location-based sensors such as GPS, image-based sensors, such as cameras including CCD, CMOS, or Lightfield cameras, multispectral cameras, RGB-D cameras, NIR cameras, the same two cameras in stereo or variations of cameras synched in stereo, or more than two synchronized together, Lidar, laser sensors, motion sensors such as IMU, MEMS, NEMS, or motion-based encoders. At step 730, the agricultural observation and treatment system can receive one or more images or point clouds from one or more image capture devices. At step 740, the agricultural observation and treatment system can identify one or more salient points or salient regions of at least a portion of a first frame. The salient points can be keypoints and the salient regions can be keypoint regions, cluster of pixels in a frame that is associated with a fixed object or points in space that can be compared for similarities, including keypoint matching, across stereo sensors or across time by frames captured by the same sensor from frame to frame. The salient points themselves can be object based, instead of keypoint based, such as objects that can be detected with a neural network using feature extraction and object detection. In one example, the salient points can be points or regions detected by a machine learning detector, keypoints generated using various computer vision algorithms or by a machine learning detector or a machine learning assisted computer vision algorithm, or a combination thereof. At step 750, the agricultural observation and treatment system can identify one or more salient points or salient regions of at least a portion of a subsequent frame. At step 760, the agricultural observation and treatment system can determine a change in position of the treatment system based on comparing the first and subsequent frame. At step 770, the agricultural observation and treatment system can verify or improve the determined change in position with the position determined by the location-based sensors, motions sensors, or both. At step 780, the agricultural observation and treatment system can determine a pose estimation. And at step 790, the agricultural observation and treatment system can send instructions to activate actuators. The points of interest to track for motion estimation and SLAM can be that of real-world objects or patterns detected, or salient cluster of points in an image or point cloud that can be tracked from frame to frame or point cloud to point cloud as a vehicle with image or point cloud sensors move in time. These can be detected by computer vision methods of detecting edges, corners, blobs, lines, etc., or by a machine learning algorithm configured to detect real world objects, such as agricultural objects, for example leaves for sensing systems pointed down at row crops, rocks, dirt, beds, troughs, crops, weeds, etc. For example, if a landmark such as a small rock in the dirt, or a leaf of a crop, in a frame captured by an image sensor, the compute unit can determine that a cluster of pixels of the frame comprise a "rock" detected by a machine learning algorithm, such that an object that is the rock detected can be tracked and matched across stereo vision system and across time, that is from frame to frame, and used to perform motion estimation and pose estimation by tracking relative position of the suite of fixed sensors, and by extension the position of the vehicle, the agricultural observation and treatment system supported by the vehicle and each of its treatment modules, to the rock as the vehicle moves in a direction relative to the rock, or any object detected by the machine learning algorithm. Alternatively, the compute unit can detect that a cluster of pixels in the frame captured is different enough from a detected background of the frame such that the cluster of pixels, while the compute unit may not know, extract enough features to determine and detect, that it is a real-world rock, is still a real-world object that is stationary and can be tracked from frame to frame, and by extension, can be compared to from frame to frame, to perform motion estimation and pose estimation. In one example, the objects detected in real time can be used to determine which areas detected in a geographic scene should be treated. Additionally, the objects detected in real time can also be used to determine motion estimation and pose estimation of the sensor sensing the objects themselves, and by extension the pose of the vehicle and agricultural observation and treatment system and each subsystem, for example each treatment module, on board the vehicle.

Figure 7B:
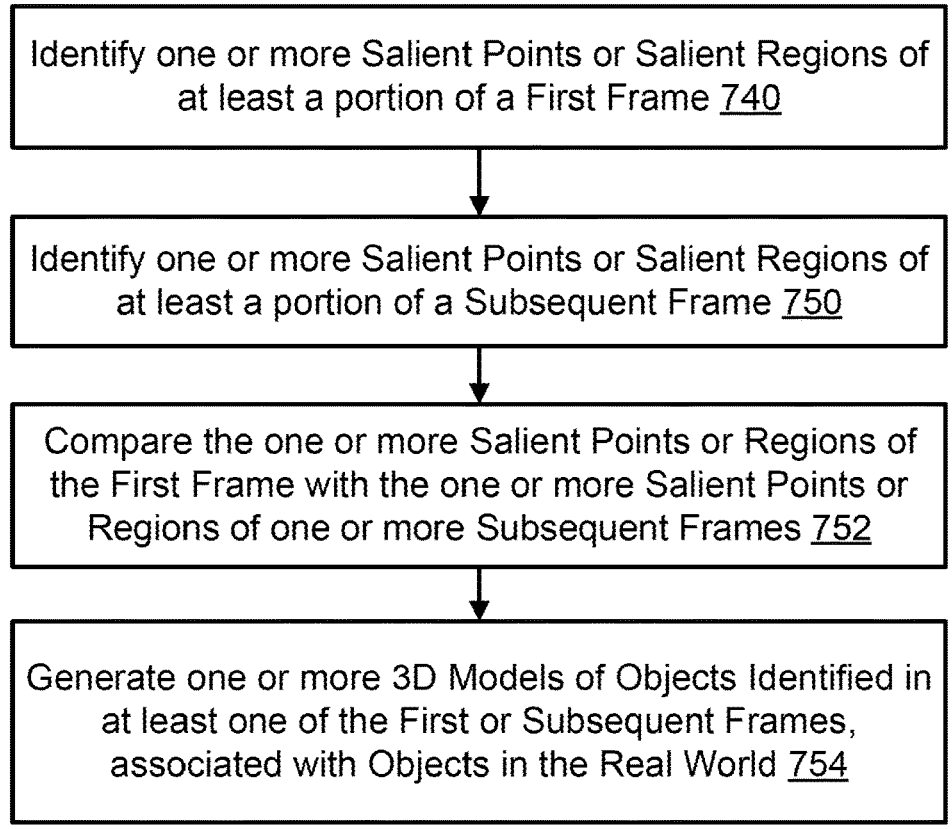
Figure 7C:
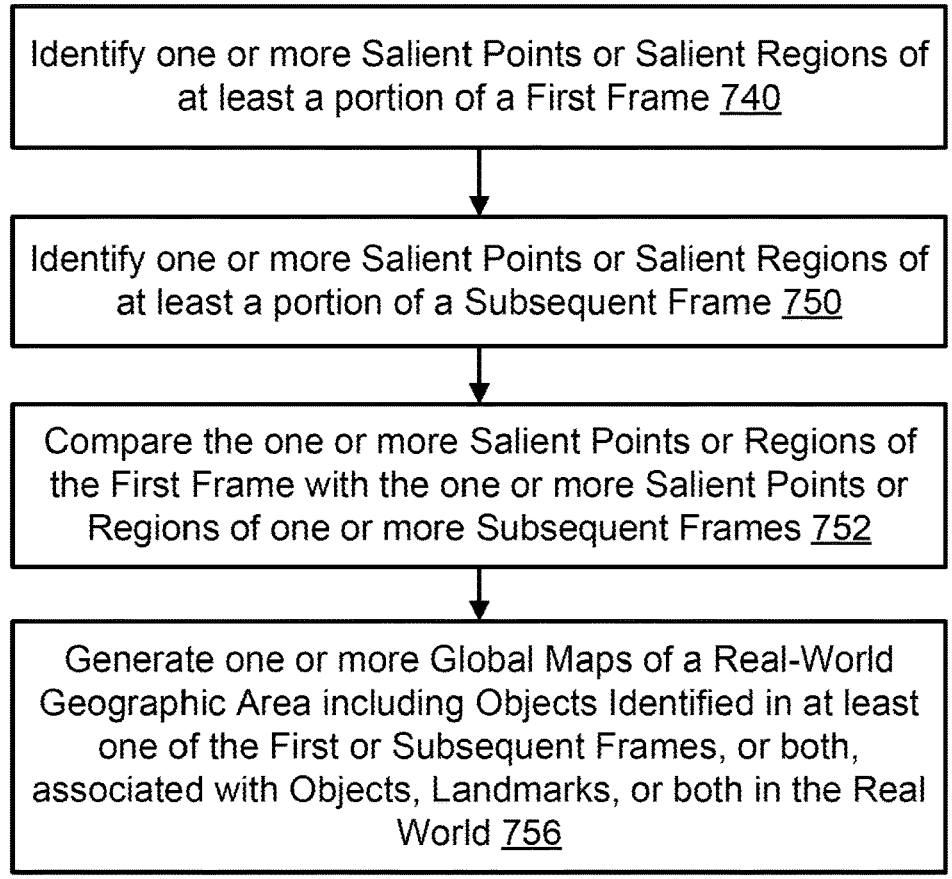

FIG. 7B and FIG. 7C illustrate additional example methods of 702 that may be performed by some example systems, subsystems, or components of systems, described in this disclosure.

Alternatively, or additionally, at step 752, the agricultural observation and treatment system can compare one or more salient points or regions of the first frame with the one or more salient points or regions of one or more subsequent frames. This can be done with a camera by comparing frame to frame, can be done with two or more cameras by comparing left and right, or top and bottom frame for depth, or from frame to frame from a first camera to the next or from the first camera to the second camera, or a combination thereof. This can also be done with different types of cameras, including comparing and matching salient points of an image from a visible color image with that of an infrared image and/or with that of an ultraviolet image and getting structure or the object or salient points, location, and pose from the comparison, not necessarily from motion of from frame to frame in time from the same sensor, but from frame 1 of camera 1, frame 1 of camera 2 and frame 1 of camera 3 at the same time. At step 754, the agricultural observation and treatment system can generate one or more 3D models of objects identified in at least one or the first or subsequent frames, associated with objects in the real world. In one example, the object can be target objects of interest, objects related to sprays such as capturing the spray projectile itself, splash health, and splat detection, referring to whether a spray projectile hit the target by measuring the splat size and location of the projecting creating a "splat" on the object and/or surface of the ground near the object.

Alternatively, or additionally, at step 756, the agricultural observation and treatment system can generate one or more global maps of a real-world geographic area including objects identified in at least one of the first or subsequent frames, or both, associated with objects, landmarks, or both in the real world.

In one example, tracking to find the same feature from a first frame detected to subsequent frames, for example using Lucas-Kanade tracking, under the assumption that the object does not move far away from frame to frame, for tracking an object on a moving vehicle. The feature detected in the first frame for tracking can be real world objects detected and identified by one or more machine learning algorithms on board, or by real time edge compute, the treatment modules of the treatment system performing observation and actions in real time online, objects that can be represented by a cluster of salient points in a frame, such as corners, lines, blobs, edges of an object, detected by computer vision techniques such as FAST, SIFT, SERF, or other techniques described in this disclosure.

In one example, the objects detected in real time can be used to determine which areas detected in a geographic scene should be treated. Additionally, the objects detected in real time can also be used to determine motion estimation and pose estimation of the sensor sensing the objects themselves, and by extension the pose of the vehicle and agricultural observation and treatment system and each subsystem, for example each treatment module, on board the vehicle.

Figure 8:
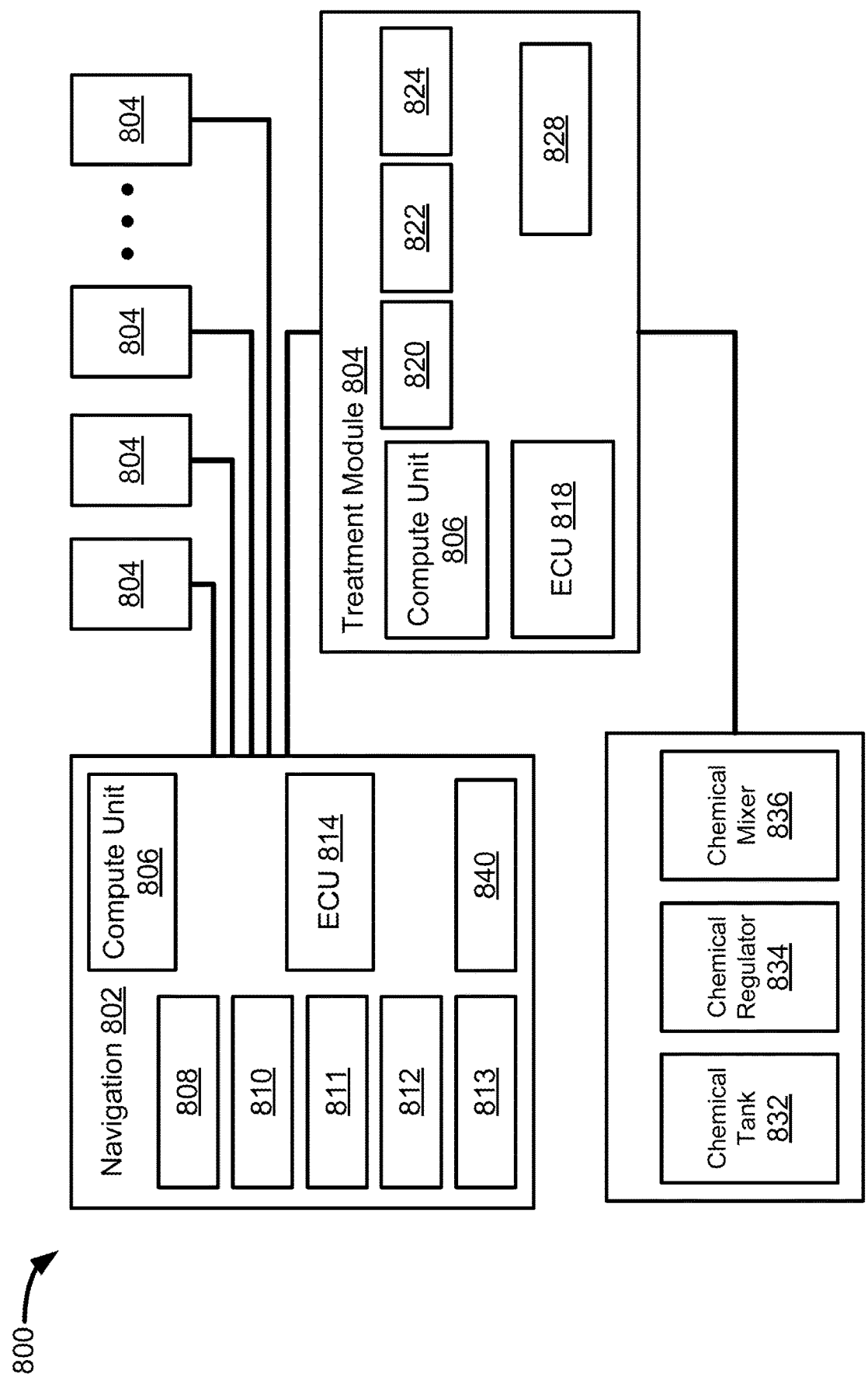
FIG. 8 is a diagram illustrating an additional portion of an example agricultural observation and treatment system, according to some examples.

FIG. 8 illustrates an example schematic block diagram of componentry that may be utilized with a system 800 similar to that of agricultural observation and treatment systems described previously in this disclosure. The system 800 may include a sub-system 802 that communicates with one or more perches, or treatment modules 804. The treatment module 804 can be a component of a modular system of one or more treatment devices. In each treatment module 804, the treatment module 804 can include, one or more image sensors 820 and 822, and one or more illumination units 824. In one example, an agricultural observation and treatment system, described in this disclosure, can be referred to as a portion of a system for observing and treating objects that is onboard a moving vehicle. Performances by the portion of the system onboard the moving vehicle, including computations, and physical actions, can be considered online performance or live performance. A portion of the system comprising one or more compute or storage components, that are connected as a distributed system, can be considered the offline portion of the system configured to perform remote computing, serve as a user interface, or storage. In one example, the agricultural observation and treatment system is a distributed system, distributed via cloud computing, fog computing, edge computing, or a combination thereof, or more than one subsystem is performing computations and actions live in addition to the portion of the system onboard a moving vehicle. In one example, treatment modules, a plurality of treatment modules, or a first, second, etc. treatment modules discussed in this disclosure can be treatment module 804 of diagram 800. The treatment module can be a subsystem having a compute unit, sensors, including image capture sensors, illumination devices, and one or more treatment units comprised of one or more nozzles guided by a gimbal or turret mechanism, local to each treatment module. The totality of multiple modular treatment modules described in this disclosure, including treatment module 804 of diagram 800, can be part of a greater online or on-board agricultural observation and treatment system having a global compute unit and sensors sensing a greater geographic agricultural environment and communicating, sending, and accessing information and instructions to each modular treatment module subsystems. And the on board agricultural observation and treatment system, supported by a vehicle and/or one or more edge compute devices to perform computing functions, can be a subsystem or a node of a greater agricultural observation and treatment system having a mesh network of onboard observation and treatment systems across a fleet of vehicles operating in multiple geographic areas, for example at multiple different farms and orchards having different crops requiring different observation and treatment services, and backend servers, compute and cloud compute subsystems configured to perform offline functions such as ingesting performance logs and sensor data captured at each farm, perform analysis and quality analysis, perform training on one or more machine learning models that can be uploaded to each on site or on board system, and many other nodes including user interface for a user to engage in the functionalities discussed above.

The treatment module 804 can include a compute unit 806, which can include a CPU or system on chip, that sends data and instructions to an ECU 818, or daughterboard ECU, for synchronization of operation of one or more illumination units 824 and operation of image sensors 820 and 822. The ECU 818 can sends/receives data to one or more cameras of image sensors 820, and/or one or more cameras of image sensors 822, and one or more illumination units 824 each including a light bar of LEDs, including instructions by the ECU 828 to activate the image sensors 820 and 822 and illumination units 824.

The system 800 can also include a navigation unit 802 configured to interface with each treatment module 804. The navigation unit 802 can include one or more components and modules configured to receive positional, velocity, acceleration, GPS, pose, orientation, and localization and mapping data. In one example, the navigation unit 802 can include a vehicle odometry module 808 with encoders and image sensors to perform wheel odometry or visual odometry and process images and vehicle movement to calculate and determine a position and orientation of the vehicle supporting the system 800. The navigation unit can also include an IMU module 810 with one or more IMU sensors, including accelerometers, gyroscopes, magnetometers, compasses, and MEM and NEM sensors to determine IMU data. The navigation unit 802 can also include an GPS module 811 to receive GPS location data, for example up to a centimeter accuracy. The navigation unit can also include a SLAM module 812 for performing a simultaneous localization and mapping algorithm and application for mapping an environment including an agricultural geographic boundary such as a farm, orchard, or greenhouse, and determining localization and orientation of a vehicle supporting the system 800, components of the system 800 relative to the geographic boundary, as well as localization and orientation of agricultural objects and scenes detected by the system 800. The SLAM module 812 can take sensor data from one or more cameras, including stereo vision cameras, cameras that are omnidirectional, cameras that are moving relative to the vehicle, or other sensors 813 including LiDAR sensors. The LiDAR sensors can be flash LiDAR sensors or static LiDAR sensors, spinning LiDAR sensors, other rangefinders, and other sensors discussed above. As the navigation 802 receives sensing data related to localization and mapping, a compute unit 806, including a CPU or system on chip, of the navigation unit 802 can fuse the sensing signals and send the data to each of the treatment modules 804 or to a remote compute unit or server through a communications module 840. The sensing components of the navigation unit 802 can be activated and controlled by an ECU 814. The ECU 814 can also be configured to interface, including activation and power regulation, with each of the treatment modules 804.

The treatment module 804 can also include a treatment unit 828 configured to receive instructions from the compute unit and ecu 818 including treatment parameters and treatment trajectory of any fluid projectile that is to be emitted from the treatment unit 828. A chemical selection unit 826 can include one or more chemical pump(s) configured to receive non-pressurized liquid from one or more chemical tanks 832 and operable to each treatment units of each of the treatment modules 804, or multiple treatment units 828 of each treatment module 804. One or more chemical tanks 832 may have different types of chemicals. The chemical pumps can send stored liquid or gas from the one or more chemical tank(s) 832 to one or more regulators 834, which will further send pressurized liquid to one or more other components in series as the pressurized liquid reaches the one or more treatment units 828 of system 800. Other components in the series of the chemical selection unit 826 can include an accumulator and chemical mixer 836 (described in previous sections of the disclosure). The treatment unit may emit the liquid at a particular trajectory in order for the fluid projectile to come into contact with an object and at a particular physical location.

In one example, as a vehicle performs a trial on a geographic boundary, each of the treatment modules 804 can perform actions independently of each other. Each treatment module 804 can receive its own image acquisition and processing of images for treatment. The treatment parameters can be determined locally on each treatment module 804, including object detection and classification of agricultural objects in a scene as well as determining treatment parameters based on the objects and features detected. The processing and be performed by each compute unit 806 of each treatment module 804. Each of the treatment modules 804 can receive the same data sensed, fused, and processed by navigation, vehicle orientation and position data from the navigation unit 802 since each of the treatment modules 804 will be supported by the same vehicle. In one example, each of the treatment modules 804 can share the same chemical selection component 826. In one example, multiple chemical selection units 826 can be configured to connect and interface with each treatment module 804 where one treatment module 804 can be configured with one chemical selection unit 826.

FIG. 9A illustrates an example modular treatment module 900, or perch. In one example, the modular treatment module 900 may be configured with multiple illumination units 910 mounted to a frame 902, 903 or supporting structure. The modular treatment module according to various examples may include multiple illumination units 910 of LED lights. Illumination unit 910 may include one or multiple LED lights including an array of LED lights. The LED lights can each be packaged in an enclosure for better mounting of the LED lights to the rest of the modular treatment module. For example, a light enclosure can support 4 individual LED Lights, each LED light can include a plurality of LED diodes to illuminate light. In another example, the LED Lights can be standalone, supported by a structure or heatsink and individually mounted to the rest of the treatment module. In one example, each LED light, having a plurality of LED diodes, can include one or more lenses to focus the illumination intensity, direction, or illumination area. The modular treatment module 900 may include a camera enclosure, or camera bank 904 that includes one or more cameras or other image sensing devices. In one example, the illumination units 910, treatment units 1100, supported by treatment unit frame 903, can all be operably mounted and connected to the camera bank 904 having a camera enclosure. The inner two cameras may be identification cameras to obtain digital imagery of agricultural objects, and the outer two cameras may be cameras used to obtain imagery of agricultural objects being treated including the treatment projectile, treatment profile, splat detection, treatment health and accuracy. In one example, a pair of stereo cameras can be configured to ingest frames at a high frame rate and at a high exposure rate or refresh rate shutter speed. For example, the cameras can ingest images up to 8K definition per frame at 2040 Frames captured per second. In this example, the compute unit embedded and enclosed in the camera bank 904, configured to send instructions and read inputs from each of the treatment units 1110, sensors including cameras, illumination units 910, and so forth, action as the main compute unit of the component modular treatment module 900, can receive different down-samples of image quality and number of frames per second. For example, one or more FPGA's, ASICs, or one or more microcontrollers can be embedded at the each of the camera modules, such that the camera's exposure and shutter speed receives 8K definition frames at 2400 frames per second. The FPGA, ASICs, or one or more microcontrollers can automatically sample the images into smaller resolution images into smaller resolution images at fewer frames per second sent to the compute unit. Additionally, it can send more than one of different types of images packets to the compute unit such that the compute unit receives different streams of data captured by the same pair of image sensors. For example, the 8K frame captured at 2400 frames per second can be down sampled to 4K frames at 30 frames per second at the FPGA/ASIC level, and then sent to the compute unit so that the compute unit can partition a task to analyze 4K image frames at 30 frames per second. In one example, it can partition a task to analyze a stereo pair of 4K image frames at 30 frames per second. Additionally, the 8K frame captured at 2400 frames per second can be down sampled to 1080p frames at 240 frames per second at the FPGA/ASIC level, and then sent to the compute unit so that the compute unit can separately partition a task to analyze 1080p image frames at 240 frames per second, both streams of image data coming from the same pair of cameras. This would reduce the need for two sets of stereo cameras enclosed in a single camera bank. The disclosure above is for illustration purposes only, and the FPGA/ASIC and other microcontrollers described can downsample the image stream to any type of quality and speed to send to the compute units for analysis. The camera module itself can account for auto balance, auto white balance, auto exposure, tone, focus, as well as synchronization with the LED lights including the LED light's exposure, temperature, peak to peak exposure time, as well as perform color correction algorithms to the images before the images are sent to the compute unit for analysis. Each LED light may be synchronized to turn on and off with respect to when an identification camera(s) is capturing an image. The number of cameras or other sensing devices, as well as the number of individual LED Lights are for illustration purposes only. In one example, more than two treatment units 1110 can be supported by a single modular treatment module 900 or a part of a single modular treatment module 900. The modular treatment module 900 can include a varying number of sensing enclosures, illumination modules, and treatment units, all operably connected to each other as one treatment module similar to that of treatment module 804.

FIG. 9B illustrates an alternate configuration of an example modular treatment module 902. The module treatment module 902 can include a support structure and components supported by or embedded in the support structure, including a treatment unit and a treatment unit support structure 923, one or more image sensors 918 including a compute unit and image sensor box or enclosure 916, and one or more illumination units 920 having one or more LED Lights with one or more lenses.

Figure 10:
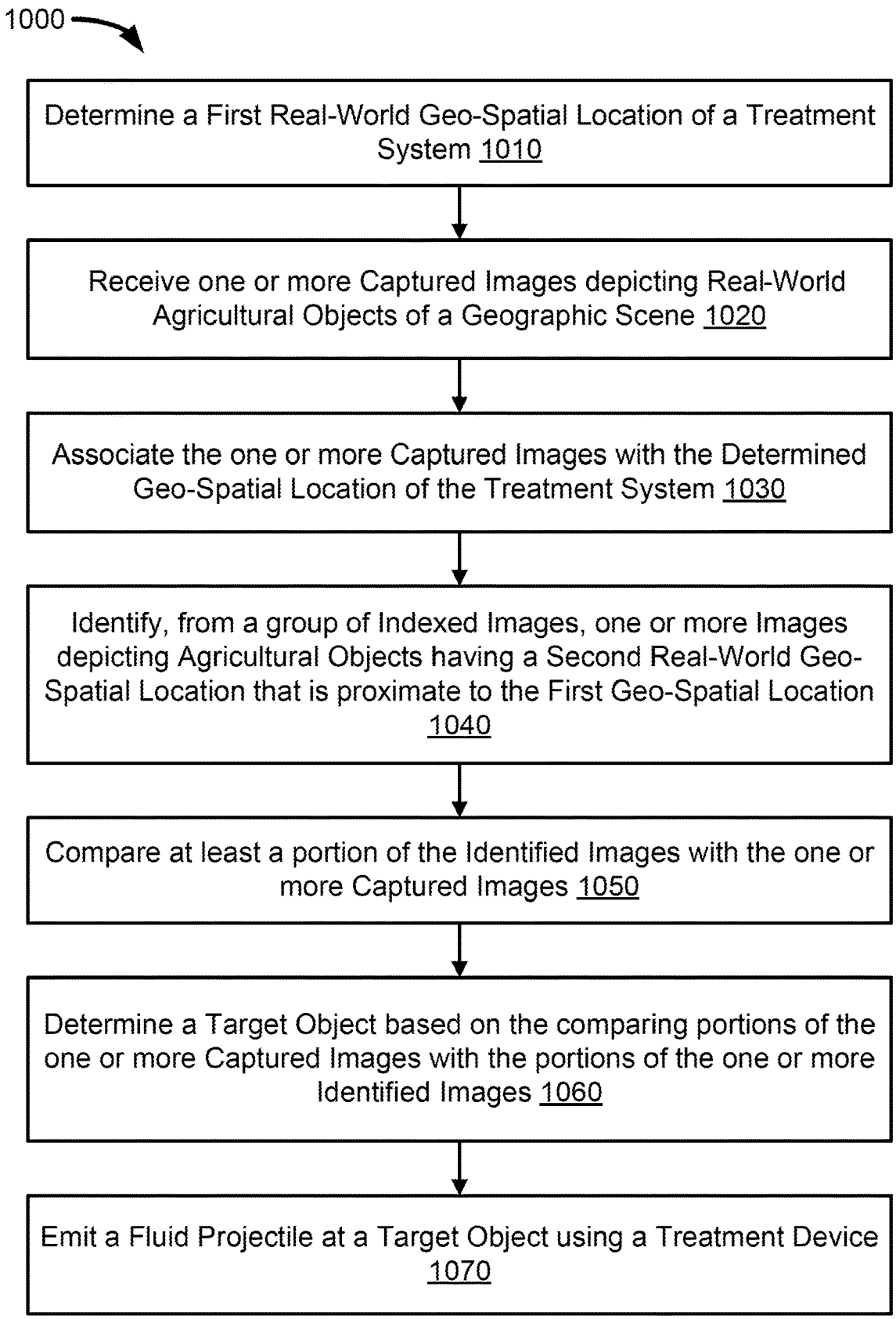
FIG. 10 is block diagram illustrating an exemplary method that may be performed by a treatment system, according to some examples.

FIG. 10 illustrates an example method 1000 that may be performed by some example systems, subsystems, or components of systems, described in this disclosure. For example, at step 1010, the agricultural treatment system can determine a first real-world geo-spatial location of the agricultural treatment system. At step 1020, the agricultural treatment system can receive one or more captured images depicting real-world agricultural objects of a geographic scene. At step 1030, the agricultural treatment system can associate the one or more captured images with the determined geo-spatial location of the agricultural treatment system. At step 1040, the agricultural treatment system can identify, from a group of indexed images, mapped images, previously assigned images, or representations of agricultural objects including at least in part, image data and position data, or a combination thereof, one or more images having a second real-word geo-spatial location that is proximate with the first real-world geo-spatial location. At step 1050, the agricultural treatment system can compare at least a portion of the identified images with the one or more captured images. At step 1060, the agricultural treatment system can determine a target object based on the comparing at least a portion of the one or more identified images with at least a portion of the one or more captured images. At step 1070, the agricultural treatment system can emit a fluid projectile at a target object in the real-world with a treatment device. The target objects are real-world objects that are intended to be sprayed with the fluid projectile.

The agricultural treatment system may store the group of images in an onboard data storage unit or a remote storage unit. The group of images may include key frame images and sub-key frame images. The key frame images may depict agriculture objects of the geographical scene, and the sub-key frame images may depict a portion of a key frame image, for example a portion of a key frame image can be an image of an agricultural object or cluster of agricultural objects. The key frame images may be images that were previously obtained by image sensors of the system. The captured digital images may be obtained by the same cameras of the system at a time subsequent to when the key frame images were taken. For example, in one trial run, the agricultural treatment system, or similar systems 100, 600, and 800, can perform observations of a geographic boundary including detecting and indexing any and all agricultural objects captured by image sensors, and perform one or more precision treatments on detected agricultural objects on the geographic boundary, such as a farm or orchard. The agricultural treatment system can index each image captured by its on-board vision system including one or more image sensors configured to capture images of agricultural objects or crops, or offline at a remote computing location nearby the physical location of the geographic boundary or at different remote location such that the remote computing units can communicate with the agricultural treatment system. The indexed series of images captured by image sensors can be further indexed, where one or more of the captured images can be assigned as a keyframe, include a unique keyframe marker. Each keyframe can represent image that include one or more unique agricultural object or landmark of interest in the real world. Because of the navigation unit of agricultural treatment system, the keyframes can include location data and a timestamp. For example, the agricultural treatment system, in a trial, can capture a series of captured images as the vehicle travels along a path in the geographic boundary. The series of images captured can be images taken of a row of plants including row crops grown directly from the soil or crops growing off trees. One or more images of the series of images captured can include agricultural objects of interest, either for treatment or for observation where the agricultural object can grow into a stage where it is desirable to select a treatment for the agricultural object. The agricultural treatment system can assign the particular image having the individual agricultural object identified as a keyframe. The keyframe, or any other images captured by the agricultural treatment system can include a location based on image analysis performed by the compute unit of the treatment system. For example, a stereo vision system can use epipolar geometry to triangulate a location of an object identified in an image relative to the location of the image capture device.

Additionally, each portion of the image that includes agricultural objects can be labeled and assigned a unique identifier to be indexed in a database. The data indexed can be a 2d or 3d constructed image of an agricultural object having a location and position data attached to the image and a timestamp of when the image was taken. In future trials conducted by the agricultural treatment system, the agricultural treatment system may capture images of the same agricultural object at the same or similar location in the geographic boundary. Since the image captured of the agricultural object in the same position was acquired at a future time from the previously captured agricultural object, the agricultural object may have grown to have different features. In one example, the agricultural treatment system can determine that an acquired image of an agricultural object with location and position data, is associated with that of a previously acquired, labeled, assigned, and indexed image or other indexed representation of an agricultural object that is the same agricultural object as the currently detected object. Having associated the two images with location and timestamp data, the agricultural treatment system can determine treatment parameters, including whether to perform a treatment at the given time or trial, determining a mixture, chemical type, volume, concentration, etc., of a treatment, and a precise trajectory for the treatment to be deposited on a surface of the agricultural object. In one example, a user can select in an application the indexed agricultural object, and a user interface of the agricultural treatment object can display information related to the agricultural object including images taken of the agricultural object, including multiple images taken at different locations, and with orientations of the image capture device, for capturing different views of the same agricultural object, as well as multiple images taken at different points in time as the agricultural treatment system conducts multiple trials and captures images of the same or near the same location as previously captured images.

The above example illustrates the agricultural treatment system performing two trials with two sets of images captured at different times, for example a day apart, of the same agricultural object and associating the images of the agricultural object with each other based on image features detected that are common between the images, position, depth, localization, and pose related information from image analysis and computer vision techniques, as well as similar position data captured by the navigation unit of the agricultural treatment system. As more trials are conducted and more images of a same agricultural object are taken, capturing the agricultural object's current growth stage, and associating each captured agricultural object with one or more previously captured images of the same agricultural object, the treatment system can build a unique profile of each unique and individual agricultural object mapped in a geographic boundary, including images associated with each of its growth stages, any and all treatment history to each individual agricultural object. This can allow a user or a treatment system to determine a crop's health, including diseases and stress, for example for fire blight detection, and color change, size, count, growth projection, yield projection and estimation of the crop grown on a farm or orchard and allow a user optimize growing crops on a farm by observing and controlling the growth rate of each individual agricultural object detected on a geographic boundary.

In one example, to identify target objects for spraying, the system may compare at least a portion of the identified images by comparing the sub-key frame image to a portion of one of the captured images. In other words, the agricultural treatment system can compare one or more patches or labeled portions of a previously indexed image of an agricultural object with at least a portion of the currently captured image. In this example, a patch is an image cropped out of a bigger image having one or more features of interest. The features of interest in the bigger image captured by image sensors can include agricultural objects, landmarks, scenes or other objects of interest to be identified, labelled, and assigned a unique identifier or marker to be indexed. For example, a bounding box of an image, or other shape, can be drawn around a portion of an image, cropped out and separately indexed by the agricultural treatment system and saved as a patch for comparing against captured images taken in the future, for building a digitized map of a geographic boundary, for associating an object captured during one trial with the same object captured at different trials, or a combination thereof. The system determines a confidence level of whether the sub-key frame image matches the portion of the captured image. The system identifies a match where the determined confidence level meets or exceeds a predetermined confidence level threshold value. In one example, various computer vision techniques can be applied to compare and correspond images and determine similar features for matching. This can include template matching for comparing a portion of an image with the region of interest of another image, normalized cross correlation, random sample consensus (RANSAC), scale-invariant feature transform (SIFT), FAST, edge orientation histograms, histogram of oriented gradients, gradient location and orientation histogram (GLOH), ridge and edge detection, corner detection, blob detection, line detection, optical flow, Lucas-Kanade method, semantic segmentation, correspondence matching, and other computer vision and matching techniques. The system may identify that a captured image includes a target object to be treated or a target object that was already sprayed and does not currently need a treatment based on features detected of the agricultural object, based on its treatment history, or a combination thereof. Based on determining the location of the image sensors of the agricultural treatment system, the location of the target object in the obtained image, the system can then configure, orient, and prepare the treatment unit such that a fluid projectile when emitted, would be sprayed in a trajectory to emit fluid onto the real-world targeted agriculture object.

In another example, the system may use landmark features or objects to determine locations of target objects to be sprayed. The landmark objects are real-world objects that aid in determining the location of a target object. The system may identify a landmark object in a captured image and determine a portion of the landmark object in the capture image matches a portion of an image from the group of images. While not intended to be an exhaustive list, examples of landmark object may include a man-made object, a fence, a pole, a structure, a portion of a plant structure, a portion of a tree structure, a leaf formation or a leaf cluster that can be used to mark a specific location of a geographic boundary or distinguish a specific keyframe for having the unique landmark assigned to the portion of the keyframe.

In another example, in one mode of operation, in a first pass along a path along an agricultural environment, the agricultural treatment system obtains a first set of multiple images while the system moves along the path. For example, the agricultural treatment system uses onboard cameras and obtains multiple digital images of agricultural objects (e.g., plants, trees, crops, etc.). While obtaining the multiple images of the agricultural objects, the agricultural treatment system records positional and sensor information and associates this information for each of the obtained images. Some of this information may include geo-spatial location data (e.g., GPS coordinates), temperature data, time of day, humidity data, etc. The agricultural treatment system or an external system (such as a cloud-based service) may further process the obtained images to identify and classify objects found in the images. The processed images may then be stored on a local data storage device of the agricultural treatment system.

In a second pass along the agricultural environment, the agricultural treatment system using the onboard cameras obtains a second set of multiple digital images using along the path that had been previously taken along the first pass. For example, the agricultural treatment system may obtain the first set of multiple images on day 1, with the images capturing blossoms on a group of apple trees. The digital images depicting the apple trees may be processed for object classification of the types of blooms depicted in the digital images. The agricultural treatment system may retrieve the processed imagery and associated data identifying the objects and classified types. On day 2, the agricultural treatment system may again follow the original path and obtain new imagery of the apple trees. The agricultural treatment system may then use the second set of obtained images in comparison with the received processed images to identify target agricultural objects to be sprayed, and then spray the agricultural objects. The system then can match the landmark objects to aid the system in determining locations of target objects. In other words, the system may use feature matching of objects in the imagery to determine that a prior image is similar to a captured image.

For example, the processed images received by the treatment system, may have associated positional information. As the agricultural treatment system moves along the path in the second pass, the agricultural treatment system may compare a subset or grouping of the processed images based on location information associated with the processed images, and a then current position or location of the treatment system. The agricultural treatment system compares new images to the processed images and determines whether the images or a portion of the images are similar. The agricultural treatment system may then identify a location to spray based on a likely location of a target object in the processed images.

As noted above, the agricultural treatment system may associate images captured by a camera(s) with real-world physical locations of where images of agricultural objects were obtained. For example, while a vehicle with an agricultural treatment system is moving along a path, an electronic control unit of the agricultural treatment system may generate camera data signals and light data signals with synchronized lighting from the lighting devices of the agricultural treatment system and the capturing of digital images. The ECU may synchronize illumination, by one or more lights mounted on the vehicle, of the physical location of an object(s) for generation of the respective captured image(s) that corresponds with that physical location of the object(s). The object determination and object spraying engine sends the camera data signals and light data signals to ECU. The object determination and object spraying engine generates position information that corresponds with a position and an orientation of the vehicle with respect to physical location(s) of the agricultural object(s) and a current route of the moving vehicle. The position information may further be associated with the respective captured image(s) that corresponds with the physical location(s) of the agricultural object(s).

Figure 11A:
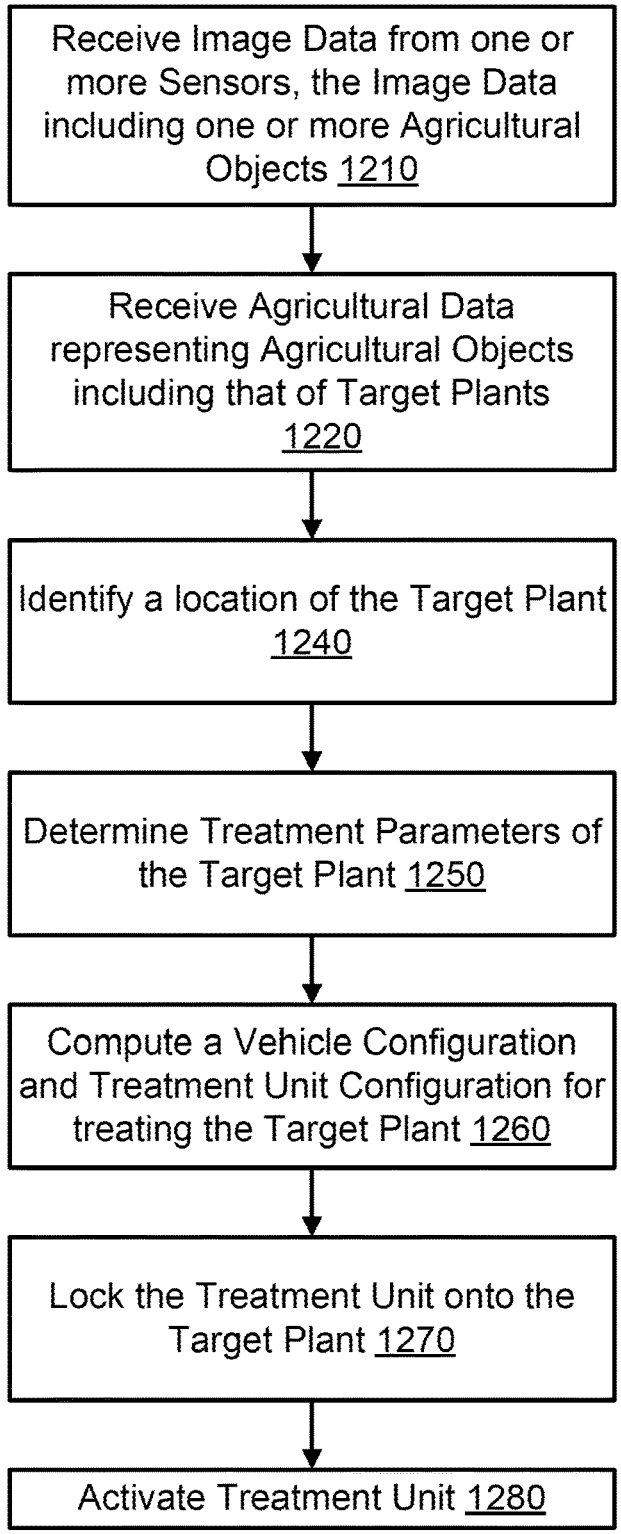
FIG. 11A is block diagram illustrating an exemplary method that may be performed by a treatment system, according to some examples.
Figure 11B:
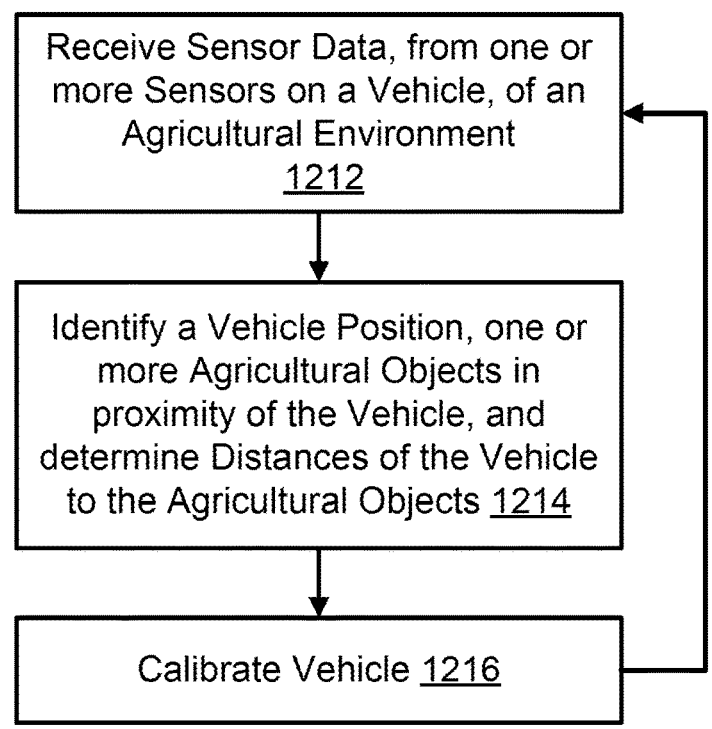
FIG. 11B is block diagram illustrating an exemplary method that may be performed by a treatment system, according to some examples.

FIGS. 11A-B illustrate example implementations of method 1200 that may be performed by some example systems, subsystems, or components of systems, described in this disclosure. For example, in one mode of operation, at step 1210, an agricultural treatment system can receive image data from one or more sensors, the image data including one or more agricultural objects. The one or more agricultural objects can be identified as one or more target plants from the image data. At step 1220, the agricultural treatment system can receive agricultural data representing agricultural objects including different crops and target plants. At step 1240, the agricultural treatment system can identify a location of the target plant. At step 1250, the agricultural treatment system can determine treatment parameters of the target plant. At step 1260, the agricultural treatment system can compute a vehicle configuration and treatment unit configuration for treating the target plant. At step 1270, the agricultural treatment system can lock the treatment unit onto the target plant in the real world. At step 1280, the agricultural treatment system can activate the treatment unit and emits a fluid projectile of a treatment chemical onto the target plant.

Additionally, the agricultural treatment system can receive, fuse, compute, compensate, and determine positional, localization, and pose related signals on a geographic boundary. At step 1212, the agricultural treatment system can receive sensor data, from one or more sensors on a vehicle of an agricultural environment. The agricultural environment can be that of a geographic boundary having a plurality of objects typically found on a farm or orchard for cultivating land and growing and harvesting crops. At step 1214, the agricultural treatment system can identify a vehicle position, one or more agricultural objects in proximity of the vehicle, and determine distances of the vehicle to the agricultural objects. At step 1216, the agricultural treatment system can calibrate the vehicle, including calculating a pose estimation of the vehicle relative to a central or known point in the geographic boundary, pose estimation of components of the agricultural treatment system relative to the vehicle supporting the agricultural treatment system, or agricultural objects detected in space relative to the vehicle. The vehicle can be calibrated by locating one or more calibration targets spread throughout a mapped geographic boundary such that as the agricultural treatment system identifies a physical calibration target and calculates its position relative to the calibration target, the agricultural treatment system can determine, or correct a previous inaccurate determination, a position of the vehicle in the geographic boundary.

Figure 12A:
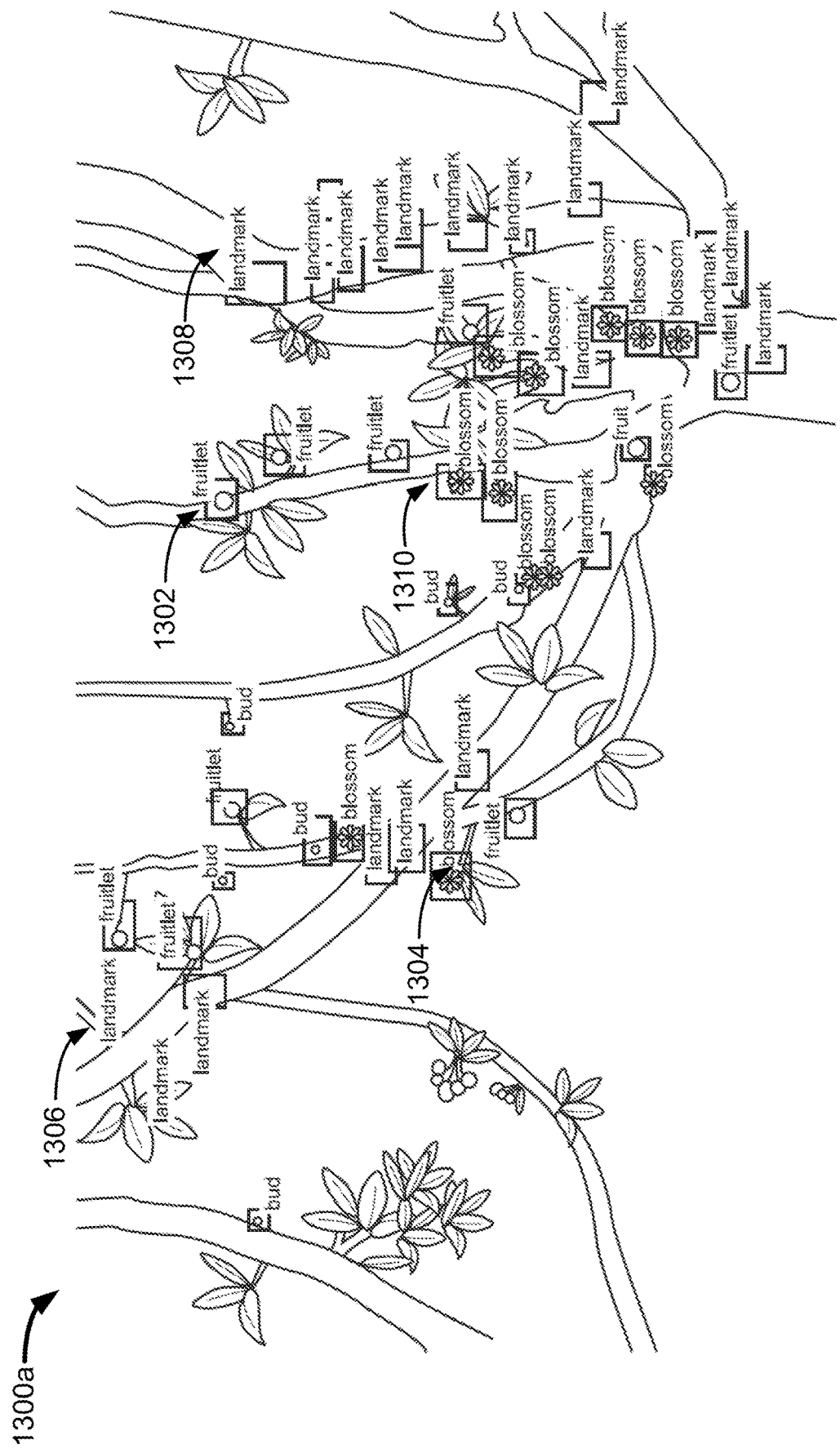
FIG. 12A is a diagram illustrating an exemplary labelled image, according to some examples.
Figure 12B:
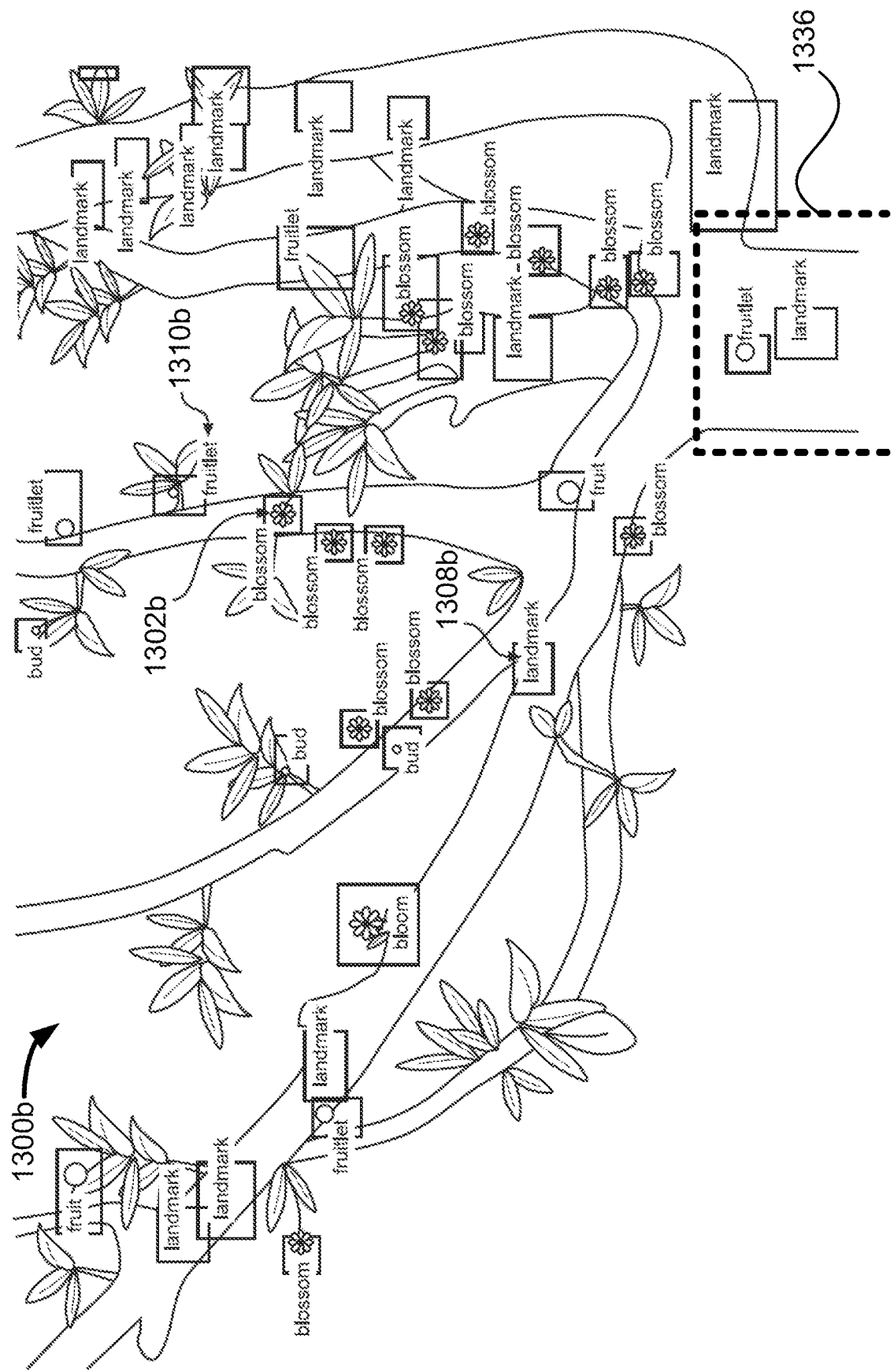
FIG. 12B is a diagram illustrating an exemplary labelled image, according to some examples.
Figure 13A:
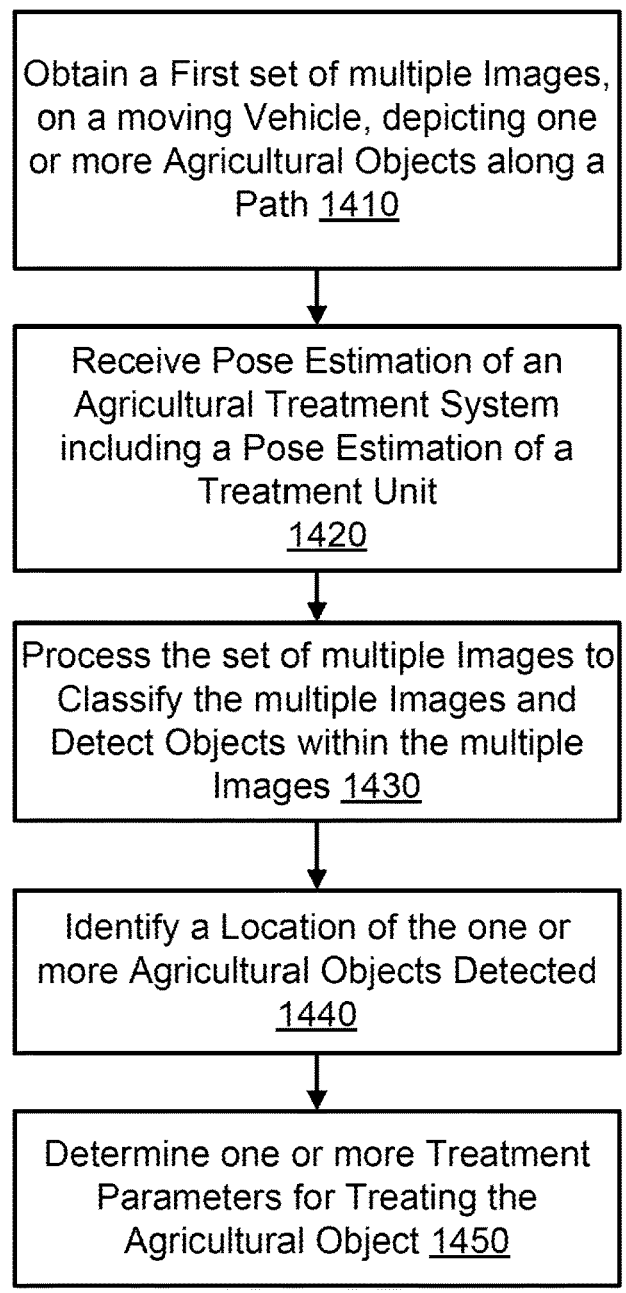
FIG. 13A is a block diagram illustrating an exemplary method that may be performed by a treatment system, according to some examples.
Figure 13B:
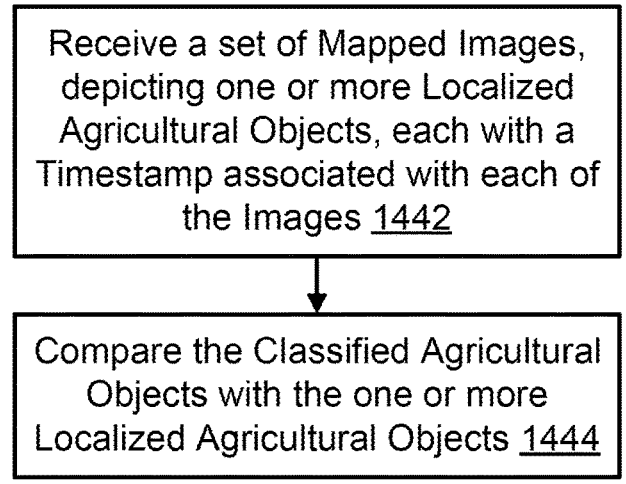
FIG. 13B is a block diagram illustrating an exemplary method that may be performed by a treatment system, according to some examples.

FIGS. 12A-12B illustrate example images obtained by an agricultural observation and treatment system described in this disclosure. As shown in the diagram 1300a of FIG. 12A, an image received by an agricultural treatment system may include multiple identifiers of different types of objects, for example objects 1302, 1304, 1306, 1308, and/or 1310, of a plurality of objects detected, each having different identifiers portrayed in a captured image. For example, an identifier marked for object 1306 or 1308 may identify a portion of the captured image that portrays a physical landmark of an of an agricultural object or landmarks in an agricultural scene. The object 1306 may further be based on visual characteristics of the object.

The diagrams 1300*a* and 1300*b* representing images with one or more detections can either be ingested images by a compute unit of a component treatment module with machine learning, computer vision, or both, based detections performed by feature extraction and object detections in real time while the treatment module is scanning an environment, or representing images with labels performed by human labelers, machine learning detections, or a combination thereof where a machine learning detector scans and detects objects and landmarks in a given frame, and a human labeler verifies the quality of the detections and manually labels missing or incorrectly classified objects.

FIG. 12B illustrates another image 1300*b* depicting another example real-time captured image with real-time object detection or a received labelled image having the labelling of objects in the received image done offline from the portion of agricultural observation and treatment system supported by a vehicle. Additionally, diagram 1300*b* illustrates example portions or sub-images of an image obtained by an agricultural treatment system.

In one example, diagram 1300*b* is a labelled image, either from real-time performed by an agricultural observation and treatment system on the vehicle, or offline at a server, by a human, by a machine learning algorithm, assisted by a machine learning algorithm, or a combination thereof.

Based on visual characteristics of an instance of an apple blossom portrayed by the captured image of an apple tree, the labeled image may include an identifier 1302*b* for the apple blossom instance. The identifier 1302*b* may be positioned in the labeled image 1300*b* at a first pixel position that corresponds to the apple blossom instance's physical location as it is portrayed in the captured image of the apple tree. Based on visual characteristics of an instance of an apple fruitlet portrayed by the captured image of the apple tree, the labeled image may include an identifier 1310*b* for the apple fruitlet instance. The identifier 1310*b* may be positioned in the labeled image at a second pixel position that corresponds to the apple fruitlet instance's physical location as it is portrayed in the captured image of the apple tree. Based on visual characteristics of an instance of a landmark portrayed by the captured image of the apple tree, the labeled image may include an identifier 1308*b* for the landmark instance, the specific landmark identifier 1308*b* being that of two branches diverging in the specific pattern, shape, and orientation illustrated in 1300*b*. The identifier 1308*b* may be positioned in the labeled image 1300*b* at a third pixel position that corresponds to the landmark instance's physical location as it is portrayed in the captured image of the apple tree.

In one example, to perform better VSLAM in an agricultural scene, certain objects that are landmarks that are tracked across time can improve the quality of VSLAM and pose estimation, for example, large enough stationary objects typically found in the specific agricultural scene. Landmarks can be used to identify which frames are of interest to store, store as a keyframe (because one does not need so many frames at once all having the same fruits, or detected objects, from frame to frame), and to be used to identify objects in real time and tracked for visual based navigation and mapping including VSLAM. Because there are spatial locations to each of the objects, landmarks, and its unique identifying characteristic. In one example, tree trunk 1336 can be detected, by a machine learning algorithm or programmatically predefined as stationary dark objects that protrude from the ground. Detection and tracking tree trunks in an orchard can allow a system to partition an agricultural environment by the trees themselves, such as to minimize error in detecting one cluster of objects and thinking its origin is at once place, when it should be at another. For example, a system can detect a first tree trunk having a first location in global scene, as well as determine a pose of the system itself relative to the tree trunk detected. The system will also detect a plurality of objects, including its identity as well as whether that unique object was detected before either with the same identifier, or a different identifier, being that the phenological state of the object has changed, but still the same object in space. In this example, the system can associate a cluster of objects detected, being on the same tree, with the tree trunk detected. In this case, if the system incorrectly detects other objects or landmarks at different and nearby trees due to its pattern being similar to a previously identified pattern or object, and it's location based sensors are not accurate which the change in location was not detected from a first object, pattern or landmark located near a first tree trunk and a second object, pattern, or landmark located at a second tree trunk, for example if the GPS sensor is off by a few meters or did not update in time. An additional checking point for the system can be detecting a first tree trunk and a second tree trunk. Because the system knows that two different tree trunks must be far enough apart from each other, the system can determine that a previously detected object determined to be a certain location is likely wrong due to the system also determining that the object detected was in proximity to another tree trunk that could not have been located at a different location.

While tree trunks are unique to orchards, any large, stationary objects or patters that are unique to the specific geographic environment can be programmatically detected to better improve spray performance, navigation performance, and mapping of the scene. For example, detecting beds, troughs, furrows, and tracks of a row crop farm can be used to improve performance of observing and performing actions in the row crop farm. The techniques used can be a combination of computer vision, machine learning, or machine learning assisted techniques in detecting beds, troughs, furrows, and tracks such as long lines in a captured frame, differences in depth between lines (for example tracks and beds will have substantially the same line pattern because they are next to each other but have different depths), which can be detected with depth sensing techniques and detecting changes in color between beds and tracks, for example.

In one example, the object determination and object spraying engine generates positional data for an instance of the fruit at a particular stage of growth that is portrayed in a captured image based in part on: (i) a pixel position of the portrayal of the instance of a fruit at the particular stage of growth in the labeled image (and/or the captured image), (ii) the position information of the moving vehicle, and/or (iii) previously generated position information associated with a previous captured image(s) of the instance of the fruit and the physical location of the instance of the fruit. Previously generated position information may be associated with captured and labeled images that portray the same instance of the fruit when the vehicle traveled a similar route during a previous time, such as a prior hour of the day, prior day, week and/or month. The agricultural treatment system may generate nozzle signals for the synchronization ECU of the agricultural treatment system on a vehicle based on the positional data for the instance of the fruit at the particular stage of growth. For example, the nozzle signals may indicate a physical orientation of the nozzle to create a trajectory for a liquid. The nozzle signals may represent a change in a current orientation of the nozzle based one or more axial adjustments of the nozzle.

The object determination and object spraying engine sends the projectile from the nozzle towards the physical location of the object according to the trajectory. For example, the object determination and object spraying engine adjusts a current orientation of the nozzle according to the nozzle signals and triggers the nozzle to spray a liquid towards the physical location of the instance of the fruit.

Because not all plants need the same amount, for example by type, volume, frequency, or a combination thereof, of treatment based on the stage of growth of the particular plant, the agricultural treatment system can be configured to scan a row of crops to identify the stage of growth of each individual crop or agricultural object that is a plant or portion of a plant and determine whether the identified crop or agricultural object needs a treatment on the particular trial run, or day, or at the particular moment in time the vehicle with agricultural treatment system is on the field and has detected the individual agricultural object. For example, a row of crops, even of the same kind of plant, can have a plurality of agricultural objects and sub-agricultural objects of the agricultural objects, where the agricultural object may depict different physical attributes such as shapes, size, color, density, etc.

For example, a plant for growing a particular type of fruit, in one agricultural cycle, can produce one or more individual crop units, for example a fruit tree, each taking the shape of a first type of bud, second type of bud, and so forth, a flower, a blossom, a fruitlet, and eventually a fruit, depending on a growth stage of a particular crop. In this example, the agricultural treatment system can label each stage of the same identified object or crop, down to the particular individual bud, on the fruit tree as different agricultural objects or sub agricultural objects, as the object changes in its growth stage including its particular shape, size, color, density, and other factors that indicate a growth into a crop. The different agricultural objects detected and labelled associated with the same object in the real-world space can be associated with each other For example, a bud detected can be labelled as a unique agricultural object with a unique identifier or label. As time moves forward in a season, the uniquely labelled bud that is mapped on a farm may change shape into a flower for pollination, or from a flower to a fruitlet, and so forth. As this happens, an agricultural treatment system can identify the flower and label the flower as a unique identifier to the agricultural object detected and associate the agricultural object that is the flower with the agricultural object that is the bud previously identified and logically link the two identified agricultural objects as the same object in the real world where one object identified has grown into the other. In another example, the unique real-world flower detected, of a plurality of flowers and other objects in a geographic boundary, can be labelled as a flower but not considered a different agricultural object, and instead be associated with the same agricultural objected previously labeled as a bud. In this example, each object detected that can be considered a potential crop can be mapped as the same agricultural object, even though the agricultural object will change shape, size, density, anatomy, etc. The same agricultural object detected in the same space at different times can then have different labels and identifiers as related to the stage of growth. For example, a first agricultural object in space, detected by the agricultural treatment system, can be identified and indexed as a real-world agricultural object #40 with a timestamp associated with the time of day and year that the agricultural treatment system captured one or more images or other sensing signals of agricultural object #40. At the moment in time of identification, the agricultural object #40 can have a first label and assign the first label to agricultural object #40. The first label can be labelled as a bud, or bud #40 since there may be many other buds detected in the geographic boundary such as a farm or orchard. As multiple trials across a span of time are conducted in the geographic boundary on the same agricultural object #40, the agricultural object #40 can turn from a first type of bud, such as a dormant bud, into a second type of bud, or from a bud and bloom into a flower, or many other changes in stages of growth of desired agricultural plants grown for harvest and consumption. In this example, the agricultural object #40 detected as a bud at a given moment in time can be labeled as agricultural object #40 as a first label of bud #40. As time moves forward in a season, the agricultural objects on the farm or orchard, including agricultural object #40 as bud #40 can naturally turn into a flower. At this moment, if and when the agricultural object #40 turns into a flower, the agricultural treatment system can label the agricultural object #40 as a flower #40, associating the bud #40 with flower #40 such that the bud #40 and flower #40 are the same agricultural object #40 in the real world. Not all agricultural objects detected of the same plant may experience the same stages of growth or continue to keep growing. Some agricultural objects may even be removed, for example by thinning. For example, some plants can be thinned such that one or more agricultural objects growing from a single tree or stem can be removed or treated such that the next growth stage will not happen. In this instance, the agricultural treatment system can still detect that a uniquely identified real world agricultural object did not reach, or stopped, at a certain growth stage having unique physical features for a unique object label, or that the agricultural object detected previously is now gone and cannot be detected by the agricultural treatment system due to thinning or other method of removing the agricultural object so that neighboring agricultural objects can continue to grow as desired.

The description of buds, blooms, flowers, fruitlets, and other agricultural objects and stages of growth of such agricultural objects discussed are only meant to be an example series of objects that can be detected by a treatment system, such as agricultural treatment system detecting fruits and objects associated with the stages of growth of fruits on fruit trees, and not meant to be limiting only to the specific example described above.

For example, as illustrated in FIGS. 12A and 12B, an image depicting an agricultural environment including a fruit tree having one or more spurs, one or more branches and stems, one or more laterals, and one or more potential crops growing on the one or more laterals. At the moment an agricultural observation and treatment system, or an agricultural treatment system, described throughout this disclosure, has observed and labelled each identifiable feature of the image, including detecting agricultural objects and labelling its growth stage, detecting and labelling landmarks including orientations of portions of the tree growing including configurations of leaves, branches, physical manmade materials that can be detected in the image, or other objects and sights of interest in the image that is not a potential crop, the agricultural treatment system can detect that not all identified objects in the image include agricultural objects of the same growth stage. For example, some agricultural objects detected are labelled as buds, some as blossoms, and some as fruitlets. Each of these labels are of agricultural objects of interest to observe and potentially treat, but not necessarily treated the same way depending on the growth stage. The agricultural treatment system can then determine treatment parameters in real time to treat each individually labelled agricultural object with different treatment parameters, or refrain from treating an agricultural object. For example, if a first labelled growth stage does not need to be treated, a second growth stage does need to be treated at least once, a third growth stage does not need to be treated, the agricultural treatment system can scan through a path, capture images such as the one depicted in image 1300*a*, and treat only the second labelled growth stage. In this specific example, a blossom can be treated with artificial pollen. The agricultural treatment system can detect that there are buds that have not yet blossomed, and fruitlets that have already grown after the blossom, so the agricultural treatment system will refrain from treating the agricultural object 1302 and only treat agricultural objects labelled with the same label as that of agricultural object 1310. In one example, the agricultural treatment system can select different treatment mixtures and emit different treatment projectiles by volume, concentration, mixture type, as well as the type of emission which can be a single spray projectile, a spray projectile with a large surface area travelling towards the surface of the agricultural object, or a mist or fog type spray treatment. In this example, multiple identified agricultural objects at different growth stages can require a treatment with different parameters. Instead of refraining from treating one type of agricultural object at a certain growth stage while treating other agricultural objects having the desired growth stage for a particular trial, the agricultural treatment system can treat multiple types of growth stages of agricultural objects growing on the same tree simultaneously by selecting and receiving a desired chemical mixture for treatment in real time.

The agricultural treatment system can observe, by running a plurality of trials, such that one trial is a sequence of capturing sensor data, depositing treatments, or a combination thereof, along each row of crops on a farm or orchard one time and captures sensor data and has the opportunity to deposit a treatment for each crop or agricultural object detected. For example, a trial run, where the agricultural treatment system scans through a farm of one or more row crops in one cycle, can be performed once a day, or twice a day, once during daytime and once during night time in a calendar day. For example, the agricultural treatment system can perform multiple trials or runs on a farm or orchard in a single day, particularly if the growth sequence of a plant is more rapid in one season or series of days over another season, such that the agricultural treatment system can capture more changes in stages of growth by conducting more trials as well as depositing treatments onto surfaces of desired agricultural objects more frequently.

Additionally, each row of crops, whether each row includes the same plant or of different plant types, for example planted in an alternating patter, can include a plurality of plants that have one or more buds exposed, a plurality of plants that have one or more blossoms exposed, a plurality of plants that have one or more fruitlets exposed for treatment, or a combination of plants having a combination of buds, blossoms, fruitlets, etc., exposed at the same time on a single row. In this example, different agricultural objects at different stages will require different treatments at different volumes and frequencies. The agricultural treatment system can identify the particular stage of growth of each uniquely identified agricultural object mapped in the row of plurality of agricultural objects and give a label or identifier to each agricultural object based on its different and unique growth stage. The agricultural treatment system can then identify the appropriate or desired treatment parameters including treatment chemical mixture, density and concentration, whether a treatment is needed at all for the particular trial if the agricultural treatment system can identify that a particular agricultural object was already previously treated with a treatment deposition such that another treatment at a given trial can be too close in time for the same treatment to be applied again to the same unique agricultural object in the geographic boundary, depending on the stage of growth detected.

The agricultural treatment system can detect a first agricultural object of a plurality of agricultural objects in a row of plants inside a geographic boundary such as a farm or orchard. The agricultural treatment system can determine that the first agricultural object is different from a plurality of other agricultural objects by type or that the first agricultural object detected is among a plurality of the same type of agricultural objects as that of the first and can be indexed by a unique identifier to identify the particular object in the real world so that each unit or object in the real world of the same agricultural object type can be indexed and located in the geographic boundary. For example, a first agricultural object of a plurality of agricultural objects of the same plant type of the same tree or root can be identified on an orchard or row farm. The first agricultural object can be assigned and indexed as agricultural object #400 with a unique identifier that identifies its object type, such as a type of crop, and its location in the geographic boundary and time that the identifier was assigned to the first agricultural object. The agricultural treatment system can also assign a label of the first agricultural object based on the size, shape, color, texture, etc., with a first label, for example fruitlet #400 if the detected first object is a fruitlet of a crop. Because different stages of growth of a same desired plant or crop can require a different type, frequency, volume, or a combination thereof of treatment, the agricultural treatment system can determine treatment parameters, in real time upon detecting the first agricultural object in space and the growth stage of the first agricultural object either determined in real time or determined based on the growth stage detected on a previous trial. For example, if the first agricultural object detected at a particular time is a flower or cluster of flowers, the agricultural treatment system can label the flower detected in one or more images as a flower and determine treatment parameters for the flower. The agricultural treatment system can apply the same type, mixture, amount, and frequency of a treatment to the each of the same agricultural object type detected at the same growth stage along the same row of plants. The agricultural treatment system can apply a different type, mixture, amount, and frequency of a treatment to each of the same agricultural object type detected at a different growth stage along the same row of plants. In one example, the different growth stage of the plant or portion of a plant can vary by days or hours in one part of a season and vary by weeks or months in another part of a season. For example, a tree of a plurality of trees in a row of the same type of plant yielding the same crop can have portions of the tree, for example shoots, spurs, stems, laterals, or branches with nodes, clusters, buds, or other objects for crops, growing at different stages. A bud for a potential crop can form on one portion of the tree or lateral while other portions of the tree do not have buds. At this stage, the agricultural treatment system can identify the portions of the tree that do have buds and perform any treatment including chemical treatment or light treatment (e.g., laser) that is appropriate for treating a bud of a certain plant. In another example, a tree can have some laterals that have blossoms and some laterals that only have buds. In this example, the blossoms may be treated with a certain treatment and the buds may be treated with a different type of treatment as that of the treatment for blossoms. The agricultural treatment system can identify and distinguish between the various agricultural objects in space having different labels based on their growth stage and apply a treatment appropriate for each unique agricultural object identified and located in the real world.

The agricultural treatment system can also identify and index a treatment history on each unique agricultural object identified in space of a geographic boundary. For example, one or more buds detected on laterals of a tree can be treated with a certain type of chemical or light treatment. At this point in time, certain laterals will have laterals that have yet to form buds. As time moves forward and the agricultural treatment system engages the row of crops for treatment, the laterals that have yet to form buds may now have buds. Additionally, the previously detected buds, that have been treated have not yet turned onto a flower, or even further stage of a bud that may require an additional treatment or different type of treatment. In this example, because the agricultural treatment system has indexed each agricultural object detected by its growth stage, with a label across time, and timestamp for each time the agricultural object was detected and its specific growth stage and image of the growth stage labeled, the agricultural treatment system can determine which agricultural objects in the row requires treatment and which agricultural objects in the row does not require a treatment, either because it was already treated in a previous trial and does not need a treatment every trial, or has not reached a later growth stage detected that will require a different type, frequency, mixture, etc., of treatment.

As with the earlier example, the first real-world agricultural object #400, having one or more images, a location, and object type associated with object #400, based on its labelled stage of growth, for example label #400, can require a first treatment having a specific treatment mixture, type, volume, concentration, etc., and projectile emission strength. A second agricultural object #401, in proximity to agricultural object #400, for example, being a potential object for harvest of the same tree as that of agricultural object #400, having one or more images, a location, and object type associate with the agricultural object #401, based on its label #401, can require a second treatment having a specific treatment mixture, type, volume, concentration, etc., and projectile emission strength. The difference in treatment parameters such as the mixture, type, volume, concentration, strength of the projectile emitted, or a combination thereof, or abstaining from depositing a treatment at all for the particular trial run conducted by the agricultural treatment system, can be based on the different growth stage detected, even if the agricultural object is of the same type. In one example, different treatment parameters can be applied to a row of crops with the same type of plant but portions of the plant, such as various laterals can have agricultural objects growing on the laterals at different stages and require different treatments. Different treatment parameters can be applied to a row of crops with different plants in the row, for example with alternating crops. In one example, the same treatments with the same treatment parameters can be applied to the same row of crops of each agricultural object having the same or similar stage of growth. In one example, a different concentration or frequencies of treatments deposited can be applied to a row of crops of either the same plant of different plants at different stages of growth. For example, a first bloom of a lateral can require one deposition of chemical-#1 with a certain mixture, concentration, volume, etc. Other portions of the tree or other laterals may not have yet experienced a bloom from the buds so only the first bloom will receive a treatment of chemical-#1. At a later time, and more specifically, at later trial performed by the agricultural treatment system, other laterals will experience a bloom, such as a second bloom. In one example, it would be desirable for the second bloom to receive a single treatment of chemical-#1. Since the first bloom already received a treatment of chemical-#1 and for this particular example growth stage of this particular plant type, this example first bloom only requires one treatment of chemical-#1, the agricultural treatment system can detect that the agricultural object of the second bloom requires a treatment of chemical-#1 of a specified volume, concentration, strength of projectile and apply the treatment of chemical-#1, and detect that the agricultural object of the first bloom does not need a treatment at all for this trial.

For example, a treatment module, with one or more image sensors in real time, can sense and detect both object 1302, for example a fruitlet, as well as object 1308, which is a landmark. In one example, a landmark can a specific pattern detected and indexed in the geographic scene, for example of a tree pattern branching into two branches. As the vehicle moves forward in a row of an orchard, the treatment module's image sensors translates and moves relative to the tree, for example from right to left, and scans the tree illustrated in 1300a in real time. As the treatment module, with its compute unit, detects objects in the tree while the vehicle is moving, the treatment module can track both the object 1302 for targeting, tracking, and treating via the treatment unit, as well as track the landmark object 1308 to generate and obtain a higher accuracy motion estimation. In this example, the detecting, via neural network or computer vision methods such as template matching, correspondence matching, homography estimation, etc. or a combination thereof, and tracking of the target object can be done for treatment but can also be tracked for the motion estimation of the treatment module, and by extension the treatment unit and its treatment head, itself. The addition of tracking other objects, including other target objects, landmarks that are real world objects, or real-world objects or salient points in an image that can be tracked, can add accuracy for pose estimation of the treatment module which reduces error or misalignment of treatment when the treatment module's compute unit sends instructions to the treatment unit for treatment.

In one example, the agricultural treatment system can determine that different chemical concentrations of a chemical mixture are required for different growth stages of the same plant on a row of plants. In one example, the agricultural treatment system can determine that different chemical concentrations of a chemical mixture are required for different growth stages of different plants planted on a same row on a farm or orchard. In another example, the agricultural treatment system can determine that only certain growth stages of agricultural objects detect require a deposition of a particular treatment, and that other agricultural objects detected require a deposition of a different treatment, or no treatment, depending on the stage of growth and treatment history of the particular agricultural objected detected in the real world. In one example, a row of plants can have laterals supporting different agricultural objects, or the same agricultural objects with different stages of growth and different treatment histories, such that different treatments are desired for each unique agricultural object in the row. The chemical selection unit can mix different treatment mixtures and concentrations in real time for the agricultural treatment system to accommodate the different requirements of treatments in real time while performing a trial in a particular row of plants. Additionally, the agricultural treatment system can accommodate for applying different treatments to different agricultural objects of different plants in a single row, or other configuration, of crops.

Thus, the agricultural treatment system can, in real time, scan with sensors for agricultural objects and its stage of growth and real-world location in the row, determine whether to apply a particular treatment based on stage of growth detected and the particular agricultural object's treatment history.

In one example, the agricultural observation and treatment system can be configured to detect objects in real time as image or lidar sensors are receiving image capture data. The treatment system can, in real time, detect objects in a given image, determine the real-world location of the object, instruct the treatment unit to perform an action, detect the action (discussed below), and index the action as well as the detection of the object into a database. Additionally, the treatment system, at a server or edge computing device offline, can detect objects in a given image, spray projectiles, spray action, spot of splat detections, and index the object detections and spray action detections. In one example, the agricultural observation and treatment system can perform and use various techniques and compute algorithms for perform the object detections including computer vision techniques, machine learning or machine learning assisted techniques, or a combination thereof in multiple sequences and layers such that one algorithm partitions a given image and a second algorithm can analyze the partitioned image for objects or landmarks.

In one example, a machine learning model, embedded in one or more compute units of the agricultural observation and treatment system onboard a vehicle, can perform various machine learning algorithms to detect objects, including object detection including feature detection, extraction and classification, image classification, instance classification and segmentation, semantic segmentation, superpixel segmentation, bounding box object detections, and other techniques to analyze a given image for detecting features within the image. In one example, multiple techniques can be used at different layers or portions of the image to better classify and more efficiently use computer resources on images. Additionally, pixel segmentation can be performed to partition colors in an image without specific knowledge of objects. For, example, for row crop farming, a system can perform color segmentation on a given image to partition detected pixels associated with a desired color from any other pixels into two groups, such as the color segmented pixels and background pixels. For example, a system can be configured to analyze frames by detecting vegetation, which can be a form of green or purple color from background objects, such as terrain, dirt, ground, bed, gravel, rocks, etc. In one example, the color segmentation itself can be performed by a machine learning model configured to detect a specific type of color in each pixel ingested by an image sensor. In another example, the color segmentation can be manually predefined as pixels ranging between a specific range of a color format. For example, vegetation algorithm can be configured to analyze a given frame to partition any pixels having attributes of the color "green" form a Bayer filter. In another example, the algorithm can be configured to detect attributes of "green" under any color model where "green" is defined. For example, a numeric representation of RGB color being (r,g,b) where the value of g>0 in any digital number-bit per channel. The algorithm can itself be a machine learning algorithm to detect "green" or a different color that are of interest.

In one example, machine learning and other various computer vision algorithms can be configured to draw bounding boxes to label portions of images with objects of interest from backgrounds of images, masking functions to separate background and regions of interest or objects of interest in a given image or portion of an image or between two images where one image is a first frame and another image is a subsequent frame captured by the same image sensor at different times, perform semantic segmentation to all pixels or a region of pixels of an given image frame to classify each pixel as part of one or more different target objects, other objects of interest, or background and associate its specific location in space relative to the a component of the treatment system and the vehicle supporting the treatment system.

Multiple techniques can be performed in layers to the same or portions of the same image. For example, a computer vision technique or machine learning technique can be first applied to an image to perform color segmentation. Once a given image is detected and pixels related to a desired or target color is segmented, the separate machine learning algorithm or computer vision algorithm can be applied to the segmented image, for example to an object detection algorithm to draw bounding boxes around the segmented image containing weeds and containing crops. In another example, an object detection algorithm can be applied to the entire image to draw bounding boxes around plants of interest, such as crops and weeds. Once the image has bounding box detections draw around each of the detected crop or weed objects in the image, a color segmentation algorithm can be applied to just those bounding boxes to separate pixels bounded by the box that are of a target color, such as green, and those pixels that are considered background. This method can allow a system to more accurately determine which pixels are associated with objects in the real world, such that an image with contours and outlines of a specific object detected in the image, such as a leaf, can be a more accurate depiction of the leaf, and therefore more accurately target the leaf in the real world, than drawing a rectangular box around a leaf where the system determines that any portion inside the bounded rectangular box is associated with the object "leaf". The example above is just one of many examples, configurations, orders, layers, and algorithms, that can be deployed to analyze a given image for better understanding of objects, that is improved feature detection, performed either online in the field in real time, or offline at a server for other uses, such as creating a time lapse visualization, mapping the object, generating key frames with detections for indexing and storage, diagnosing and improving machine learning models, etc.

In one example, detecting a plurality of agricultural objects and/or landmarks can be used to perform variations of consensus classification. For example, multiple detections of the same agricultural object and/or landmark can be performed to eliminate or reduce false positives or false negatives of object detection. While a machine learning model will be tasked to identify individual objects and landmarks, the closeness of an object to another object in a single frame can also be accounted for an considered by the machine learning detector for detecting an object. For example, if in a first frame, the machine learning detector detects a target object as well as a plurality of nearby target objects, other agricultural objects, or landmarks, but then in subsequent frames, while the vehicle has not moved enough such that the location where the ML detector has detected a target object has not moved out of the next frame, does not detect that same target object, but does detect all of the other nearby target objects, other agricultural objects and landmarks detected in the first frame, the compute unit can determine that the first frame may have had a false positive and flag the frame for review and labelling, at a later time on board the vehicle for a human to label, or offline, without instructing the treatment unit to perform an action at the location in the real world where the system detected a target object to treat based on the first frame.

Figure 14:
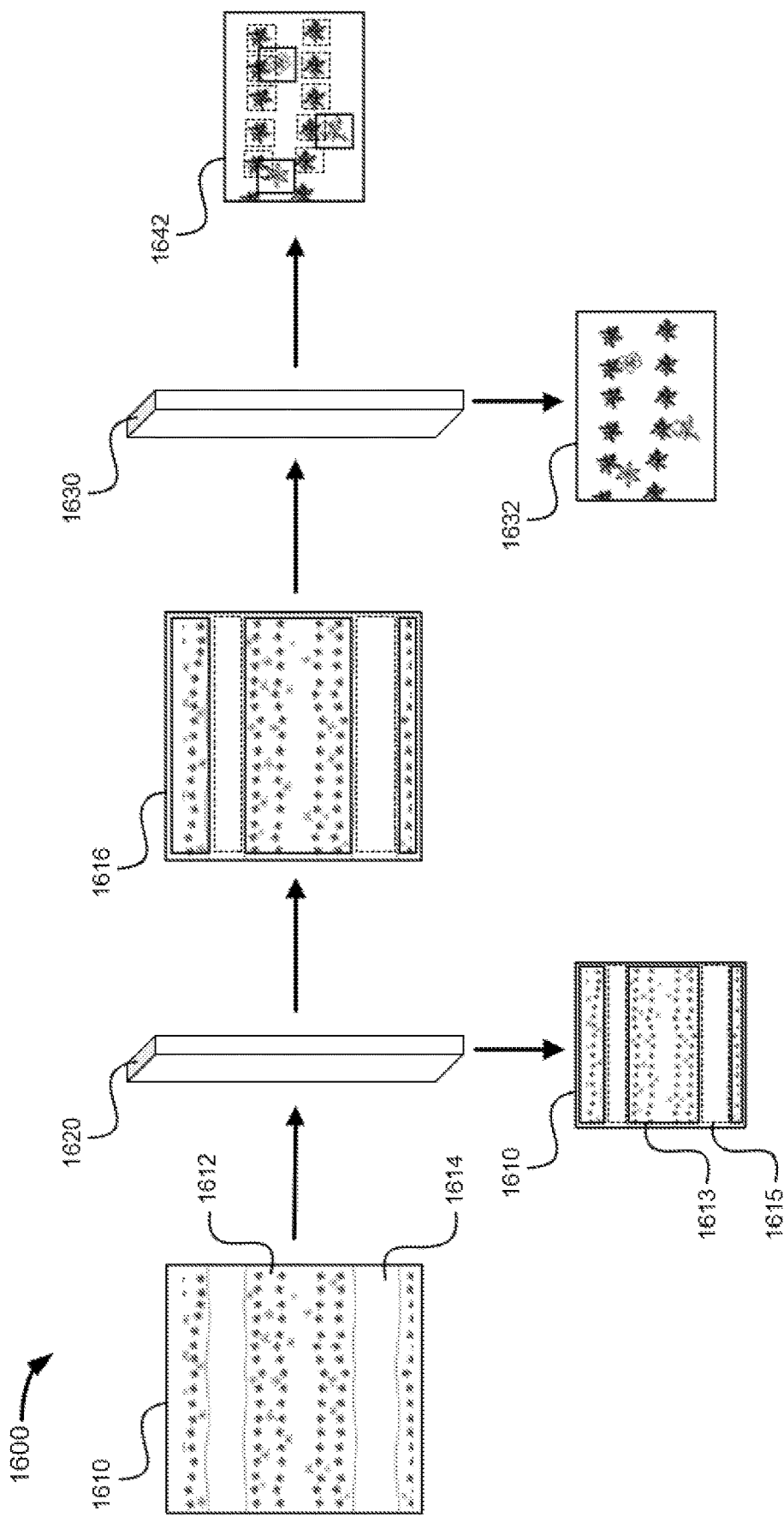
FIG. 14 is a diagram illustrating an example image acquisition to object determination performed by an example system, according to some examples.

FIG. 14 illustrates an example diagram 1600 for ingesting an image, performing various computer vision and machine learning algorithms onto various portions or layers of the image to extract and detect features of the image.

As discussed above, multiple techniques can be performed in layers to the same or portions of the same image. For example, an image 1610 can be acquired by an image capture device and loaded onto a local compute unit of a local modular treatment module. For illustration purposes only, the image 1610 captured can be an image of a row crop farm having one or more beds 1612 supporting a plurality of crops, such as carrots, and weeds, and one or more furrows or tracks 1614 for a vehicle's wheels to run through as a vehicle passes the row. One or more embedded machine learning algorithms and computer vision algorithms in the compute unit, or accessible by the compute unit in real time via the cloud or edge compute device containing the machine learning algorithm and computer vision algorithm, such as computer vision algorithm 1620 and machine learning algorithm 1630 can be used to partition the image 1610 into analyzed images with features extracted, with the goal of accurately detecting objects in the given image 1610. For example, the first computer vision algorithm 1620 configured to separate beds and furrows can be applied to the analyze and segment classify the image 1610 with portions of the image related to beds such as partitioned image 1613 with portions of the image related to furrows such as partitioned background image 1615. One purpose of deploying this technique is to that the treatment module does not have to run a machine learning detector on the entire image 1610, but only on portions where object of interest may be. The partitioning of beds and furrows, as is the partitioning of green and background, are just many examples of performing a plurality of computer vision and machine learning techniques to an image to reduce computation load while generating accurate detections of features in the real world. Next, the system will have generated a partitioned image 1616 having pixels associated with beds and pixels associated with furrows such as that of partitioned image 1613 and partitioned background image 1615. The machine learning algorithm 1630, which for example can be a machine learning algorithm to detect plant objects of interest, such as crop plants and various species of weeds, can be implemented to further analyze the image 1610 or the partitioned image 1616, and only the portion of the image 1610 that is partitioned image 1613, and not the partitioned image 1615. This would allow the ML detector or machine learning algorithm 1630 to analyze fewer pixels or tiles of pixels, and reduce the load on the system, while the system having a high probability that the machine learning detector is scanning the most important areas of the image 1610. In this example, the detector would run detections on only a portion of the partitioned image 1616, for example a portion of the partitioned image 1613, such as a patch 1632 of the partitioned image 1613. The treatment system can then draw bounding boxes, semantically classify, or perform various machine learning methods deployed by machine learning algorithm 1630, for example detect objects and draw bounding boxes, and generated a machine labelled or machine detected image 1642, which is a labeled of image of a portion of the original intake image 1610. The agricultural observation and treatment system can then use those detections to determine which detections are target objects to treat, target the objects in the real world, track the detected objects in subsequent frames, and perform a treatment action to the detected object in the real world. Additionally, using multiple layers of computer vision and machine learning algorithms to optimize the computing load onto a compute unit can be performed to improve VSLAM. For example, vegetation segmentation can be performed to detect green objects. In the VSLAM pipeline for matching keypoints from frame to subsequent frames by the same sensor, the compute module or compute unit associated with the sensors receiving the images, can determine that points associated with green objects are real objects in the world that are stationary and can be tracked via VSLAM by sensors and compute units of each component treatment module for local pose estimation. This would allow the VSLAM algorithm analyze keypoints, keypoints in this case being points related to corners or contours or edges of green objects, with higher confidence that the keypoints generated and analyzed are higher quality than that of arbitrary salient points, compared to that of known objects, such as objects corresponding to green pixels, since the system will know beforehand that green pixels are of vegetation, which are physical objects in space that are stationary and are of similar size and topography as that of target objects for treatment that will be tracked.

Figure 15A:
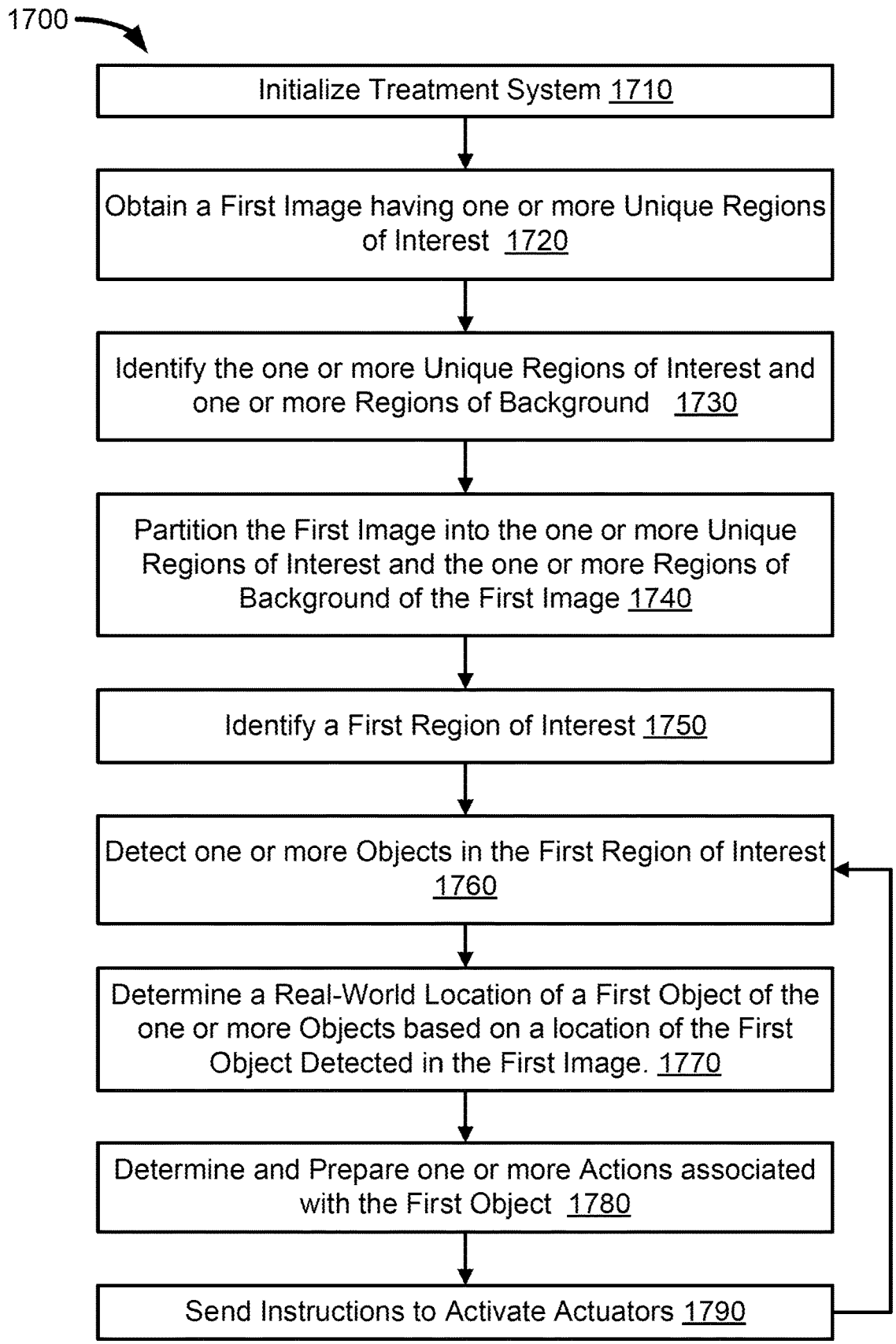
FIG. 15A is a block diagram illustrating an exemplary method that may be performed by an agricultural observation and treatment system, according to some examples.

FIG. 15A illustrates an example method 1700 that may be performed by some example systems or subsystems described in this disclosure either online, that is onboard a vehicle supporting one or more modular agricultural observation and treatment systems, subsystems, or components of systems, or offline, that is at one or more servers or edge compute devices.

At step 1710, the agricultural observation and treatment system can initialize the treatment system. At step 1720, the agricultural observation and treatment system can obtain a first image having one or more unique regions of interest. For example, the regions of interest can be regions or portions of images that are specific to a specific geographic boundary such as a row crop farm or an orchard. For example, images where there are tree trunks, images where a substantial portion of the image are either beds or troughs or furrows, images where objects of interest have a certain color and every other portion of the image can be background. At step 1730, the agricultural observation and treatment system can identify the one or more unique regions of interest and one or more regions of background. At step 1740, the agricultural observation and treatment system can partition the first image into the one or more unique regions of interest and the one or more regions of background of the first image. At step 1750, the agricultural observation and treatment system can identify a first region of interest among the regions of interest. At step 1760, the agricultural observation and treatment system can detect one or more objects in the first region of interest. At step 1770, the agricultural observation and treatment system can the agricultural observation and treatment system can determine a real-world location of a first object of the one or more objects based on a location of the first object detected in the first image. At step 1780, the agricultural observation and treatment system can determine and prepare one or more actions associated with the first object in the real world. At step 1790, the agricultural observation and treatment system can send instructions to activate actuators. The system can repeat steps 1760 to detect a second object detected in the first region and prepare treatment actions associated with the second object. Once all objects of interest are accounted for in the first region of interest, the system can detect objects in a second region of interest for treatment, or partition the image for a second region of interest.

Figure 15B:
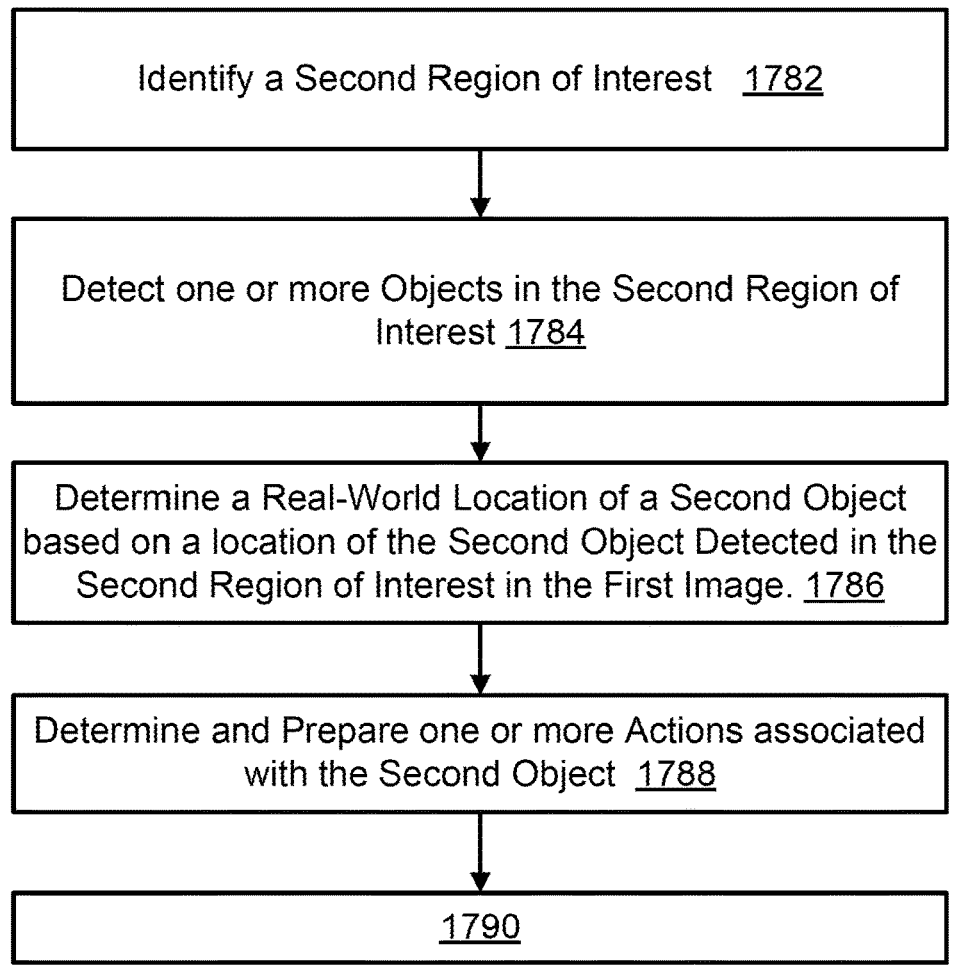
FIG. 15B is a block diagram illustrating an exemplary method that may be performed by an agricultural observation and treatment system, according to some examples.

Additionally, as illustrated in FIG. 15B, at step 1782, the agricultural observation and treatment system can identify a second region of interest. At step 1784, the agricultural observation and treatment system can detect one or more objects in the second region of interest. At step 1786, the agricultural observation and treatment system can determine a real-world location of a second object based on a location of the second object detected in the second region of interest in the first image. At step 1788, the agricultural observation and treatment system can determine and prepare one or more actions associated with the second object.

Figure 16:
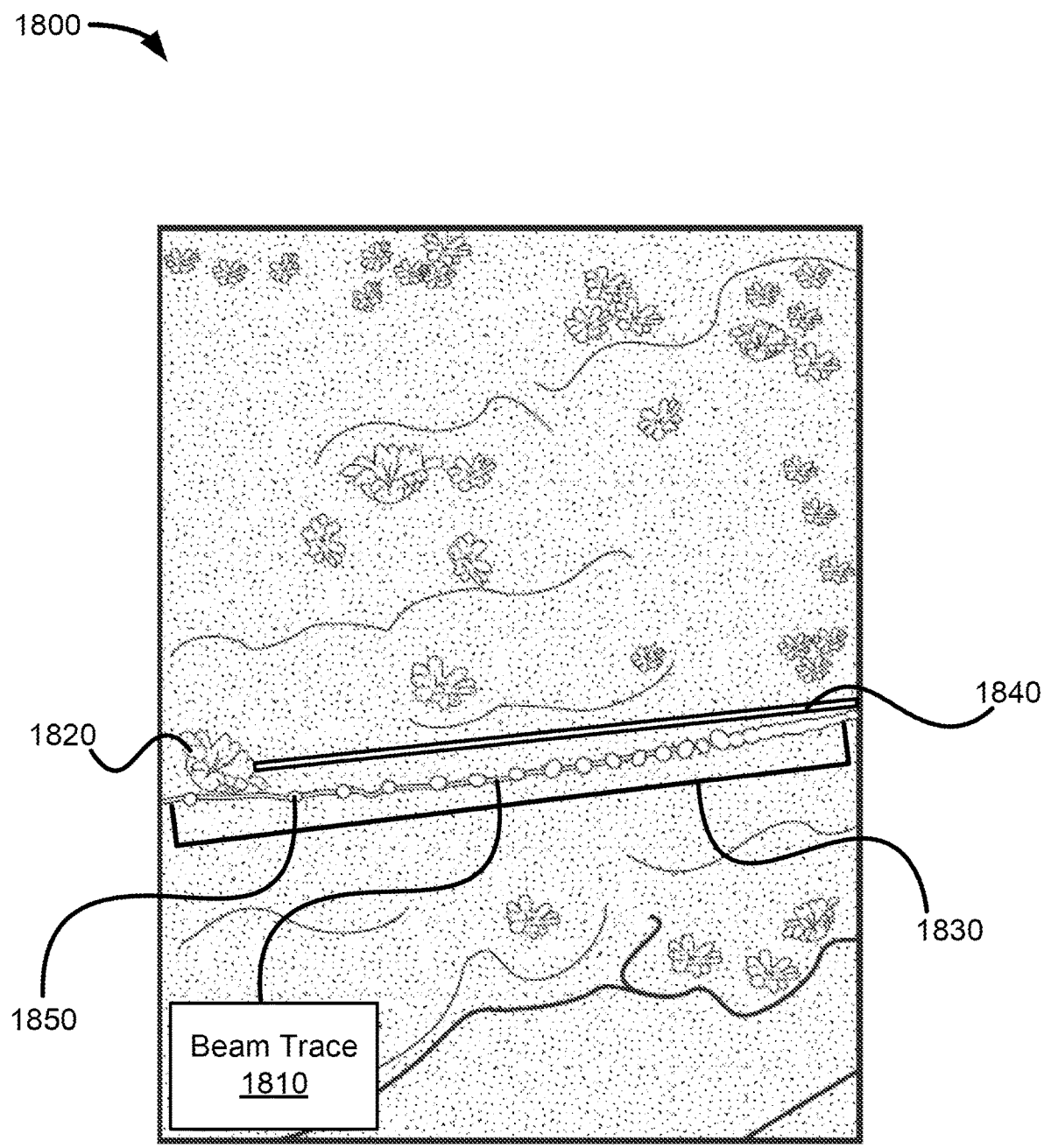
FIG. 16 is a diagram illustrating capturing an action performed by an observation and treatment system, according to some examples.

FIG. 16 is a diagram 1800 capturing an action performed by an observation and treatment system. In this example, an image capture device can receive a constant stream of images of a local scene having one or more agricultural objects in the scene. Once a target object is detected, targeted, and tracked, the system will instruct a treatment unit to activate and emit a liquid projectile or a beam of light onto a surface of the target object. This action will take a length of time to release from the treatment unit to exiting the treatment head, travel in space, hit the target if accurately targeted and emission parameters, such as dwell time which is the amount of time the nozzle head is pointed at the target object while the nozzle head is on a moving vehicle, pressure release time which is when a pressure actuator such as a capacitor or solenoid valve opens and closes and allows pressurized fluid to release from the valve and through the nozzle head, nozzle orifice size, and other parameters, and create splash, splat, or a footprint on the ground for row crops where plants, or target plants, are growing out from the ground.

In this example, the image capture system can capture and trace the liquid projectile itself, for example fluid projectile 1830. Because the projectile is a fluid, it may not flow it an exact straight line. Additionally, the projectile can be comprised of smaller liquid droplets 1850. The compute unit and image sensors can detect the beam trace directly from detecting the projectile 1830 and its smaller droplets 1850 as the liquid leaves the treatment unit. Additionally, a laser with a laser beam 1840 can be pointed at the intended target object 1820 for the system to detect both the laser beam and trace the projectile beam to determine whether there was a hit, and if there was any error or discrepancy form the desired projectile hit location to the actual trajectory of the projectile.

Figure 17A:
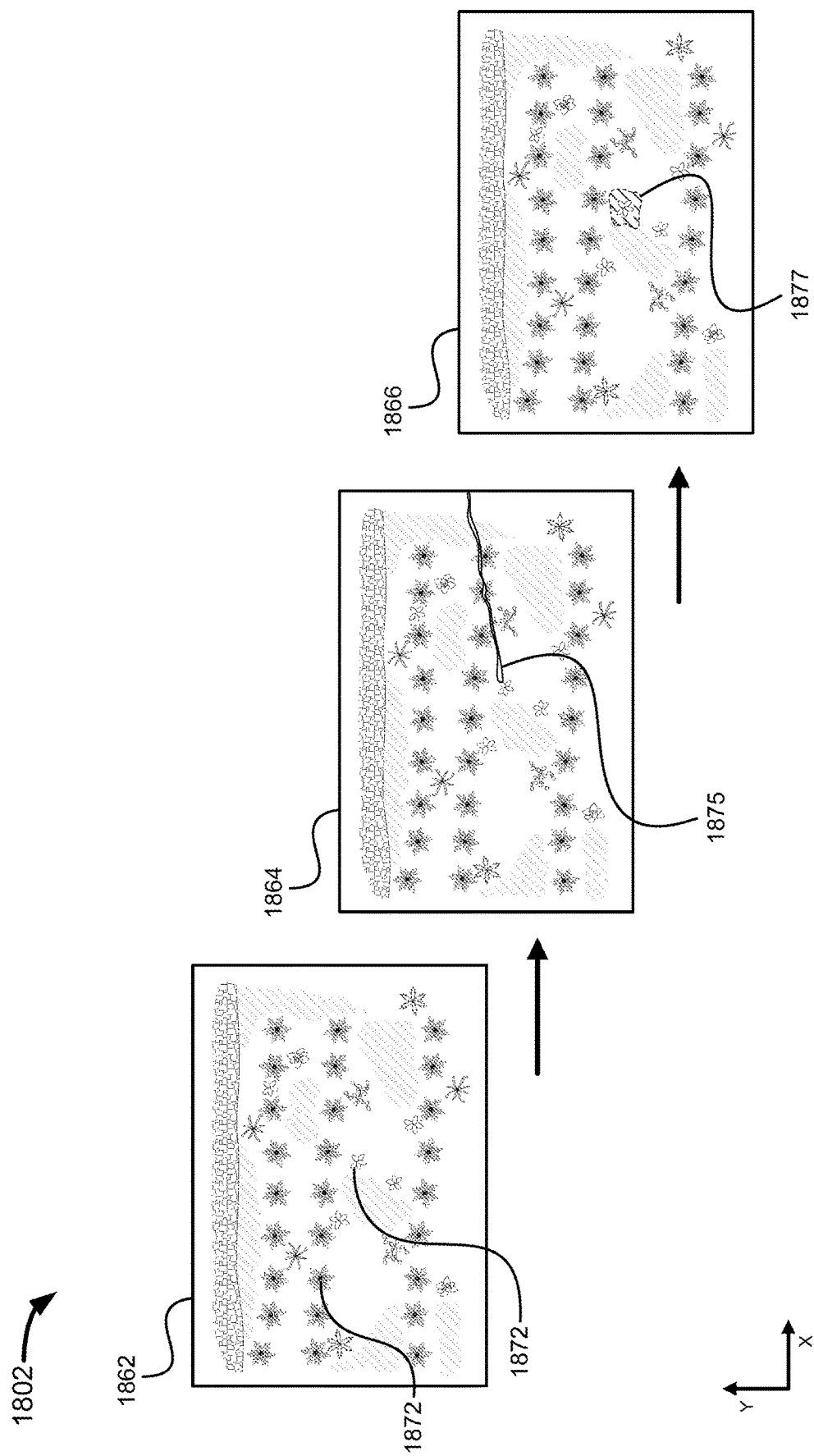
FIG. 17A is a diagram illustrating capturing action and treatment pattern detection, according to some examples.
Figure 17B:
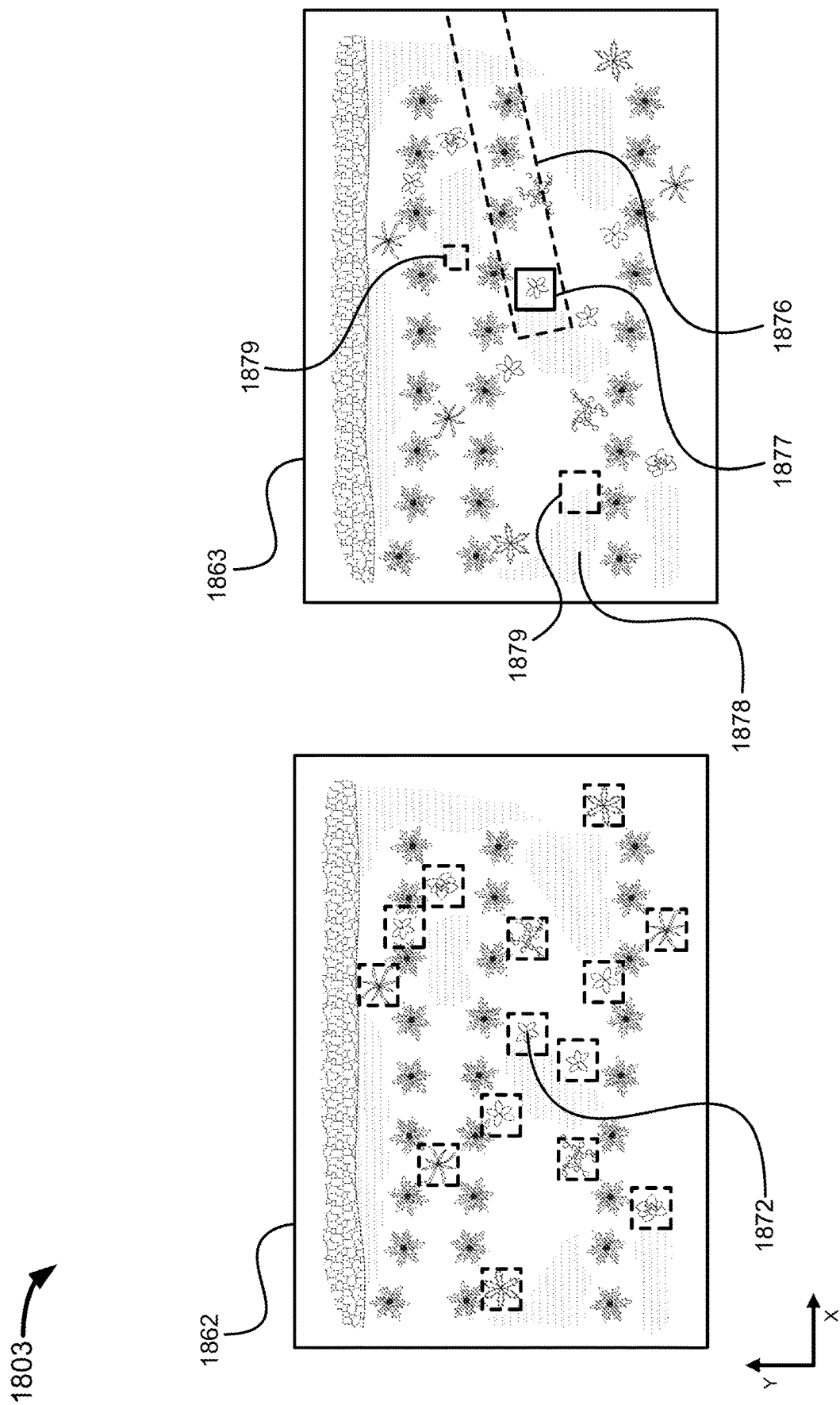
FIG. 17B is a diagram illustrating capturing action and treatment pattern detection, according to some examples.
Figure 17C:
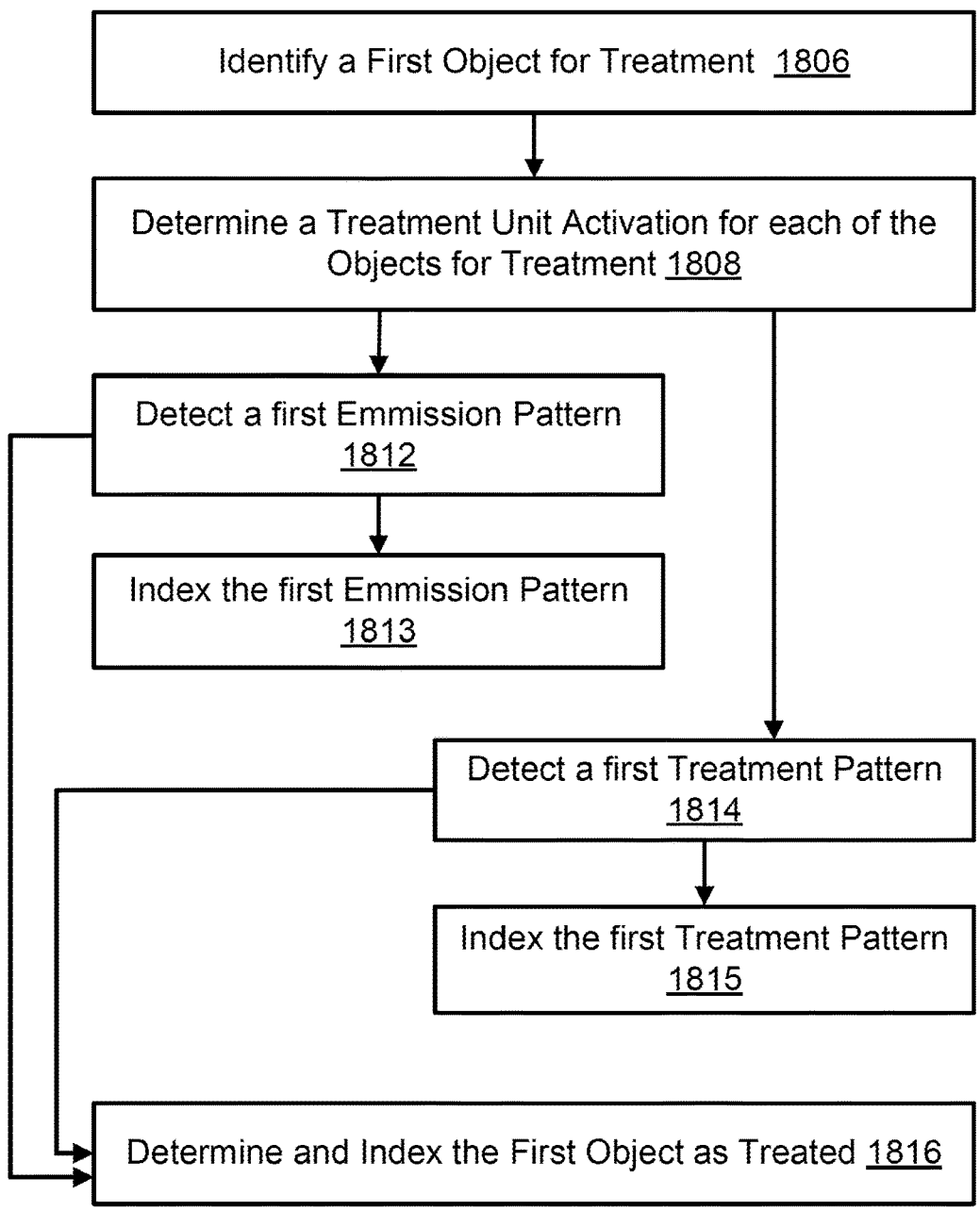
FIG. 17C is a block diagram illustrating an exemplary method that may be performed by an agricultural observation and treatment system, according to some examples.
Figure 17D:
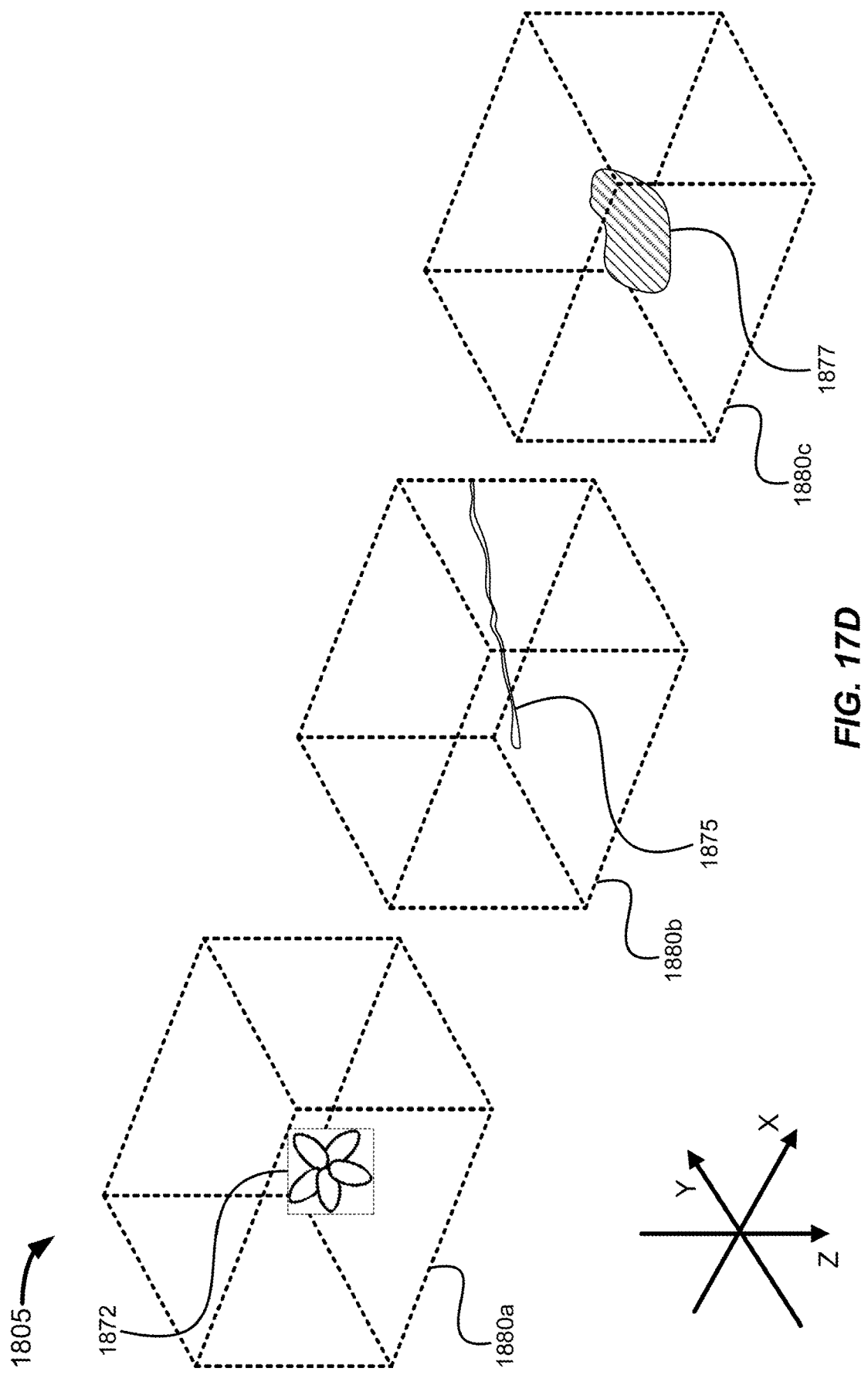
FIG. 17D is a diagram illustrating capturing action and treatment pattern detection, according to some examples.
Figure 17E:
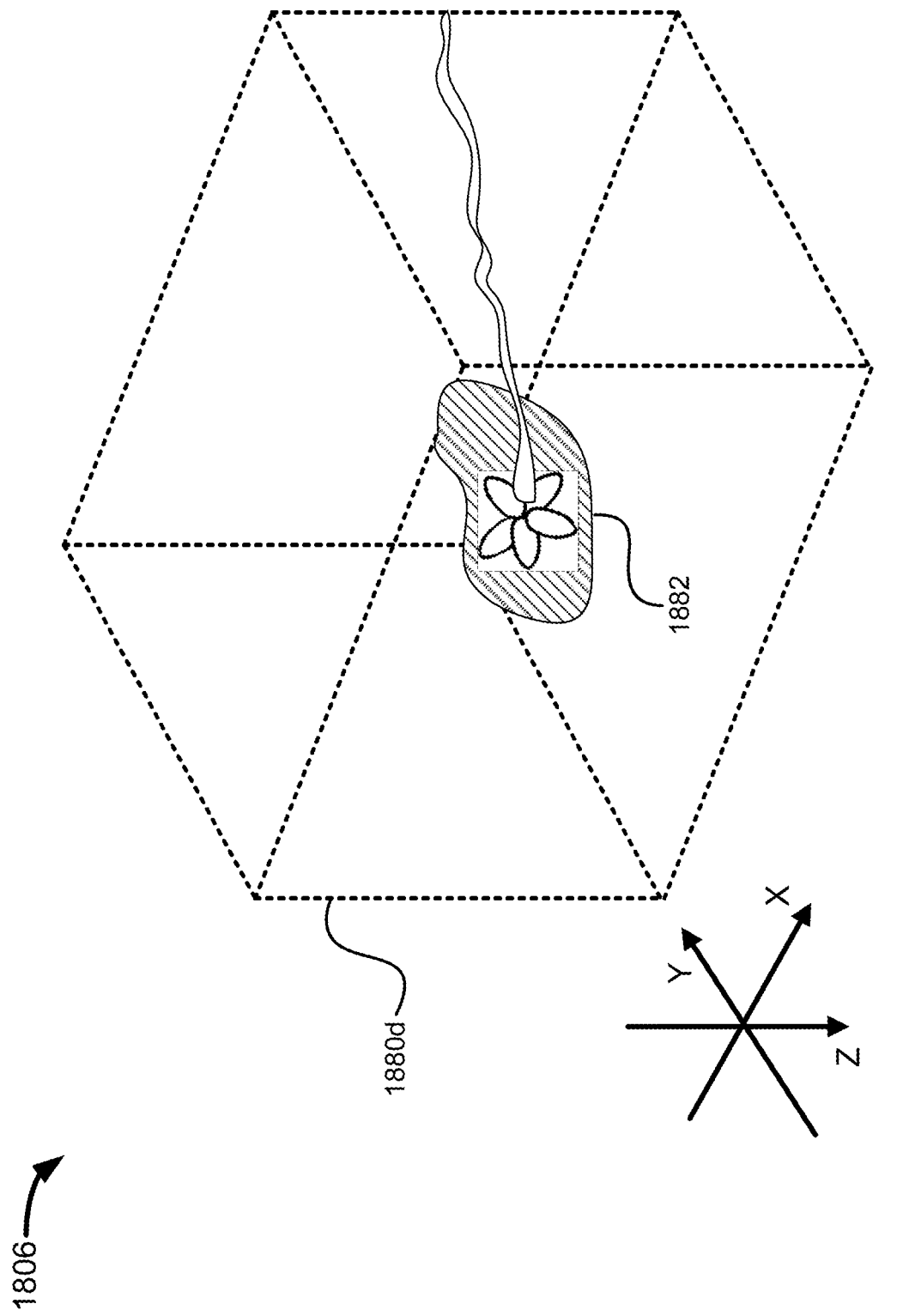
FIG. 17E is a diagram illustrating capturing an action and a treatment pattern, according to some examples.

FIG. 17A and FIG. 17B illustrate an example of spray detection, beam detection, or spray projectile detection. In these diagrams 1802 and 1803, one or more image sensors is scanning a local scene comprising a plurality of plants 1872 including target plants for treatment and crop plants for observation and indexing. As the sensor scans the scene while a vehicle supporting the sensor is moving in a lateral direction, the sensor will capture one or more image frames in sequence from one to another illustrated in image frames 1862, 1864, and 1866 where image frame 1864 and 1866 are frames captured by a sensor that captured image frame 1862 subsequently, but not necessarily the immediate next frame captured by the image sensor. During the capturing of images, if component treatment system having sensors and treatment units sends instructions to the treatment unit to perform a spray action, such as emit a fluid projectile, the image sensors would capture the spray action as it comes into the frame and then eventually disappears as the projectile is fully splashed onto the surface of the intended target or ground. In such example, the spray projectile, such as projectile 1875, can be detected and indexed by the image sensors and the treatment system, as well as the splat area 1877 after the spray has completed. The system can detect the splat size and location.

In one example, the detection of the spray can be performed by various computer vision techniques including spray segmentation, color segmentation, object detection and segmentation, statistical analysis including line fitting, homography estimation, or estimation of a homography matrix, or a combination thereof. For example, the differences between frame 1862 and frame 1864 can be the presence of a spray and the lack of presence of a spray. The rest being the same features in each image. In one example, homography estimation is used to account for change in space across a common plane, such as a bed of a row crop farm. A homography matrix can be used to estimate how much movement in space from a first frame to a subsequent frame. The images will be slightly misaligned from each other due to the camera being on a moving vehicle while the first frame 1862 is captured and a subsequent frame 1864 is captured. The discrepancy in in the frames caused by the motion of the camera can be accounted for with homography estimation, given that the two frames are likely looking at the same plane of equal distance from the camera from the first frame 1862 to the subsequent frame 1864, at a later time but not necessarily the exact next frame captured by the image capture device. The difference in the two images, other than the discrepancy which can be accounted for by homography estimation, would be the presence of the spray, which can be generated by comparing the two frames and performing spray segmentation, that is the pixels in frame 1864 that has the spray projectile 1875 captured compared to the pixels in frame 1862 that do not have a projectile detected. In this case, one or more statistical and image analysis techniques, including line fitting, and masking function to determine that the pixels detected in frame 1864 but not detected in frame 1862 is a spray projectile. Since spray projectiles are likely line shaped, the pixels related to the spray can be line fitted. Other image differential techniques can be applied to detect the spray beam including outlier rejection and using priors for masking outliers. The priors can be an expected region such as that outline by predicted spray path 1876. In one example, the difference in pixels profiles detected from a first frame to a subsequent frame, accounting for homography estimation due to changes in translation of the image sensor, can generate a projectile segmentation. Similar techniques can be used to detect the splat or spot detection of the spray outcome onto the surface of the target and ground, for example, seeing the color of the ground and target plant change from unsprayed to sprayed. For example, a liquid projectile hitting a target plant will morph from a projectile having a small cross-sectional diameter to a flat area covering a portion of the dirt or leaf. In this example a liquid projectile may change the color of the dirt surrounding a plant, due to dry dirt turning wet from the liquid projectile hitting the dirt. In this case, the image sensors can detect a color change in the ground and determine that a splat is detected and that a detect target object for treatment has been treated, and logged or indexed by the treatment system. In one example, a stereo pair of cameras can detect sprays in each camera and associated with each other to fit a 3D line such that the system can detect and index a spray in the real world with 3D coordinates.

FIG. 17B illustrates a diagram 1803 to determine spray accuracy and spray health, spray health being whether external factors outside or correctly detecting target object and lining the treatment head onto the target object and tracking it as the target object moves away from the treatment unit, since the treatment unit is on a moving vehicle, a prior or predicted spray path 1876 can be generated. For example, a sensor, disposed on a moving vehicle, can receive an image frame 1862 having a plurality of crop objects and target objects, including detected target object 1872. The treatment system will target the target object 1872, track the object 1872 in subsequent frames, such as that of frame 1862, and emit a projectile onto target 1872. In one example, due to external factors not necessarily related to computer vision, such as portions of the treatment unit no longer calibrated to the image sensor, such that targeting at a specific location in the real world from a detection in the image frame may result in a misalignment of the line of sight of the treatment head. For example, the treatment system, given frame 1862 or 1862, may target the target object 1872 at the correct real-world location, but in doing so and instructing the treatment head to aim its nozzle to target object 1872 in the real world may in fact be targeting a location 1879 or 1878, or an incorrect location or misaligned location in the real world, that the treatment systems image sensor would capture. In this case, to quality check the spray targeting and spray action, the treatment system can predetermine a predicted spray path 1876 and perform spray segmentation and other computer vision and machine learning techniques described above only in the portion of the image, and therefore compare pixels related to the images contained in the region defined by the predicted spray path 1876. If the detection is not good enough, such as the line cannot be fitted, the system can determine that the spray did not happen, or happened but not at the intended target. Alternatively, the system can perform spray segmentation on the spray that was detected, whether within the predicted spray path 1876 or not, and determine whether the end of the spray or the splat detected lines up with the intended target. Thus, seeing where a target object should have been sprayed, and/or should have had a splat detected, and where the actual spray profile was detected, including 3D location, and where the spray splat was detected, can be used to evaluate the specific spray health of that particular spray, and whether intrinsic or extrinsic adjustments needs to be made. The adjustments can be accounting for wind that may have moved the spray, the speed of the vehicle not being accounted for properly as the system tracks an object from frame to frame, or mechanical defects such that the intended target and the line of sight after sending the correct instructions to orient the treatment head of the treatment unit are misaligned. Upon detecting an inaccurate or incorrect spray projectile, one or more of the discussed defects can be accounted for in real time and a second projectile can be reapplied on to the target object and tracked again for trajectory evaluation and its spray health and accuracy.

FIG. 17C illustrates an example method 1804 that may be performed by some example systems or subsystems described in this disclosure either online, that is onboard a vehicle supporting one or more modular agricultural observation and treatment systems, subsystems, or components of systems, or offline, that is at one or more servers or edge compute devices.

For example, at step 1806, the observation and treatment system or server can identify a first object for treatment. In this example, the observation and treatment system or a server is analyzing the performance of the online observation and treatment system during its latest run, in a location such as an agricultural geographic boundary. The system, online or at a server, can identify each treatment performed or instructed to be performed on the geographic boundary for verification, indexing, and adding the verification to each of the identified target object's treatment history. For example, a treatment system may have identified and initialized a few thousand or a few hundred thousand actions performed in a single run at a field, orchard, or farm, and a server is analyzing the treatment accuracy and efficacy of each of the actions performed on the field in that particular run. At step 1808, the observation and treatment system or server can determine a treatment unit activation for each of the objects for treatment. In this optional step, the system or server can determine treatment actions based on the treatment performed and logged previously in real time while the observation and treatment system was on the field performing detection objects and performing treatments. In this example, the server does not have to identify every frame captured and determine which objects detected were treated for second time, but instead can analyze only those frames captured by image capture devices where each online and onboard compute unit has already detected. In one example, the determining of treatment activation can include the treatment parameters such as desired spray size, volume, concentration, mixture of spray content, spray time of flight, etc.

At step 1812, the observation and treatment system or server can detect a first emission pattern. This can be done with techniques described above as well as image correspondence from a previous frame and a subsequent frame to detect a projectile.

At step 1813, the observation and treatment system or server can index the first emission pattern. This can be stored as a 3D vector, or a 2D or 3D model of the full 3D profile with shape and orientation mapped into a virtual scene.

At step 1814, the observation and treatment system or server can detect a first treatment pattern. This can be the splat detection from color change in dirt from a first frame to a subsequent frame, performed by similar methods described above.

At step 1815, the observation and treatment system or server can index the first treatment pattern.

At step 1816, the observation and treatment system or server can determine and index the first object as treated. For visualization purposes, a target object that has not been accurately treated can have a bounding box with a dotted line indicating a detection of the object itself but no detection of a spray onto that target object. And once a spray or treatment is detected, by the projectile or the splat detection, the dotted line can convert to a solid line, as illustrated in diagram 1803 of FIG. 17B.

As illustrated in FIGS. 17D and 17E, each spray projectile and splat detections can be indexed and visually displayed in a user interface. The 2D or 3D models 1880*a*, 1880*b*, and 1880*c* of each target object 1872, spray projectile 1875, and splash 1877 onto a surface of the ground and target object. Additionally, the 3D models can be superimposed on each other to reconstruct the spray action from the targeting of the target object, to the spraying of the target object, to the splash made and splat detected as illustrated in model 1880*d* of diagram 1806 of superimposed model 1882.

FIGS. 18-21 illustrate various examples of performing agricultural observation, digitizing a geographic boundary, building a map of each individual agricultural object or crop detected and associating captured images of agricultural objects from one moment in time to another to digitize and map a farm with location and image history of each agricultural object detected, targeting and tracking objects, and treating each individual agricultural object.

The description of buds, blooms, flowers, fruitlets, and other agricultural objects and stages of growth of such agricultural objects discussed are only meant to be an example series of objects that can be detected by a treatment system, detecting fruits and objects associated with the stages of growth of fruits on fruit trees, and not meant to be limiting only to the specific example described above. For example, agricultural objects can include larger objects or portions of a tree that are part of supporting a crop can be detected, classified, and labelled for spraying including spurs, shoots, stems, laterals, other nodes, fruiting clusters, leaves, or other portions of a tree. Different types of plants can be treated by the treatment system including general plants for crops, specialty crops, including fruits, vegetables, nuts, flowers, herbs, foliage, etc. The agricultural treatment systems described in this disclosure can be performed in geographic boundaries typically appropriate for a robotic vision and treatment deposition system for observing, treating, harvesting, or a combination thereof, of crops such as farms, orchards, greenhouses, nurseries, or other regionally and topographically bounded locations for agronomy and agriculture, horticulture, floriculture, hydroculture, hydroponics, aquaponics, aeroponics, soil science and soil agronomy, pedology, etc.

Figure 18:
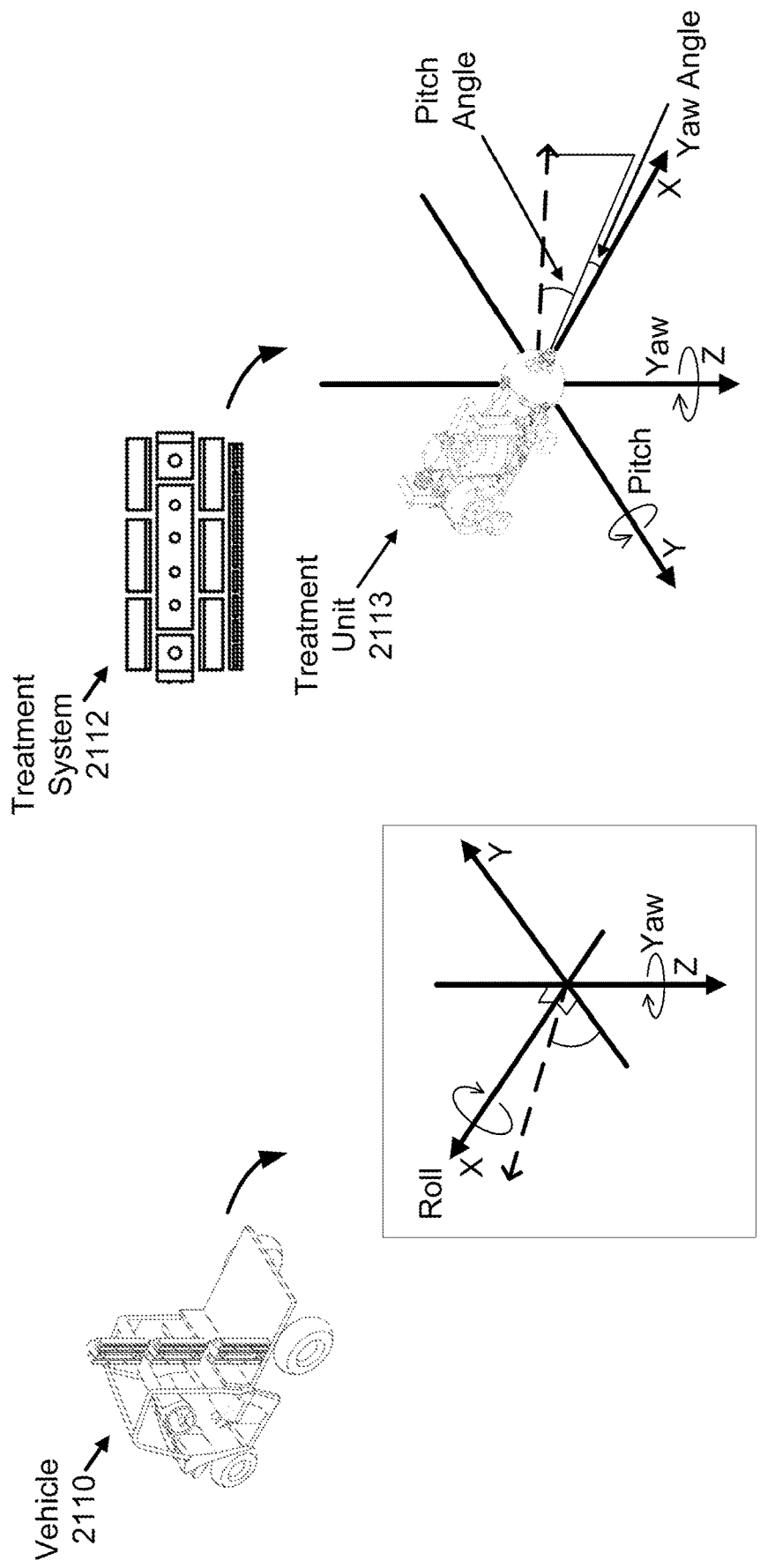
FIG. 18 is a diagram illustrating axes of movement, rotation, and degrees of freedom of a vehicle and components of an observation and treatment system, according to some examples.

FIG. 18 illustrates a vehicle having coordinates associated with rotational movement including that of roll about an X axis, pitch about a Y axis, and yaw about a Z axis, as well as translational coordinates associated with lateral movement including an X, Y, and Z position in a geographic boundary. The vehicle 2110, illustrated in FIG. 18 can move with at least 6 degrees of freedom. Additionally, the treatment unit 2113 of the treatment system 2112 can also have coordinates associated with rotational movement including that of roll about an X axis, pitch about a Y axis, and yaw about a Z axis, as well as translational coordinates associated with lateral movement including an X, Y, and Z position in a geographic boundary. This can include rotating and moving a gimbal assembly of the treatment unit 1653 to a desired pitch angle 2002 and desired yaw angle 2004 when the treatment unit is configuring and orienting itself to position a nozzle or head of the treatment unit 1653 at a target or aligning a line of sight towards a target for emitting a projectile.

Figure 19A:
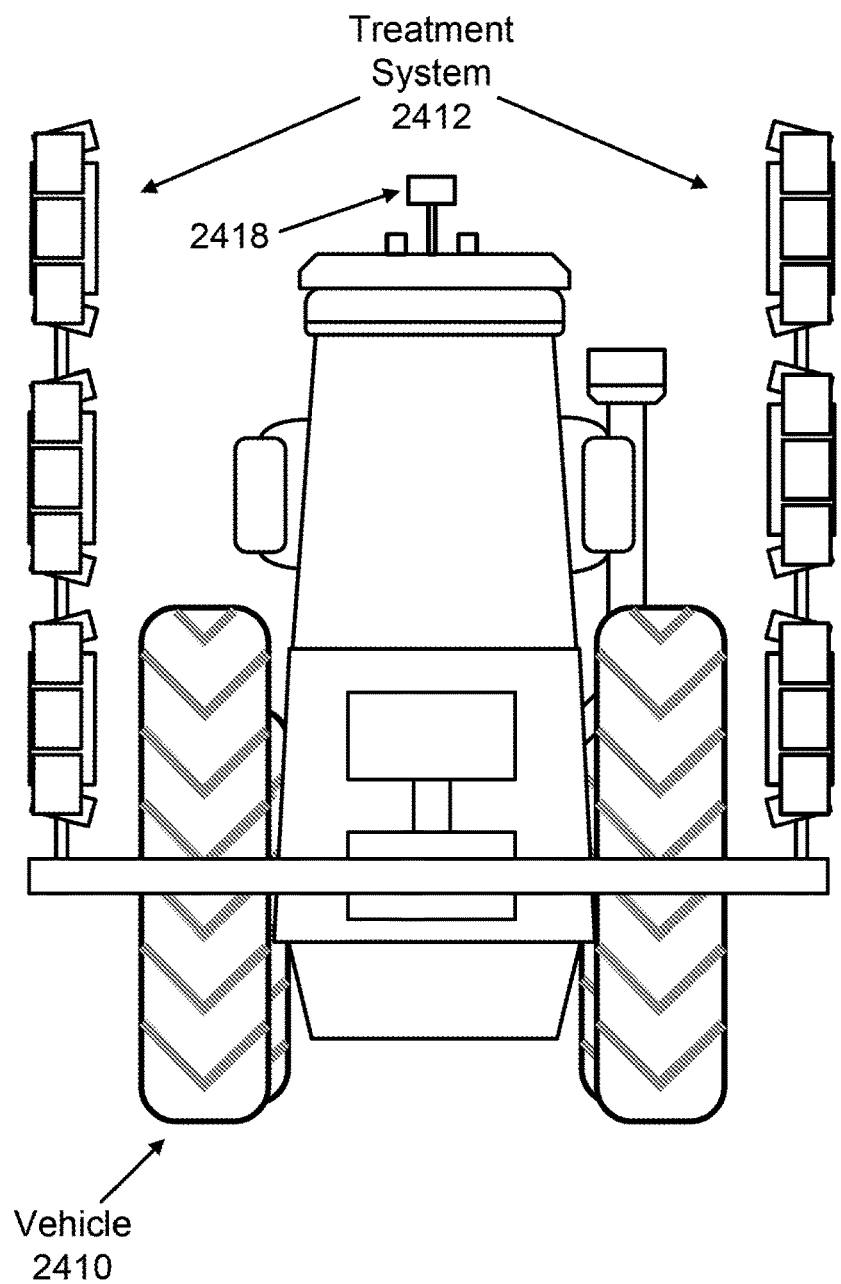
FIG. 19A is a diagram illustrating an example vehicle supporting an example observation and treatment system, according to some examples.
Figure 19B:
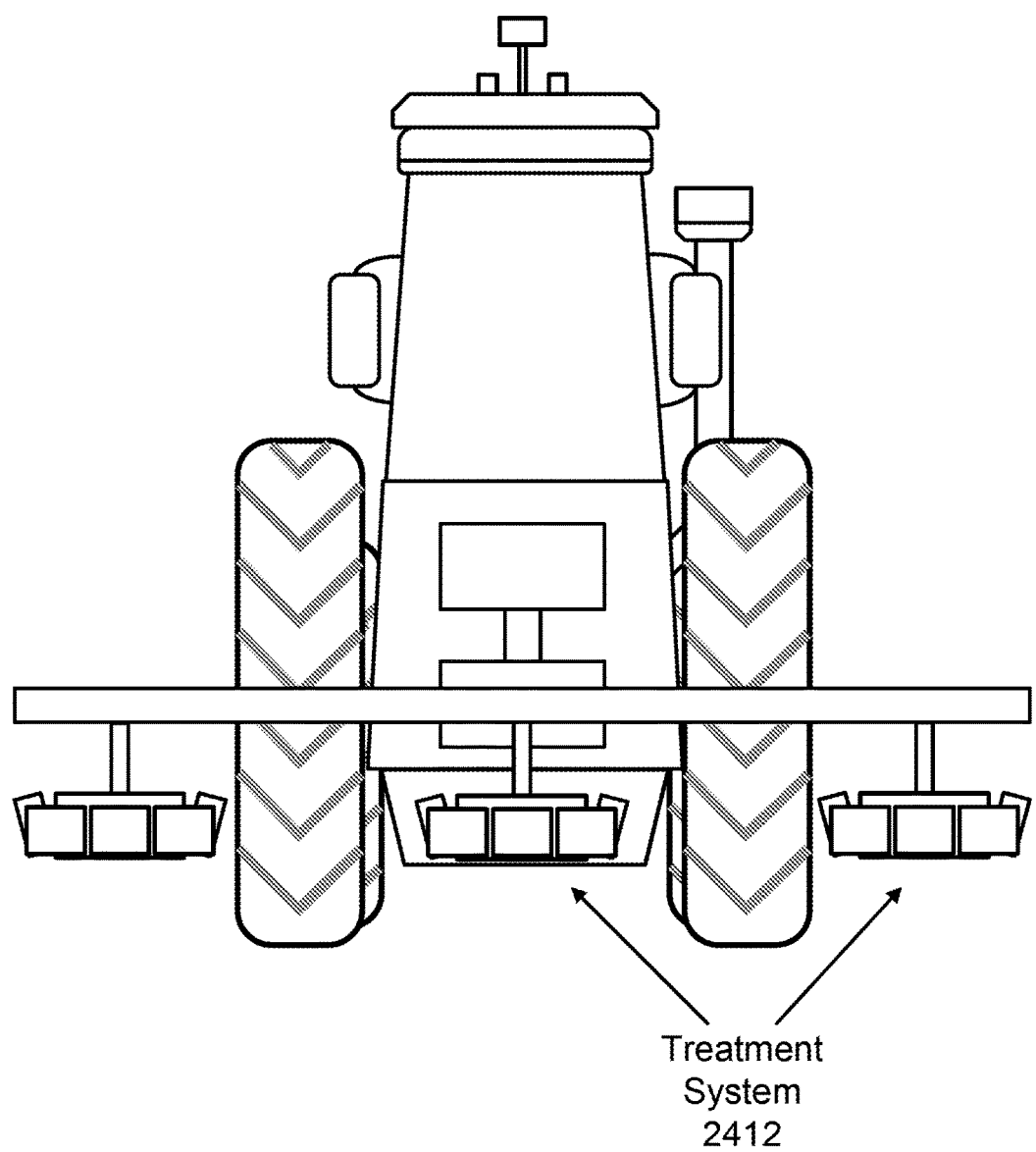
FIG. 19B is a diagram illustrating an example vehicle supporting an example observation and treatment system, according to some examples.

FIG. 19A illustrates a diagram 2400 including a vehicle 2410, having one or more sensors 2418 and other electronic devices, supporting and towing one or more treatments systems 2412. In one example, the vehicle 2410 can be a tractor towing a plurality of modular treatment systems 2412. FIG. 19B illustrates the diagram 2402 with an alternate orientation of the treatment systems 2412 being towed by vehicle 2410.

Figure 20A:
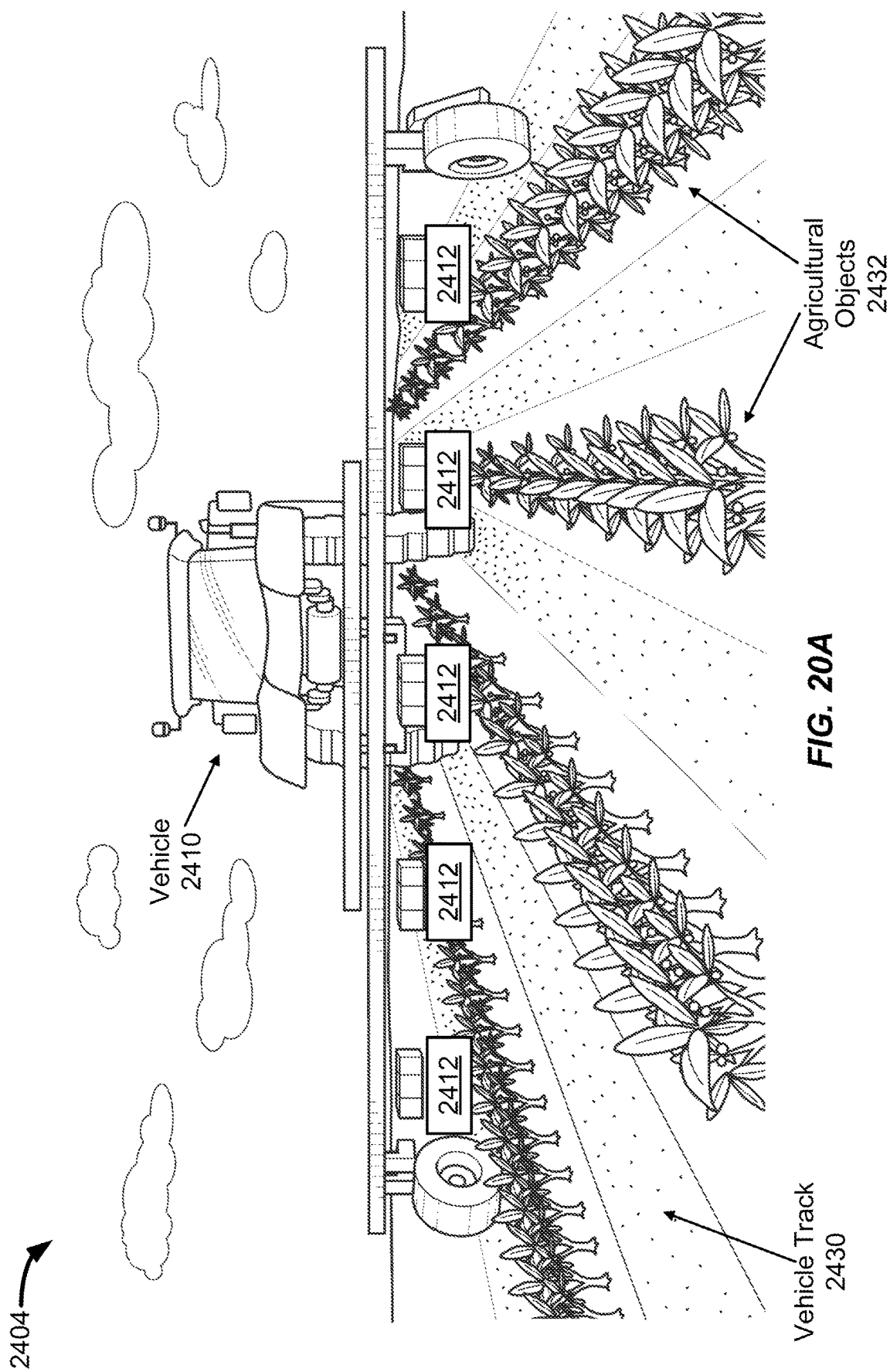
FIG. 20A is a diagram illustrating an example vehicle supporting an example observation and treatment system performing in a geographic boundary, according to some examples.

Further illustrated in FIG. 20A, a vehicle 2410, such as a tractor is configured to tow one or more treatment systems 2412 along a vehicle track 2430 having multiple lanes for the vehicle to operate a geographic boundary. Between each vehicle track 2430 are one or more rows of agricultural objects 2432, such as plant including crop plants and weed plants, for each treatment system 2412 to scan across each row to observe and treat individual plants growing form the ground.

Figure 20B:
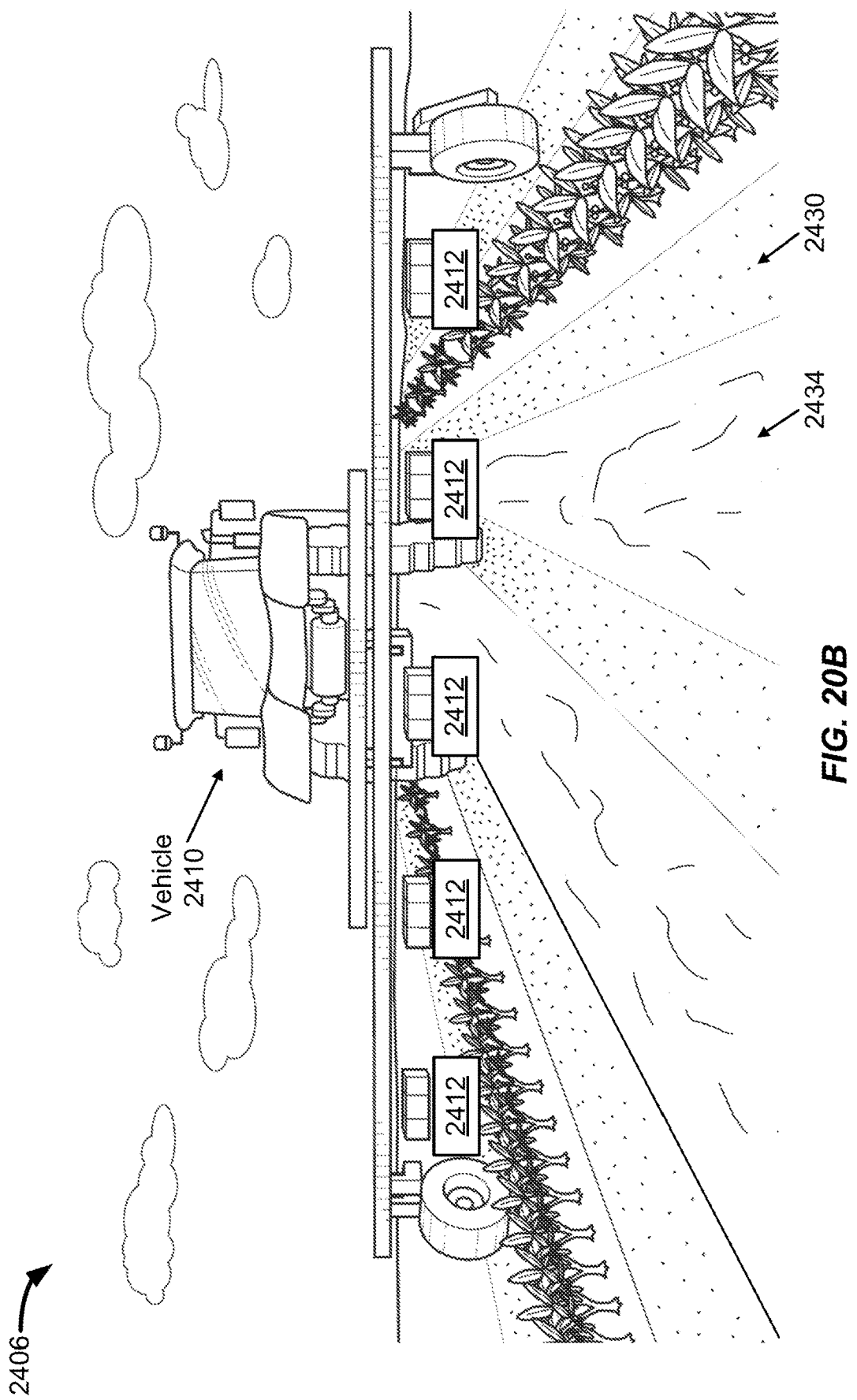
FIG. 20B is a diagram illustrating an example vehicle supporting an example observation and treatment system performing in a geographic boundary, according to some examples.

As illustrated in FIG. 20B, the treatment systems 2412 can be configured to observe a plant, soil, agricultural environment, treat a plant, soil, agricultural environment, or a combination thereof, such as treating a plant for growth, fertilizing, pollinating, protecting and treating its health, thinning, harvesting, or treating a plant for the removal of unwanted plants or organisms, or stopping growth on certain identified plants or portions of a plant, or a combination thereof.

In one example, the treatment systems can be configured to observe and treat soil for soil sampling and mapping of features and chemical compositions of soil including soil deposition, seed deposition, or fertilizer deposition, nutrient management, for both cultivated and uncultivated soil. The agricultural objects described above for targeting and treating can be of specific patches of soil that can be identified and features and classification labelled by a vision of the treatment system. Each patch or region of the soil detected by the treatment system 2412 and can be indexed and mapped with a timestamp associated with the moment the patch or region was sensed and treatment history detailing each treatment applied to each patch or region of the soil.

Figure 21:
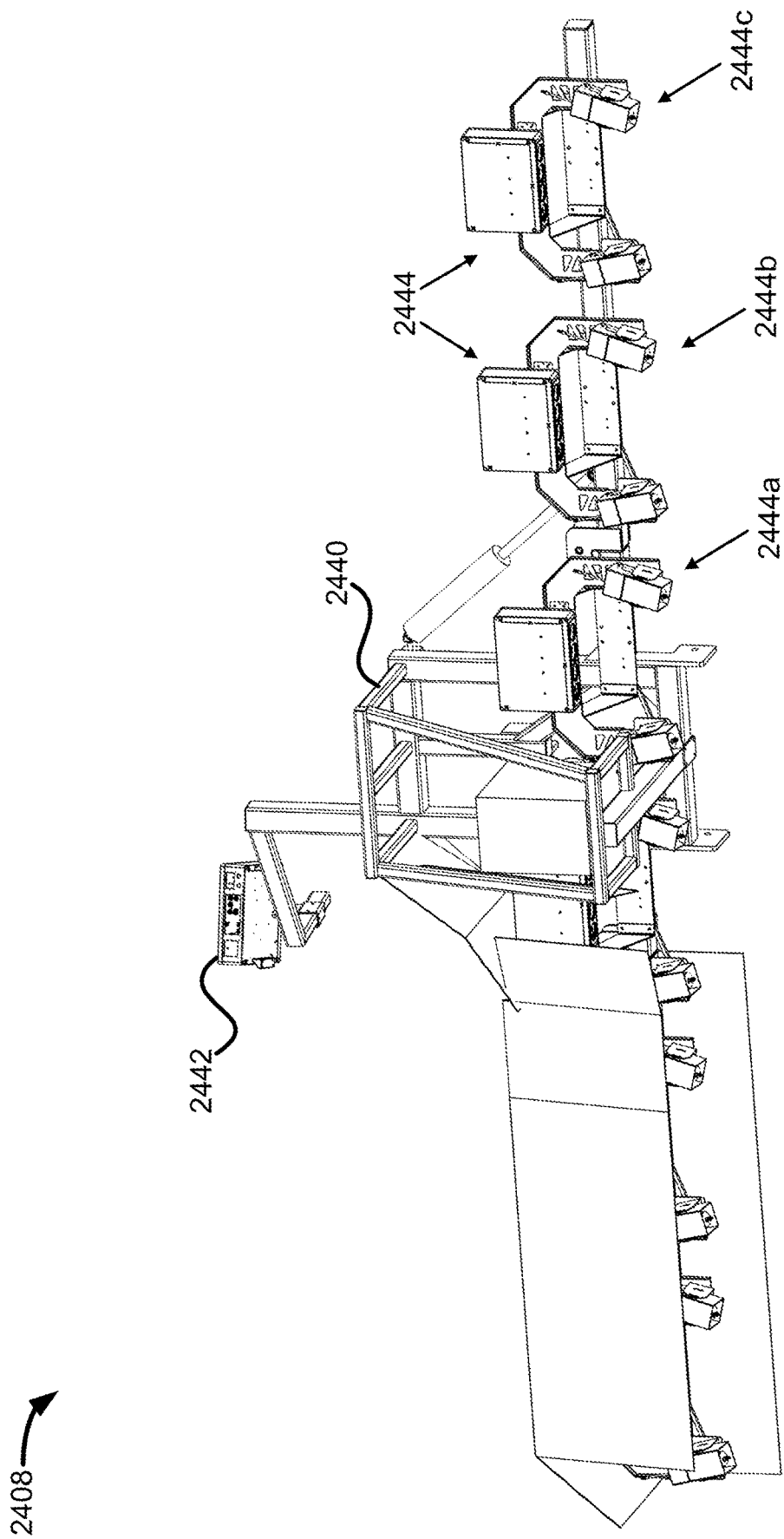
FIG. 21 is a diagram illustrating an example observation and treatment system and components of the observation and treatment system, according to some examples.

FIG. 21 illustrates a diagram 2408 depicting an example treatment system having a plurality of component treatment modules 2444 supported by a support member 2440 and a navigation unit 2442 (various sensor of the navigation unit 2442 may not necessarily be enclosed in a box illustrated in diagram 2408).

In one example, each component treatment module 2444, via its own compute unit and image sensors, and other sensors, can perform VSLAM to continuously map a local environment in the agricultural scene and continuously generate pose estimation, such as a local pose estimation relative to objects or landmarks detected on the ground, such as plant objects, patterns, salient points representing unknown objects near the ground, including target plant objects. Additionally, the navigation unit 2442, via its own compute unit and image sensors, GPS, IMU, and other sensors, can perform VSLAM and VIO to continuously map a global scene and continuously generate a pose estimation, such as a global pose estimation of a global scene. The compute unit of each treatment module 2444, can account for both its locally determined pose estimation relative to objects and landmarks on the ground, and the globally determined pose estimation of a global scene relative to a point of origin in an agricultural environment, such as a farm, because each of the treatment modules 2444*a*, 2444*b*, 2444*c*, etc. are rigidly attached to a support structure supported by a vehicle having sensors located throughout the vehicle associated with the navigation unit such that translation of the vehicle, which includes a change in global pose estimation detected, will have substantially the same translation of each of the component treatment module, and therefore also includes a change in a global pose estimate detected and accounted for each component treatment module.

In one example, tracking multiple poses of each component treatment system, being the local pose generated from local sensors to the component treatment system, and global pose received form the navigation unit, can account for loss and/or inaccuracies of kinetic motion from the vehicle to each of the component treatment systems, particularly the component treatment systems that are farther away from the vehicle itself, relative to modules supported by the vehicle that are closer to the vehicle. This is especially apparent in farming activities where performance of any agricultural observation and treatment system will likely be performed on rough topography such that movement along a path will cause various magnitudes in bumps, and thus change in height, along the path. For example, as a vehicle navigates in a rough terrain, the component treatment module $2444c$ will likely bump up and down more violently than the bumping of component treatment module $2444a$. Thus, it may be impractical for each component treatment system to only determine its local pose estimation from that of the global pose estimation as movement of sensors of the navigation unit $2442$, or that of the navigation unit $2442$ box itself, will be different from the movement of, for example, the component treatment module $2444c$. It this case, each of the component treatment modules $2444$ can determine its local pose to more accurately detect and track targets in real time for treatment actions.

In one example, when a compute unit of the first treatment module $2444$ sends instructions to each of one or more treatment units, for example treatment devices with one or more nozzles on a turret or gimbal mechanism, the agricultural treatment system can determine the specific pose of each of the nozzle heads at the time the treatment module, through local or global poses, global being vehicle and local being at or near each treatment module $2444$, detect and identify an object and its location relative to the treatment module, as well as determine the location of the object in the global scene. At this point, the compute unit of the first treatment module can account for the vehicle's pose of the global scene, that is the global registry of a farm, the pose of the treatment module itself relative to the local first target object, as well as account for the last state of orientation of the treatment unit's nozzle or emitter's line of sight relative to the treatment module. This is because the vehicle, the treatment module, more specifically the treatment module's local sensors, and the treatment unit are all mechanically coupled in a fixed position to each other. Thus, a change in pose estimation generated by sensor signals of the vehicle itself will directly translate to the same change in pose estimation to anything physically supported by the vehicle. -However, calculating for pose at each treatment module as well as accounting for pose of the vehicle, with sensors and computer vision techniques such as performing visual SLAM using machine learning to detect objects to track, particularly for treatment modules that are disposed farther away from the vehicle as compared to other treatment modules closer to the vehicle, and therefore the sensors of the navigation unit $2442$.

In one example, multiple rows where each treatment module $2444$ can determine a pose estimation based on determine its own pose local pose with its local sensors embedded or supported by the module $2444$, and that of the vehicle's pose. Thus, each object identified, can be indexed in the real world such that if the vehicle operates on the same geographic area in a subsequent day, or any subsequent time where a break in operation has occurred, an object detected in the subsequent time can be matched and associated with an object previously identified since in at least both cases, the treatment system determined the location of each object identified in the real world, global scene, by approximating its location in the real world with the treatment system's sensed and determined global map of the geographic boundary and further narrowing down its local position relative to a point in the global map of the geographic boundary to a specific point in the geographic boundary with each of the treatment module's sensed and determined local position of the object relative to the vehicle and/or treatment module.

Figure 22:
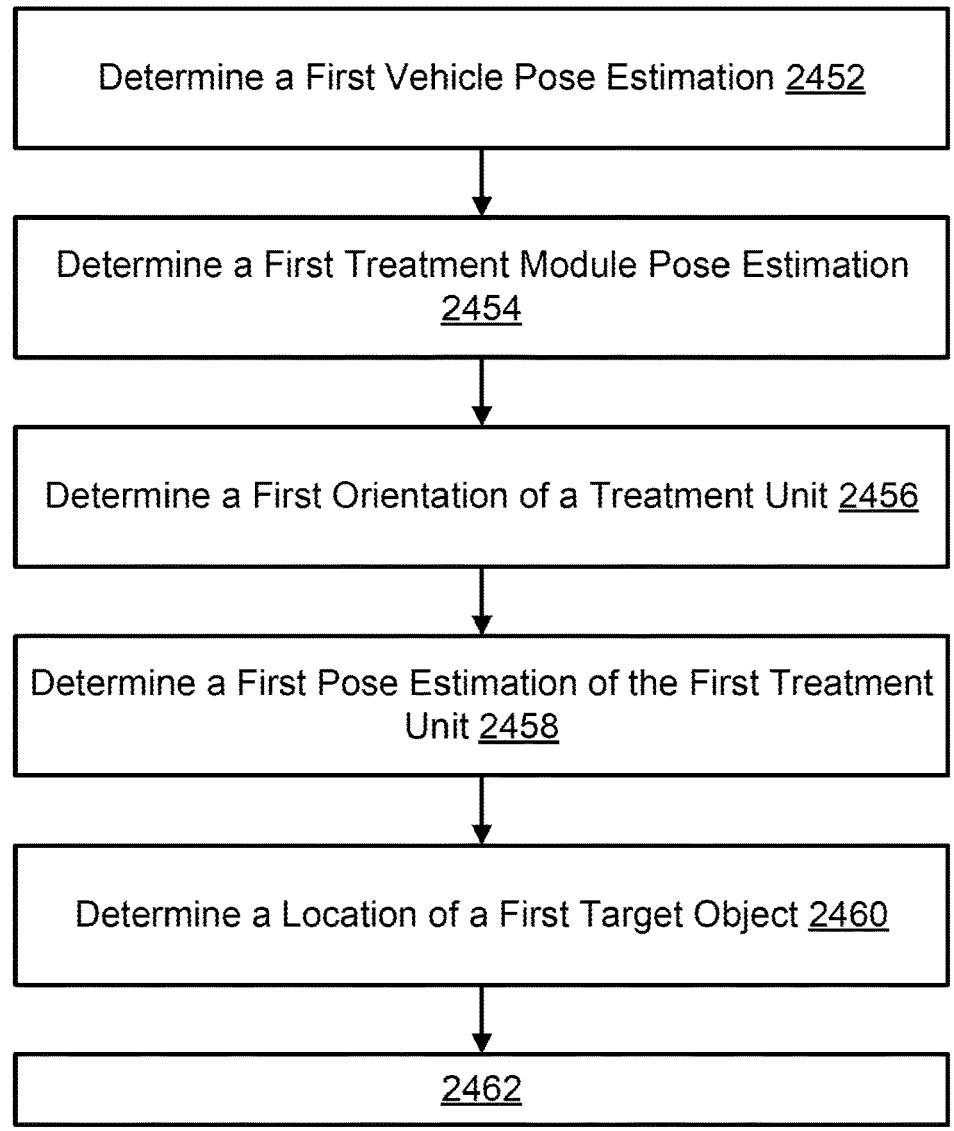
FIG. 22 is a block diagram illustrating an exemplary method that may be performed by an agricultural observation and treatment system, according to some examples.

FIG. 22 illustrates an example method $2450$ that may be performed by some example systems or subsystems described in this disclosure either online, that is onboard a vehicle supporting one or more modular agricultural observation and treatment systems, subsystems, or components of systems, or offline, that is at one or more servers or edge compute devices. For example, at step $2452$, an agricultural observation and treatment system can determine a first vehicle pose estimation. At step $2454$, the agricultural observation and treatment system can determine a first treatment module pose estimation. At step $2456$, the agricultural observation and treatment system can determine a first orientation of a treatment unit. At step $2458$, the agricultural observation and treatment system can determine a first pose estimation of the first treatment unit. This is done by accounting for the pose estimation of the first treatment module operably and rigidly connected to the treatment unit and knowing the prior orientation, such as the first orientation, of a treatment head of the treatment unit, such as the orientation of the treatment head when it last sprayed a projectile. At step $2460$, the agricultural observation and treatment system can determine a location of a first target object.

Figure 23:
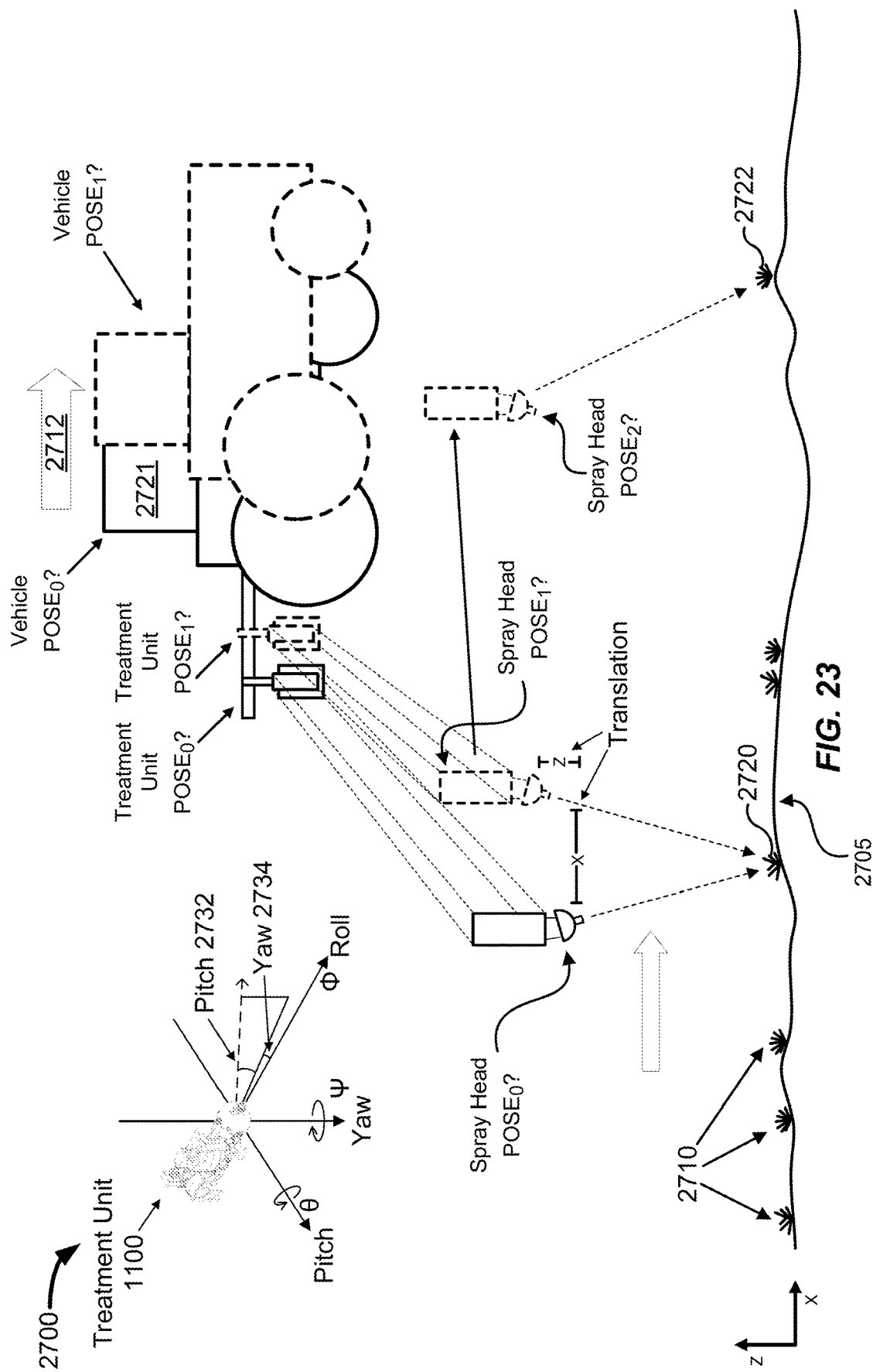
FIG. 23 is a diagram illustrating a treatment system observing an environment and performing actions in a geographic boundary, according to some examples.

FIG. 23 is a diagram illustrating pose determination of the agricultural observation and treatment system, according to some examples. The figure illustrates an example of a vehicle $2721$ with treatment unit $1653$ attached. A vehicle $2721$ is shown moving along a path $2712$. For example, as illustrated in FIG. 23, a vehicle $2721$, such as a tractor may be configured to tow one or more treatment systems along a vehicle track have multiple lanes for the vehicle $2721$ and tow support.

If the vehicle $2721$ were to remain in a stopped positioned, the system $400$ could spray the target object $2720$ and then move onto the next target object, and then stop and spray the next target object. However, the system $400$ is flexibly configured to allow the continuous movement of vehicle $2721$ and make adjustments to the position of the spraying head of the treatment unit $1653$. While the vehicle $2721$ is moving along the path, the system $400$ may determine a pose for the vehicle (e.g., Vehicle $POSE_0$, Vehicle $POSE_1$, Vehicle $POSE_2$ . . . Vehicle $POSE_n$ and/or for the treatment unit $1653$ ((e.g., Unit $POSE_0$, Unit $POSE_1$, Unit $POSE_2$ . . . Unit $POSE_n$. For example, using onboard navigation and IMU sub-systems, the system $400$ may determine multiple locations or positions of the vehicle while the vehicle is moving along the path $2712$.

As noted above, the treatment unit $1653$ emits at fluid at a target object $2720$. While the vehicle $2721$ is moving, the system $400$ determines a translation of Vehicle $POSE_n$ and/or the Unit $POSE_n$ to a Spray $POSE_n$ such that spraying head is oriented or positioned to allow an emitted projectile fluid to spray upon a desired target object. For example, the system $400$ may determine that a target object $2720$ is to be treated. The system $400$ determines a Vehicle $POSE_0$ and/or a Treatment Unit $POSE_0$. The system $400$ will provide instructions/signals to the motors of the treatment unit $1653$ to adjust one or more axis (e.g., pitch $2732$, yaw $2734$ and/or roll) of the spraying head. As the vehicle $2721$ move along the path $2712$, the system $400$ periodically determines n poses of the vehicle 2721 and/or the treatment unit 1653. The system 400 then translates the periodically determined n poses to an n spraying head pose such that the treatment unit may continually spray the target object 2720 while the vehicle is moving. The system 100 may evaluate speed, movement, velocity, direction, altitude, location of the vehicle 2721 and/or treatment unit 1653 and determine a pose for the spray head.

As used herein, pose may be understood to be a location and orientation of an object relative to a frame of reference (e.g., x, y, z, phi, theta, psi, where x=an x-axis coordinate in a 3-dimensional coordinate system, y=a y-axis coordinate in a 3-dimensional coordinate system, z=a z-axis coordinate in a 3-dimensional coordinate system, phi=degree or position of roll, theta=degree or position of pitch, psi=degree or position of yaw. For example, the agricultural treatment system may determine pitch, roll and yaw values of the vehicle, treatment unit and or the spraying head assembly. In some embodiments, the agricultural treatment system may not be configured to identify a pitch, roll and/or yaw of the vehicle, treatment unit and or spraying head. In such instances, the value for these variables may be set to zero.

A global frame of reference may be provided for an environment in which the agricultural treatment system operates. For example, a global frame of reference may be set to a particular geospatial location or the fixed reference point on a property (e.g., a corner of a barn, structure, a 5 g/wifi/gps tower, etc.). The point of reference may be defined as (x=0, y=0, z=0, phi=0, theta=0, psi=0). The agricultural treatment system may determine multiple poses of the vehicle, in relation to the point of reference, as the vehicle moves about the environment. The pose of the vehicle may be defined as vehicle $(x_n, y_n, z_n, phi_n, theta_n, psi_n)_{time\_interval}$, the system may determine the nth values at a particular time interval being sampled at a particular sample rate (such as 200-5000 times a second). The agricultural treatment system may also determine a pose for a treatment unit, such as treatment unit $(x_n, y_n, z_n, phi_n, theta_n, psi_n)_{time\_interval}$. The agricultural treatment system may also determine a pose for a sprayer head of the treatment unit, such as spraying head $(x_n, y_n, z_n, phi_n, theta_n, psi_n)_{time\_interval}$. The sprayer head may have a pose relative to the vehicle pose, may have a pose relative to the treatment unit pose and/or may have a pose directly in relation to the global frame of reference. The agricultural treatment system may determine a final spraying head (x, y, z, rho, theta, psi) pose to be used to adjust the spraying head to a different position. The final pose can be relative to the body of the treatment unit, the sprayer apparatus components, the vehicle or components thereof, and/or relative to some (0,0,0,0,0,0) location of the farm.

As described herein, the agricultural treatment system may determine the pose of the vehicle and/or treatment unit and translate the pose into commands or instructions to adjust a spraying head assembly to emitted fluid at a desired target object. In other words, the agricultural treatment system may identify a target object to be sprayed, orient a spraying head assembly to the target object and then control fluid spraying operations to emit fluid from one or more fluid sources at the target object. The system can move along a path and make adjustments to the spraying head assembly such that the fluid is continuously sprayed at the target object and/or detect new target object(s) to be sprayed and then position the spraying head assembly to the detected new target object(s).

While the above describes pose determination for a vehicle or treatment unit, the system may determine a pose for any part or object of the system (e.g., a seat, the vehicle, a wheel, treatment unit, spraying head, spray box, turret, nozzle tip, etc.). The pose may be determined with one or more different sensors (e.g., a camera positioned can obtain imagery of different parts or components), and the system can estimate the pose of the parts or components. The system may use computer vision, lidar, radar, sonar, GPS, vslam, wheel encoders, motor encoders, IMU, cameras on a spray box. In some embodiments, the system may be configured to determine, for example, the vehicle and multiple treatment units. This may be done for example where the vehicle is pulling a trailer with many spray boxes places along a frame or support that has many wheels. Each of the spray boxes may have different poses due to the ruggedness or unevenness of the terrain.

The system may be configured to determine particular poses of the vehicle as a global pose and the treatment units as a local pose. A local pose for each treatment unit may be determined in relationship to the global pose, and/or may be determined individually for the treatment without relationship to the global pose. The system may use the global pose (a.k.a. vehicle pose) as a localization method to determine its relationship to a real-world environment. And the system sensors may obtain information about the real-world environment. The allows the system to build a high map of an agricultural environment (such as a farm). In one embodiment, the system uses a navbox and sensors to determine the global pose.

The system may use the local pose of a particular component for certain operations. As discussed herein, the system may determine a pose for a treatment unit and a spraying head. The system would use the local pose of these components to determine its physical relationship as between the component and a target object. For example, two different treatment units may each have a spraying head. A first treatment unit and spraying head may need to spray a first target object. A second treatment unit and spraying head may need to spray a second target object. In this situation, the system may determine a pose for each spraying unit and each of the spraying heads, and then maneuver or orient the spray nozzle of the spraying heads toward their respective target object. In one embodiment, the system would use the local poses to orient the spraying heads to emit a projectile fluid at the respective target objects.

In one example, the agricultural treatment system determines multiple vehicle and/or treatment unit poses. The system evaluates a first pose, and then periodically determine subsequent poses. The system may calculate the difference or changes of the coordinate values from the first pose and a subsequently obtained posed. In other words, the system may calculate the movement of the vehicle and/or treatment unit. The calculated difference or changes then may be translated to a desired pose for the spraying head. The sample rate of the pose can be configured as set rate or a variable rate. For example, the system may evaluate its pose at predetermined intervals, such as 5 milliseconds. In an alternate configures, the system may use a variable sample rate such that when the vehicle speed increase, the pose determination rate increases. For example, the sample rate for determining a pose may be 5 milliseconds where the vehicle speed is from 1-3 mph, and the sample rate increase to a higher rate, such as every 2 milliseconds, where the vehicle speed is over 3 mph.

In one example, pose for the vehicle may be determined by evaluating data from various sources, such as onboard cameras, GPS, IMU's, wheel encoders, steering wheel encoders, LiDAR, RADAR, SONAR, and additional sensors that may be used to determine the vehicles position in a real-world environment. The system for example may evaluate the sensor data for example at 200-5000 hz.

In one example, pose for a treatment unit 2800 may be determined in similar manner to the vehicle, as one or more treatment units would be configured in a fixed position in relationship to the vehicle. A change in pose of the vehicle may be considered to be the same change in pose of the treatment unit. The treatment unit may have one or more processors and microcontrollers to monitor and determine the pose of the treatment. The processors and microcontrollers are configured to keep track of treatment unit pose. The treatment unit process periodically requests from a vehicle processor system pose information for the vehicle. The treatment unit process may then determine its pose by using the pose of the vehicle and may offset the pose of the vehicle based on a distance value from where a respective treatment unit is positioned relative to the point of where the pose is determined for the vehicle. As discussed herein, the agricultural treatment system may include multiple treatment units. Each of the processor of the respective treatment unit may determine the pose for the treatment unit. Thus, each of the treatment units may have a unique pose relative to the determined vehicle pose.

Each of the treatment unit processors and microcontrollers may determine a spraying head pose. As noted above, each of the treatment unit continually poll or request a vehicle pose from the vehicle's computer system and may determine a treatment unit pose. The treatment unit processors are configured to determine and evaluate the positions of the motors via the encoders coupled to the motors. The treatment unit processer obtains information from the microcontroller 2875 of the treatment unit regarding the encoder output. In other words, the encoders provide data output about motors' position and/or rotational movement. The microcontroller receives the encoder output data and provides the data to the treatment unit processor. Similarly, the microcontroller may receive instructions or data from the treatment unit processor, and the microcontroller in turn may provide or translate the received instructions or data to instructions, voltage and/or commands to that cause the motors to rotate in one direction or the other. The axial rotation of the motor then causes the linkage assemblies to rotate thereby causing the spraying head to change. The treatment unit processor may determine a spraying head pose and provide instructions to the microcontroller 2875 to then make adjustments to each of the motors such the that the spraying head is adjusted to the desired spaying head pose.

In one example, a first 3-dimensional coordinate system may be used for the vehicle and/or treatment unit pose, and a second 3-dimensional coordinate system may be used for the spraying head. Changes in the first 3-dimensional coordinate system may be mapped to the second 3-dimensional system. Distance moved in the second 3-dimensional coordinate system may then be calculated and the distance moved can be translated into instructions/commands to rotate the motors by a certain amount, degree or time to achieve a desired position of the motor.

While the above discussion, focuses on an example of a single treatment unit, the system may determine poses for multiple treatment units and adjust the pose of the respective unit spraying head such that each of the spraying heads may lock on to their respective target objects.

Figure 24:
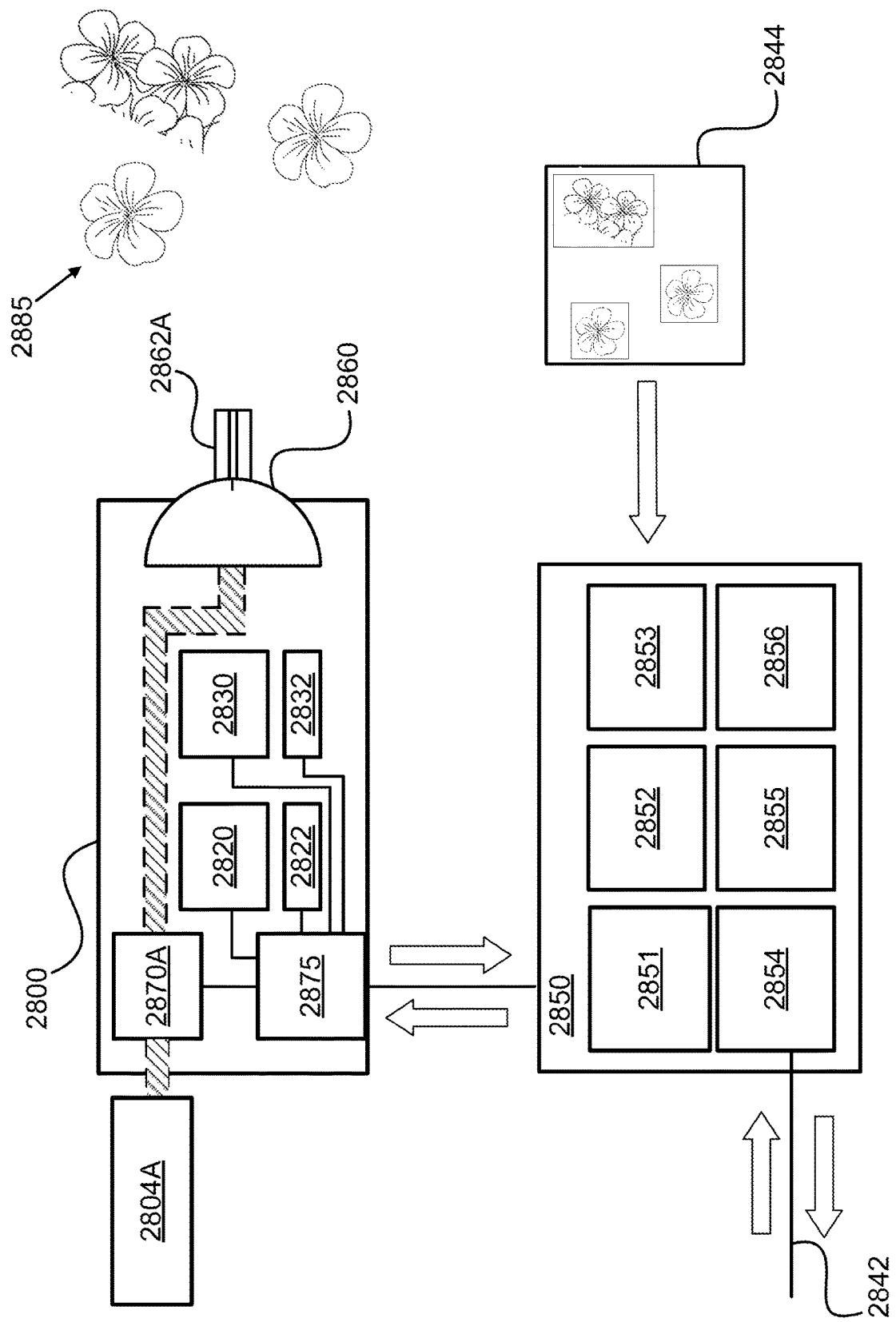
FIG. 24 is a diagram illustrating an example configuration of a system with a treatment unit having an example configuration of a fluid source and fluid flow mechanisms.

FIG. 24 is a block diagram illustrating an example configuration of the system with treatment unit 2800 configured for various fluid source and spraying tip options as well as light source and laser emitting tip options. In one example, the agricultural treatment system has onboard circuitry, processors and sensors that allows the system to obtain imagery of agricultural objects and then identify a target object to be sprayed. Furthermore, the agricultural treatment system has onboard circuitry, process and sensors that allows the system to determine position of the vehicle and/or treatment unit in a three-dimensional space. Moreover, the agricultural treatment system includes other cameras and computer vision sensor to obtain and process imagery of external real-world objects 2884. For example, block 2850 illustrates a subsystem having a computer unit 2851, communication channel 2854, cameras 2853, machine learning model and computer vision algorithm 2855, lights 2856, and other sensors 2852. For example, the system may use GPS location data, IMU data to identify inertial movement and distance moved. Over a period of time, the system may determine multiple poses of the vehicle and/or treatment unit and convert/translate these poses that the spraying head would need to be positioned into such that the spraying head would maintain an emit spray at the target object while the vehicle is moving.

The subsystem 2850 interacts with a treatment unit 2800. While a single treatment unit is shown, the subsystem 2850 may interact with and control multiple treatment units. Generally, the treatment unit 2800 includes a microcontroller that is operably coupled with one or more solenoids 2870, pumps, multiple motors 2820, 2830 and multiple encoders 2822, 2832. The treatment unit 2800 may draw fluid from one or more source tanks 2804. The subsystem 2850 may communication via communications channel 2842 with another computer system. For example, the subsystem 2850 may receive global registry information and data (e.g., global registry information such as GPS location data, IMU data, VSLAM data, etc.)

The microcontroller 2875 may control or interact with the pump, solenoid 2870A, motors 2820, 2830 and encoders 2822, 2832 to position the treatment head assembly 2860 and emit fluid from one or more fluid sources. For example, based on interaction with the subsystem 2850, the treatment unit 2800 may control the position of a treatment head assembly 2860 to orient the treatment head assembly 2860 such that the treatment head assembly 2860 may emit a fluid at a target object 2885. In one example, the system includes a treatment unit with a single fluid source tank 2804A and a single solenoid 2870A, and a spraying head 2862A with a single port.

In one example, the treatment unit 2800 can include multiple fluid sources that may be combined or mixed with a primary fluid source. The micro controller 2875 may operate a solenoid 2870A to control the flow of a primary fluid source, such as water. The primary fluid source may then be combined with one or more secondary fluid sources disposed near the treatment head. The secondary fluid sources may be concentrated chemicals or fertilizers that are mixed with the primary fluid source to dilute the concentrated chemicals and create a chemical mixture as the primary fluid source travels close to the end of the line from a tank, to the treatment head assembly 2860. While not shown, each of the secondary fluid sources may be controlled via separate solenoids and pumps to cause the secondary fluid sources to disperse fluid from a tank. The combined mixture of the primary fluid source and the one or more secondary fluid sources are then emitted via the spraying head assembly 2860 via spraying tip 2862A with a single port.

Figure 25:
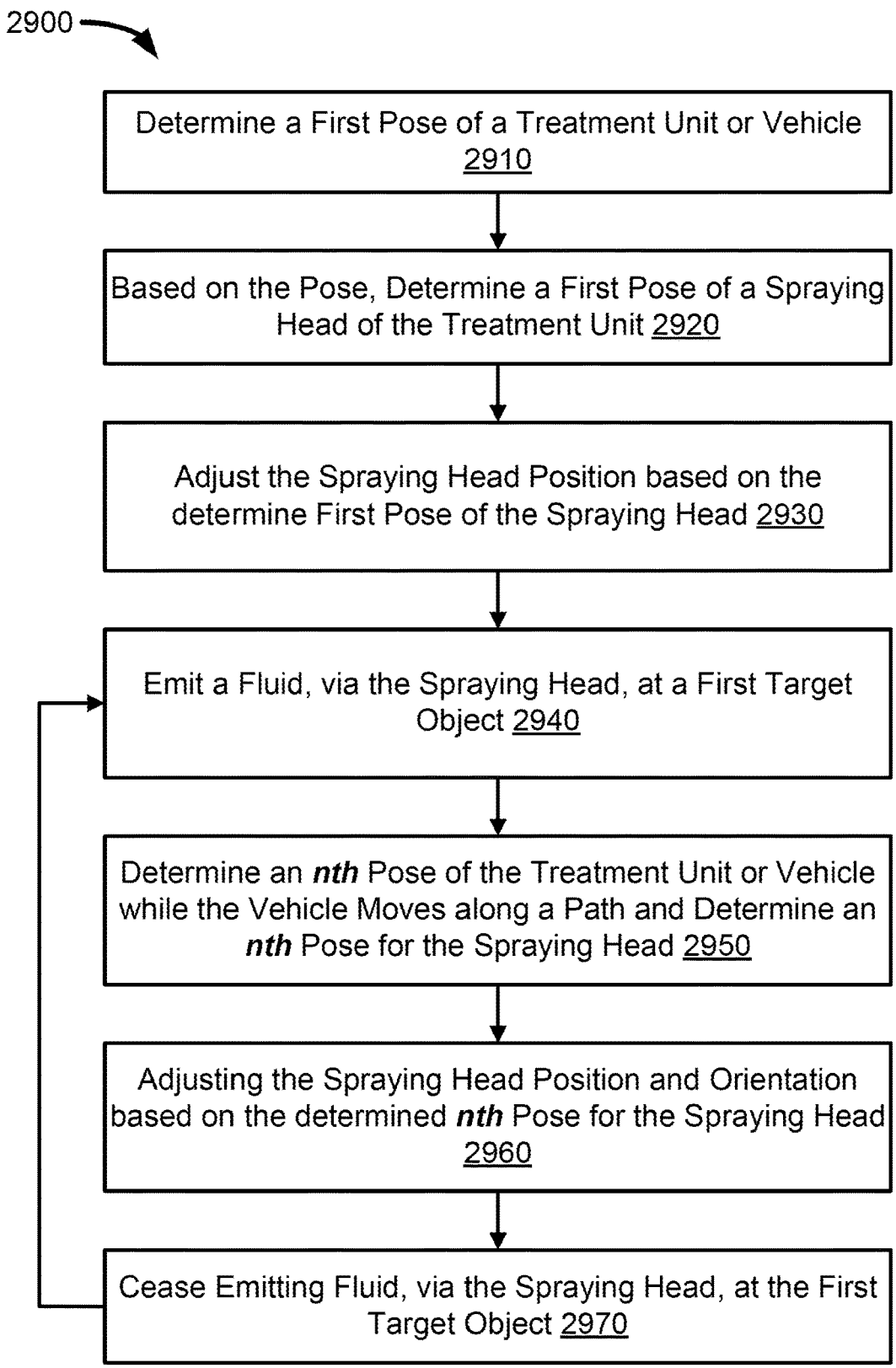
FIG. 25 is a block diagram illustrating an exemplary method that may be performed by an agricultural observation and treatment system, according to some examples.

FIG. 25 illustrates example implementations of method 2900 that may be performed by some example systems described above. For example, in one mode of operation, at step 2910, the agricultural treatment system determines a first pose of a treatment unit or vehicle. The determination of the pose is described above as to FIGS. 23 and 28. At step 2920, the agricultural treatment system, translates the first pose of the of the treatment unit or vehicle, and determines a first pose of a spraying head of the treatment unit. At step 2930, the agricultural treatment system adjusts the spraying head position based on the determined first pose of the spraying head. The spraying head, for example, may be repositioned by instructing one or more motors of the agricultural treatment system to rotate, thereby causing the spraying head to pivot or rotate along one or more axis. At step 2940, the agricultural treatment system controls a fluid flow regulator (such as a solenoid or another control device) to allow fluid to be emitted from the spraying head at a target object. The vehicle may move along a path, and while doing so the agricultural treatment system may periodically determine n poses. At step 2950, the agricultural treatment system determines an nth pose of the treatment unit and/or vehicle while the vehicle moves along a path and determines a nth pose for the spraying head. At step 2960, the agricultural treatment system adjusts the spraying head position based on the determined nth pose of the spraying head. Steps 2940 through 2970 may be repeated. The periodic pose determine process allows the agricultural treatment system to continually adjust the spraying head while the vehicle is moving so at to maintain the emitted spray at the target object.

While the agricultural treatment system moves along a path, the system may continuously evaluate for additional target objects to be sprayed using one or more treatment units. As described above, the spraying head assembly may be positioned such that a fluid may be emitted at an identified target object. After a target object is sprayed with a fluid, the system may instruct the spraying head assembly to reposition to a ready position, such as the neutral position of x=0, y=0, or at some other ready position. For example, while the vehicle is moving forward a spraying head assembly may be pointed towards the forward path of movement. Doing so would allow (i.e., get ready) the spraying head assembly to be in a ready position when a new target object is detected. The system may instruct the treatment unit spraying head assembly to move into the ready position when the system is initially powered on. Moreover, the system may instruct a particular treatment unit spraying head assembly to move into the ready position after the spraying of a then current target object is completed. Moving the spraying head assembly into a forward ready position allows the agricultural treatment system to readily start spraying subsequent target objects as soon as they are detected without first having to move the spraying head to the target object.

In one example, the treatment unit 2500, may have a high-powered laser unit or laser chip embedded in or supported by the treatment unit 2500, can be configured to treat portions of plants that are larger than plant typically only grow a few inches or feet above the ground. These plants can include trees, orchard trees, or other plants with one or more trunks, shrubs, bushes, or other plants grown on trellises or other human made mechanisms such that a horizontally or top mounted treatment unit 2500 is more practical rather than a treatment unit substantially pointing at the ground with rotational freedom.

While the above disclosure contemplates the control of a spraying head assembly for the emission of a projectile fluid, the spraying head assembly may be replaced with a controllable laser head assembly. Also, a laser source may be attached to the spraying head assembly. The system may control the positioning of a laser head assembly to position the laser head assembly to direct an emitted laser beam at a target object. The laser beam may be used, for example, to ablate, bum or otherwise treat the target object with a laser light beam. Additionally, different laser beams of different wave lengths may be configured on the laser head assembly. The laser light may be focused to a desired diameter to treat a target object. In one embodiment, the spraying head includes a spraying nozzle and a laser emitting tip and may be disposed next to each other such that either a laser or a spray nozzle can activate upon targeting an object of interest for treatment.

The system may treat the target object based on the identified target object. For example, the system may set operative parameters of the laser to treat the target object (such as duration, frequency, wavelength, laser pulse repetition, etc.). Different target objects may be treated with different parameters using emitted laser light from the treatment head.

In one embodiment, the agricultural treatment system may be configured to monitor the health of the spraying head and determine whether the spraying head is accurately emitting a fluid at a target object. In some instances, the spraying tip may build up residue or other particulate. For example, the spraying head may disperse a fluid containing a solution of salts or of other compounds. Over time, salts or other compounds from the solutions may build up on the outer surface of the spraying head tip and cause an emitted fluid to deviate from an intended projected course. In other words, the emitted fluid may miss an intended target object if the emitted fluid deviates in its projected direction.

The system may correct for a deviation of the projected fluid by adjusting the spraying head to account for the deviation. As the fluid is emitted from the spraying head, an onboard camera may obtain imagery of the fluid as the fluid is emitted or projected at an intended target object. The system may determine whether or not the intended target object was actually sprayed by the emitted fluid. The system may calculate an adjustment by determining a distance and position of where the emitted fluid was actually sent, and where the fluid should have landed on the target object. The system then can determine an offset to make a spraying head positional adjustment such that subsequent emitted fluids would land at an intended location of the target object.

In one mode, the system may continuously emit fluid in a spray or in bursts of fluid, and then determine the location of where the fluid is projected. The system may make slight or micro adjustments to the position of the spraying head assembly until the emitted fluid is sprayed at the target object at an intended location. The positional adjustment values then may be used as an offset for subsequent spraying. For example, an emitted spray may be spraying 1.5 inches to the left of an intended location of a target object. The system can then move the spraying head towards the right of the target object and determine when an emitted projectile fluid accurately hits the target object. This allows the system to determine what position or distance the spraying head needs to move to correct for spraying location error.

In one example, the system may use computer vision to track a target object while the vehicle is in motion. The system may evaluate imagery of a target object with onboard cameras. The system may determine the position of features or objects in an image and evaluate the positional changes of pixels of the object moving in the image. The system may translate the pixel movement to adjustments to the spraying head assembly such that the system adjusts the spraying head assembly so that the treatment unit accurately emits a fluid at the target object.

This process of correcting for spraying head projectile deviation may also be used when a new spraying head tip is attached the spraying head assembly. This process allows for initial configuration of a treatment unit to identify and correct for any deviation of an emitted fluid from the spraying tip.

Figure 26:
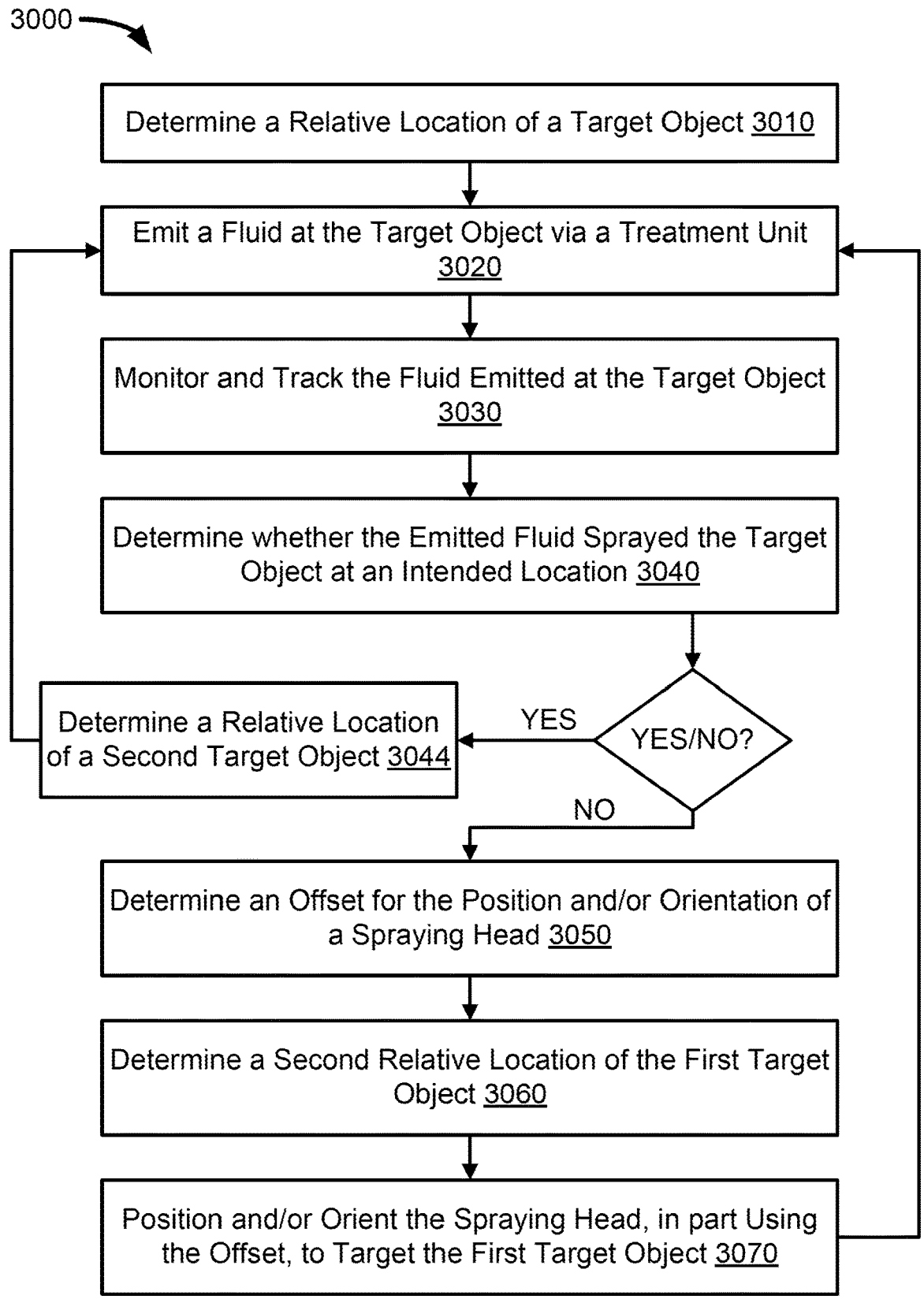
FIG. 26 is a block diagram illustrating an exemplary method that may be performed by an agricultural observation and treatment system, according to some examples.

FIG. 26 illustrates example implementations of method 3000 that may be performed by some example systems described above. At step 3010, the agricultural treatment system determines a relative location of a target object. At step 3020, the system may emit a fluid at the target object via a treatment unit. At step 3030, the system monitors and tracks the fluid emitted at the target object. At step 3040, the system determines whether the emitted fluid sprayed at the target object at an intended location. If yes, then at step 3044, the system determines a relative location of a second target object and continues to step 3020. If no, then at step 3050, the system determines an offset for the position and/or orientation of a spraying head. Next at step 3060, the system determines a second relative location of the first target object. Then at step 3070, the system positions and/or orients the spraying head, in part, using the offset, to target the first target object.

For example, the agricultural treatment system may determine a first target object to be sprayed. The treatment unit emits a fluid at the first target object via a spraying head. The system may use an onboard computer vision system to monitor the emitted fluid at the target object. The system determines whether the emitted fluid sprayed the target object at an intended location. The system may evaluate obtained digital images and identify whether or not the emitted fluid actually sprayed the target object. The system may also determine at what distance and location the projectile stream deviated from the target object. The system may determine an offset for the position of the spraying head. For example, the system may calculate a positional adjustment to the spraying head so that the spraying head would spray the fluid at an intended target object. The system then may spray subsequent target objects. The system may determine a second target object to be sprayed. The system may then emit a fluid at the second target object via the spraying head using the offset. For example, the spraying head would be positioned in part using the determined offset.

Figure 27:
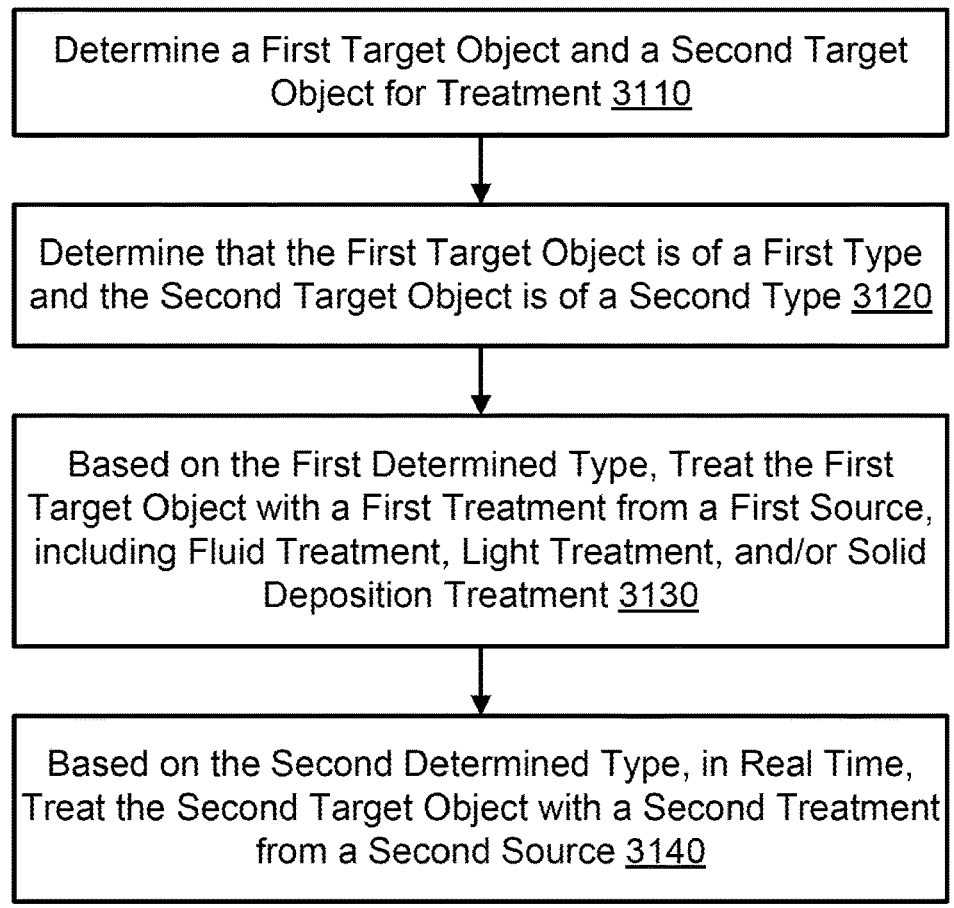
FIG. 27 is a block diagram illustrating an exemplary method that may be performed by an agricultural observation and treatment system, according to some examples.

FIG. 27 illustrates example implementations of method 2600 that may be performed by some example systems described above. The agricultural treatment system may identify and determine that multiple targets are in close proximity to one another and a particular target object can be treated while the spraying head assembly is positioned to emit fluids toward one of the target objects. The treatment unit may be configured such that system may emit a fluid from one source tank at a first target object, and then emit a second fluid from another source tank. At step 3110, the system determines a first target object and a second target object for treatment. At step 3120, the system determines that the first target object is a first type of a target object, and the second target object is of a second type of a target object. For example, the system may recognize the particular type of a target object using various computer vision and object detection techniques. At step 3130, based on the first determined object type, the system may treat the first target object with a first treatment from a first fluid source. The system may cause fluid from a first source tank to be emitted at the first target object. At step 3140, based on the second determined object type, treat the second target object with a second treatment from a second fluid source. For example, two target objects may be identified being close in proximately to one another.

Figure 28:
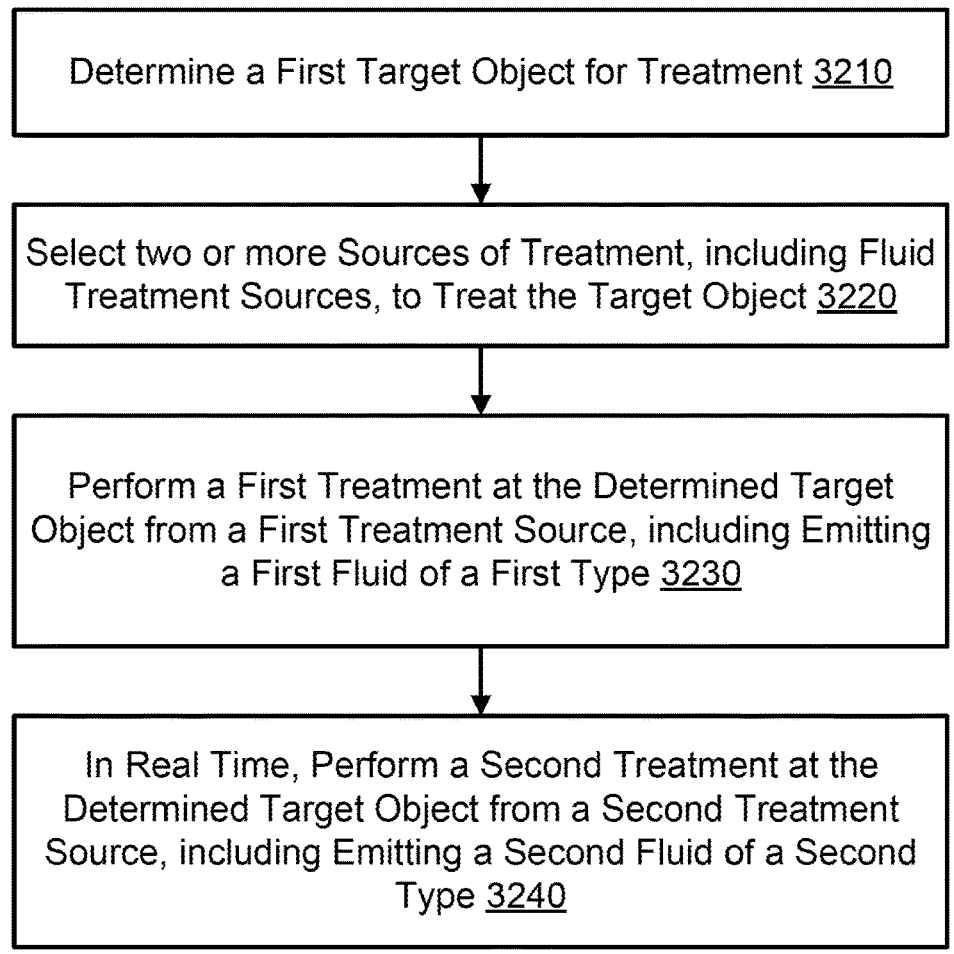
FIG. 28 is a block diagram illustrating an exemplary method that may be performed by an agricultural observation and treatment system, according to some examples.

FIG. 28 illustrates example implementations of method 3200 that may be performed by some embodiments of the systems described above. A treatment unit may pump fluid from different or multiple tank sources and treat a target object by emitting fluid from the different tank sources. For example, it may be desirable in some instances, to treat a particular type of a target object, such as a bud or a flower, with fluid from multiple tank sources, whereas a further developed agricultural object, may only need treatment from one of the tank sources. At step 3210, the system may determine a first target object for treatment. As discussed herein, the system may identify a target object to be treated. At step 3220, based on a first determined target object, the system may select from two or more fluid sources to treat the target object. As discussed herein, the system may include multiple tanks or containers of different fluids that may be used to treat a target object. The treatment unit may be configured to cause fluid pumped from the multiple tanks to be mixed together and emitted from a single spraying tip port, pumped separately and emitted sequentially from one source tank and then another, or may be emitted from a tip that has multiple spraying tip ports (e.g., a 4-port spraying tip). At step 3230, the treatment unit emit a first fluid at the determined target object from a first fluid source. At step 3240, the treatment unit emits a second fluid at the determined target object from the second fluid source. The system may determine that the target object is of a particular type of object, and the select from one or more source tanks to pump fluid and then treat the target object with the fluid.

Figure 29:
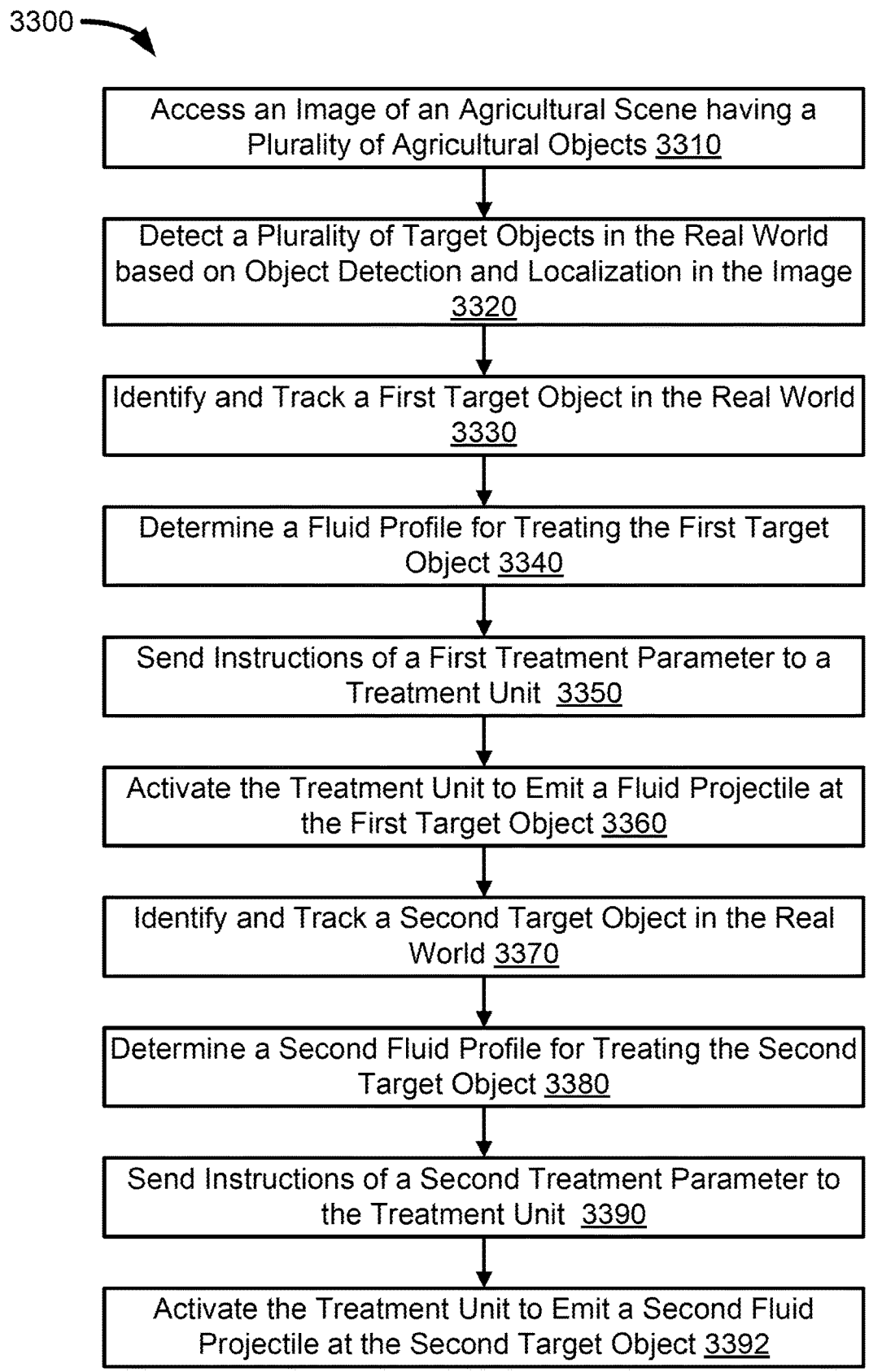
FIG. 29 is a block diagram illustrating an exemplary method that may be performed by an agricultural observation and treatment system, according to some examples.

FIG. 29 illustrates example implementations of method 3300 that may be performed by some embodiments of the systems described above. At step 3310, the system accesses an image of an agricultural scene having a plurality of objects. At step 3320, the system detects a plurality of target objects in the real world based on an object detection and localization in the image. At step, 3340 the system determines a fluid profile for treating the first target object. At step 3350, the system sends instructions of a first treatment parameter to a treatment unit 3350. At step 3360, the system activates the treatment unit to emit a fluid projectile at the first target object. At step 3370, the system identifies and tracks a second target object in the real world. At step 3380, the system determines a second fluid profile for treating the second target object. As step 3390, the system sends instructions of a second treatment parameter to the treatment unit. At step 3392, the system activates the treatment unit to emit a second fluid projectile at the second target object.

Figure 30:
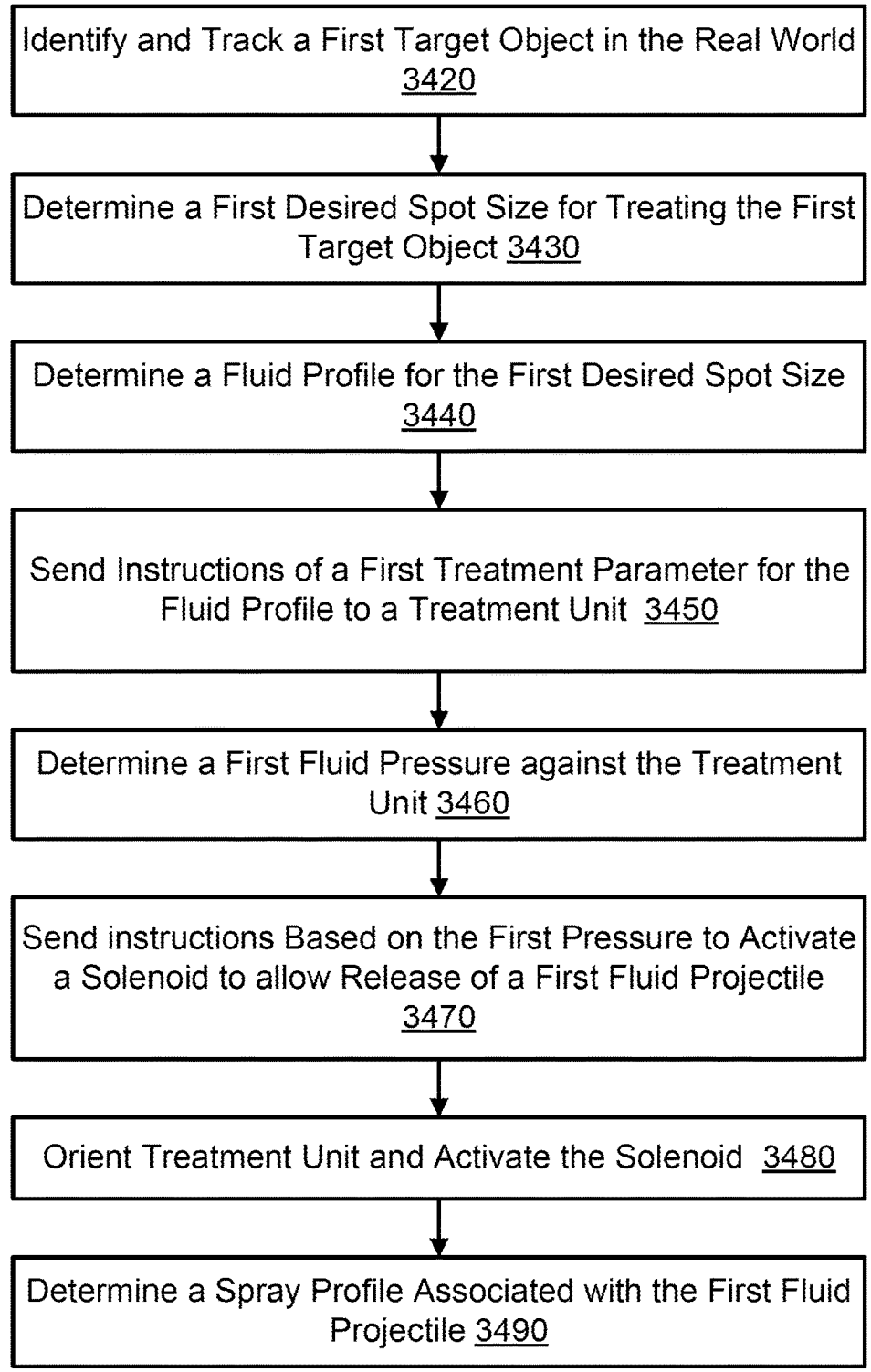
FIG. 30 is a block diagram illustrating an exemplary method that may be performed by an agricultural observation and treatment system, according to some examples.

FIG. 30 illustrates example implementations of method 3400 that may be performed by some embodiments of the systems described above. At step 3420, the system identifies and tracks a first target object in the real world. At step 3430, the system determines a first desired spot size for treating the first target object. At step 3440, the system determines a fluid profile for the first desired spot size. At step 3450, the system sends instructions of a first treatment parameter for the fluid profile to a treatment unit. At step 3460, the system determines a first fluid pressure against the treatment unit. At step 3470, the system sends instructions based on the first pressure to activate a solenoid to allow release of a first fluid projectile. At step 3480, the system orients treatment unit activate the solenoid. At step 3490, the system determines a spray profile associated with the first fluid projectile. The following further describes these operations.

As discussed above, the system may use a pump to create pressurized fluid from the pump to a solenoid. The system may send specific voltage and pressure instructions to the solenoid such that, accounting for the distance between the turret nozzle to the surface of the target, a ⅛ inch to 5 inch diameter of the spot of the spray can hit the target. Moreover, the system may variably and incrementally change the liquid projectile for every spray. The system may utilize a predetermined base pressure from the pump to the solenoid, and then open and close the solenoid by providing voltage instructions (for example, 24 or 48 volts). The spot of the spray of the emitted projectile may be controlled by the system to achieve a desired spray amount and spray diameter to cover an area of a target object.

While the solenoid is completely closed, the fluid may be pressurized to a particular psi. For example, a pump may operate to pressurize the fluid in the range of 1-200 psi. A working line psi from the pump to the solenoid may be about 60 psi when the solenoid is completely closed. An emission tubing from the solenoid to the nozzle and/or spray tip would have a psi less than the working line psi when the solenoid is closed. The opening of the solenoid releases the pressurized fluid from the working line and causes the fluid to fill into the emission line and out through the nozzle and/or spray tip. Over a period of time, the emission line may build up pressure and cause the pressurized fluid to emit through the nozzle and/or spray tip. By quickly opening and closing the solenoid, the system may emit intermittent bursts of the fluid from the working line causing the fluid to emit as a projectile via the nozzle and/or spray tip.

As fluid leaves the pressurized working line behind the solenoid, the pressurized working line behind the solenoid (from the pump to the solenoid) loses a small, but negligible amount of pressure. As more and more fluid leaves the working line (for example, 100 bursts or shots), the overall drop in pressure becomes nontrivial. In certain situations, the pump may not be able to compensate for the drop in pressure until a pressure drop becomes significant enough. For example, the pressure may be 60 psi up to the wall of the solenoid. As the treatment unit emits 100 bursts of fluid projectiles, the pressure behind the solenoid may incrementally drop, for example, to 40 psi. At 40 psi, a pressure sensor may inform the pump and solenoid to accommodate for the pressure drop, and the system will increase pressure back to 60 (and in some instances maybe increase the psi in the working line to more than 60 psi to quickly reach a base 60 psi).

A situation may occur in that dropping the pressure in the working line from 60 psi to the 40 psi, and then suddenly increasing back to 60 psi, incremental bursts (e.g., shots) may be emitted at slightly different starting pressures. So if the system opens the solenoid at the same rate and same voltage every time, the solenoid actually may open at different rates (because the pressure pushing at the wall was different), so emitted fluid projectiles are incrementally different. To account for the variability of the pressure in the working line, the system may account for the incremental drop in pressure due. The system may generate instructions to change voltages sent to the solenoid so to maintain the same droplet size and/or fluid volume. The amount by which the solenoid opens each time may be slightly different so as to maintain the same trajectory, volume and/or droplet for the size emitted fluid projectile (thereby accounted for the differences in the psi for each burst or shot of the fluid because the pressure pushing at the wall is different). The system may be calibrated and/or configured to open and close the solenoid at different time intervals and different time durations such that the amount of pressure is the same for each shot. Alternatively, the system may be calibrated to open and close at different time intervals and for different durations such that the amount of pressure is similar. The system may use a spray profile that controls the timing and duration of the opening and closing of the solenoid.

For example, the system may receive one or more images of an agricultural scene having one or more agricultural objects, such as plant object. The system may then detect a plurality of target objects based on the received one or more images. The system may identify a first target object in the real world from the detecting of the plurality of target objects in the received one or more images. The system may determine a set of first treatment parameters (e.g., spray profile) for the first target object. Based on the first set of treatment parameters, the system may instruct a treatment unit to emit a fluid projectile at the first target object. The first set of treatment parameters may include one or more of: a spray speed for an emitted fluid, a spray size for an emitted fluid, a spat profile and/or a spray duration. Based on the spray profile, the system controls a solenoid to release a pressurized fluid that has been pumped from a fluid source, the emitted fluid projectile that includes a portion of the released pressurized fluid. The system may adjust the opening and closing of the solenoid to account for hysteresis band of a pressure drop in the pressurized fluid.

The system may continue to treat multiple other target objects, such as agricultural objects that are plant objects. The system may identify a second target object in the real world in the received one or more images. The identification of the other target objects may occur in real time concurrently or after the first target object is detected. The system may determine a set of second treatment parameters (e.g., a spray profile) for a second target object. The set of second treatment parameters may bet the same or different from the first treatment parameters for the first target object. For example, the system may determine a second spray size for the second target object that is different from a spray size for the first target object. The system may determine a second spray speed for the second target object that is different from a spray speed for the first target object. The system may determine a second spray volume for the second target object that is different from a spray volume for the first target object. Also, the system may determine a target splat size for the second target object that is different from a target splat size for the first target object. For example, a splat size of a same about of a drop of fluid may have a different impact shape when it impacts a surface. The impact shape may be changed based on the trajectory speed of the drop of fluid when it impacts the surface of the target.

After the second set of parameters are determined, then the system may activate the treatment unit to emit a second fluid projectile at the second target object based on the second treatment parameters. The system may confirm whether the second fluid projectile contacted the second target object (e.g., based on sensor data comprising digital imagery, lidar data, sonar data, radar data or a combination thereof). In one example, the second target object can be the same target object as that of the first target object, such that the system is performing two treatment actions with two different treatment parameters, for example the chemical type or composition or state, onto at least a portion of a surface of the same object.

While the foregoing describes examples of the pressurized fluid spray with particular pressure and spray profiles, the system may be configured within various ranges. For example, the emitted spray may be emitted from about 1 millisecond to 1 second between the range of 40 to 80 psi. The system may be capable of generating a pressure of about 1 psi to 2700 psi in the working line. The volume of fluid released and emitted may be from about 1 micrometer to 1000 milliliters. The target splat diameter can be about a dime size at 40 psi to about a quarter size at 60 psi. The projectile/droplet size may be about 1 millimeter to about 100 millimeters diameter in a single drop (not volumetric).

In some other examples described below, some embodiments are implemented by a computer system 70000. One example is depicted in FIG. 37. A computer system 70000 may include a processor 70200, a memory, which may be optional and is omitted from FIG. 37, and/or a non-transitory computer-readable medium. The memory and non-transitory medium may store instructions for performing methods and steps described herein. The computer system 70000 may further include one or more interfaces 70400. These interfaces may be used for receiving data and images, sending data and images or interacting with a human operator via a man machine interface such as a keyboard and a display. Various examples and embodiments described below relate generally to robotics, autonomous driving systems, and autonomous agricultural application systems, such as an autonomous agricultural observation and treatment system, utilizing computer software and systems, computer vision and automation to autonomously identify an agricultural object including any and all unique growth stages of agricultural objects identified, including crops or other plants or portions of a plant, characteristics and objects of a scene or geographic boundary, environment characteristics, or a combination thereof.

Additionally, the systems, robots, computer software and systems, applications using computer vision and automation, or a combination thereof, can be configured observe a geographic boundary having one or more plants growing agricultural objects identified as potential crops, detect specific agricultural objects to each individual plant and portions of the plant, determine that one or more specific individual agricultural object in the real world geographic boundary requires a treatment based on its growth stage and treatment history from previous observations and treatment, and to deliver a specific treatment to each of the desired agricultural objects, among other objects. Generally, the computer system provides computer vision functionality using stereoscopic digital cameras and performs object detection and classification and apply a chemical treatment to target objects that are potential crops via an integrated onboard observation and treatment system. The system utilizes one or more image sensors, including stereoscopic cameras to obtain digital imagery, including 3D imagery of an agricultural scene such as a tree in an orchard or a row of plants on a farm while the system moves along a path near the crops. Onboard lights sources, such as LEDs, may be used by the system to provide a consistent level of illumination of the crops while imagery of the crops is being obtained by the image sensors. The system can then identify and recognize different types of objects in the imagery. Based on detected types of objects in the digital imagery, or the same object from one moment in time to another moment in time experiencing a different growth stage which can be recognized, observed, and identified by the on system, as well as the system associating the growth stage or the different label with a unique individual agricultural object previously identified and located at previous growth stage, the system can apply a treatment, for example spray the real-world object with chemicals pumped from one or more liquid tanks, onto a surface of the agricultural object. The system may optionally use one or more additional image sensors to record the treatment, as a projectile, as it is applied from the system to the agricultural object in proximity to the system.

1. Additional Embodiment Scenarios

Agricultural industry is looking for new ways to keep up with ever-increasing demand. One possible way is to use more land for farming. However, growth in area of arable land faces other competing obstacles from real estate industry, ease of connectivity with urban areas and local regulations. Therefore, increasing productivity of existing farmland is an attractive option.

The above-described techniques can be used in an agricultural setting to improve crop yield. Some additional embodiments are disclosed next. The term crop used herein may refer to fruits, vegetables, grains, and other agricultural products that are used for direct or indirect human or animal consumption. In one example aspect, the disclosed techniques may be used to detect undesirable growth in a farm that competes with desirable crop for water and nutrients. Such undesirable growth may include, for example, weeds or other plants that are not intended to be grown on the farm. Accordingly, weeds may be detected and eliminated using the disclosed techniques. Unless otherwise mentioned, the term "farm" is used herein as a short reference to various flora growing facilities such as crop farms, orchards, green houses, gardens, and so on.

2. Example System Overview

Figure 31:
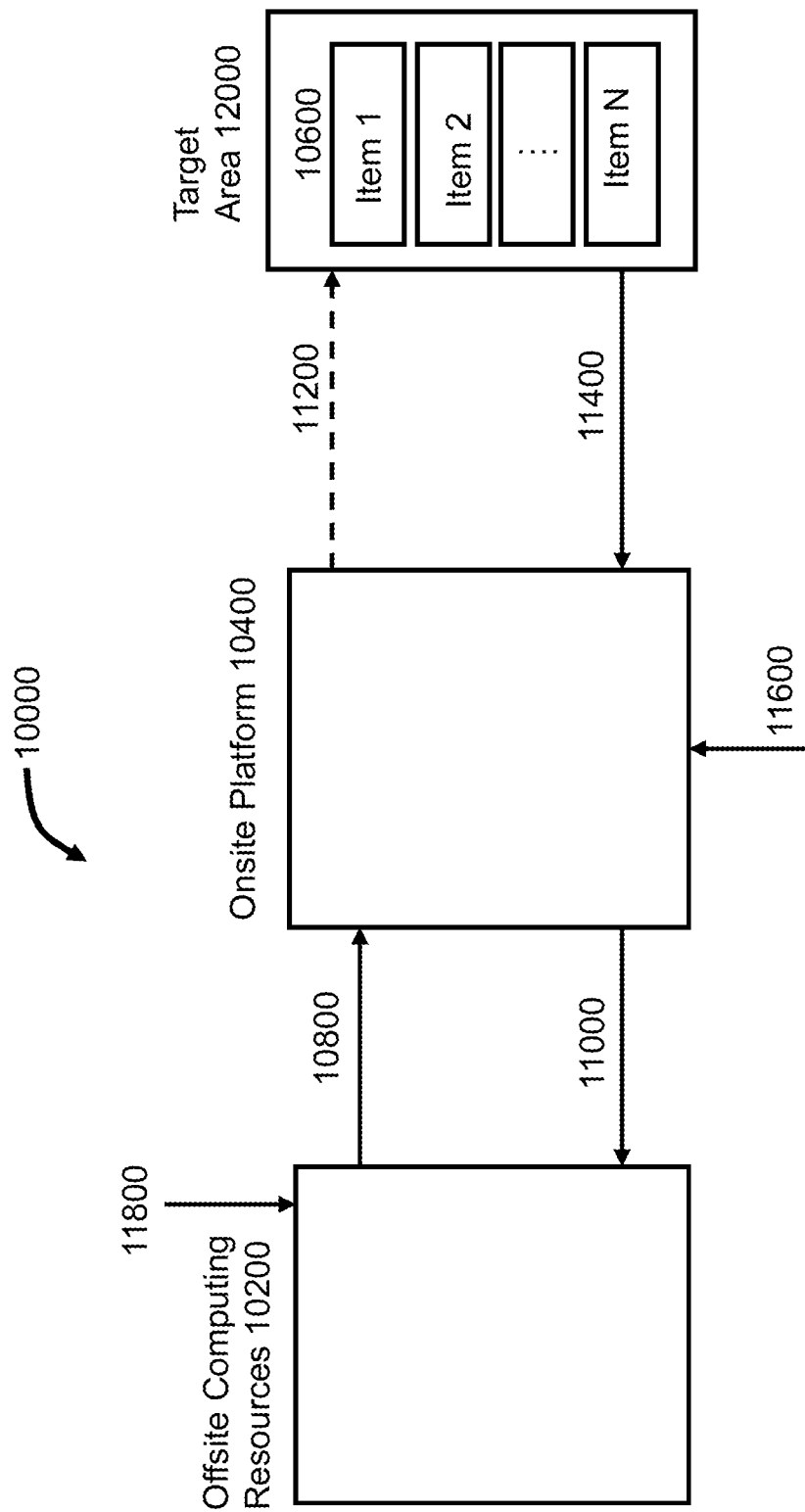
FIG. 31 is a block diagram of a system described in the present document.

FIG. 31 shows an example of a setup 10000 that may be used for implementing some of the techniques disclosed in the present document. The setup 10000 includes an onsite platform 10400 and offsite computing resources 10200. The setup 10000 may further include a target 10400. For example, the onsite platform 10400 may be a computer system and may be mounted on an agricultural vehicle that may be configured to operate in a farm or orchard. The example agricultural observation and treatment systems, including portions or the systems or component treatment modules, systems, and/or subsystems, whether performance of analysis, ingesting sensor readings, treatment actions are performed on compute units onboard or onsite a physical moving platform, or distributed at servers including cloud servers or edge computer devices, or a combination thereof, that are discussed above can be broadly interpreted and implemented in the following discussions below, particularly with discussions related to onsite platform 104 and functionalities and actions performed by onsite platform 104. In some embodiments, onsite platform 104 may be modular—e.g., comprising multiple modules that operate relatively independent of each other and are configured to implement various functionalities described in the present document. Each of the module may comprise hardware that includes a processor, a memory and may further include hardware such as cameras and/or sensors for estimating a local pose of the module, a treatment application mechanism such as a spray turret or a laser source. The offsite computing resources 10200 may be located at a suitable location. For example, in some embodiments, the offsite computing resources 10200 may be located in close proximity of the onsite platform 10400 (e.g., on a shared platform or within 10 to 100 meters) configured to provide and perform edge computing resources in real time in parallel with actions performed by the onsite platform 10400. In some embodiments, the offsite computing resources 10200 may be located or distributed in a remote location such as a data or control center, a cloud computing facility, and so on. The offsite computing resources 10200 may be either co-located or distributed across various locations. The various components of the setup 10000 may be implemented using other configurations disclosed in the present document, e.g., FIG. 2, FIG. 4 and FIG. 8.

In various embodiments, the target area 10400 may include one or more targets items 10600, listed as item 1 to N in FIG. 31. The target area may be, for example, a rectangular portion of the ground being scanned by the onsite platform 10400. The one or more target items 10600 may include desirable vegetation (e.g., crop being grown) and/or undesirable vegetation (e.g., weeds or other growth that is not intended to be farmed) and/or other miscellaneous items such as trash, pebbles, soil clumps, and so on. The present document further describes how the target area is determined and processed for the treatment operation.

The communication link 10800, further described throughout the present document, may be a wired or wireless link carrying data and control from the offsite computing resources 102 to the onsite platform 10400. The communication link 10800 may carry ML information, control data, and so on.

The communication link 11000 from the onsite platform 10400 to the offsite computing resources 10200 may be a wired or wireless communication link. The communication link 11000 may carry information that includes images, results of operation of the onsite platform 10400, diagnostic information, map data, and so on, as further disclosed in the present document.

The offsite computing resources 10200 may further receive inputs such as raw image data or training image data 11800, as is further described in the present document.

The onsite platform 10400 may receive input 11600 representing signals and information locally collected using various sensors such as camera and LiDAR (light detection and ranging) for performing functions such as image capture and pose detection, as is further described in the present document.

The link 11200 represents emanations from the onsite platform 10400 that may reach the target area 12000, such as a sprayed chemical, deposited substance such as fertilizer, or a laser beam.

The link 11400 from the target area 12000 to the onsite platform 10400 represents images or other sensor readings captured by the onsite platform 10400 both prior to treatment operation and during and after the treatment operation.

3. Onsite System Embodiments

Figure 32A:
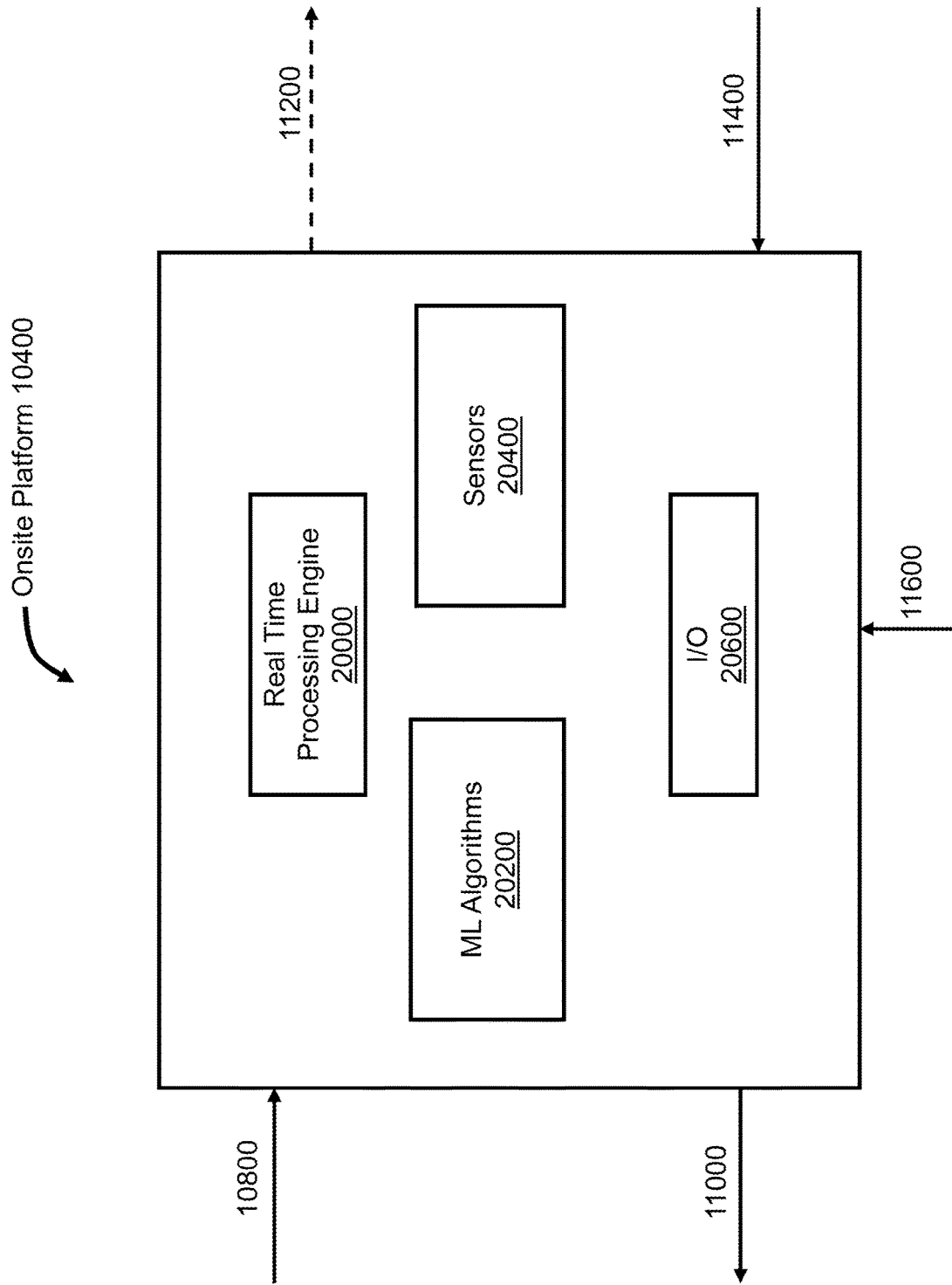
FIG. 32A is a block diagram of onsite platform.

FIG. 32A shows one example implementation of the onsite platform 10400. The onsite platform 10400 may include a real-time processing engine 20000. The real-time processing engine 20000 may analyze acquired images, as is further described in the present document. In some embodiments, the onsite platform 10400 may be configured to implement ML support functionalities 20200, as is further described throughout the present document. In some embodiments, the onsite platform 10400 may include one or more sensors 20400 to acquire various information of the environment in which the online platform 10400 operates. Some examples of the sensors are depicted in FIG. 32D and include pose sensors 24000, light sensors 24200 and other sensors 24400 such as humidity sensors. In some embodiments, additional input/output modules 20600 may be included. Examples of such modules (see FIG. 32E) include ejectors 25000 which may be laser emitters or liquid spraying turrets and further described in the present document, cameras 25200 and other data communication interfaces 25400 including wireless or wired data communication interfaces. Using the sensors 20400 and/or the I/O 20600, the onsite platform 10400 may acquire various inputs 11600, as further described in the present document.

The onsite platform 10400 may include a number of treatment containers and treatment nozzles or a number of laser sources. A typical number may be between 2 to 6 spraying or laser mechanisms, each with one to 6 individual treatment units that can be configured to target, aim, track, and emit a treatment on to a specific small stationary target in the geographic boundary, such as an agricultural environment, on a moving vehicle. The onsite platform 10400 may also continuously track the pose of each of the treatment mechanisms such as the spraying/laser mechanisms in terms of their availability and a direction to which these mechanisms are pointing and will eject.

Figure 32B:
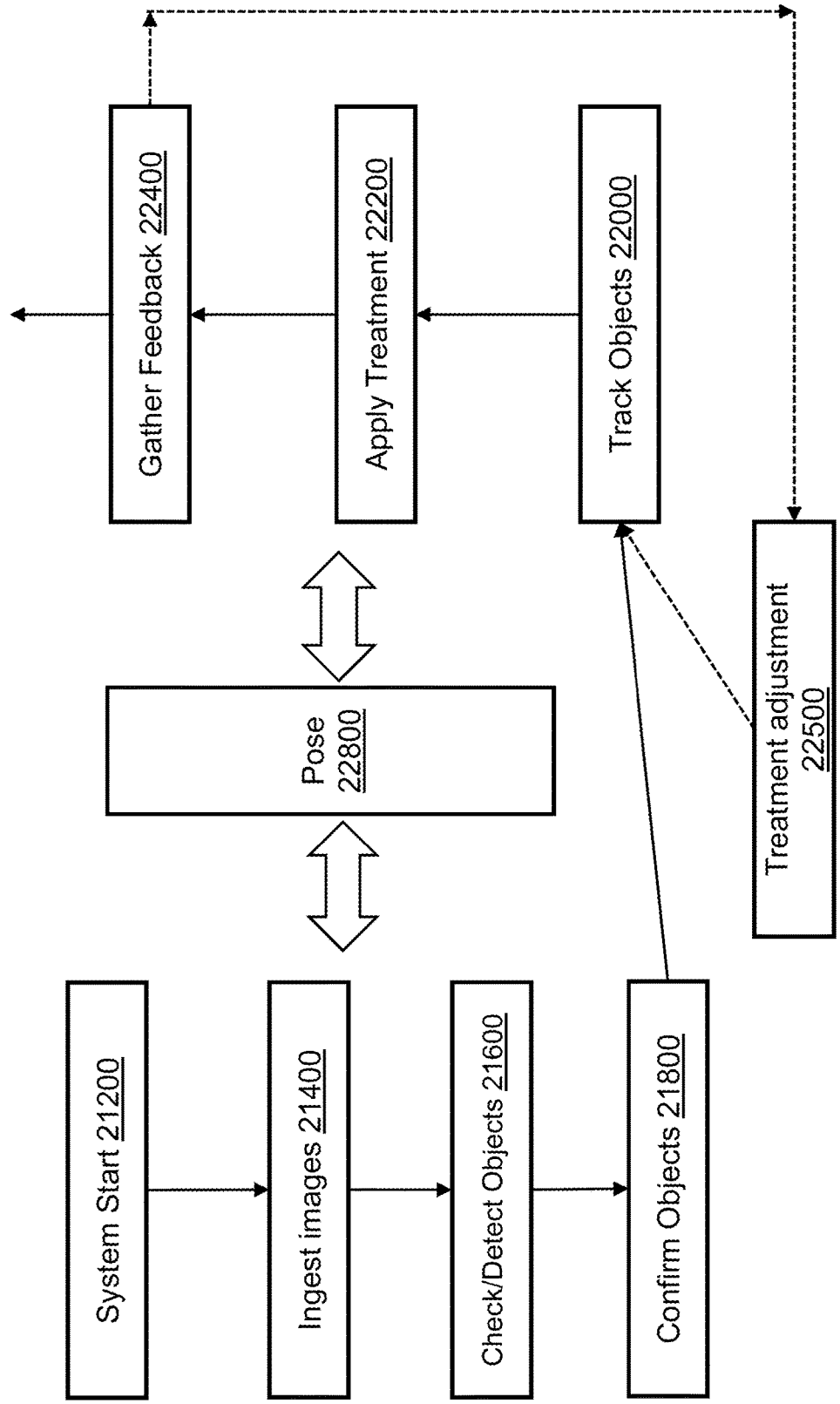
FIG. 32B is a block diagram of an example implementation of a real-time processing engine.
Figure 32D:
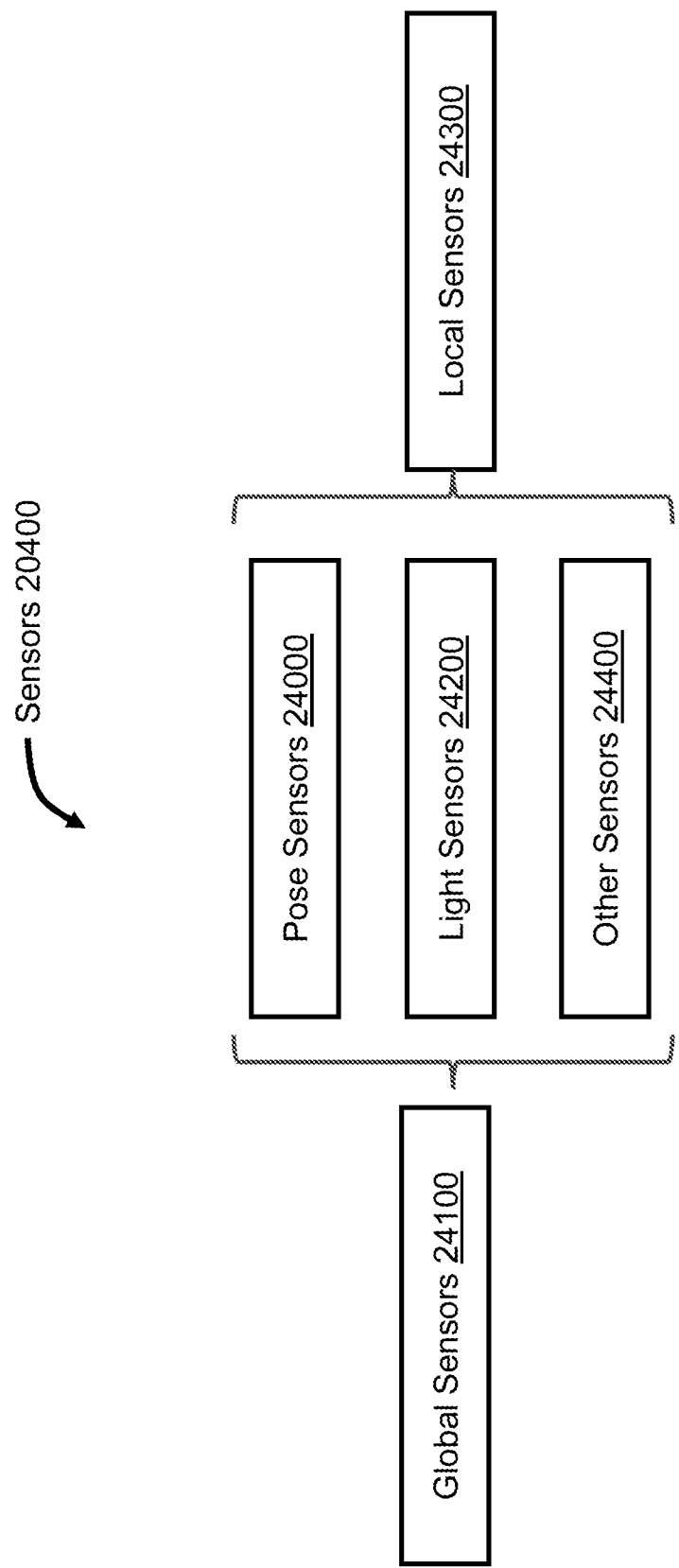
FIG. 32D shows examples of sensors equipped on an onsite platform.

FIG. 32B shows a workflow that may be implemented by a system such as the onsite platform 10400 on an agricultural vehicle. At 21200, the system may turn on and go through a self-calibration to ensure that the system achieves normal, or expected, operational conditions. In some embodiments, the calibration operation may be used to ensure that each position, orientation, and what each sensors are seeing are in agreement. This includes sensor calibration, fusion calibration, clock calibration, accounting for latency, and so on. One such technique is called projection and reprojection of stereo cameras. For example, as illustrated in the flowchart of FIG. 43, a method 130000 for calibration may be as follows. At 130200, two cameras may be used to obtain a stereo image. Based on the camera separation and an estimated nominal distance at which an object X in the image is, a first determination (130400) may be performed using a frame captured from a first camera, wherein the first determination estimates where in a second image captured from the second camera should the object appear. Similarly, a second determination (130600) may be made based on the second image captured from the second camera about where in the first image captured by the first camera should the object X occur. Accordingly, one implementation of calibration may include a detecting operation in which the Object X is detected, followed by two estimated position determination operations, one on each image of a stereo image pair, followed by an adjustment to the system (e.g., 22500 in FIG. 32B) based on mismatch found in the determination operations. The adjustment may be made in the analog domain (e.g., by moving camera positions for correct alignment) or in the digital domain (e.g., by correcting fractional pixel offsets between left and right images in the stereo pair).

Alternatively, or additionally, a stereo matching technique may be used to combine images obtained from the cameras to generate ingest images. It will be appreciated that such a calibration operation is able to verify that a detected object is actually present in the physical world and thus be submitted (130800) for subsequent ML based detection and treatment, as described in the present document.

In some embodiments, calibration can be done by scanning a known object of known size and known distance, like that of a barcode or another known pattern.

Figure 39:
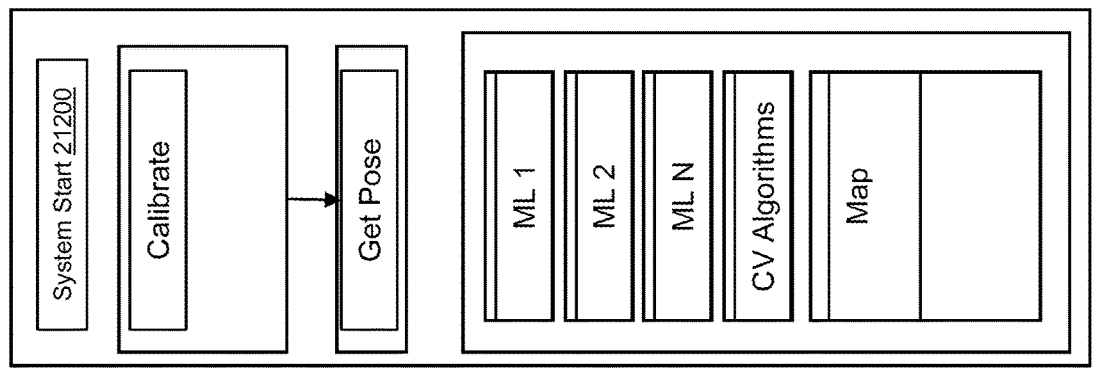
FIG. 39 shows an example of an initialization of a system mounted on an agricultural vehicle.

FIG. 39 shows an example of a starting configuration of the onsite platform 10400 showing a number of ML algorithms (from 1 to N) loaded on the onsite platform 10400, zero or more computer vision (CV) algorithms loaded on the onsite platform 10400 and a map of area in which the agricultural vehicle is operating. Upon startup, the system may perform an optional calibration process to calibrate certain operational parameters such as accuracy of pose sensing or image capture equipment. One of the tasks performed at 21200, may be determination of a pose of the system. The pose may refer to the physical location and/or bearing of the vehicle.

At 21400, the vehicle may ingest images. Various embodiments for ingesting one or more images are described in the present document. Ingested images may be of different types. One type of ingested images may be used for operational reasons such as pose estimation, map building, etc. Another type of images may be ingested for use in the determination of treatment targets by searching for objects and their positions from the ingested images.

In some embodiments, the vehicle may continually monitor its pose throughout the described workflow. In some embodiments, the agricultural vehicle may carry two groups of sensors. One group of sensors may be used for global registry and the other group of sensors may be used for local registry. Furthermore, each group also can serve TWO purposes. Accordingly, there may be four different outcomes or benefits due to such an arrangement. In some embodiments, the first group of sensors may be fitted on the agricultural vehicle (for global positioning estimate) and a second group of sensors may be positions on individual modules of the onsite platform 10400 (for local pose estimation) as further described below.

In some embodiments, the Group 1 sensors (24100) gather sensor readings in real time for vehicle pose in real time. Further, Group 1 sensors may gather or use the sensor readings to build a global map in real time and/or offline.

In some embodiments, Group 2 sensors (24300) gather sensor readings in real time for object detection (e.g., as discussed with respect to ingest images 21400) for real time treatment. Furthermore, Group 2 sensors may gather sensor readings and tracks objects, for example without even knowing what they are, just that they are definitely objects) to get pose of the local sensors.

One advantage of this arrangement is that the onsite platform 10400 can map specific plant objects (because of the ingested images) and integrate that into a global map (the robot knows where each ingested images are in the greater scheme from the global map). In some embodiments, a comprehensive high definition (HD) map may be generated. This HD map may be zoomable and may have associated specific information with specific portions of the map indicating a location, a treatment history, and what the object looks like, and so on.

Another advantage of this arrangement is that, in real time, from the treatment turret's perspective, an accurate reading may be obtained because the sprayer now knows it's local pose from the sensors physically close to it, as well as the vehicle pose because of the "macro sensors" visual simultaneous localization and mapping VSLAM cameras, global positioning system GPS, inertial measurement unit IMU, etc. (the sprayer has encoders to even more bolster the accuracy of where it is). This superposition of all these real time readings to give us pose just makes the targeting and tracking more accurate. At 21600, the ingested image is analyzed to discern one or more targets or objects in the image.

At 21800, a confirmation is made regarding whether or not the objects detected in the previous step should indeed be considered for being target for treatment. The confirmation may be made based on—what type of object was detected and whether the detection was robust.

Figure 34:
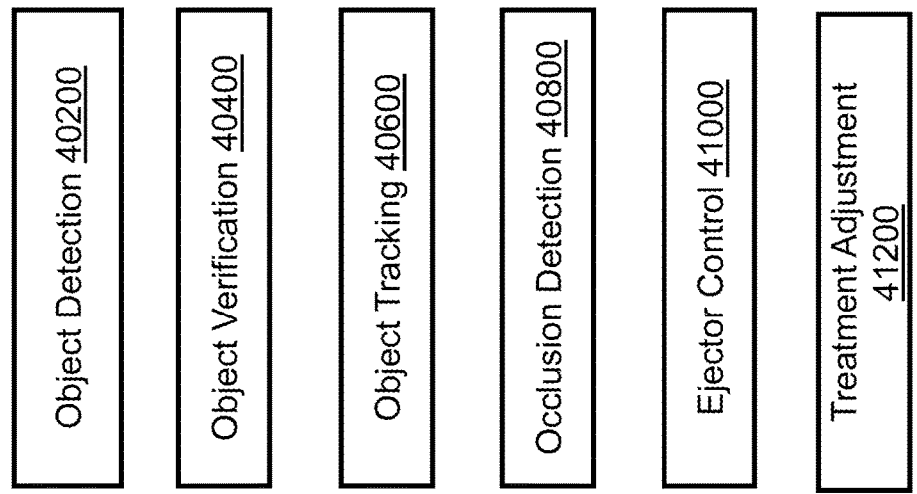
FIG. 34 is an example of target processing.

Using the confirmation, a decision may be made regarding whether an ejector or a spray is to be activated for treatment. As further described in the present document, the decision may be made by analyzing the images using a ML algorithm that is trained to identify a particular crop or a particular weed. Some of the tasks performed for target area processing are depicted in FIG. 34 and include object detection 40200 (e.g., outcome of 21600), object verification 40400, object tracking 40600, occlusion detection 40800, and ejector control 41000, all of which are further described below.

Object Verification 40400

Based on the identification, either a rule of exclusion or a rule of inclusion may be used to identify the targets for a next action. The rule of exclusion may, for example, label certain identified objects to be excluded from the next step of operation. These objects may be, for example, a crop or a fruit or a vegetation that is intended to be grown in a field. The rule of inclusion may, for example, label certain identified objects to be included in the next step of operation. Examples of such objects may include weeds, grass or other undesirable growth identified in the image. In some embodiments, object verification 40400 may be used to control treatment application mechanism such that if a target object is within a close proximity (e.g., within a threshold distance) of another object that is deemed to be a high value object, then the treatment application mechanism may be controlled to mitigate any adverse impact to the high value objects. The controlling may be done by reducing an amount of ejection or a duration of ejection or by pointing the treatment tip to a location that is farthest possible position within the target object and the high value object that is not to be disturbed by application of treatment.

In various embodiments, the images ingested at 21400 may comprise of point cloud data, fused data points such as point cloud data in sync with image data, sonar, radar, etc. As further described in the present document, these images may be analyzed to identify objects such as flowers, weeds, fruits, objects, etc. As previously described, in some embodiments, a type of ingested images may be used to estimate pose and visual inertial state estimation VIO or for simultaneous location and mapping, SLAM.

The ingested and processed images may also include any salient points to track. For example, the points can just be interesting groups of pixels that likely map to a real-world object or pattern. It does not need to have a direct correspondence to a real object with real meaning. For example, a cluster of "corners" or "lines" can be detected (with or with ML) and tracked so the sensor sensing it can determine where it is relative to the stationary "corner". Particularly for agriculture, this can include real world defined objects like tree trunks, beds, troughs, rocks, ditches, gravel with specific shapes/patters, poles, irrigation systems. Such objects may be called landmarks within the collected visual imagery.

Object Tracking 40600

Based on the identified targets, the real-time processing engine 20000 may then proceed to perform, at 22000, object tracking. The operation may include, e.g., preparing the onsite platform 20400 for treatment on one or more of the identified targets. The real-time processing engine may need to take several operational factors into account in issuing a command to adjust the treatment mechanism such as the spray turret or the laser source to eject an appropriate amount or bolus of liquid or light for an appropriate duration in an appropriate direction with an appropriate force.

For example, the real-time processing engine 20000 may determine a time interval between a first-time instance at which an image that contains a particular treatment candidate object was captured and a time at which the real-time processing engine 20000 will deliver the liquid to hit the object. This time interval will depend on several factors that include: (1) image capture delay, (2) image pre-processing delay, (3) ML algorithm execution delay to identify the object, (3) computational delay form confirming the object (step 21800), (4) computational time to make a decision to treat and issue a command to the ejector mechanism (5) inertial delay or physical reaction time to prepare the ejector mechanism to shoot in an appropriate orientation pointing to the future position where the target object will be when the sprayed liquid or treatment substance reaches the object. To be able to take into account delays such as the inertial delay, the real-time processing engine 20000 may constantly be aware of its pose, the orientation of the ejector mechanism. The real-time processing engine 20000 will also estimate a speed of relative movement between the agricultural vehicle and the onsite platform 10400 and the target object to predict a position of the object when the sprayed liquid reaches the target object.

For predicting future position of a target object, various image processing or computer vision algorithms may be used. For example, in some embodiments, an optical flow of the target object may be determined. The optical flow may be determined using a number of "control points" that define the object (typically 4 to 6 control points) and relative movement of the control points between successive frames. Based on the assumption that rigid object move smoothly, the optical flow may be used to predict position of the object at some number of frame times in the future. In some embodiments, a Lucas Kanade tracking method may be used to track small objects that move incrementally relative to a moving vehicle. Performing ML detection on every frame may at times be resource expensive, so tracking a cluster of points from an object that is identified frame 1 into frame 2 and 3 is much easier also likely accurate. Tracking objects also makes it similar to send instructions to a treatment sprayer to emit a projectile at the object detected and localized in frame 1 while still moving. For example, the ML detector only needs to detect on frame 1 and the tracker algorithm, which is computationally less expensive than the ML detection, can track the object into frame X and cause to send instruction to treat the object. FIG. 44 shows an example workflow 140000 for such a procedure which includes running an ML detection algorithm on a first frame (140200) that results in identification of an object in the first frame; turning off the ML algorithm for N next frames after the first frame while turning on a tracking algorithm for the N frames to track the object (140400) and directing a treatment ejector to treat the object at a target frame after the N frames based on a targeted position estimate of the object in the target frame (140600). The number N may be 3 to 4 frames, and may depend on extrinsic factors such as speed of the agricultural vehicle, environmental factors and intrinsic factors such as a confidence level of the ML detection and the tracking algorithm.

Occlusion Detection 40800

In some embodiments, the objects in the ingested images may be tracked to check for occlusions. For example, if a tracked (for discussion related to Occlusion Detection, tracking an object may refer to detecting objects using ML or CV detector in multiple consecutive frames such that the ML or CV detector is analyzing each frame for the same object) object A is seen in frames 1 and 2, but is not seen in frame 3, a determination may be made regarding whether this has occurred due to the object A being falsely identified in the first two frames, or because the object is occluded behind another object B in frame 3. Occlusion detection logic may check for whether the object A re-appeared in subsequent frames 4 or later when camera angle relative to the object A changes. Alternatively, or in addition, the occlusion detection logic may track optical trajectories of various objects with respect to their relative positions from the camera to resolve a situation of whether object A has disappeared from an image due to a possible occlusion or due to another error. With respect to a decision regarding whether or not an object that was occluded is to be treated, various strategies may be used. In some implementations, a determination may be made regarding whether an object that is a target for treatment (e.g., weed) may become occluded at the future time instant at which the bolus of herbicide is expected to hit the object. If the answer is yes, then the object may not be treated (e.g., sprayed upon). In some implementations, objects that "disappear" from certain intervening images may still treated in case that it is determined that the object disappeared from one or more images due to an expected occlusion. In one example, tracking objects across frames can be performed by applying one or more warping functions to each subsequent frame such that comparing a first frame to subsequent frames of captures images can be performed more accurately, particularly on a moving vehicle, such that deviations such as a change in field of view from frame to frame can be accounted for FIG. 41 is an example of a method 110000 for performing occlusion detection of M objects, where M is an integer greater than or equal to 1. The method 110000 may be implementing while performing the occlusion detection 40800. At 110200, M objects may be tracked in the ingested image sequence. In some embodiments, the tracking may be performed after ML algorithm has detected the objects in the ingested images using techniques described in the present document. Here, the number M may be a positive integer, with typically values of between 2 to 20 objects, but also be detected up to hundreds of objects per frame. Some examples are disclosed with respect to operation 40600 herein. At 110400, it is determined that an object that was present in a previous image is not present in a current image. Upon determining that the object is not visible in the current frame, a determination is made regarding occlusion status of the object. In some embodiments, the occlusion status of a single object from M objects may be made by comparing a projected trajectory of the object with projected trajectories of M−1 remaining objects to for intersection along an axis between a location of the camera and a predicted location of the object in the current frame. In case that the occlusion status is determined to be "yes", then the current frame is marked as an occlusion frame for the object and next frame processing is continued. In case that the occlusion status is determined to be "no" then it is determined that the object has moved out of the active area of current image capture and marked accordingly. In case that the object has been determined as having moved out of active area of imaging, the object may be removed from the list of target objects for treatment.

Ejector Control 41000

In some embodiments, the real-time processing engine 20000 may determine an appropriate amount of liquid to be ejected towards the target object(s). In some embodiments, depending on the type of weeds that will be encountered in a field, a particular type of herbicide might be loaded into the spray turrets. Furthermore, a nominal value of herbicide bolus may be pre-specified for the type of weeds. During operation, the real-time processing engine 20000 may determine a delta to be added to this nominal value or a delta to be subtracted from the nominal value when shooting at the target objects. One factor that may add delta amount to the nominal value is that the weed may have been expected to be eliminated based on previous runs and previous maps, but has not been effectively killed. Another factor to add delta amount may be that the detected object (e.g., the borders or the bounding box of the object) may be larger than a typical value for the weed (e.g., 20% greater area than the typical value). Another factor to add delta amount may be related to environmental factors such as rain or wind. For example, if the ambient situation is rainy or windy, a larger bolus may be delivered to ensure that an effective amount of liquid lands on the target object. Conversely, factors that may be used to reduce the nominal amount by a delta could be that the detected object is smaller in size than the typical size, or that the detected object is within a physical distance of a desirable object. Another factor may be that there are numerous target object close to each other and therefore a smaller dose for each target object is acceptable.

As disclosed in Section 10, in some cases the ejector may be controlled to aim at a specific critical point of the target object (e.g., root, stem or leaves). Alternatively, in some cases, a volumetric approach in which the entire target object is treated may be used. This determination may be made using pre-determined rules that depend on, for example, the type of weed, the chemical formula of the herbicide being used, the level of weed control that is desired during the run, and so on.

At 22200, the real-time processing engine 20000 may activate a mechanism to eject a chemical through one or more nozzles by pointing the one or more nozzles in directions of the identified targets. The real-time processing engine 20000 may activate a mechanism to emit a light pulse through one or more emitter head units by configuring the emitter head of an emitter unit to point to a target object in real time on a physically moving platform, the light pulse configured to burn a portion of a plant.

During and after the treatment operation 22200, the real-time processing engine 20000 may gather feedback, at 22400, from the target area. The feedback may be used, for example, to verify whether the treatment occurred and an amount of treatment and a post-treatment image of the one or more identified targets. In some embodiments, the feedback may be live or in real time. This may allow the system to determine if there was a miss in the treatment application. The system may then attempt to figure out whether the mark was missed due to a calculation error, a physical spray nozzle problem, wind, etc. For example, if salt or residue builds up in the sprayer, even though the sprayer has the line of sight correctly, the residual built up could perturb the trajectory of the desired spray, which may need to run a cleaning routine or adjust the pressure of ejection during treatment, and in real time or on a later run, remember to adjust and re-treat the plant. In some embodiments, after a run is complete, the data is uploaded to the cloud to remap the entire geographic boundary (a farm) with updated image/views/2d/3d models of every plant and its location, it has its treatment history attached, it's phenology logged (if it's any different this time) including for example stage of growth, etc.

Alternatively, in some embodiments another weed-removing mechanism may be activated. For example, in some embodiments, a knife or a scissors may be controlled to cut into the area of interest. In some embodiments, scissors may be used to cut a growth in an area of interest.

Additional examples of this operation are disclosed throughout the present document, including Sections 6 and 9 of the present document.

4. Examples of Agricultural Vehicle

An agricultural vehicle may be a vehicle that is deployable on unpaved farm ground. This vehicle itself can be navigated autonomously, as a self-driving vehicle. For autonomous navigation, the vehicle may use the input 11600 and the pose estimation functionality 22800 described in the present document. Sensory inputs may be processed to obtain a pose of the vehicle. The pose may be used to determine a next location or a next pose to which the vehicle proceed. The decision may be used to control actuators connected to motion control.

In some embodiments, the agricultural vehicle may be a tractor with an attachment that stations the onsite platform 10400. As disclosed in Section 2, in some embodiments, the onsite platform 10400 may include one or more modules equipped with cameras and the treatment mechanism such as a spray nozzle pointing towards ground or a side and a number of additional sensors to be able to figure out the global and local poses of the onsite platform 10400.

5. Examples of Pose Estimation

In some embodiments, the method 60000 (refer to FIG. 36) include determining a pose of the agricultural vehicle. In some embodiments, the pose is continually determined. In some embodiments, the pose is determined using sensory inputs including one or more of a global positioning system input, an inertial measurement unit, a visual sensor, or a radar sensor, sonar, LiDAR, RGB-D camera, infrared, multispectral, optoelectrical sensors, encoders, and so on.

In some embodiments, the pose is determined using multiple sensed and/or calculated points. For example, a GPS measurement may be combined together with a pre-loaded map of an area to determine the pose. In one beneficial aspect, the combination of multiple sensory readings allows to compensate for errors in each individual sensor measurement.

In some embodiments, visual simultaneous localization and mapping (vSLAM) or SLAM may be used. Additionally, or alternatively, visual odometry (VO) or visual inertial odometry (VIO) may be used. In various embodiments, VSLAM may be performed with local sensors and/or with global sensors. In some embodiments, VSLAM may be done with keypoint detection, key cluster detection and so on. Additional features of pose estimation include one or more of: frame to frame detection, local bundle adjustment, object to object detection, known object to known object based, using ML detected object, just for tracking, etc. In some embodiments, pose detection may be achieved by matching frames in time, matching frames in stereo, or both. In some embodiments, pose estimation may use line detection, corner detection, blob detection, etc. to build HD maps online and offline, and get pose in real time.

In some embodiments, pose of the onsite platform 20400 may be represented using a relative term relating to the location and orientation (6 total degrees of freedom) from some base location.

Pose may refer to a location and orientation of an object relative to a frame of reference (x,y,z, phi, theta, psi (for example)). For example, a "Global Frame of reference" may be defined as a corner of a farm (or a barn, or a 5G/wifi/GPS tower on the farm) as (0,0,0,0,0,0). The pose of the vehicle would be (x1, y1, z1, phi1, theta1, psi1) that may get checked frequently (e.g., 200-5000 times a second). Then the sprayer can also have a pose relative to the vehicle. Then the sprayer head (because it itself is a gimbal) itself can also have a pose relative to the sprayer or to the vehicle, or directly to the "global frame". Pose estimation may involve figuring out all of these poses to get final reading. Meaning a final (x, y, z, rho, theta, psi) of the treatment head assembly at t=1 can be relative to the body of the sprayer, relative to the vehicle, relative to some (0,0,0,0,0,0) location of the farm. Alternatively, or in addition, the pose can be relative to the body, the body then relative to the vehicle, the vehicle then relative to the farm.

Therefore, a "pose" of each object (e.g., a fruit, a flower, a weed, etc.) can be the location of it relative to the camera, or the corner of the farm. Therefore, pose of an object may be considered to be a localization of the object in some geographic area/boundary (global map/submap).

In some embodiments, pose for the vehicle is caught by fusing two or more of: 1. cameras (not the cameras looking for flowers) looking at the global world (the farm), 2. GPS reading, 3. Input from IMUs, 4. wheel encoders, 5. steering wheel encoders, 6. LIDAR readings 7. Radar reading. 8 Sonar. 9. as many other sensors to get position of the vehicle. As mentioned before, these can be flashing at 24-5000 hz for example and feeding that information to each treatment mechanism controlled by the onsite platform 104 at any speed.

2. In some embodiments, the pose for the treatment mechanism may be assumed to be same as that of the agricultural vehicle because it may be fixed on the vehicle. In some embodiments, the turret of the treatment mechanism may be fixed to a platform that holds a controller that controls the treatment mechanism, called a spraybox computer, which may also be fixed onto the vehicle. Therefore, a change in pose of the sprayer is just the same as the change in pose of spraybox. Furthermore, pose of both these may change with changes to pose of the vehicle when they are fixed to the vehicle. Each spraybox's computer and sprayer's microcontroller will work to keep track of pose. The spraybox computer will constantly ask the vehicle for what the pose is so it will know its own pose, and then let the microcontroller of the sprayer know. At this point a particular spraybox may only care about its own pose, and not the pose of other sprayboxes. The other sprayboxes have their own computer to determine their own pose.

3. Pose for the treatment mechanism and its discharge nozzle is caught by the spraybox computer by asking the vehicle for pose, but also asking the microcontroller of the sprayer itself what the encoders are saying the motors are doing, and what the motors did last. The spraybox computer may combine the two together to determine where the discharge nozzle's pose in the world at the current time, and adjust for treatment.

The use of global pose and local pose may be highlighted using the following use cases. In some embodiments, the onsite platform 10400 may simply be looking for weeds to kill and crops to not kill while it's killing weeds. There may be no tracking about where the weed is in the world. If the same weed is seen during another run (e.g., a month later), that dead weed may be the same weed that was identified a month ago and indexed. However, the onsite platform 10400 may not care (due to lack of global pose information) and just shoot at weeds based on local pose information.

In some embodiments, the onsite platform 10400 may be configured for finding a weed to kill. It may look for a specific object, e.g., weed #1284 on farm column #32 on farm X, that was previously detected, and match it with previous detection and treat in in real time.

The first situation does not require any global registry of pose. As long as the spraybox identifies a weed and knows where the weed it relative to the spraybox, it will just treat the object. It doesn't matter if the spraybox knows where the spraybox is in the world, or the weed. The onsite platform 10400 may just use local SLAM to track the weed, or other pose estimation techniques to find and track plants relative to the spraybox. The second situation requires mapping the world as well as finding the weed and indexing the state/history of each weed.

6. Treatment Verification

In some embodiments, the method 60000 includes capturing, using an auxiliary camera system 24200 on the onsite platform 104, one or more images of operation of the ejector ejecting towards the region of interest. In some embodiments, the auxiliary camera system is configured to operate at a second frame capture rate that is more than the first frame capture rate.

In some embodiments, the method 60000 includes uploading the one or more images of the target area to a server.

In some embodiments, the cameras may be time synchronized with each other. In some embodiments, the cameras may also coordinate with other equipment on the agricultural vehicle such as light sensors, and other sensors. For example, based on ambient light, camera exposure or frame capture rate may be adjusted to obtain a high-quality image.

7. Embodiments of Image Analysis

In some embodiments, the analyzing includes using the one or more images as an input to a machine learning implementation to generate the target. The target may be identified, for example, using a bounding box around a region of interest in the one or more images. In some embodiments, the image analysis may use semantic segmentation, including pixel segmentation and labeling various objects in the one or more images as fruit, flower, random noise, background, landmark, etc.

In some embodiments, ML implementation includes use of a neural network.

In some embodiments, an object of interest may comprise a subset of all pixels forming the target. For example, a target may correspond to a bounding box of an undesirable vegetation (e.g., a weed), while the object of interest may correspond to contours of the weed. In some embodiments, an ML implementation may be configured to draw rectangular boxes around a number of pixels. This may be in the form of an actual box being drawn in the image, or just a storage of notes of the 4 corners of a box within the image and may include the label name/object type. In some embodiments, the box may be drawn such that the entire box is an object of interest. For example, a weed, a crop leaf, a rock, a bed, a trough, a fruit, a bud, a flower, etc. For example, objects within the box may not be distinguished as foreground objects with a background within the box. In some implementations, an ML implementation may be configured to perform pixel segmentation of an entire image (e.g., 4K×2 from stereo) where every pixel is either an object of interest that ML model knows or is considered to be background.

Figure 35A:
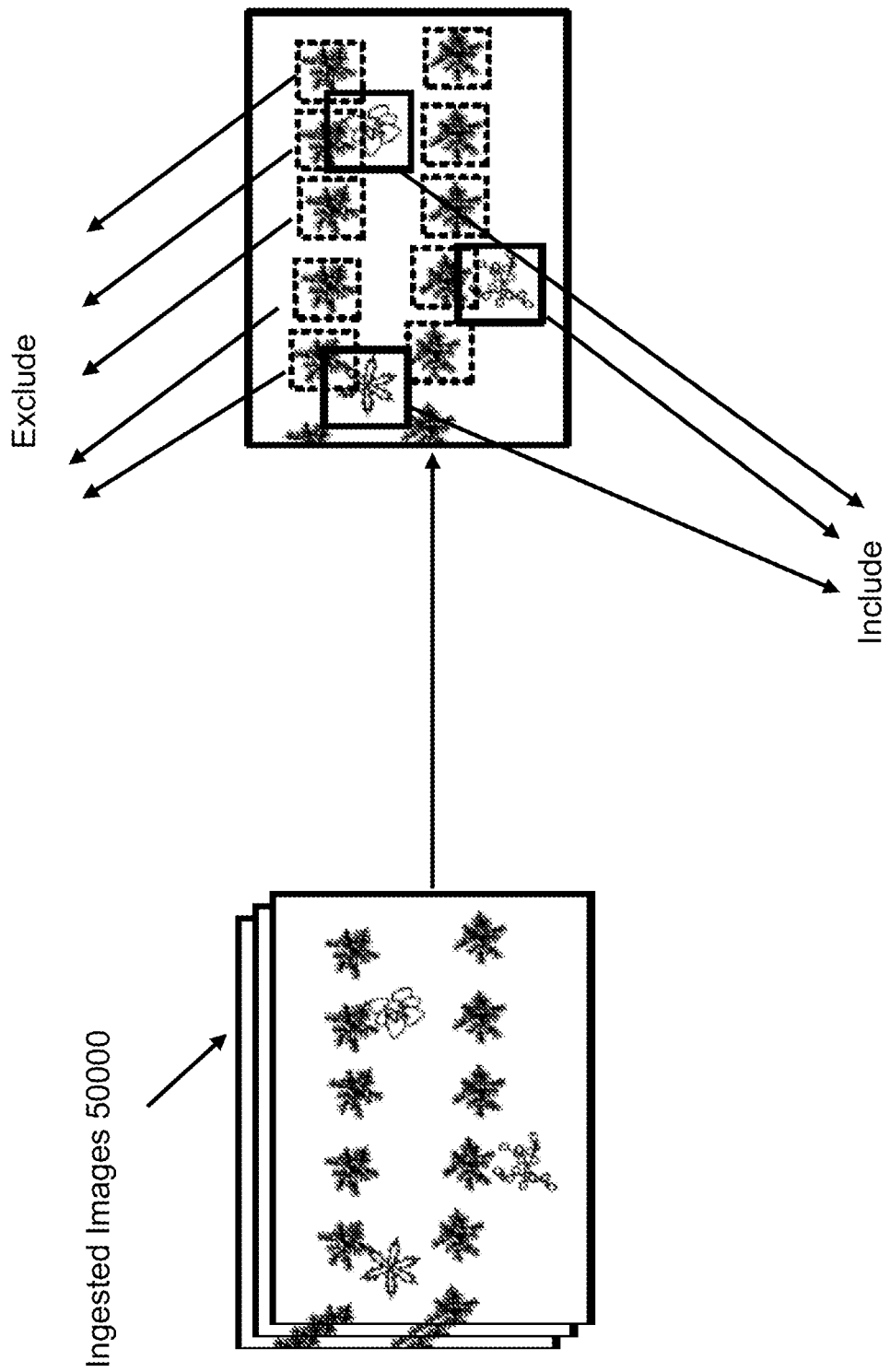
FIG. 35A-35B show an example implementations of ML image processing for automated implementation of agricultural activities.
Figure 45A:
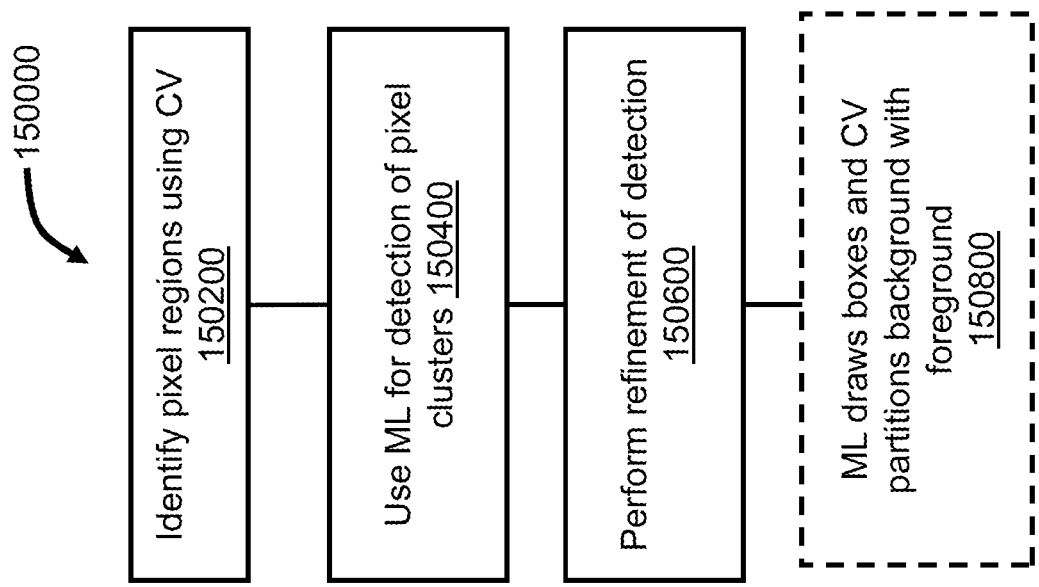
FIG. 45A is a flowchart of an example method of object detection.

In some embodiments, the ML implementation can draw Boxes around objects of interest, followed by another ML or a same ML model performing pixel segmentation on each individual box. In some embodiments, a computer vision technique may be used to ease the load. For example, a workflow 150000 depicted in FIG. 45A may be used. As shown, at 150200, CV draws boxes around interesting clusters of pixels. For example, referring to FIG. 35A, in some embodiments, CV may be used to identify rows or stripes of the ingested images 50000 in which the rows of vegetation belong (e.g., two rows are depicted in FIG. 35A). In some embodiments, alternatively or additionally, ML may also be used to perform this coarse identification to identify portions of images were future detection should work on. This way, the number if pixels to be handled by the next computing operation could be reduced. Next, ML may be used to perform ML detection (150400) on those clusters of pixels. For example, referring again to FIG. 35A, ML may be used to put the dashed bounding boxes or borders around pixel clusters that seem to include objects of interest (e.g., treatment targets). Next, at 150600, further refinement of the detection may be performed. For example, CV or ML may be used inside each of the identified areas to further identify foreground and background within each of the boxes (e.g., as depicted in FIG. 35A). For example, the CV or ML algorithm may separate out brown background (ground) from green objects (vegetation) or objects with other non-brown colors (e.g., a flower or a fruit). For example, in some implementations, as shown in an optional operation 150800, ML may draw boxes and CV (or another ML) may partition background with foreground. In some implementations, instead, or in addition, the ML or CV algorithm may generate superpixels in the boxes. The superpixels may represent a group of pixels that is determined to have a similar visual characteristic. For example, the underlying image portion may be a rigid object whose pixels will exhibit similar behavior of motion, rotation or coloring. Superpixel refinement may offer a reduced computational load during subsequent processing of the images.

In some embodiments, image analysis may be performed to identify targets that include unwanted objects such as weeds. For example, an ML algorithm may be programmed to eliminate known objects from the images (e.g., carrots or another crop) and the remaining objects may be classified as being unwanted objects. Alternatively, or in addition, the ML algorithm may be trained to identify a number of weeds whose pictures have been previously used to train the ML algorithm. Accordingly, all objects that are similar to the learned images of weeds may be marked as being unwanted objects.

In some embodiments, the image analysis may use instance segmentation. Here, pixels may be separated into separate objects such as fruit 1, flower 1, flower 2, weed, dirt, noise, and so on. In some embodiments, the image analysis may use a green segmentation technique in which a carrot may be recognized separate from green portion. Other examples of image analysis, including use of ML and/or CV techniques are described with reference to FIG. 45A.

At the end of the image analysis, in some embodiments, the ML algorithm may produce a list of unwanted objects (e.g., weeds) in the analyzed image.

In some implementations, two consecutive frames may have an overlapping common area because the camera may have travelled less distance between two frames than the distance covered by each frame. In such cases, the image analysis may simply use the "new" portion of the next image form object detection and rely on results of previous object detection on the overlapping portion of the image, where the objects will have simply moved in a particular direction that is opposite to the direction of movement of the camera. Alternatively, in some embodiments, the ML algorithm may run on each frame separately, with the object tracker tracking validity of detected objects as described in the present document.

In some embodiments, ingested images may be processed through pre-processing to make them friendlier for a subsequent ML based object detection. One example of pre-processing is image rotation. Using pose information, an image may be rotated to lie along an imaginary plane that is an optimal plane for ML based object detection. For example, this plane may represent "ideal" flat ground. Another example of pre-processing is color adjustment. An ingested image may be transformed into a color space that is suitable for use by the trained ML model. Another example of pre-processing is image zooming in or zooming out, including performing warping functions and techniques better align images from frame to frame across time by one or more sensors or from a first sensor to a second sensor to match, project, verify, or a combination thereof, capturing the sensor readings at the same time. This pre-processing may be used in case that the pose estimation indicates that the relative height of the camera from the ground has deviated above a threshold. Another example of pre-processing is image rotation that may be used to adjust a misalignment between pose of the agricultural vehicle and the camera direction. In the above examples, the pre-processing of images can be performed in real-time on a moving platform just before the step of processing the processed images or other sensor readings for object or keypoint identification.

8. Image Capture Embodiments

In some embodiments, the one or more images of the target area are captured using a main camera system positioned on the onsite platform 10400 on the agricultural vehicle. In some embodiments the main camera system is configured to operate at a first frame capture rate. The location of cameras typically will determine the area of farmland than is captured in a single image. For example, a camera that is located at 3 ft. height above ground will capture a smaller area of land compared to a camera that is located at 5 ft. height, comparing the two cameras with the same field of view. Consequently, an image captured from higher elevation may show vegetation as having relatively smaller size (in terms of pixel dimensions) compared to an image taken from a lower elevation. At the same time, the image taken from higher elevation may include a greater number of objects of interest compared to an image captured from a lower elevation than the higher elevation. Therefore, camera height may impact the performance of ML algorithm in detecting objects and also may impact the amount of computational resources used for real-time detection of weeds and other undesirable vegetation. Accordingly, in some embodiments, ML models may be trained for use in a certain range of camera height, which may be continuously monitored during pose determination.

In various embodiments, image capture may be performed using cameras, RGB-D cameras, multispectral cameras in stereo or more operably linked and time synced to each other, LiDARs, radars, infrared detectors, sonar, and so on. In some cases, there may be two sets of cameras—one set for pose detection to obtain global registry of pose of a vehicle supporting one or more spraying or plant treatment systems and subsystems and mapping an environment at global level, and other set or more sets operably connected to one or more treatment systems also supported by the vehicle for and object detection and another set for treatment verification at a local level, such that the sensors are sensing specific plant objects, e.g., as described in Section 6 of the present document.

9. Ejector Operation Embodiments

In some embodiments, the activating the ejector 24000 includes causing the ejector to eject a treatment substance such as spraying a liquid pesticide or herbicide towards the region of interest.

In some embodiments, the activating the ejector includes causing the ejector to eject a laser beam towards the region of interest. The ejector mechanism may be pneumatically or hydraulically pressurized. A solenoid may be control via an electric current into an open or a close position to release the liquid pesticide or herbicide in a desired direction. In some embodiments, the parameters that control the treatment such as spraying or laser beaming performed by the ejector include a pose or an orientation of the ejector, a duration for which the ejector will treat such as eject or spray, a pulse pattern in case the ejector is desired to perform more than one consecutive ejections. Such a mode may be used, for example, to allow the ejected liquid to be assimilated over the target in smaller quantity sprayings at rapid successions.

In some embodiments, the ejector may have a turret mounted on a turret and being able to move or rotate around multiple axes such as at different angles, pitch and yaw. The turret's nozzle may be connected to a storage tank that stored liquid to be sprayed. An example of an ejector mechanism is disclosed in the previously mentioned U.S. patent application Ser. No. 16/724,263, entitled "TARGETING AGRICULTURAL OBJECTS TO APPLY UNITS OF TREATMENT AUTONOMOUSLY."

10. Target Area Identification Embodiments

As described in the present document, the real-time processing engine 20000 may check ingested images for objects (see, e.g., operations at 21600). In various embodiments, the ingested one or more images may be analyzed using a variety of different techniques. These techniques may use ML or computer vision or other image processing and object identification embodiment.

In some embodiments, the analyzing the one or more images comprises comparing with a template that includes one or more images of weed plants, and wherein the region of interest corresponds to image area that matches one or more templates. Additionally, the ingested sensor readings can be sensor readings from non-camera related sensors or specifically visible color related camera sensors, such as radar, sonar, lidar, infrared sensors, multispectral sensors. For example, template point clouds, keypoints, or clusters can be accessed to compare with other point clouds, keypoints, or clusters of points capture in real time for object identification. In another example a combination of sensed signals including that of captured images, captured multi-spectral imagery, point clouds, or a combination thereof, can be used as templates to detect objects in real time from one or more sensors ingesting sensor readings in real time.

In some embodiments, the analyzing the one or more images comprises comparing with a template that includes one or more images of a crop, and wherein the region of interest corresponds to image area having a mismatch with the template.

In some embodiments, a multi-image post-processing may be performed on the identified target to ensure robustness of the identification process. For example, if one image yields a target that is identified as a weed, the ML algorithm may check next N images (N an integer) for presence or absence of the identified weed. For example, N may be equal to 3 to 7 consecutive images that are checked to see if the weed detected in the first image is also seen in the second image, the third image, and so on. For example, in some embodiments, based on the pose of the vehicle and a direction of movement of the vehicle, the ML algorithm may expect a target detected around location (x, y) in an image to be near a position (x+dx, y+dy), in a next frame. Here dx and dy represent effective movement of the target due to the movement of the vehicle (and therefore camera) in a 2-dimensional reference frame. After affirmatively confirming that the target is being tracked with high accuracy in consecutive N frames, the system may activate the ejector mechanism as described herein. Additional techniques for target tracking are also disclosed in Section 3 and with respect to FIG. 34.

In some embodiments, the image analysis may provide a target area which is a bounding box or contours of portions of an image, determined or generated by performing semantic segmentation of at least a portion of an image frame, performing superpixel segmentation, of an object identified by the ML image analysis, further described in Section 11. In addition, a further determination may be made regarding a precise location within the target area where the ejector should be aimed to shoot at. For example, depending on the type of object (e.g., a variety of weed), a pre-determined rule about which part of the weed should the herbicide point to may be used. For example, for certain types of weeds, the ejector may be pointed towards roots, while for other types of weeds, the ejector may be pointed towards leaves, and so on. In some cases, if a specific critical point within the target area cannot be identified or is not required, a volumetric approach may be used to shoot the entire target area with a relatively large bolus of the herbicide.

11. ML Embodiments

In some implementations, a ML system may be implemented on the vehicle that is configured to operate in the agricultural setting. Various aspects of the ML system are depicted in FIG. 32C, and include embodiments that provide target inclusion capability (23000), target exclusion capability (23200), various ML training methods (23400) and implementations of ML (236), as further described in the present document. The ML system may be implemented using a general-purpose computer or preferably using a specialized process that is configured with an ML library. The ML system may be implemented on two different locations. A first portion, which may mainly perform training and building of ML models, may be implemented using the offsite computing resources 10200. The first portion, mainly used for feature extraction and object detection, or classification, or both using a trained ML model, may be continually updated upon further training and implemented by the onsite platform 10400. At the beginning of an in-field session, the offsite computing resources 10200 may communicate most recent ML models to the onsite platform

10400 via the link 10800. In particular, these models may be used to identify objects using one of several techniques. For example, in some embodiments, supervised learning, or unsupervised learning, may be used to train the ML model using a number of images of different object that the onsite platform 104 may encounter in the field. These objects include various images of a desired crop or fruit or flower that is intended to be cultivated and/or types of weeds and other undesirable vegetation that is to be eliminated from the field. The objects in these images may be labeled according to the object name. For example, previously ingested images that were correctly identified may be used for the supervised-learning-based approach. Active learning techniques may be applied to produce better candidate images for human labelling as ground truths for further training of a machine learning model. For example, a machine learning model can be configured to determine that certain image frames, or sequence of continuous frames, ingested from a plurality of continuous frames ingested in an observation and treatment trial on a geographic boundary do not detect any objects of interest for targeting or from omitting from targeting. For example, a vehicle can pass through a patch of dirt without, in reality, any weeds, plants, or crops for a few meters. Upon uploading a continuous set of image frames to a server for analysis and for labelling, a machine learning algorithm can be applied to detected an optimal subset of frames for human labelling or quality control, including for example, excluding the sequence of image frames capturing the few meters of dirt without any weeds, plants, or crops. Active learning can also be applied for example, to determine common landmarks from frame to frame that are not necessarily plant objects of interest, such as target plants for treating. Once common landmarks are identified, the system via active learning can produce a subset of image frames for human labelling or quality control by removing or reducing images that have common landmarks as that of other images to further reduce redundancy of image quality analysis. Additionally, active learning techniques can be applied such that one or more machine learning algorithms analyzes an entire set of ingested images and performed detections, classifications, labelling, pixel classification, or bounding box labelling, such that detections above a certain threshold can be used as training data and those that do not meet a threshold can be sent to a human for labelling, classifying, or performing quality control. Additionally, propagation techniques, including forward propagation and backpropagation can be applied to further provide resources as training datasets for training the machine learning model. Additionally, unsupervised learning techniques can be applied In some embodiments, labeled data may be used to train the ML models. The labeled data may include exclusion targets (e.g., objects that are to be identified as being desirable or high value objects, while everything else being considered low value or undesirable), or inclusion targets (e.g., objects that are identified as targets for elimination by treatment, while everything else is to be preserved). The labeled data may provide "ground truth" images that are known to, for sure, show weeds and/or desirable vegetation. The training data may also use raw data that is not labeled in order for ML algorithm is able to train on. In some embodiments, ML models can be models configured to detect salient points or cluster of points of a given image or point cloud. In one example, unsupervised learning can be applied to train machine learning models to analyze unlabeled data. Additionally, an ML model can be configured to detect a certain spectrum of color, or a certain shape that are of interest in an agricultural environment, particularly static objects such as tree trunks, row farm beds and troughs, etc.

In some embodiments, the ML model may be trained by trial and error. In these embodiments, a human supervision may be provided at the offsite computing resources 10200 for improving accuracy of object detection by monitoring and correcting identification errors.

Figure 33:
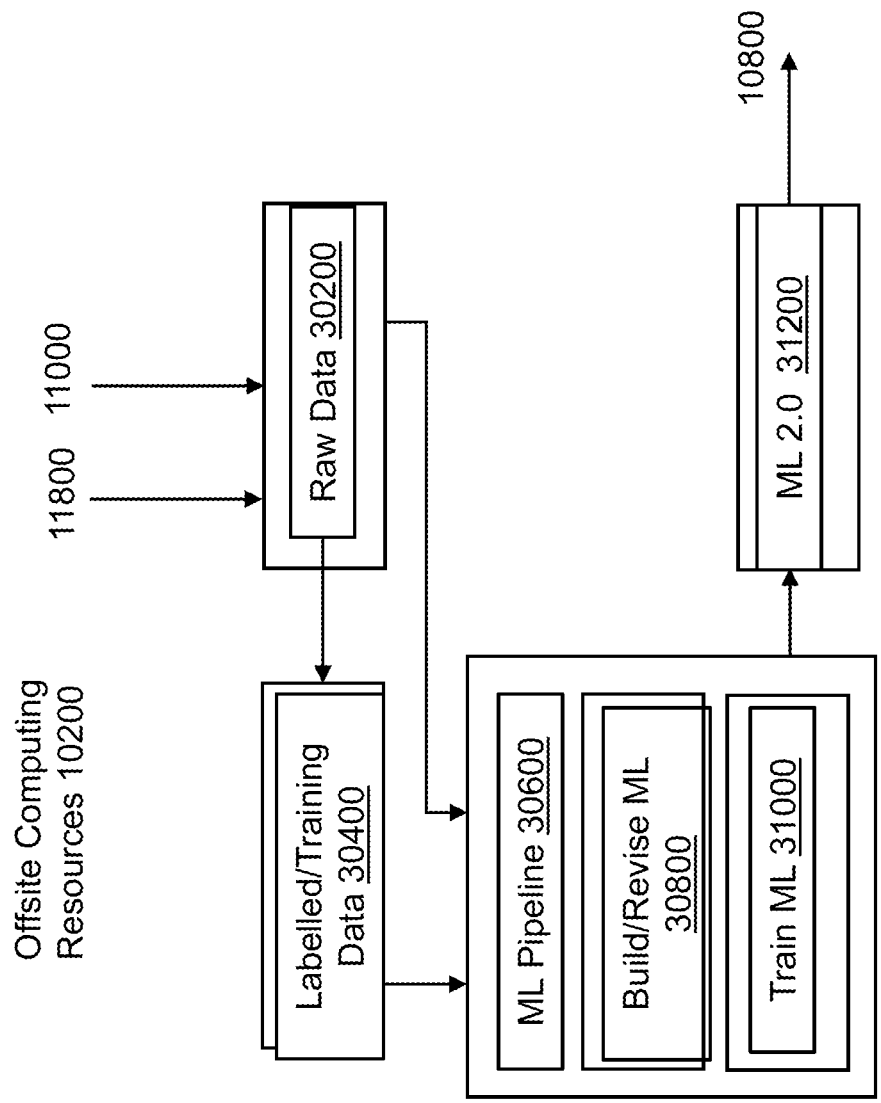
FIG. 33 is an example of offsite computational resources that provide support for an automated weed elimination process.

FIG. 33 shows an example of how offsite computing resources 10200 may acquire data for improving ML models during use. Data may be acquired from various sources such as raw data (30200) from field videos, or data uploaded by onsite platforms 10400 after completing their runs (e.g., via link 11000). A human operator or an artificial intelligence algorithm (AI) may be used to label (30400) some frames of raw data such that these frames may be used as labeled data for training. The raw data and the labelled or training data may be input to an ML pipeline (306) that undergoes training as described in the present document, resulting in new or revised ML models (30600) that are better trained (31000). Such better trained ML models, called ML 2.0 31200, in name only) may be downloaded to the onsite platforms 104 via the link 10800 on a periodic basis such as once every day or at the beginning of a run or trial. In some embodiments, transfer learning techniques can be applied to machine learning models configured to detect plant objects of a certain type located on a first type of agricultural environment and trained on datasets of plant objects or labelled plant objects of the certain type, and applied to detect plant objects of another type located on a second type of agricultural environment. In this example, an online agricultural observation and treatment system, supported by an autonomous vehicle, having one or more machine learning models downloaded and stored on a local database and accessed by a local compute unit of the treatment system, can perform agriculture related functions on various types of farms or orchards, continuously ingest datasets of different objects, and train on all of the different types of datasets to improve the machine learning model such that the treatment system can improve performance on any agricultural environment treating any type of plant.

Figure 35B:
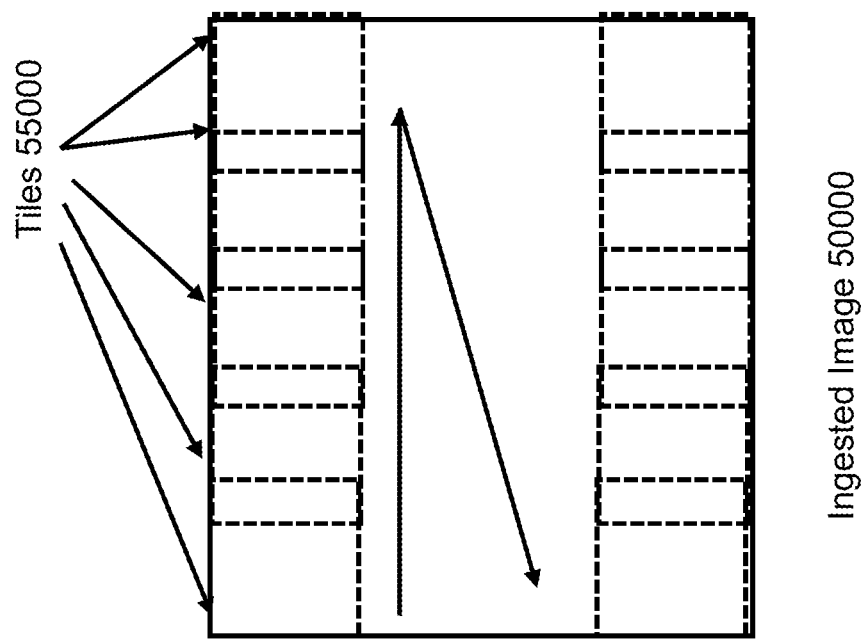

In some embodiments, after a ML model is downloaded to the onsite platform 10400, the ingested images 50000 may be divided into tiles 55000, as depicted in FIG. 35B. The tiles are a smaller portion of the image 50000, typically rectangular, that may be scanned from one end of the image to the other end of the image. In some embodiments, consecutive horizontally displaced tiles may be overlapping. In some embodiments, the tiles may be non-overlapping. For example, an entire image may be processed as a number of tiles starting from left to right and progressing downwards from the top of the image to the bottom of image. The sliding of tile region may be overlapping in the horizontal or vertical direction. In some embodiments, non-overlapping tiles may be used to reduce amount of computations to be performed in real-time. Alternatively, in some embodiments, overlapping tiling may be used to improve accuracy of object detection. In some embodiments, a mix of overlapping and non-overlapping tiles may be used. For example, in regions of lower illumination or lower color contrast, overlapping tiles may be used to improve accurate object detection by the ML mode.

The size of tiles may be chosen to be larger than an expected size of a region or a bounding box of objects expected to be found in the image. In some cases, the ML model may be adapted to varying tile sizes during offline training. In some embodiments, a pre-processing stage may be used to eliminate certain parts of an image before an ML model is applied to the image for object detection. For example, large flat area of constant texture may be identified by pre-processing and removed from the image prior to the tiling. In some embodiments, the ML models implemented on the onsite platform 10400 may be configured to detect objects only in the new area of image that has entered in the view of the camera from a previous image to a next image.

In some embodiments, different ML algorithms or models may be used simultaneously to detect objects. For example, one ML model may be used for identifying apples, another may be used for identifying pears, yet another for detecting weeds, and so on. In a typica farming situation, it may be possible to encounter 100s of different objects—including flowers, fruits, leaves, and so on. The task of detection of useful objects from among these multitude of possible objects may be simplified by selecting ML models that are specifically trained for excluding or including a certain number of these objects, as is described next. In some other embodiments, a single ML algorithm or model may be used to train on all of the varying types of objects and salient points for object or keypoint detection.

Figure 38:
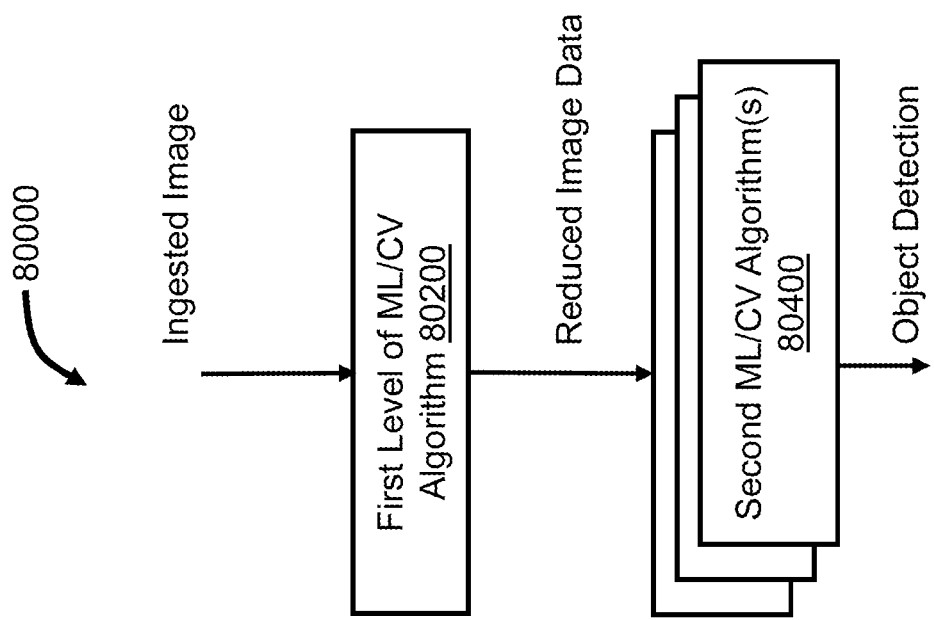
FIG. 38 shows an example of image preprocessing.

In some embodiments, a multi-level strategy may be used. For example, a first run of a first ML algorithm (or a first CV algorithm) may be used to simply mark area of interest and eliminate areas in an image where no objects are present. This may be followed by one or more second ML algorithms (or CV algorithm) for detecting objects in the reduced image data that has been filtered through the first ML algorithm. The first ML algorithm may, for example, identify a dominant color that should be used by the second level of ML analysis. FIG. 38 shows an example of such a multi-level strategy 80000 wherein the first ML algorithm, or CV algorithm, may be applied, at 80200, on an entire image, followed by one or more second level ML (or CV) algorithms, at 80400, on reduced image data. FIG. 35A shows another example in which an ingested image includes approximately two rows of a crop and some weeds, and the image on the right identifies a number of areas for which additional ML object detection may be performed to either exclude or include objects for treating. In some other embodiments, a combination of computer vision techniques, ML techniques, or a combination thereof, can be applied in multiple levels to better or more quickly with using fewer resources or smaller computational load to detect objects and its location in the real world.

12. ML Target Inclusion (23000)

In some embodiments, ML may train for inclusion of targets. As further discussed in Section 11, inclusion objects may be weeds, insects or other objects detected in the ingested or captured images that may be target for ejection action for treatment such as spraying with a chemical or laser burning. In these embodiments, a library of possible objects detected in a farm may be maintained. New objects (e.g., previously unseen weeds) may be added to this library and used for ML training. The addition of new objects may be done using offsite computing resources 10200 and may be performed during two runs of the agricultural vehicle such that newly detected objects may be used to train ML models that are used for object detection in the next run of the agricultural vehicle.

13. ML Target Exclusion (23200)

In some embodiments, ML may be trained for excluding targets. For example, a particular crop or fruit or flower may be considered for exclusion from treatment or spraying, while everything else may be okay to treat. In a farming situation, typically, a farm may be growing only one specific crop and therefore desirable objects may be limited to a small number—e.g., leaves, fruits or flower of the crop. In comparison the number of undesirable objects may be large such as a number of possible weeds or other undesirable growth that may be seen on the farm. Therefore, such embodiments may reduce the amount of computational resource needed for object detection due to relatively fewer desirable objects compared to undesirable objects.

In some embodiments, a crop may be a root or a tuber that largely lies underground and therefore may not be clearly visible to a camera from above. For example, in some embodiments, an ML algorithm may be trained to identify everything that looks to be green leafy. From all such objects, the objects that match leafiness of a crop (e.g., carrot leaves) may be excluded from identifying as a treatment target and all other green leafy objects may be considered treatment targets. For example, semantic segmentation models that identify objects based on color may be used. In some embodiments, ML algorithms may be trained to detect green objects using a gamut of green shades and the gamut may be successively improved based on training.

14. ML Training/Feature Extraction (23400)

In some embodiments, the ML algorithm may extract features of the ingested frame during the analyzing operation and during checking for objects 21600. Here, a feature may be a measurable piece of image data. The measurable piece or a combination of multiple such measurable pieces may be used to distinguish the object from other objects. For example, a shape of a line, an area and a corresponding color, or a range of colors within the object may be some examples of features of the object. In some embodiments, the object may be divided into multiple portions (e.g., leaves, stem, etc.) with each portion of the object having a feature associated with it.

In some embodiments, during ML training, both the features of the object and how to divide an object into multiple portions may be trained for the ML model. For example, one particular type of weed may not show any flowers and may be characterized by only leaves portion and stem portion, while another type of weed may be characterized additionally by a flower portion. In some embodiments, features may be extracted using a histogram oriented gradient. In some embodiments, the features may be extracted using a Haar cascade implementation. In some embodiments, scale-invariant feature transforms (SIFT), FAST, SURF, ORB, or a combination thereof, may be used to detect salient features or cluster of points in a given sensor reading. For example, these computer vision techniques can be used to take into account that leaves may be in various orientations with respect to the camera that captures the images. Other techniques may be implemented to detect corners, edges, lines, blobs, keypoints, etc.

15. Deep Learning

In some embodiments, object identification may be performed using a deep learning algorithm. The deep learning algorithm may be implemented using a deep neural network. Images may be input to the deep learning algorithm which produces a list of objects perceived in the input images. For example, a multi-layer perceptron architecture (MLP) for implementing the deep learning. In some embodiments, a convolutional neural network (CNN) may be used for object identification. The CNN may use a set of hyperparameters that characterize or describe the operation of the CNN. Such parameters include number of hidden layers, activation functions, error functions, batch size, and so on.

In some embodiments, the offsite computing resources 10200 may be used to optimize hyperparameters for the machine learning algorithm used by the onsite platform 10400. For example, at the beginning of each run made by the onsite platform 10400 in the field, the offsite computing resources 10200 may download (e.g., at 21200) a new set of models or ML behavior to the onsite platform 10400. In one advantageous aspect, such an architecture provides a flexible use of resources for farming operation where an onsite platform 10400 may learn to perform better not just based on its own previous data but also based on data collected from farm runs of other agricultural vehicles and corresponding onsite platforms that may also be controlled by the offsite computing resources.

Figure 40:
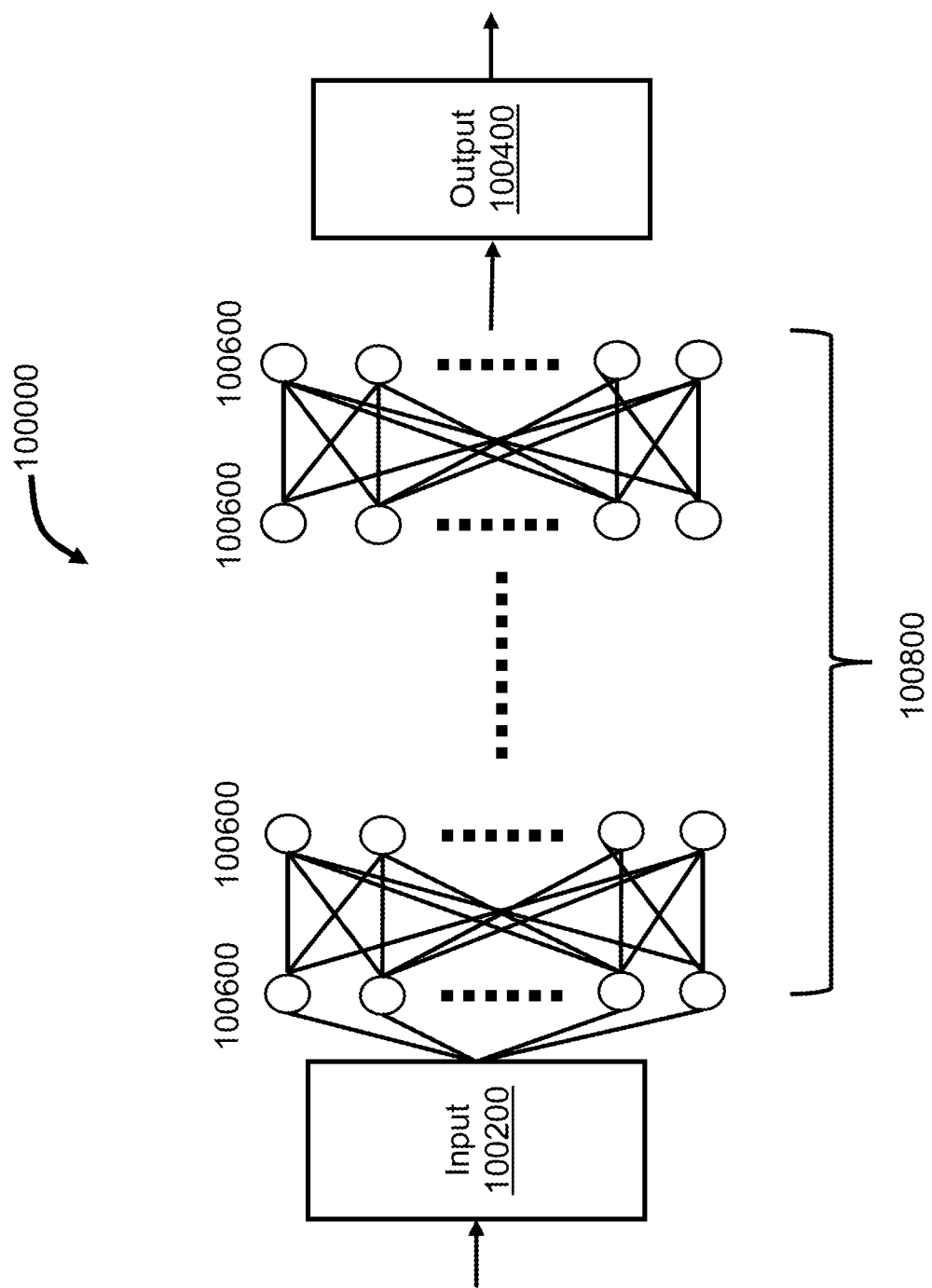
FIG. 40 is an example of a neural network for machine learning.

FIG. 40 shows an example of a neural network NN 100000 used for implementing deep learning for identification of various objects as described in the present document. The NN 100000 includes multiple layers 100600 of neurons that operate upon input 100200 to produce an output 100400. The NN 100000 may be characterized by a number of hyperparameters 100800. In some embodiments, the input 100200 may include one or more ingested images. These images may be, for example, images captured by cameras on the onsite platform 104. In some embodiments, the output 1004 may include a list of objects, a bounding box for each identified object, a confidence number for each identified object or another image parameter.

The hyperparameters 100800 for the NN 100000 may be determined based on training that may be performed using sample images and/or previous runs of the agricultural vehicle. One hyperparameter may correspond to a number of layers 100600 used for the ML implementation. This number may be determined based on previous runs as a trade-off between one or more of a computational complexity, real-timeness of the ML results, visual complexity of vegetation of a field, and so on. In some embodiments, one of the hyperparameters may comprises an input activation function used for handling input 100200. The input activation function may be, for example, a rectifier linear unit (ReLU) activation function. In some embodiments, one of the hyper-parameters may correspond to an output activation function. The output activation function may be, for example, a normalized exponential function. These activation functions may specially be suited for object recognition and various parameters of these functions may be trained/optimized based on test data or in-field results. In some embodiments, one of the hyperparameters may correspond to an error function used for determining ML object detection errors. In some embodiments, mean square error may be used. In some embodiments, a human eye model mask may be used for determining the error in ML object detection. In some embodiments, one of the hyperparameters may correspond to a number of samples used for parameter updates. A tradeoff may be performed between large number of samples between parameter updates (which requires a large amount of memory but learn faster) versus small number of samples between parameter updates. The actual number may depend on operational parameters such as computing resources in the onsite platform 10400 of a specific agricultural vehicle. In some embodiments, one of the hyperparameters corresponds to an optimization algorithm that is used by the NN 100000 for object detection using the ML algorithm.

16. One Example Workflow

In some embodiments, an onsite platform 10400 may operate as follows. The agricultural vehicle may be configured to implement the onsite system 10400. At the beginning of a field run, an ML model (or multiple ML models) may be loaded onto the onsite system 10400 from the offsite computing resources. The agricultural vehicle may drive through a path in a field, continuously monitoring its pose via a plurality of time synced and fused sensors including GPS, IMU, rotational encoders, image sensors and point cloud sensors configured to obtain global registry of an environment, for example by performing visual SLAM and visual odometry, among other sensors configured to obtain pose of a vehicle supporting an agricultural treatment system or subsystems. Based on the knowledge about initial pose, the subsystems of the agricultural observation and treatment system supported by the vehicle, can point additional sensors, including cameras, towards the field that includes desirable and undesirable vegetation growth. The agricultural vehicle may keep moving forward (e.g., along a row of crop plantings) and capture images of the field at a certain rate. For example, the frame capture rate may be 60 to 200 frames per second. Based on the pose and the direction of travel, the onsite platform 10400 of the agricultural vehicle may estimate distance moved between two consecutive image captures, either as an actual distance, or a relative distance in units of pixels of the image resolution.

In parallel with image capture operation, the onsite platform 10400 may ingest the captured images to the ML algorithm loaded on the onsite platform 10400 to perform object detection. The ML algorithm may, for example, provide a list of weeds and locations or regions in which the weed are located within the frame. Based on the detection of one or more objects of interest in one or more images captured, the agricultural observation and treatment system can then determine the real-world location of the object of interest detected in the image.

For example, when a weed is detected in an image, the onsite platform 10400 may track the movement of the weed from one frame to next (in general N frames, but practically between 3 to 8 frames). Upon determining with a high degree of confidence that (a) the detected object is a weed, and (b) the weed is a threshold distance away from desired vegetation such that treating or spraying the weed with herbicide will not damage the crop, the onsite platform 104 may point a spray nozzle or a laser towards the location of the weed and spray the herbicide or the laser at the weed. The onsite platform 10400 may implement an object tracker algorithm to track movement of various objects from one frame to next, with the objects being detected by the ML algorithm. At any time, the object tracker algorithm may track 1 to 50 different objects in the frame. The exact number may be adaptive and may also be learned from the ML algorithm. For example, in some cases, after crop object is identified (e.g., which may be up to 6 to 10 objects in the image), every other object may be assumed to be a weed. Alternatively, specific weeds may be tracked and treated. Thus, the ML algorithm may operate in conjunction with the object tracker algorithm to implement the ML target inclusion and the ML target exclusion strategies described in Sections 12 and 13.

The onsite platform 10400 may capture the treatment event using a camera for quality control. Subsequently, the video may be uploaded to the offsite computing resources for verification of accuracy of the treatment either manually or by a machine.

The onsite platform 10400 may transmit the captured images to the offsite computing resources for monitoring effectivity. For example, if ML algorithm identifies a weed and a crop in a certain image, a bounding box of the crop may be subtracted from the image and the resulting weed region may be compared with a previous capture at the same exact location to check effectiveness of the weed-killing strategy.

17. Edge Server Embodiments

Revisiting FIG. 31, in some embodiments an edge server may be used in the system 10000 depicted in FIG. 31. While not shown explicitly in FIG. 31, the edge server may be positioned between the onsite platform 104 and the offsite computing resources 10200. For example, an edge server may be installed at a shed or a barn in a farm (e.g., within direct wireless communication range) and may be operating using electricity. The edge server may be used to achieve a trade-off between the computational power limitations on the onsite platform 10400 and the relative speed with which certain results (e.g., decision to treat) are needed to meet a real-time operation of the farming vehicle.

In some embodiments, the onsite platform 104 may perform preprocessing of images. As described in Section 7, the preprocessing may include color space conversion, resolution adjustment, and so on.

In some embodiments, the onsite platform 10400 may send captured images to the edge server to perform the first level of ML algorithm processing (80200, described in FIG. 38). This first level of ML algorithm may operate on a large number of pixels (e.g., 4K images) and may reduce the amount of image data on which ML algorithms may be run. The second ML algorithms may be run on the onsite platform 104 on the reduced data, which may thus need a reduced amount of computing resources and power. The onsite platform 10400 may perform the tasks of object tracking and activation of ejector mechanism to ensure a minimal delay to treat, e.g., spray herbicide at a weed.

Alternatively, in some embodiments, all ML algorithms may be run on the edge server (e.g., operations 21400, 21600) while the onsite platform 10400 may simply take the target object list (e.g., target area 12000) and perform operations of system start (including pose estimation) 21200, object confirmation 21800, object tracking 22000 and treatment activation 22200 and 22400.

FIG. 42 shows an example method 120000 of operating an edge server. The method 120000 includes receiving, at 120200, a configuration and one or more ML models from offsite computing resources. For example, in some embodiments, the edge server may communicate a request on behalf of an agricultural vehicle. At the time an agricultural vehicle is powered on and put into use in a field, the agricultural vehicle may register with an edge server that is operating near the field. After the initial handshake or one-way registration is complete, the edge server may transmit a message to the offsite computing resources. After the transmission of the message, the edge server may receive operational data and parameters from the offsite computing resources. The operational data may include one or more ML models that the current run of the agricultural vehicle will use. The parameters may be used for configuring other operational features such as details of image processing pre-processing, splitting of certain tasks between edge server and the agricultural vehicle, and so on.

At 120400, the method 120000 includes downloading operational data and parameters to a field equipment. In some embodiments, a secure communication protocol such as using encryption or authentication certificate may be used for securing the operational data and parameter downloading.

At 120600, the method 120000 includes receiving, by the edge server, run-time data from the field equipment. The run-time data generated by the agricultural vehicle and transmitted to the edge server may depend on the parameters that were configured for the operation of the agricultural vehicle. For example, in some embodiments, the run-time data may include images captured by the cameras on the agricultural vehicle. In some embodiments, the run-time data may include a partially processed image data (not the entire image, but a processed version such as a down-sampled version or a color reduced version, etc.). In some embodiments, ML algorithm may be split to run partly on the agricultural vehicle and partly on the edge server. The split may be based on image panels or sub-portion or based on image groupings such as every other image. Accordingly, the run-time data may include corresponding partial image data. In some embodiments, an output of ML processing of the images may be transmitted. This output may include a listing of objects identified by the ML algorithm, including a confidence level. This information may be used by the edge server to perform object tracking.

At 120800, the method 120000 includes processing the run-time data according to the configuration. The processing may depend on the parameters that configure the resource division between the agricultural vehicle and the edge server. The resource division may depend on resource availability on the agricultural vehicle, the complexity of operation, and so on. For example, if it is determined that a particular field operation entails tracking of a large number of objects (e.g., above a threshold such as 10 objects), the computational resources on the edge server may preferably be used. In some cases, adverse field conditions such as low illumination or rain may trigger a greater use of computational resources on the edge server, which typically may be houses in a better controlled environment. Accordingly, the processing at 120800 may include image pre-processing, object detection using ML algorithm, object tracking, decision making regarding objects to treat, collection and compilation of ejector operation videos/images and so on.

18. Additional Example Embodiments

FIG. 36 is a flowchart for a method 60000. The method 60000 includes obtaining (60200), by a computer system mounted on an agricultural vehicle, one or more images of a target area. The images may be obtained using the cameras and image capture embodiments described in the present document, e.g., Section 8.

The method 60000 includes analyzing (60400), by the computer system, the one or more images to determine a target. Various techniques for analyzing images are described in the present document, including, e.g., Sections 7 and 11 to 15.

The method 60000 includes activating (60600), by the computer system, an ejector onboard the agricultural vehicle to emit towards the target. Various techniques for treatment activation such as the activation of ejector to spray an herbicide or a laser are described in the present document, e.g., Sections 3 and 9.

In some embodiments, two different cameras may be used to obtain depth perception to the target. Alternatively, or in addition, a single camera may be used for obtaining depth information. The single camera may be operated at two or more rate or density to obtain the depth information.

In some embodiments, the method 60000 includes uploading the one or more images of the operation of the ejector to a server. For example, the server may an edge server.

In some embodiments, prior to the obtaining the one or more images of the target area, the computer system may be initialized for use as follows. The initialization may include one or more of: (a) updating a machine learning algorithm and/or a machine learning model onboard the computer system, (b) determining a pose of the agricultural vehicle, (c) calibrating one or more sensors onboard the agricultural vehicle, or (d) performing diagnostics on the ejector. (e) time synchronize each sensor, lights, actuator/motor, and ejector.

In some embodiments, different ML models may be used for different applications of the vehicle. For example, different models may be used for weed identification, fruit identification, nut identification and so on. Alternatively, a ML model that encompasses two or more of the above may be used. Each ML model may be trained on one or more ML algorithms. For example, training may be performed via a CNN (convolutional neural network) or DNN (deep neural network) gradient descent method. Additional examples of training are disclosed in Sections 3 and 11 of the present document.

Some embodiments may preferably use the following technical solutions.

Figure 45B:
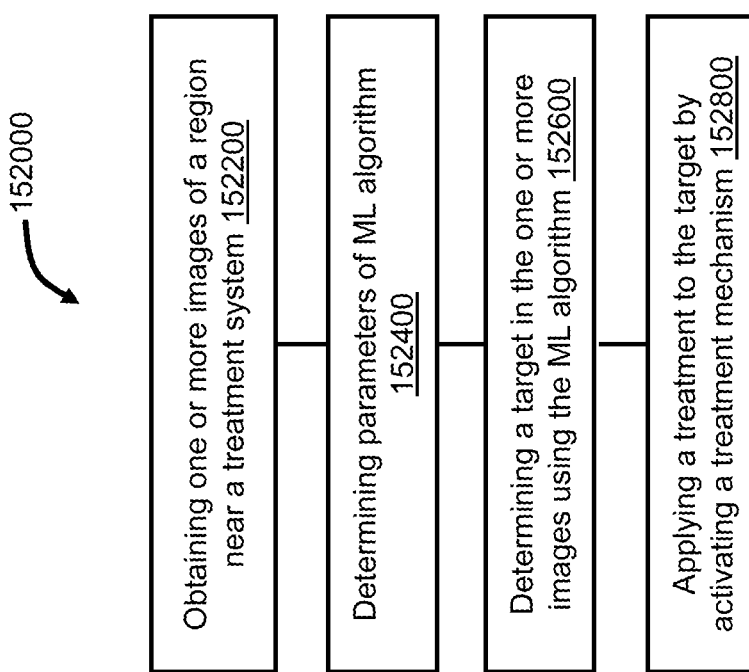
FIG. 45B is a flowchart of an example method described in the present document.

1. A method implemented by a treatment system (e.g., method 152000 depicted in FIG. 45B) having one or more processor, a storage, and a treatment mechanism, comprising: obtaining (152200), by the treatment system mountable on an agricultural vehicle and configured to implement a machine learning (ML) algorithm, one or more images of a region of an agricultural environment near the treatment system, wherein the one or more images are captured from the region of a real-world where agricultural target objects are expected to be present; determining (152400), by the treatment system, one or more parameters for use with the ML algorithm, wherein at least one of the one or more parameters is based on one or more ML models related to identification of an agricultural object; determining (152600), by the treatment system, a real-world target in the one or more images using the ML algorithm, wherein the ML algorithm is at least partly implemented using the one or more processors of the treatment system; and applying (152800) a treatment to the real-world target by selectively activating the treatment mechanism based on a result of the determining the target.

2. The method of solution 1, wherein the determining the target includes: identifying a subset of pixels of the one or more images for a next processing; detecting, using the ML algorithm, one or more areas in the subset of pixels including an area that includes the target; and performing refinement of the one or more areas.

3. The method of solution 2, wherein the identifying is performed using a first computer vision technique and the refinement is performed using a second computer vision technique.

4. The method of solution 3, wherein the refinement comprises identifying a foreground object and a background in the one or more areas.

5. The method of solution 4, wherein the identifying is performed by segmenting according to colors or by segmenting according to regions or by segmenting according to detected edges.

6. The method of solution 3, wherein the refinement comprises identifying superpixels in the one or more areas.

7. The method of solution 1, wherein the activating the treatment mechanism includes emitting a fluid projectile towards the target.

8. The method of solution 1, wherein the activating the treatment mechanism includes orienting the treatment mechanism towards the target and emitting a beam of light towards the target.

9. The method of solution 1, wherein the selectively activating comprises activating the treatment mechanism in response to detecting the target in multiple consecutive frames of the one or more images.

0. The method of solution 1, wherein the ML algorithm is implemented using a convolutional neural network (CNN).

Some embodiments may preferably use the following technical solutions.

Figure 45C:
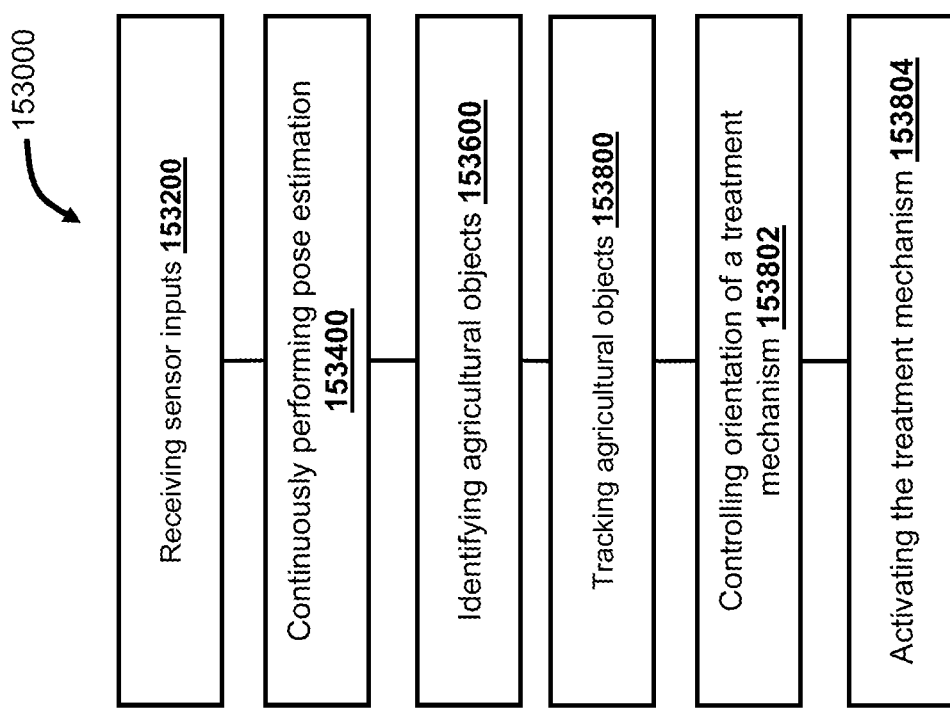
FIG. 45C is a flowchart of an example method described in the present document.

1. A method performed by a treatment system (e.g., method 153000 depicted in FIG. 45C) having one or more processors, a storage, and a treatment mechanism, comprising: receiving (153200), by the treatment system, sensor inputs including one or more images comprising one or more agricultural objects; continuously performing (153400) a pose estimation of the treatment system based on sensor inputs that are time synchronized and fused; identifying (153600) the one or more agricultural objects as real-world target objects by analyzing the one or more images; tracking (153800) the one or more agricultural objects identified by the analyzing; controlling (153802) an orientation of the treatment mechanism according to the pose estimation for targeting the one or more agricultural objects; and activating (153804) the treatment mechanism to treat the one or more agricultural objects according to the orientation.

2. The method of solution 1, wherein the performing the pose estimation includes determining a global pose estimation using inputs from sensors configured to receive sensor readings of a world environment causing determination of a position and an orientation of a vehicle on which the treatment system is disposed.

3. The method of solution 2, wherein the determining the global pose estimation includes mapping a global scene of the treatment system.

4. The method of solution 2, wherein the sensors configured to receive sensor readings from the world environment include sensors that detect an (x, y, z) orientation.

5. The method of solution 1, wherein the performing the pose estimation comprises determining a local pose estimation from sensors configured to sense a local environment of the treatment system and to determine a localization and an orientation of components of the treatment system.

6. The method of solution 5, further comprising generating a mapping of local scenes based on the information received from the sensors configured to sense the local environment and a global map indicative of a global environment of the treatment system.

7. The method of solution 1, wherein the activating the treatment mechanism includes emitting a beam of light towards the one or more agricultural objects.

8. The method of solution 1, wherein the activating the treatment mechanism includes emitting a fluid projectile towards the one or more agricultural objects.

Additional embodiments and features of the above described solution sets are described throughout the present document.

In some embodiments, a vegetation control system includes a computer system comprising one or more processors, an image capture system configured to capture images of an environment near the computer system and provide the images to the computer system; and a treatment mechanism configured to eject a treatment substance under a control of the computer system. The computer system is mountable on an agricultural vehicle and is configured to implement a machine learning (ML) algorithm, and determine a pose of the computer system, wherein the pose comprises a global pose and a local pose; determine a target in one or more images from the image capture system; and activate based on the pose and upon the determining the target, the treatment mechanism to emit the treatment substance towards the target. In some embodiments, the image capture system is further configured to capture feedback images of the target during operation of the treatment mechanism, and wherein the computer system is configured to analyze the feedback images to provide a correction signal to the operation of the treatment mechanism. In some embodiments, the computer system analyzes the feedback images using computer vision. In some embodiments, the correction signal comprises adjusting an ejection angle of the treatment mechanism. In some embodiments, the correction signal causes the treatment mechanism to perform a cleaning or an alignment or a modification to an operational parameter. In some embodiments, the image capture system is configured to capture the images of the environment at a first frame rate and a first frame resolution and capture the feedback images at a second frame rate and a second frame resolution, wherein the second frame rate is greater than the first frame rate or the second frame resolution is less than the first frame resolution.

In some embodiments, a system of vegetation control includes one or more offsite computing resources representing offsite computing resources of the system, an onsite platform representing onsite computing resource of the system, wherein the onsite platform is configured to communicate with the offsite computing resources through a communication coupling.

In some embodiments of the system, the onsite platform is configured to obtain a pose of the onsite platform, wherein the pose includes a global pose and a local pose; determine a target in one or more images input to the onsite platform, wherein the one or more images are obtained based on an environment near the onsite platform; and activate, based on the pose and upon the determining the target, a treatment mechanism onboard an agricultural vehicle to emit towards the target. In some embodiments, the onsite platform is further configured to receive a machine learning (ML) model used to determine the target and/or transmit a result of activating the treatment mechanism. In some embodiments, the treatment mechanism is configured to eject a chemical or a laser beam towards the target. In some embodiments, the system further includes an edge server positioned between the offsite computing resources and the onsite computing resources, wherein the edge serve is configured for: (1) facilitating a communication from the offsite computing resources to the onsite platform, (2) facilitating a communication from the onsite platform to the offsite computing resources, or (3) offload computing tasks from the onsite platform in coordination with the onsite platform. In some embodiments, the edge server offloads ML computing tasks from the onsite platform such that the onsite platform is limited to performing computer vision analysis of the result of activating the treatment mechanism. In some embodiments, the ML model is trained at the one or more offsite computing resources based on raw data obtained from the onsite platform.

In some embodiments, a treatment system that is included with an onsite platform may include one or more processors, one or more treatment mechanisms or units that are configured to implement the above-described solutions.

Further features and embodiments of the above-described solutions are disclosed throughout the present document.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method performed by a treatment system on a moving platform, the treatment system having one or more processors, a storage, and a treatment mechanism, comprising:
   receiving, by the treatment system, during operation in an agricultural environment, one or more images comprising one or more agricultural objects in the agricultural environment;
   identifying, in real-time, one or more objects of interest from the one or more agricultural objects by analyzing the one or more images, wherein the analyzing results in a first object being identified as belonging to one or more target objects and a second object being identified as not belonging to the one or more target objects;
   logging one or more results of the identification of each of the one or more objects of interest and a corresponding treatment decision; and
   activating the treatment mechanism to treat the one or more target objects;
   wherein the activating the treatment mechanism includes: directing an ejection from the treatment mechanism towards the first object at a predicted position of the first object where the ejection is expected to hit the first object;
   wherein the predicted position of the first object is determined using an estimated optical flow of the first object.

2. The method of claim 1, wherein the analyzing the one or more images comprises analyzing the one or more images using a machine learning (ML) algorithm that uses one or more ML models configured to identify the one or more agricultural objects.

3. The method of claim 1, wherein the predicted position of the first object is determined by estimating a time difference between when an ejector mechanism of the treatment mechanism is activated and a time when a discharge from the ejector mechanism is expected to hit the first object.

4. The method of claim 1, wherein the ejection is directed from the treatment mechanism towards the first object based on a pose of the treatment mechanism.

5. The method of claim 4, wherein the pose is determined by determining a global pose using inputs from sensors rigidly connected to the moving platform configured to receive sensor readings of a world environment causing determination of a location and an orientation of the moving platform and a local pose from sensors configured to sense a local environment of the treatment system and to determine a localization and an orientation of the treatment system.

6. The method of claim 1, wherein the activating the treatment mechanism includes emitting a laser towards the one or more target objects or emitting a fluid projectile towards the one or more target objects or configuring an end effector to physically interact with the one or more target objects.

7. The method of claim 1, further comprising generating a treatment history of the one or more target objects treated by the treatment mechanism, including the first object.

8. The method of claim 1, further comprising generating and mapping a first digital agricultural environment comprising one or more first digital assets representing the one or more agricultural objects in the agricultural environment, the generating and mapping at least partially based on the identified one or more objects of interest including the one or more target objects, the first object, the second object, or a combination thereof, the one or more results of the identification, the corresponding treatment decision of the one or more objects of interest identified, or a combination thereof.

9. The method of claim 8, further comprising generating and mapping, based on a subsequent pass performed by the treatment system identifying the one or more agricultural objects or newly identified objects of interest in the agricultural environment, a second digital agricultural environment comprising one or more second digital assets representing the one or more agricultural objects, newly identified objects of interest, or a combination thereof.

10. The method of claim 9, wherein the first digital agricultural environment and the second digital agricultural environment map a same agricultural environment and the second digital agricultural environment is an updated version of the first digital agricultural environment such that a plurality of the one or more second digital assets are mappable onto and digitally linked to the one or more first digital assets, each of the linked first and second digital assets representing a same agricultural object.

11. The method of claim 10, wherein linking of the one or more second digital assets to the one or more first digital assets represent state changes of the identified one or more agricultural objects from a first pass performed by the treatment system to the subsequent pass performed by the treatment system.

12. The method of claim 9, wherein the first digital agricultural environment and the second digital environment are accessible on a user interface.

13. The method of claim 12, further including enabling a viewing of a state change of the one or more agricultural objects by displaying a change between the one or more first digital assets and the one or more second digital assets.

14. The method of claim 12, further including enabling a viewing of a state change of the agricultural environment by displaying a change between the first digital agricultural environment and the second digital agricultural environment.

15. A treatment system on a moving platform, the treatment system comprising:
   one or more processors,
   a storage configured to store data or processor-executable code, and
   a treatment mechanism under control of the one or more processors,
   wherein the one or more processors is configured to:
   receive, during operation in an agricultural environment, one or more images comprising one or more agricultural objects in the agricultural environment;
   identify, in real-time, one or more objects of interest from the one or more agricultural objects by analyzing the one or more images, wherein the analyzing results in a first object being identified as belonging to one or more target objects and a second object being identified as not belonging to the one or more target objects;
   log one or more results of the identification of each of the one or more objects of interest and a corresponding treatment decision; and
   activate the treatment mechanism to treat the one or more target objects,
   wherein the treatment mechanism is activated by directing an ejection from the treatment mechanism towards the first object at a predicted position of the first object where the ejection is expected to hit the first object;
   wherein the predicted position of the first object is determined using an estimated optical flow of the first object.

16. The treatment system of claim 15, wherein the analyzing the one or more images comprises analyzing the one or more images using a machine learning (ML) algorithm that uses one or more ML models configured to identify the one or more agricultural objects.

17. The treatment system of claim 15, wherein the ejection is directed from the treatment mechanism towards the first object based on a pose of the treatment mechanism.

18. A treatment system on a moving platform, the treatment system comprising:
   one or more processors,
   a storage configured to store data or processor-executable code, and
   a treatment mechanism under control of the one or more processors,
   wherein the one or more processors is configured to:
   receive, during operation in an agricultural environment, one or more images comprising one or more agricultural objects in the agricultural environment;
   identify, in real-time, one or more objects of interest from the one or more agricultural objects by analyzing the one or more images, wherein the analyzing results in a first object being identified as belonging to one or more target objects and a second object being identified as not belonging to the one or more target objects;
   log one or more results of the identification of each of the one or more objects of interest and a corresponding treatment decision; and
   activate the treatment mechanism to treat the one or more target objects;
   wherein the treatment mechanism is activated by directing an ejection from the treatment mechanism towards the first object at a predicted position of the first object where the ejection is expected to hit the first object;
   wherein the predicted position of the first object is determined by estimating a time difference between when an ejector mechanism of the treatment mechanism is activated and a time when a discharge from the ejector mechanism is expected to hit the first object.

19. The treatment system of claim 18, further comprising generating and mapping a first digital agricultural environment comprising one or more first digital assets representing the one or more agricultural objects in the agricultural environment, the generating and mapping at least partially based on the identified one or more objects of interest including the one or more target objects, the first object, the second object, or a combination thereof, the one or more results of the identification, the corresponding treatment decision of the one or more objects of interest identified, or a combination thereof.

20. The treatment system of claim 19, further comprising generating and mapping based on a subsequent pass performed by the treatment system identifying the one or more agricultural objects or newly identified objects of interest in the agricultural environment, a second digital agricultural environment comprising one or more second digital assets representing the one or more agricultural objects, newly identified objects of interest, or a combination thereof.

* * * * *